US011511468B2

(12) United States Patent
Suzuki

(10) Patent No.: US 11,511,468 B2
(45) Date of Patent: Nov. 29, 2022

(54) MOLD DEVICE, INJECTION MOLDING SYSTEM AND METHOD FOR MANUFACTURING MOLDED ARTICLE

(71) Applicant: Yasuhiro Suzuki, Suzuka (JP)

(72) Inventor: Yasuhiro Suzuki, Suzuka (JP)

( * ) Notice: Subject to any disclaimer, the term of this patent is extended or adjusted under 35 U.S.C. 154(b) by 579 days.

(21) Appl. No.: 15/737,316

(22) PCT Filed: Dec. 7, 2016

(86) PCT No.: PCT/JP2016/086380
§ 371 (c)(1),
(2) Date: Dec. 18, 2017

(87) PCT Pub. No.: WO2017/119228
PCT Pub. Date: Jul. 13, 2017

(65) Prior Publication Data

US 2018/0194051 A1 Jul. 12, 2018

(30) Foreign Application Priority Data

Jan. 6, 2016 (JP) ................................ 2016-000781
May 10, 2016 (JP) ............................ JP2016-094427
Aug. 31, 2016 (JP) ................................ 2016-168716

(51) Int. Cl.
*B29C 45/17* (2006.01)
*B29C 45/34* (2006.01)
(Continued)

(52) U.S. Cl.
CPC ...... *B29C 45/1734* (2013.01); *B29C 45/0025* (2013.01); *B29C 45/0055* (2013.01);
(Continued)

(58) Field of Classification Search
CPC .............. B29C 45/1732; B29C 45/174; B29C 45/14795
See application file for complete search history.

(56) References Cited

U.S. PATENT DOCUMENTS 4,479,914 A * 10/1984 Baumrucker ......... B29C 44/105 264/101
4,508,356 A 4/1985 Janian
(Continued)

FOREIGN PATENT DOCUMENTS

DE 19516290 A 11/1996
EP 0495614 A 7/1992
(Continued)

OTHER PUBLICATIONS

International Search Report for PCT/JP2016/086380 dated Mar. 7, 2017.

(Continued)

*Primary Examiner* — Jacob T Minskey
*Assistant Examiner* — S. Behrooz Ghorishi
(74) *Attorney, Agent, or Firm* — Yokoi & Co., U.S.A.; Toshiyuki Yokoi

(57) ABSTRACT

[Problems] The objective of present invention is to provide the mold, injection molding system and method capable of limiting the outflow of pressurized fluid injected into a mold cavity.
[Solution] A mold device and a molding device comprising: a shaft body 27 provided at least on one mold among a first mold 205 and a second mold 206 that form a molding space 200, the shaft body being used for pushing out a molded article formed from a resin injected into the molding space 200; a ring-shaped elastic member for supporting the shaft body 27 in which an opening formed along the circumferential direction is oriented toward the said molding space; and an injection portion provided on at least one mold among the first mold 205 and the second mold 206, the injection portion being used for injecting a pressurized fluid into the molding space 200.

8 Claims, 86 Drawing Sheets

(51) Int. Cl.

| | |
|---|---|
| ***B29C 45/00*** | (2006.01) |
| ***B29C 45/03*** | (2006.01) |
| ***B29C 45/40*** | (2006.01) |

(52) U.S. Cl.

CPC ............ *B29C 45/03* (2013.01); *B29C 45/174* (2013.01); *B29C 45/1732* (2013.01); *B29C 45/34* (2013.01); *B29C 45/401* (2013.01); *B29C 2045/1737* (2013.01); *B29C 2045/1741* (2013.01); *B29C 2045/4015* (2013.01)

(56) References Cited

U.S. PATENT DOCUMENTS

| | | | | |
|---|---|---|---|---|
| 5,439,371 | A | 8/1995 | Sawaya | |
| 5,540,581 | A | 7/1996 | Aida et al. | |
| 5,874,324 | A * | 2/1999 | Osada | B29C 43/32 438/124 |
| 2010/0252962 | A1 * | 10/2010 | Ueha | B29C 45/174 264/500 |

FOREIGN PATENT DOCUMENTS

| | | | | | |
|---|---|---|---|---|---|
| JP | H03-224719 | A | | 10/1991 | |
| JP | H05-111938 | A | | 5/1993 | |
| JP | H06-198691 | A | | 7/1994 | |
| JP | H08-066932 | A | | 3/1996 | |
| JP | H08-066946 | A | | 3/1996 | |
| JP | H10-24469 | A | | 1/1998 | |
| JP | H11-108193 | A | | 4/1999 | |
| JP | H11-216748 | A | | 8/1999 | |
| JP | 2001-162654 | A | | 6/2001 | |
| JP | 2003048235 | A | * | 2/2003 | B29C 45/1704 |
| JP | 2004-299357 | A | | 10/2004 | |
| JP | 2009-083216 | A | | 4/2009 | |
| JP | 2009-299787 | A | | 12/2009 | |
| JP | 2010-184401 | A | | 8/2010 | |
| JP | 2010184401 | A | * | 8/2010 | |
| JP | 2011-255541 | A | | 12/2011 | |

OTHER PUBLICATIONS

PCT written opinion dated Mar. 7, 2017.

Extended European Search Report dated Apr. 3, 2019.

Saint-Gobain Seals, OmniSeal catalog, 2014.

Moglichkeiten und Grenzen der Projektilinjektionstechnik, IKV Fachtagung, Gas und Wasserinjektionstechnik—Potenziale nutzen, Herausforderungen meistern, pp. 1-7, Nov. 28, 2007.

* cited by examiner

Fig. 59B
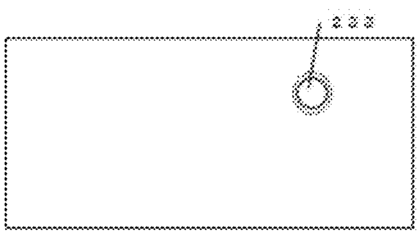
Fig. 59D
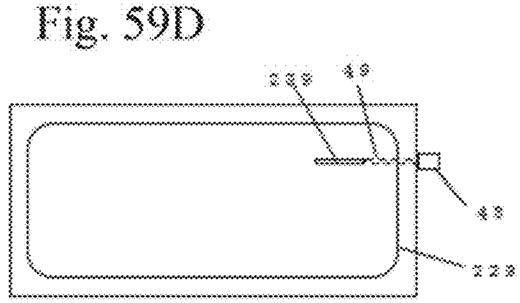
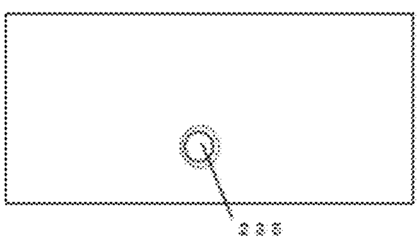
Fig. 59C
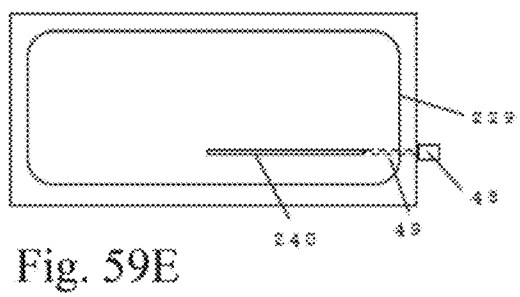
Fig. 59E

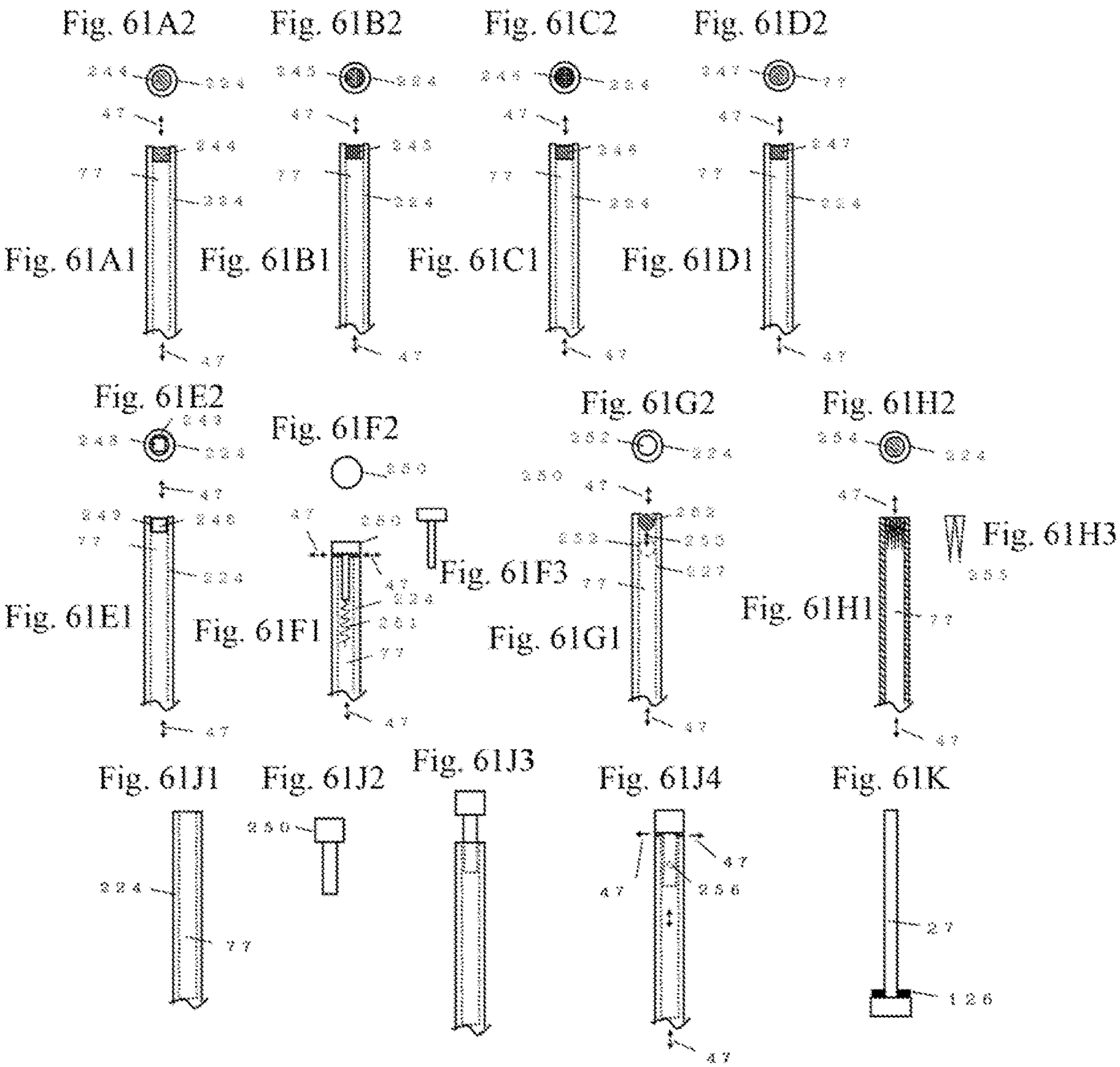
Fig. 61A2 Fig. 61B2 Fig. 61C2 Fig. 61D2
Fig. 61A1 Fig. 61B1 Fig. 61C1 Fig. 61D1
Fig. 61E2 Fig. 61F2 Fig. 61G2 Fig. 61H2
Fig. 61F3 Fig. 61H3
Fig. 61E1 Fig. 61F1 Fig. 61G1 Fig. 61H1
Fig. 61J1 Fig. 61J2 Fig. 61J3 Fig. 61J4 Fig. 61K
Fig. 62
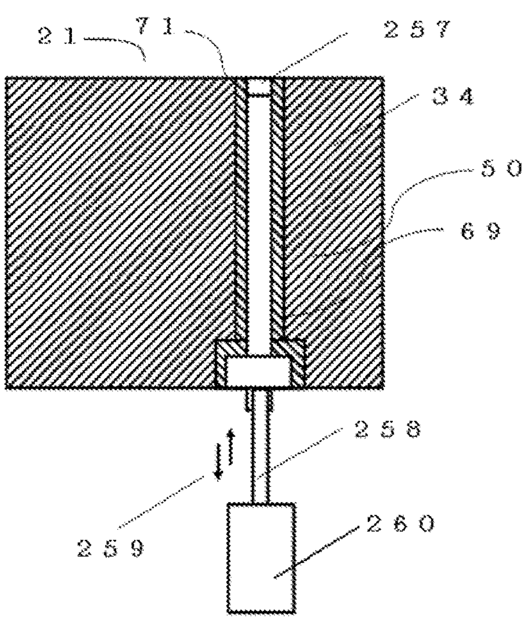

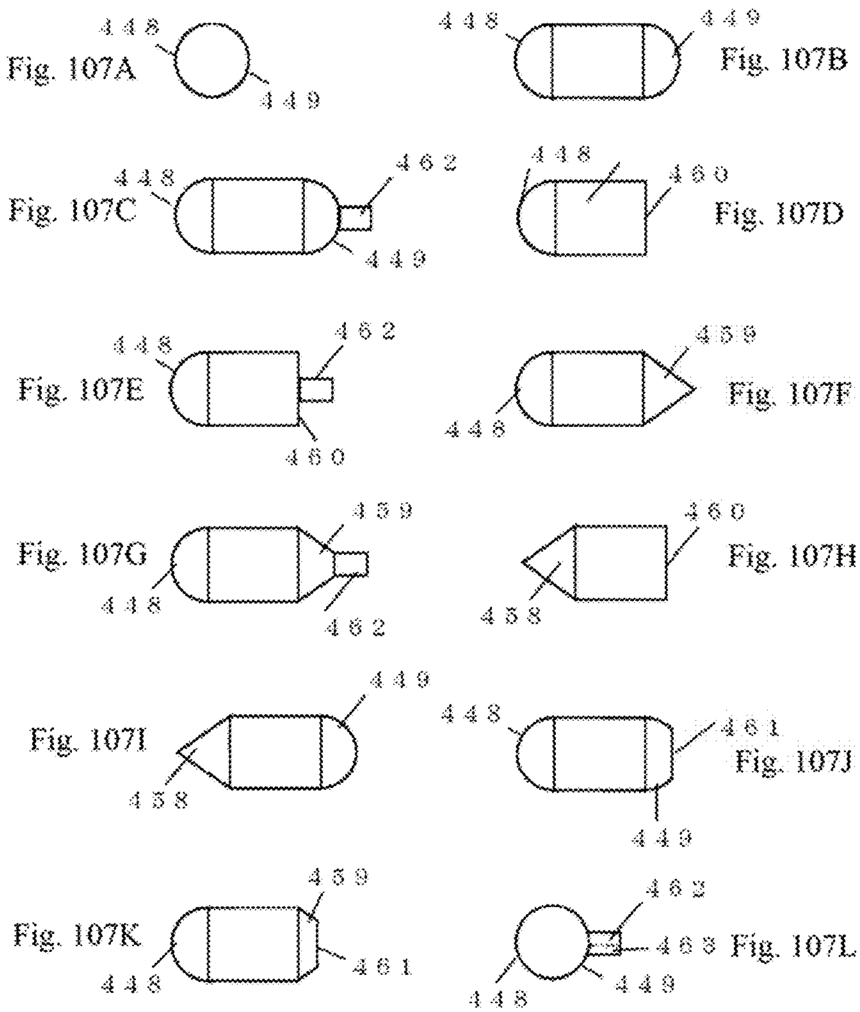
Fig. 107A Fig. 107B Fig. 107C Fig. 107D Fig. 107E Fig. 107F Fig. 107G Fig. 107H Fig. 107I Fig. 107J Fig. 107K Fig. 107L
Fig. 108
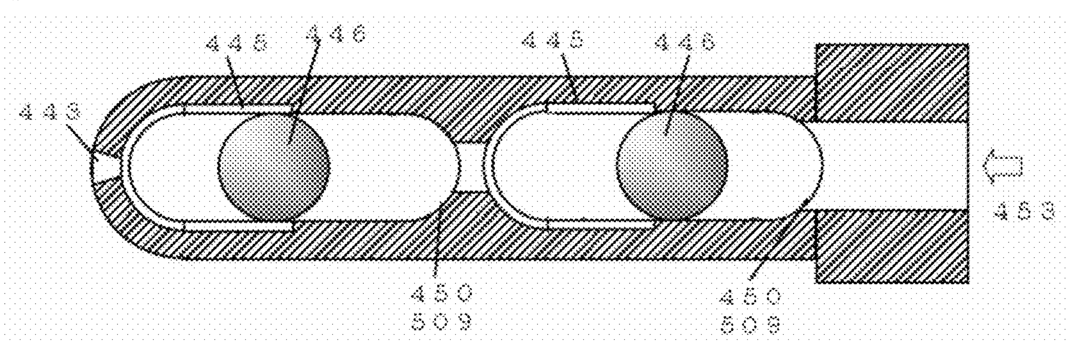

Fig. 128A
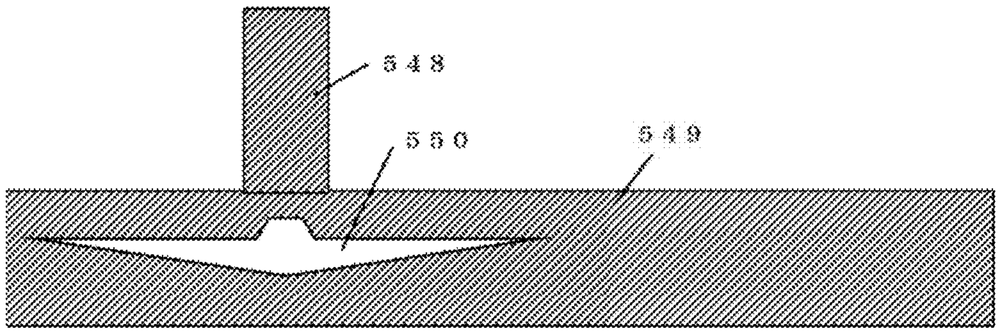
Fig. 128B
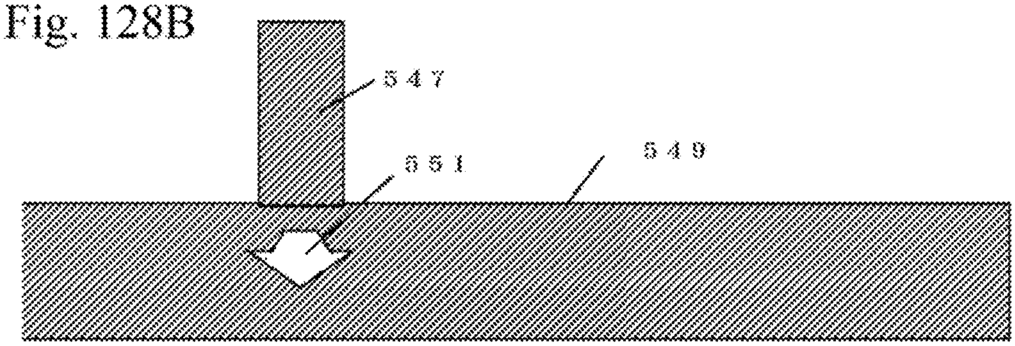
Fig. 129A
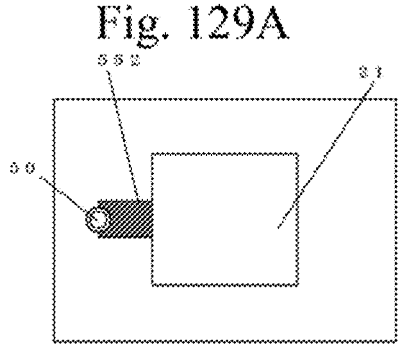
Fig. 129C
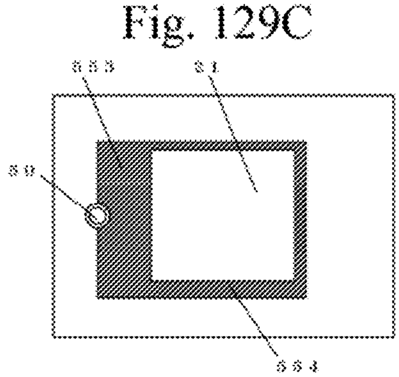
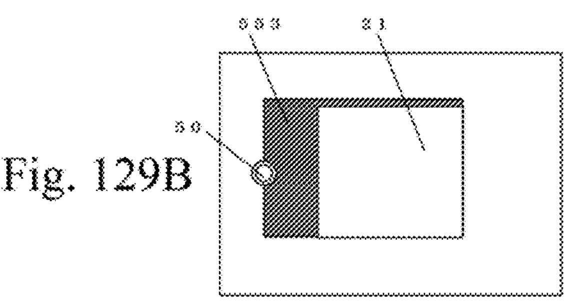
Fig. 129B

MOLD DEVICE, INJECTION MOLDING SYSTEM AND METHOD FOR MANUFACTURING MOLDED ARTICLE

TECHNICAL FIELD

The present invention relates to the mold device, the injection molding system and the method for manufacturing molded article.

BACKGROUND ART

The patent document 1 relates to the mold structure for manufacturing the palette of plastic material with skids composed of a non-foamed surface layer and a formed inner part, by injecting a molten resin into a cavity formed by a hermetically-closed space of ejector box as well as by a movable mold and a stationary mold, after the said cavity has been filled with an ejected compressed gas. The patent document 1 describes an art whereby the material hardness of a movable mold and a stationary mold is enhanced around the zone of confluence of molten resin in comparison with other zones.

PRIOR ART DOCUMENTS

Patent Documents

[Patent document 1] Japanese published unexamined application official bulletin 2009-083216

DISCLOSURE OF THE INVENTION

Problems to be Solved by the Invention

The ejector box is provided for securing the hermetically-closed condition of the ejector box. Here, the ejector mechanism comprises the ejector pins to extrude the article molded in the cavity and the ejector plate for mounting the ejector pins.

The ejector pins are inserted into the holes leading to the cavity formed in the mold on the movable side or in the mold on the stationary side and make a reciprocating motion in conjunction with the reciprocating motion of the ejector plate. Since there are clearances between the said holes and ejector pins, the pressurized fluid in the cavity flows out (leaks) when the pressurized fluid is ejected into the cavity. The ejector box is provided for the purpose of preventing the pressurized fluid flowing out through the said clearances from flowing out further to the outside.

However, because of the large volume of the ejector box, in order to prevent the escape of the pressurized fluid out of the mold, it is needed to eject from outside into the ejector box the pressurized fluid with its pressure as high as that of the fluid in the cavity as well as with its volume as large as that of the ejector box.

The present invention addresses the problem of providing a mold, an injection molding system, and a molding manufacturing method that limit the outflow of a pressurized fluid ejected into a cavity.

Means for Solving Problem (Constitution of Claim 1)

The first invention according to claim 1 relates to a mold with a nested structure that is sealed, when the pressure forming-injection molding by using a pressurized fluid is carried out, in such a manner as to prevent leakage of pressurized fluid from the clearances in parting and nested element, wherein ejector pins and pressurization ejector pins are sealed by ring-shaped elastic members.

Incidentally, an ejection device of pressurized fluid has a multiple structure composed of an outer cylinder and an inner core. In the ejection device of pressurized fluid, the pressurized fluid is ejected from its tip portion and enters a clearance between a resin and the mold to effect pressure forming.

(Action of Claim 1)

With the first invention according to claim 1, since a sealed mold is used, the resin in the molding space is formed by fluid pressure without outward escape of a gas or a liquid that has entered the clearance between a resin and the mold, and consequently a molded article of high transcription quality can be obtained.

(Effect of Claim 1)

With the first invention according to claim 1, since a gas or a liquid that has entered the clearance between the resin and the mold pressurizes the resin in the cavity with a uniform pressure by the Pascal' s law, the effect to derive an article of high transcription quality and of high dimensional precision is realized.

(Description of Claim 1)

The first invention according to claim 1 relates to a mold device comprising: a shaft mechanism that is provided on at least one of a first mold and a second mold forming a molding space having a nested structure (having a clearance); and an ejection portion that is provided on at least one of the first mold and the second mold, the ejection portion ejecting a pressurized fluid into the molding space from an ejection device having multiple structure, wherein the shaft mechanism includes a shaft body (ejector pin, shape extrusion, inclined pin, inclined core, etc.) for extruding an article molded from a resin injected into the molding space; a ring-shaped elastic member for supporting the shaft body, an opening of a groove formed in a circumferential direction of the ring-shaped elastic member being oriented toward the molding space; and a ring-shaped member fitted into the opening of the groove of the ring-shaped elastic member.

The invention relates to a molding device used for a molding method for filling the resin in the cavity (molding space) of injection molding having ejector pins for ejecting a molded article and a mold having a nested structure and introducing a pressurized fluid into the clearance between the filled resin and the mold from the ejecting device having multiple structure with at least two components for ejecting pressurized fluid in order to pressurize and compress the resin filled in the molding space. In order to prevent the escape of pressurized fluid having entered the clearance between the resin and the mold through clearance of the nested element, clearance of ejector pin, and clearance of pressurization ejector pin, the bottom of the nested structure is sealed by a seal-plate, an ejector pin and a pressurization ejector pin as the shaft mechanism for extruding the molded article are sealed by the ring-shaped elastic member, and an elastic member made of plastic or metal is fitted into the opening of the ring-shaped elastic member.

Incidentally, an ejector pin 27, a pressurization ejector pin 227, and an ejector pin 27 constituting a pressurization ejector pin 500 have a function to push out (eject) the molded article.

"Ejection device of pressurized fluid" signifies: pressurization pin 50; pressurization ejector pin 227; pressurization ejector pin 500; and pressurization pin having a structure capable of effecting the fluid pressurization illustrated in FIGS. 61A-61J.

(Constitution of Claim 2)

The ejection device of pressurized fluid of the second invention according to claim 2 has a multiple structure composed of an outer cylinder and an inner core, wherein the pressurized fluid flows between the outer cylinder and the inner core and the pressurized fluid is ejected only from a tip portion of the ejection device of pressurized fluid.

(Action of Claim 2)

Because the ejection device of pressurized fluid of the second invention according to claim 2 has a multiple structure composed of an outer cylinder and an inner core, the pressurized fluid is ejected only from a tip portion of the ejection device of pressurized fluid.

(Effect of Claim 2)

Because the ejection device of pressurized fluid of the second invention according to claim 2 has a multiple structure composed of an outer cylinder and an inner core, the pressurized fluid is ejected only from a tip portion of the ejection device of pressurized fluid and hence is not ejected from the clearance of the nested element and the like, and therefore the pressurized fluid is filled in the molding space without disturbing the molded shape of resin.

(Constitution of Claim 3)

The third invention according to claim 3 relates to a structure having a mechanism enabling the inner core and the outer cylinder of the ejection device of pressurized fluid to advance and recede (i.e., move forward and backward).

(Action of Claim 3)

The third invention according to claim 3 enables the action to move backward at least the outer cylinder of the ejection device of pressurized fluid composed of an outer cylinder and an inner core before fluid pressurization to make a space between at least the outer cylinder of the ejection device of pressurized fluid and a resin filled in the molding space so that the pressurized fluid can be ejected into the space thus created and the pressurized fluid can enter easily the clearance between the resin and the mold.

(Effect of Claim 3)

Because the third invention according to claim 3 enables a mold device to move backward at least the outer cylinder of the ejection device of pressurized fluid composed of an outer cylinder and an inner core before fluid pressurization to make a space and eject the pressurized fluid into the space thus created, the pressurized fluid can enter easily the clearance between the resin and the mold, and consequently the mold device realizes an effect to prevent the pressurized fluid from intruding into the resin and forming hollows there even if the pressure of pressurized fluid is increased.

(Description of Claim 3)

In the mold device, before ejecting the pressurized fluid, at least the outer cylinder of a pressurization pin or a pressurization ejector pin is made to recede to create a space between the resin filled in the molding space and the outer cylinder (tip portion of the outer cylinder). Since the pressurized fluid is ejected toward thus created space, even if the pressure of pressurized fluid is high, the fluid does not intrude into the resin to form hollows but it enters the clearance between the resin and the mold and effects pressure forming.

(Constitution of Claim 4)

The fourth invention according to claim 4 relates to an injection molding unit provided with a mechanism that enables the unit to inject a resin into a molding space after the mold is closed and an ejector rod is advanced to a predetermined position, while keeping the rod at the advanced position, and then after finishing the resin injection to move the ejector rod backward to create a space between the resin injected into the molding space and an ejection device of pressurized fluid.

(Action of Claim 4)

The fourth invention according to claim 4 relates to an injection molding unit wherein a space is created between an injected resin and an ejection device of pressurized fluid when the ejector rod is moved backward after the molding space has been filled with the resin. By ejecting the pressurized fluid toward the created space, the pressurized fluid can enter with ease the clearance between the resin and the mold and effect the pressurization.

(Effect of Claim 4)

The fourth invention according to claim 4 realizes the effect of reducing the mold cost through simplifying the mold structure by incorporating into an injection molding unit a mechanism to enable an ejection device of pressurized fluid to function.

(Description of Claim 4)

In an injection molding system, the first mold and the second mold are closed to form a molding space. Before the space is filled with a resin, the system makes an ejector rod advance to move forward the ejection device of pressurized fluid, i.e., a pressurization ejector pin, as far as a predetermined position. Then the molding space is filled with the resin while keeping the ejection device of pressurized fluid at that position. Upon completing the resin injection or after a certain period of time following it, the system makes the ejector rod recede to move backward the ejector plate and consequently the ejection portion at the tip of the ejection device of pressurized fluid separates and creates a space between it and the resin injected into the molding space. As the pressurized fluid is ejected toward this space from the ejection portion at the tip of the ejection device of pressurized fluid, the pressurized fluid enters the clearance between the resin and the mold without intruding into the injected resin to form hollows, and effects fluid pressurization.

An injection molding system according to claim 5 has a mold device according to any one of claims 1 to 4 and an injection device for injecting the resin into the mold device.

The method for manufacturing molded article by using the system according to claim 6 comprises: a first step of injecting the resin into the molding space of the mold device according to claim 1; a second step of ejecting the pressurized fluid from the ejection portion into the clearance between the resin injected into the molding space and the surface of the first mold or the second mold forming the molding space; and a third step of opening the first mold and the second mold and extruding the molded article by the shaft body, the molded article being formed from the resin injected into the molding space.

The method for manufacturing molded article according to claim 7 comprises: a first step of injecting the resin into the molding space of the mold device according to any one of claims 2 to 4 while discharging air in the molding space from a discharge portion; a second step of ejecting the pressurized fluid from the ejection portion into between the resin injected into the molding space and the surface of the first mold or the second mold forming the molding space; and a third step of opening the first mold and the second mold and extruding the molded article by the shaft body, the molded article being formed from the resin injected into the molding space.

The method for manufacturing molded article according to claim 8 comprises: a first step of injecting the resin into the molding space of the mold device according to claim 1; a second step of moving the ejection device of pressurized fluid backward; a third step of ejecting the pressurized fluid from the ejection portion into between the resin injected into the molding space and the surface of the first mold or the second mold forming the molding space; and a fourth step of opening the first mold and the second mold and extruding the molded article by the shaft body, the molded article being formed from the resin injected into the molding space.

The method for manufacturing molded article according to claim 9 comprises: a first step of injecting the resin into the molding space of the mold device according to any one of claims 2 to 4 while discharging air in the molding space from the discharge portion; a second step of ejecting the pressurized fluid from the ejection portion into between the resin injected into the molding space and the surface of the first mold or the second mold forming the molding space; and a third step of opening the first mold and the second mold and extruding the molded article by the shaft body, the molded article being formed from the resin injected into the molding space.

A method for manufacturing molded article according to claim 10 comprises: a first step of injecting the resin into the molding space of the mold device according to any one of claims 2 to 4 while discharging air in the molding space from the discharge portion; a second step of moving the ejection device of pressurized fluid backward; a third step of ejecting the pressurized fluid from the ejection portion into the clearance between the resin injected into the molding space and the surface of the first mold or the second mold forming the molding space; and a fourth step of opening the first mold and the second mold and extruding the molded article by the shaft body, the molded article being formed from the resin injected into the molding space.

BRIEF DESCRIPTION OF THE DRAWINGS

FIG. 49A is a schematic diagram of the incorporation of inner core 71 by using the elements of FIG. 48. FIG. 49B is a schematic diagram (plan view) of the plate 53 as viewed from the upper side toward the lower side of page.

FIG. 50A is a schematic diagram of a structure wherein grooves 81, passageways 49 and connection ports 48 are provided separately. FIG. 50B is a schematic diagram (plan view) of the plate 53 as viewed from the upper side toward the lower side of page.

FIG. 51A is a schematic diagram of a case where multiple seal-plates 53 and multiple seal-plates 54 are used, and a circuit of pressurized fluid is formed separately on each of the seal-plates. FIG. 51B is a schematic diagram (plan view) of the plate 53 as viewed from the upper side toward the lower side of page. FIG. 51C is a schematic diagram (plan view) of the plate 53 as viewed from the upper side toward the lower side of page.

FIG. 58A is a schematic diagram of a mold structure incorporating pressurization ejector pins 227. FIG. 58B is a schematic diagram (plan view) of the plate 28 as viewed from the upper side toward the lower side of page. FIG. 58C is a schematic diagram (plan view) of the plate 28 as viewed from the upper side toward the lower side of page.

FIGS. 59A to 59F are schematic diagrams representing a case where multiple ejector plates are used in FIG. 55, each of them being provided with a circuit of pressurized fluid. FIG. 59A is a schematic diagram representing a structure mounting multiple pressurization ejector pins 227. FIG. 59B is a schematic diagram (plan view) of the upper plate 29 as viewed from the upper side toward the lower side of page. FIG. 59C is a schematic diagram (plan view) of the lower plate 29 as viewed from the upper side toward the lower side of page. FIG. 59D is a schematic diagram (plan view) of the upper plate 28 as viewed from the upper side toward the lower side of page. FIG. 59E is a schematic diagram (plan view) of the lower plate 28 as viewed from the upper side toward the lower side of page. FIG. 59F is a schematic diagram representing a case where the length of pressurization ejector pin 27 varies.

FIGS. 61A1 to 61H3 and 61J1 to 61K are schematic diagrams representing the structure of other types of ejector pins capable of fluid pressurization. FIG. 61A1 is a schematic diagram of a pressurization ejector pin at the tip of which a sintered part allowing the pressurized fluid to flow through it is embedded. FIG. 61A2 is a schematic diagram (plan view) of the tip of 61A1 as viewed from the upper side of the page. FIG. 61B1 is a schematic diagram representing a pressurization ejector pin at the tip of which superposed plates allowing the pressurized fluid to flow between them are embedded. FIG. 61B2 is a schematic diagram (plan view) of the tip of 61A1 as viewed from the upper side of the page. FIG. 61C1 is a schematic diagram representing a pressurization ejector pin at the tip of which superposed quadrangular columns allowing the pressurized fluid to flow between them are embedded. FIG. 61C2 is a schematic diagram (plan view) representing the tip of 61C1 as viewed from the upper side of the page. FIG. 61D1 is a schematic diagram representing a pressurization ejector pin at the tip of which superposed quadrangular columns allowing the pressurized fluid to flow between them are embedded. FIG. 61D2 is a schematic diagram (plan view) representing the tip of 61D1 as viewed from the upper side of the page. FIG. 61E1 is a schematic diagram representing a pressurization ejector pin in which a cubic block (or quadrangular pillar) is embedded. FIG. 61E2 is a schematic diagram (plan view) representing the tip of 61E1 as viewed from the upper side of the page. FIG. 61F1 is a schematic diagram representing a pressurization ejector pin at the tip of which a flanged column is embedded, the ejector pin being provided with a mechanism that lifts the flanged column by the pressure of pressurized fluid and pushes it back by a spring action when the fluid pressurization is completed. FIG. 61F2 is a schematic diagram (plan view) representing the tip of FIG. 61F1 as viewed from the upper side of the page. FIG. 61F3 is a schematic diagram representing the flanged cylindrical column. FIG. 61G1 is a schematic diagram representing a pressurization ejector pin in which a ball is embedded. FIG. 61G2 is a schematic diagram (plan view) representing the tip of FIG. 61G1 as viewed from the upper side of the page. FIG. 61H1 is a schematic diagram representing a pressurization ejector pin at the tip of which superposed quadrangular pyramids or cones allowing the pressurized fluid to flow through them are embedded. FIG. 61J1 is a schematic diagram representing a pressurization ejector pin on which element 250 of FIG. 61F1 to FIG. 61F3 is fixed by a setscrew. FIG. 61J2 is a schematic diagram representing a flanged cylindrical column. FIG. 61J3 and FIG. 61J4 are schematic diagrams representing the assembly of a flanged cylindrical column. FIG. 61K is a schematic diagram representing a sealing means of an ejector pin or an ejector pin used without liquid pressurization.

FIG. 62 is a schematic diagram representing that a driving mechanism is provided in the rear portion of a pressurization pin 50 to enable it to move back and forth.

FIG. 63A is a schematic diagram representing the state wherein the pressurization ejector pin is still in touch with the molten resin before it recedes. FIG. 63B is a schematic diagram representing the state wherein the pressurization ejector pin has receded and a space has been formed between the molten resin and it. FIG. 63C is a schematic diagram representing that the fluid pressurization is in progress.

FIG. 69A is a schematic diagram representing the state wherein the outer cylinder and the inner core have not been made to recede. FIG. 69B is a schematic diagram representing the state wherein the inner core only has been made to recede to make a space. FIG. 69C is a schematic diagram representing the state wherein the outer cylinder only has been made to recede to make a space. FIG. 69D is a schematic diagram representing the state wherein the outer cylinder only has been moved back to make a space. FIG. 69E is a schematic diagram representing the state wherein the inner core has been moved back further than the outer cylinder to make a space. FIG. 69F is a schematic diagram representing the state wherein the outer cylinder has been moved back further than the inner core to make a space.

FIG. 87A is a schematic diagram representing a means to fasten a slide-core by inserting a pressurization pin and a pressurization ejector pin as far as the top surface of slide-core. FIG. 87B is a schematic diagram representing a means to fasten a slide-core by supporting a pressurization pin or a pressurization ejector pin on the bottom surface of slide-core.

FIG. 88A is a schematic diagram representing a means to fasten a slide-core by inserting a pressurization pin or a pressurization ejector pin into the slide-core of nested structure. The pressurized fluid is ejected from the clearances of nested elements. FIG. 88B is a schematic diagram representing a means to fasten a slide-core by inserting a pressurization pin or a pressurization ejector pin into the slide-core. The pressurized fluid is ejected from a porous portion provided on the nested element.

FIG. 89A is a schematic diagram representing a means to fasten a slide-core by inserting a pressurization pin and a pressurization ejector pin as far as the top surface of slide-core. FIG. 89B is a schematic diagram representing a means to fasten a slide-core by supporting a pressurization pin and a pressurization ejector pin on the bottom surface of slide-core.

FIG. 90A is a schematic diagram representing a means to fasten a slide-core by inserting a pressurization pin or a pressurization ejector pin into the slide-core of nested structure. Pressurized fluid is ejected from the clearance of nested element. FIG. 90B is a schematic diagram representing a means to fasten a slide-core by inserting a pressurization pin or a pressurization ejector pin into the slide-core. The pressurized fluid is ejected from the porous portion provided on the nested element.

FIG. 91A is a schematic diagram representing the state of mounting a K-seal on an ejector plate. FIG. 91B is a schematic diagram representing in detail the part A of FIG. 91A.

FIG. 94A is a schematic diagram representing the situation wherein it is impossible to block hermetically (contain) a renewed ejection of pressurized fluid flowing erratically because the tip of ejector pin is at the same level as the surface of molten resin injected into the cavity. FIG. 94B is a schematic diagram representing the situation wherein it is impossible to block hermetically (contain) a renewed ejection of pressurized fluid flowing erratically because the tip of ejector pin is separated from the surface of molten resin injected into the cavity. FIG. 94C is a schematic diagram representing the situation wherein it is possible to close off (contain) a renewed ejection of pressurized fluid flowing erratically because the tip of ejector pin penetrates the surface of molten resin injected into the cavity and lodges inside it.

FIG. 95A is a schematic diagram representing the situation wherein a gas rib provided on the end of movable side can prevent the flowing around of pressurized fluid through the parting toward the stationary side. FIG. 95B is a schematic diagram representing the situation wherein a gas rib provided on the end of stationary side can prevent the additional entry of pressurized fluid into the stationary side even if the pressurized fluid flows around through the parting toward the stationary side.

FIG. 100A is a schematic diagram representing the state immediately after the cavity has been filled with a resin. FIG. 100B is a schematic diagram representing the state wherein the gate portion has been pushed by a thrust pin to enter the cavity. FIG. 100C is a schematic diagram representing the process through which the gate portion is pushed by a thrust pin to enter the cavity, the thrust pin recedes and the gate-cut is completed.

FIG. 105A is a schematic diagram representing the configuration wherein a ball-check having a sealing function is incorporated into the nozzle of an injection molding unit, the ball receiver portion (reference numeral 450) being shaped in a spherical form. FIG. 105B is a schematic diagram representing the inside of nozzle cap 444. FIG. 105C is a schematic diagram representing the rear portion of groove 445. FIG. 105D is a schematic diagram representing the configuration wherein a ball-check having a sealing function is incorporated into the nozzle of an injection molding unit, the ball receiver portion (reference numeral 509) being shaped in a conical form.

FIG. 106A is a schematic diagram representing the configuration wherein a magnet is inserted in the rear portion. FIG. 106B is a schematic diagram representing the inside of the element of FIG. 106A.

FIGS. 107A to 107L are schematic diagrams representing the forms of inner ball 446 and other elements having a valve function. FIG. 107A is a schematic diagram representing a ball-shaped check-valve. FIG. 107B is a schematic diagram representing a bale-shaped check-valve. FIG. 107C is a schematic diagram representing a configuration wherein a guide is provided to the check-valve of FIG. 107B. FIG. 107D is a schematic diagram representing a configuration wherein the rear portion of the bale-shaped valve is formed in a flat surface. FIG. 107E is a schematic diagram representing a configuration wherein a guide is provided to the check-valve of FIG. 107D. FIG. 107F is a schematic diagram representing a configuration wherein the rear portion of the check valve of FIG. 107B is shaped in a conical form. FIG. 107G is a schematic diagram representing a configuration wherein a guide is provided to the check-valve of FIG. 107F. FIG. 107H is a schematic diagram representing a configuration wherein the frontal portion of the check valve of FIG. 107D is shaped in a conical form. FIG. 107I is a schematic diagram representing a configuration wherein the frontal portion of the check valve of FIG. 107B is shaped in a conical form. FIG. 107J is a schematic diagram representing a configuration wherein a part of the rear portion of the check valve of FIG. 107B is formed in a flat surface. FIG. 107K is a schematic diagram representing a configuration wherein a part of the rear portion of the check valve of FIG. 107F is formed in a flat surface. FIG. 107L is a schematic diagram representing a configuration wherein a guide is provided to the check-valve of FIG. 107A.

FIG. 108 is a schematic diagram representing the configuration wherein a multiple number of balls 446 are used.

FIG. 117A is a schematic diagram representing a hot-runner wherein the valve pin of a hot-runner of valve-gate type is provided with a valve structure. FIG. 117B is a schematic diagram representing a hot-runner that does not use valve pin 514.

FIG. 118A is a schematic diagram of a configuration wherein a part like pressurization pin 50 is put in place from the movable side. FIG. 118B is a schematic diagram of a configuration wherein a part like pressurization pin 50 is put in place from the stationary side. FIG. 118C is a schematic diagram of a configuration wherein a plate is provided on the movable side and a part like pressurization pin is put in place on the plate surface from the movable side.

FIG. 119A is a schematic diagram of a configuration wherein a part like pressurization pin is provided from the movable side on the parting surface of the mold. FIG. 119B is a schematic diagram of a configuration wherein a part like pressurization pin is provided from the stationary side on the parting surface of the mold. FIG. 119C is a schematic diagram of a configuration wherein another plate is provided in the stationary side and a part like pressurization pin is provided on the plate surface from the movable side. FIG. 119D is a schematic diagram of a configuration wherein another plate is provided in the stationary side and a part like pressurization pin is provided on the plate surface from the stationary side. FIG. 119E is a schematic diagram of a configuration wherein steps are provided on the parting surface of the molded article.

Figure 120A:
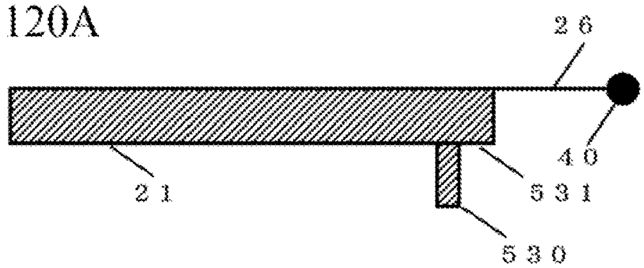
Figure 120B:
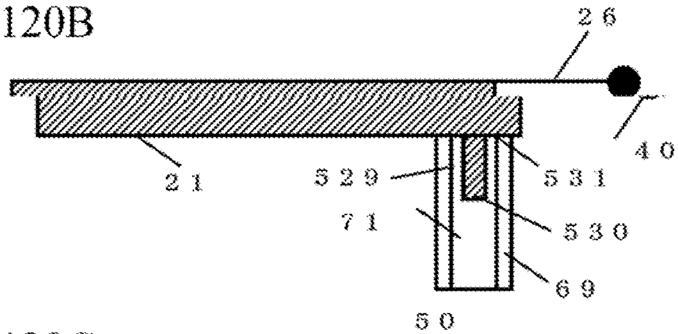
Figure 120C:
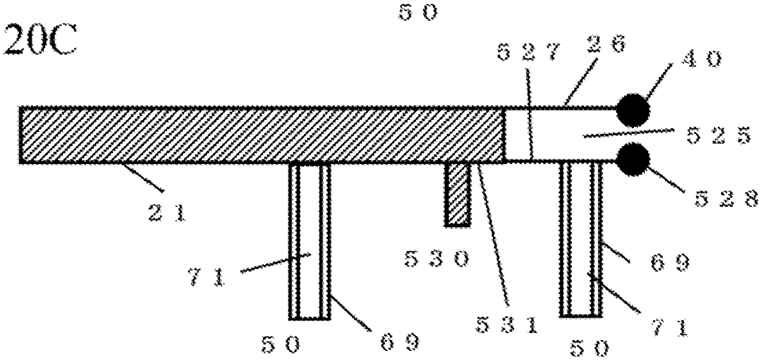

FIGS. 120A to 120C are schematic diagrams representing the means to effect fluid pressurization on both the inner side and the outer side of a rib on the molded article in which the rib is provided at a location a little removed inward from the edge of molded article. FIG. 120A is a schematic diagram representing the molded article in which a rib is provided at a location a little removed inward from the edge. FIG. 120B is a schematic diagram representing a configuration wherein a pressurization pin is positioned above a rib (the shape of rib is incorporated into a part like pressurization pin). FIG. 120C is a schematic diagram representing a configuration wherein a part like pressurization pin is positioned on the inner side of the rib as well as on the outer side of the molded article.

Figure 121A:
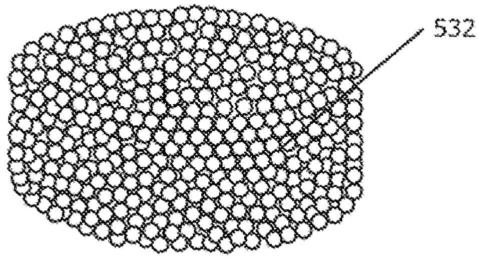
Figure 121B:
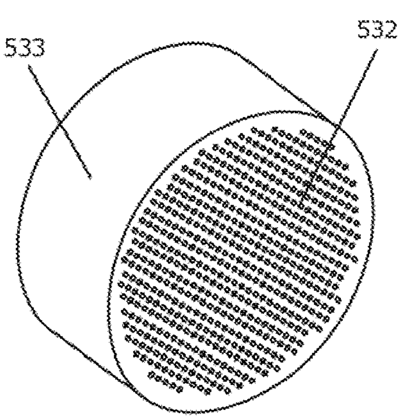
Figure 121C:
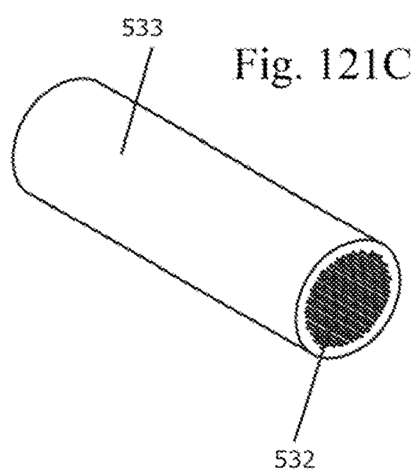

FIGS. 121A to 121C are photographs exemplifying sintered metal elements. FIG. 121A is a photograph of a sintered metal element. FIG. 121B is a photograph of a sintered metal element enclosed in an outer cylinder. FIG. 121C is a photograph of a sintered metal element enclosed in an outer cylinder.

Figure 122A:
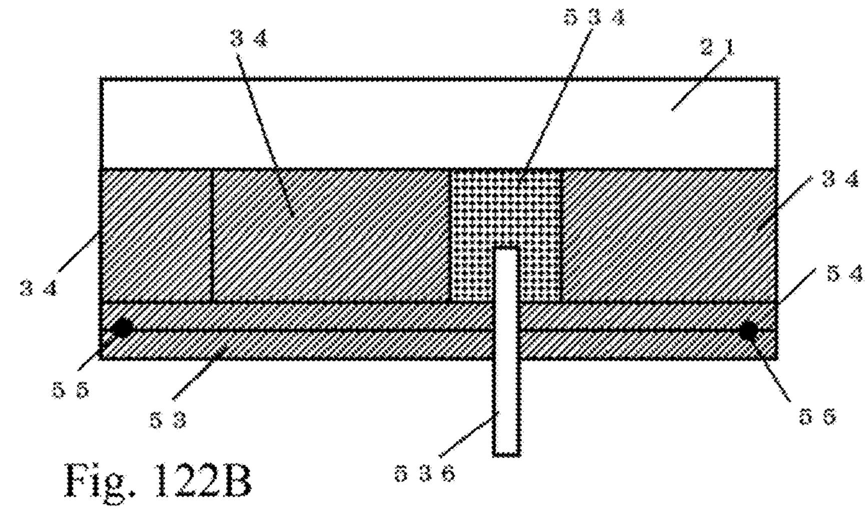
Figure 122B:
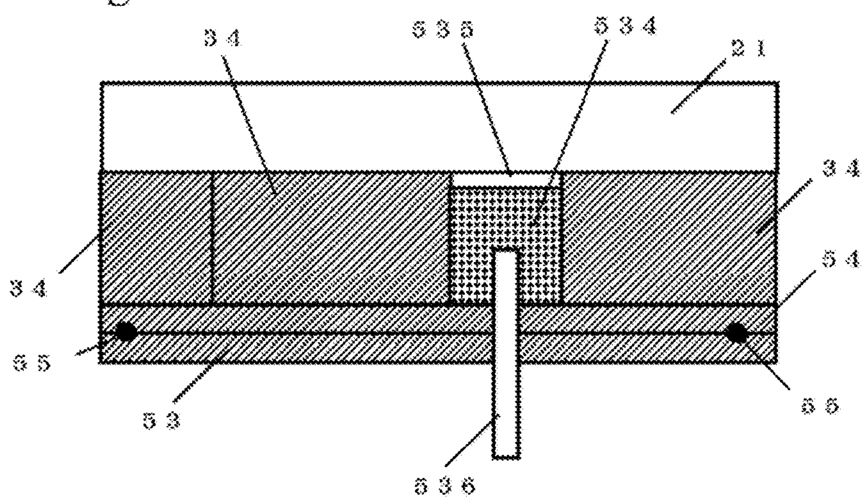

FIGS. 122A and 122B are schematic diagrams of mold structure illustrating a means of fluid pressurization by using a sintered metal element. FIG. 122A is a schematic diagram of the configuration wherein a sintered metal element constitutes a nested element. FIG. 122B is a schematic diagram illustrating a means of fluid pressurization wherein, after retracting the nested element using a sintered metal element to create a space, the pressurized fluid is introduced into the space through the sintered metal element.

Figure 123A:
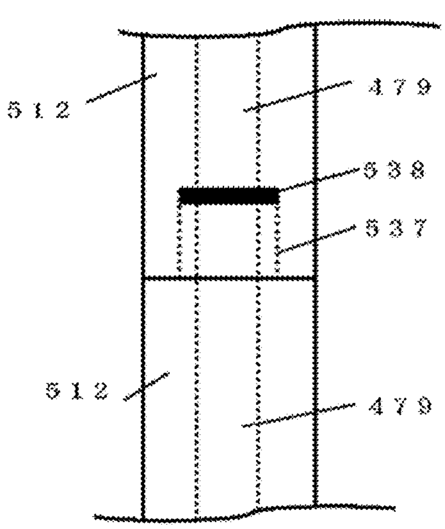
Figure 123B:
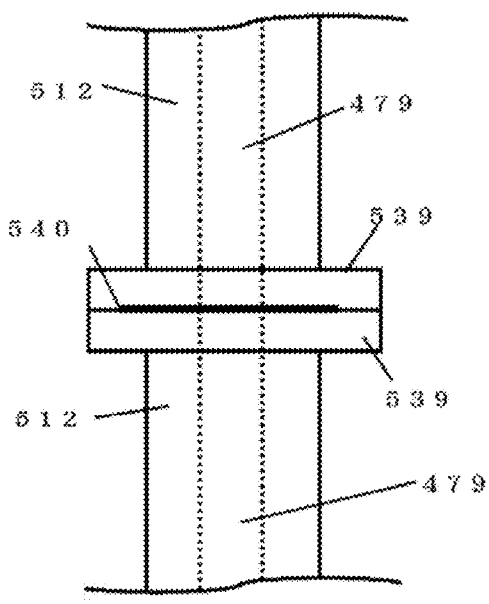

FIGS. 123A and 123B are schematic diagrams representing means of joining pressurization pins or ejector pins capable of fluid pressurization. FIG. 123A is a schematic diagram representing a means of joining with a screw pressurization pins or ejector pins capable of fluid pressurization. FIG. 123B is a schematic diagram representing a means of joining with flanges pressurization pins or ejector pins capable of fluid pressurization.

Figure 124A:
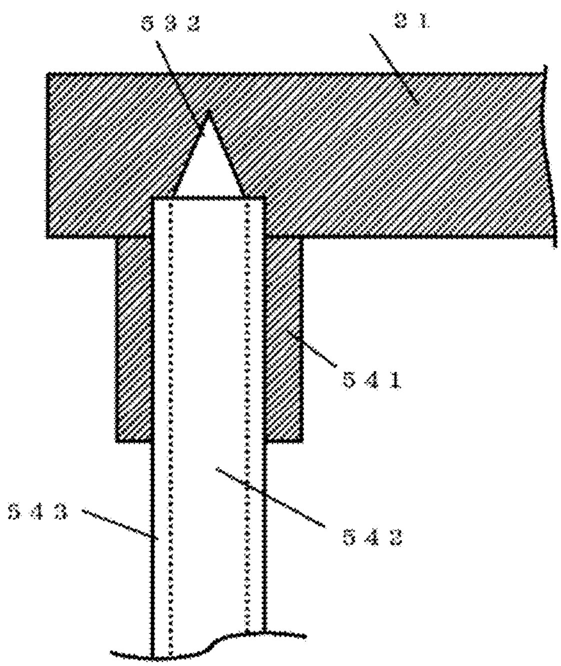
Figure 124B:
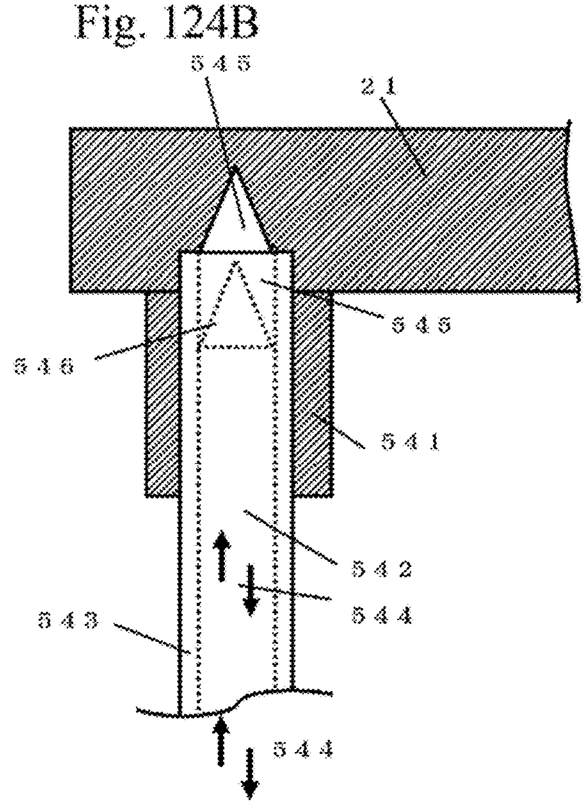

FIGS. 124A and 124B are schematic diagrams representing a means to facilitate the discharge of pressurized fluid into the atmosphere in the injection blow molding by creating a space in front of an inner core by retracting it and by effecting fluid pressurization through the space. FIG. 124A is a schematic diagram representing the state where the inner core has moved forward. FIG. 124B is a schematic diagram representing the state where the inner core has receded and a space has been created above its tip.

Figure 125A:
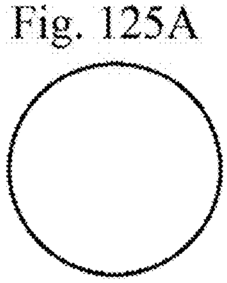
Figure 125B:
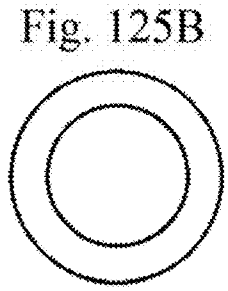
Figure 125C:
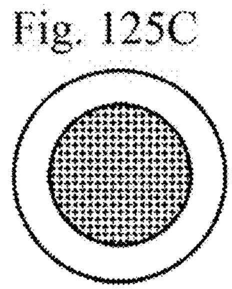
Figure 125D:
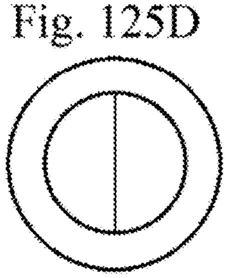
Figure 125E:
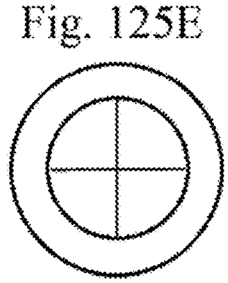

FIGS. 125A to 125E are schematic diagrams representing the imprints of an ejector pin left on a molded article by carrying out the pressure forming-injection molding process. FIG. 125A is an imprint of an ejector pin without fluid pressurization. FIG. 125B is an imprint of an ejector pin capable of fluid pressurization with a double structure comprising an inner core and an outer cylinder. FIG. 125C is an imprint of an ejector pin capable of fluid pressurization provided with such a feature as a sintered metal element at the tip. FIG. 125D is an imprint of an ejector pin capable of fluid pressurization with a double structure comprising an inner core and an outer cylinder, the inner core being split into two halves. FIG. 125E is an imprint of an ejector pin capable of fluid pressurization with a double structure comprising an inner core and an outer cylinder, the inner core being split into two halves.

Figure 126A:
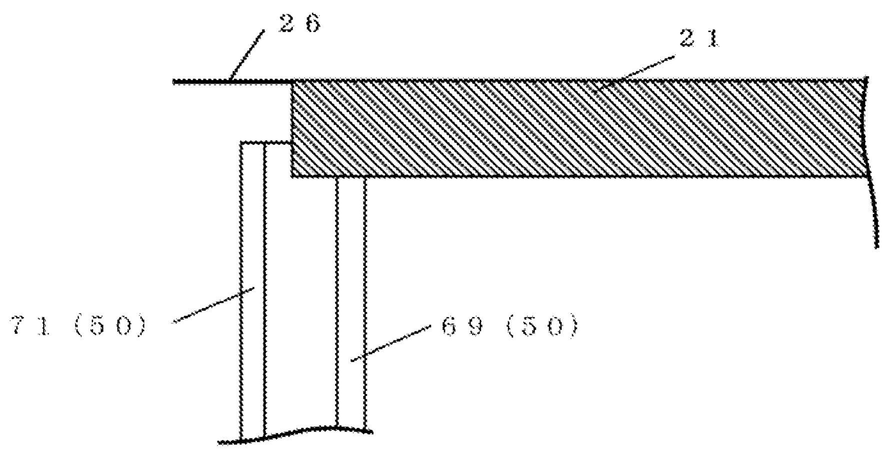
Figure 126B:
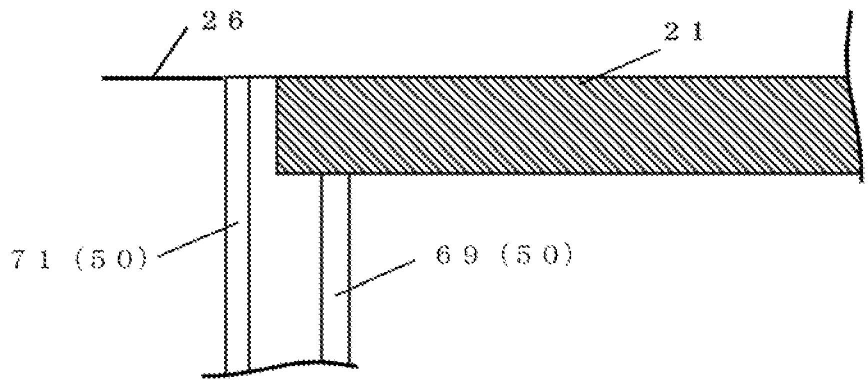

FIGS. 126A and 126B are schematic diagrams representing a configuration wherein such an element as a pressurization pin is provided on an end face of the molded article. FIG. 126A is a schematic diagram representing a configuration wherein such an element as a pressurization pin is provided on a part of an end face of the molded article. FIG. 126B is a schematic diagram representing a configuration wherein such an element as a pressurization pin is provided on the entire end face of the molded article.

Figure 127:
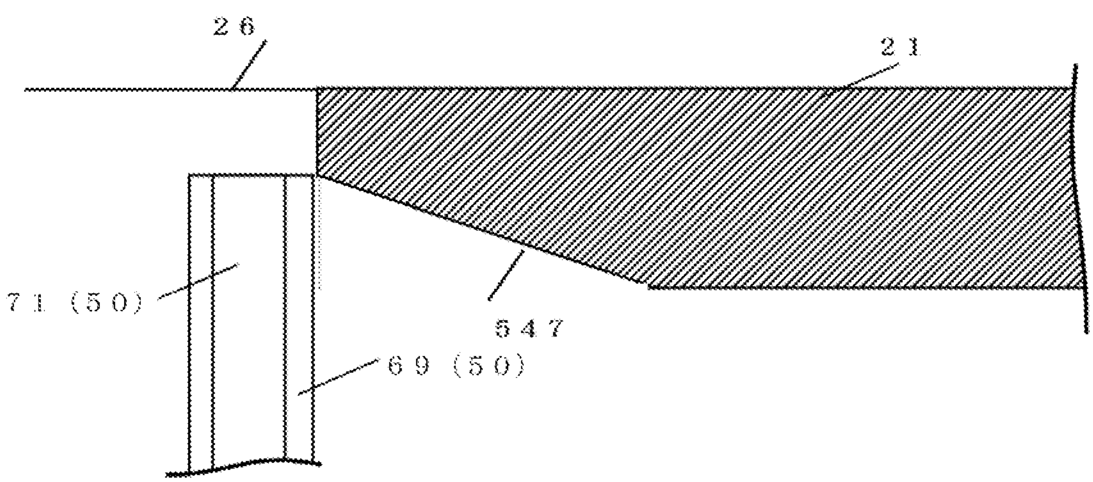

FIG. 127 is a schematic diagram representing a means to conduct the pressurized fluid toward the movable side by forming the end face of the molded article in a slanted shape (the lower side of the figure indicating the movable side).

FIGS. 128A and 128B are schematic diagrams representing a hollow portion created at the base of a rib. FIG. 128A is a schematic diagram representing a hollow portion created at the base of a rib when the injection blow molding process only is carried out. FIG. 128B is a schematic diagram representing a hollow portion created at the base of a rib when both the injection blow molding and the pressure forming-injection molding are carried out simultaneously (used in combination).

FIGS. 129A to 129C are schematic diagrams of a mold as viewed from the parting face, representing a means to conduct the pressurized fluid to the molten resin in the cavity 21 by joining a pressurization pin 50 and the cavity 21 by embossment. FIG. 129A is a schematic diagram representing the state where embossment 552 has been carried out partially. FIG. 129B is a schematic diagram representing the state where embossment 553 has been carried out over a half of the parting face, bounds of embossment being varied. FIG. 129C is a schematic diagram representing the state where embossment 553 and embossment 554 have been carried out over the entire circumference of parting of the mold, bounds of embossment being varied.

Figure 130A:
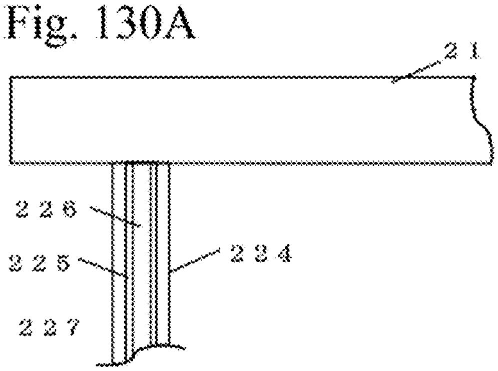
Figure 130B:
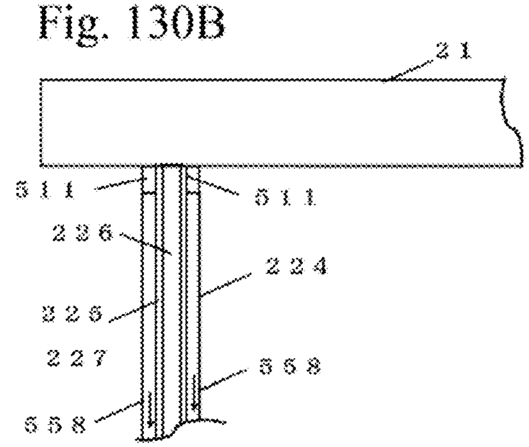
Figure 130C:
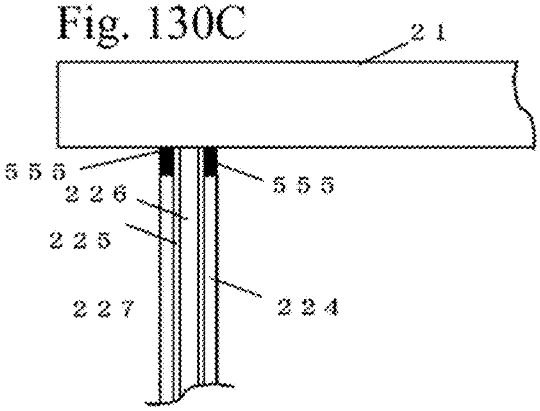
Figure 130D:
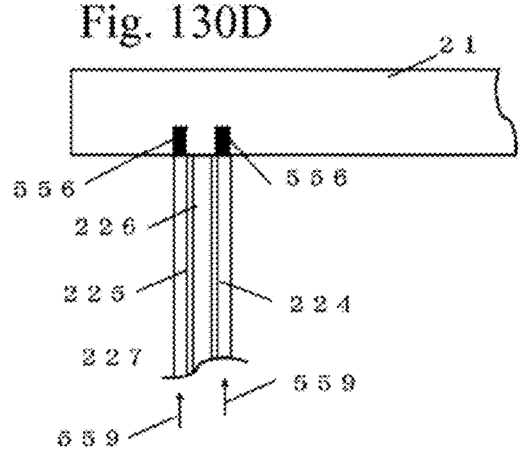
Figure 130E:
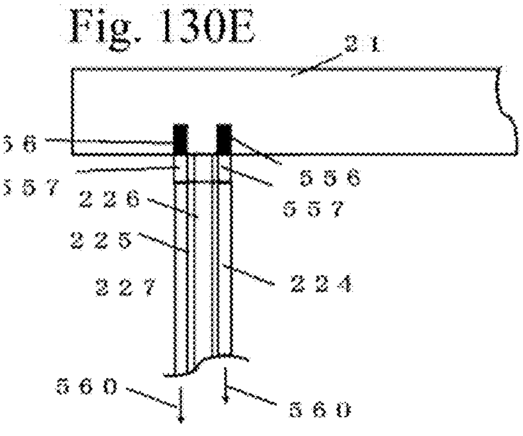

FIGS. 130A to 130E are schematic diagrams representing the means to reinject (thrust back) into the cavity the molten resin that happens to have entered the space created by the retraction of outer cylinder as a means of fluid pressurization. In order to simplify the description, the portion that does not have to be represented by a cross-sectional view is not shown by a cross-sectional view. FIG. 130A is a schematic diagram representing the state wherein outer cylinder 224 has moved forward and the cavity has been filled with a molten resin. FIG. 130B is a schematic diagram representing the state wherein outer cylinder 224 has moved back and a space 511 for ejection of pressurized fluid has been created. FIG. 130C is a schematic diagram representing the state wherein the molten resin in the cavity 21 has flowed into the space 511, reference numeral 555 indicating the resin having flowed into the space 511. FIG. 130D is a schematic diagram representing the state wherein the outer cylinder 224 has moved forward and the molten resin 555 has been pushed into the resin in the cavity 21, the reference numeral 556 indicating the resin having been pushed into the resin in the cavity 21. FIG. 130E is a schematic diagram representing the state wherein the outer cylinder 224 has moved back again and a space 557 for ejecting the pressurized fluid has been created.

Figure 131:
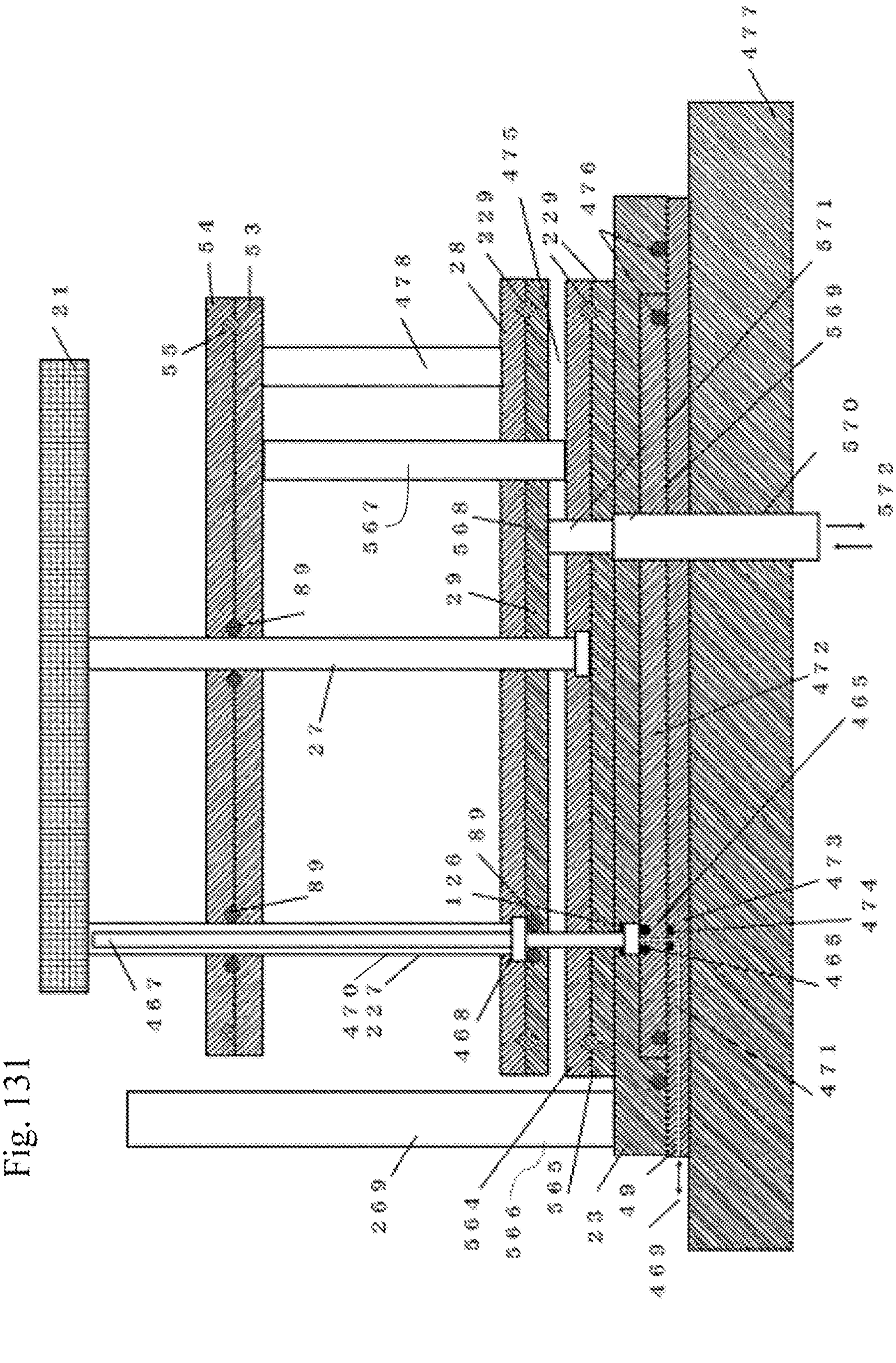

FIG. 131 is a schematic diagram of a mold structure representing the means of supporting the pressure on ejector pins generated when the molten resin is injected, by providing two sets of ejector plates separately so that the pressure in question can be supported not only by the ejecting mechanism of injection molding unit but also by the structure of mold (mounting plate on the movable side) of it.

Figure 132:
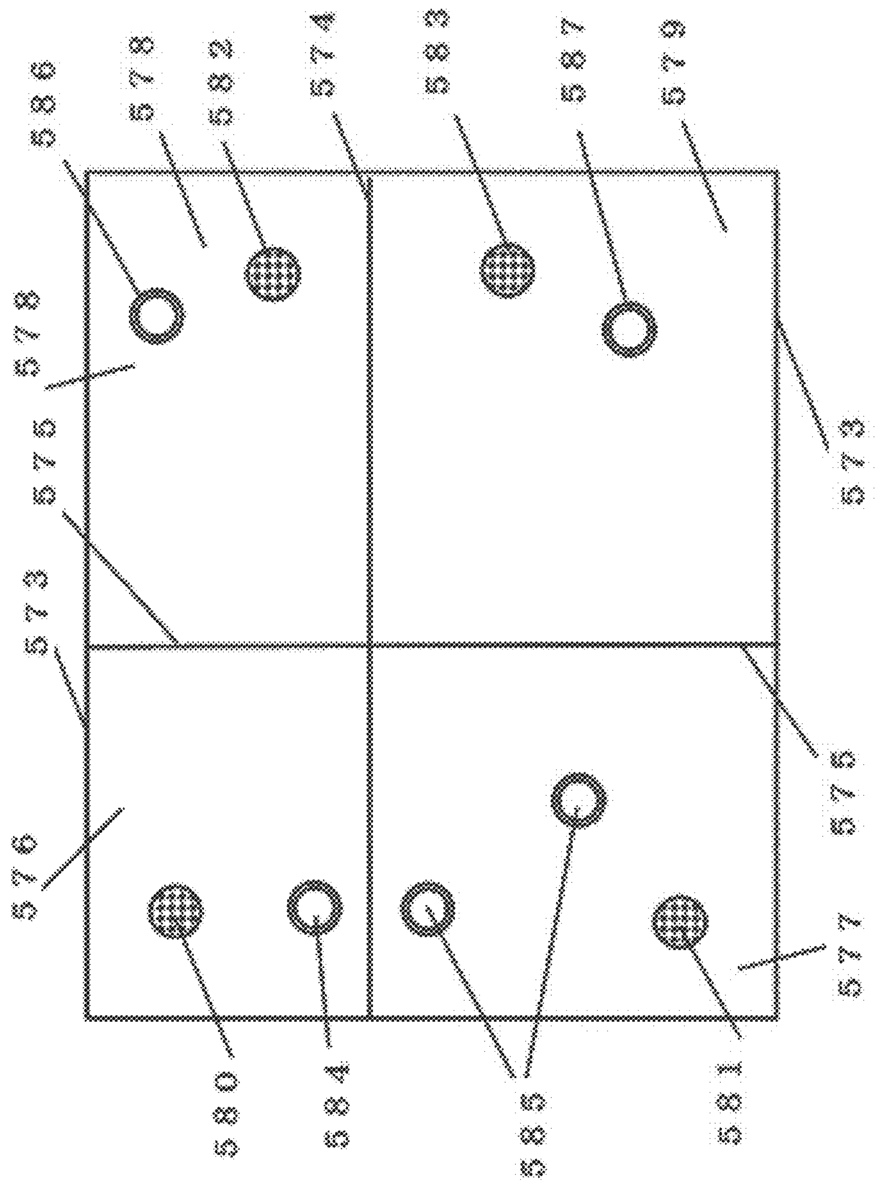

FIG. 132 is a schematic diagram representing the sequential control.

MODES FOR CARRYING OUT THE INVENTION

The present invention relates to injection molding of resin (as an example, thermoplastic resin). More specifically, the present invention relates to a mold device, an injection molding system and a method for manufacturing molded articles, by applying pressurized fluid to the resin filled in the cavity to pressurize it. The resin can also be a thermoplastic resin, a rubber, a thermoplastic elastomer or a thermosetting resin.

First, the terms employed in the present invention are to be defined.

(Mechanism and Function)

"Mechanism" signifies structure and organization of a machine. On the other hand the concept itself of "function" is very vague. It can be used in certain cases to signify even "action" or "workings" on the same level as the daily language. However, as a sociological term, it signifies, among others, the operation of a system or that of different parts of the system as viewed from the point of view of contribution to the "objective" that can be assigned to the system.

(Molding)

"Molding" signifies creation of a form, creation in conformity with a specific form, or processing of a material into an object with a specific shape by using a mold, etc. In the case of molding of a resin, it signifies an operation of reproduction of the identical shape of a molding space with a resin through filling the molding space with a thermoplastic resin or a thermosetting resin. It is also called "making a type".

In the case of a thermoplastic resin, it is heated and melted at a high temperature, injected into a mold at a low temperature and cooled down to be solidified. It is generally heated up to a temperature higher than that of its glass-transition point by 50-250° C. The purpose of heating is to reduce the viscosity specific to a polymer. While a heated resin has an advantage that it can be molded in a relatively short cycle time of several seconds to several minutes, it is required to inject the resin rapidly at a high pressure because of its high viscosity.

In the case of a thermosetting resin, at the beginning it is heated to around 50° C. to give fluidity to it and then injected into a mold at a high temperature to be hardened (solidified). As the molecular weight of a thermosetting resin is low and hence its viscosity is low, it does not require a high injection pressure.

(Injection Molding)

"Injection molding" is a process, for example with a thermoplastic resin, to heat it to a high temperature to melt it, and then to inject it into a mold at a cold temperature and cool it down to solidify it.

It is a process, for example with a thermosetting resin, at the beginning to heat it to around 50° C. to give fluidity to it and then inject it into a mold at a high temperature (around 150° C.) to harden (solidify) it.

(Injection Foam Molding)

"Injection foam molding" signifies a method for obtaining a molded article having a foamed structure by injecting a foaming resin into the cavity by giving foaming properties to a resin by using a physical foaming agent and/or a chemical foaming agent, and it is also called simply "foam molding".

Specifically, examples include the methods of: UCC (Union Carbide Corporation); Batenfeld; GCP (gas counter pressure); New-SF; MuCell; AMOTEC; Allied Chemical Corporation method; Aachen Institute of Technology method; GasTy-1.

(Injection Blow Molding)

"Injection blow molding" signifies a method to obtain a molded article with hollow structure by filling a mold cavity with a non-foaming resin and then injecting a pressurized fluid into the resin, and is also called simply "blow molding".

Specifically, examples include the methods of: Simprel; AGI; GIM of Idemitsu Kosan Co., Ltd.; HELGA; Nitorojection; Air Mold; Liquid Mold; PFP; GasTy-2.

In certain cases, a foaming resin is used and New-SF, GasTy-1 and the like can be exemplified.

(Pressure Forming-Injection Molding)

"Pressure forming-injection molding" signifies a method for transcribing the surface of a mold by the fluid pressure through steps of: filling the mold cavity with a non-foaming resin or a resin provided with foaming properties; introducing between the cavity wall and the resin a fluid with a high pressure or a fluid pressurized at a low pressure of about 1 MPa (mega Pascal); pressurizing the resin in the cavity by the fluid pressure (effecting a pressure forming process) before the phase of cooling and solidification of resin is completed, wherein the transcription is made on the side of mold into which the pressurized fluid has not been introduced.

"Pressure forming-injection molding" signifies also a process of injection molding wherein a resin is filled (injected) into the cavity, and during the injection, immediately after the injection or after a lapse of predetermined length of time following the injection, a pressurized fluid is ejected into the clearance between the resin injected into the cavity [cooling and solidification progresses in the portion in contact with mold but the inner portion is still in a molten state] and the cavity wall surface so that the pressure of the pressurized fluid is exerted on the resin in the cavity. It is also called simply "pressure forming".

In certain cases "ejection" may be expressed as "injection" into the clearance between the resin and the mold surface, the latter being synonymous with the former. "Ejection port" is a portion where a pressurized fluid is ejected (issues forth) and corresponds to the tip of pressurization pin 50, pressurization ejector pin 227 or pressurization ejector pin 500, and may also be called "injection port".

In the pressure forming-injection molding, when only the fluid pressurization is effected on the resin injected into the cavity with a short-shot by injection molding unit without using resin pressure keeping by using the screw of injection molding unit, it becomes possible to reduce the mold clamping (closing) force between the mold on the movable side and that on the stationary side. In fact, since the pressure forming-injection molding enables a small injection molding machine to manufacture a large-sized molded product, the technique is able to reduce the manufacturing cost of molded articles.

Furthermore, since the pressure forming-injection molding does not use pressure-keeping by resin, the occurrences of burrs at the parting, particularly burrs around the gate are few. In addition, since in the pressure forming-injection molding the resin is pushed (pressed) against the cavity wall surface by the thrust of pressurized fluid, the transcription performance conforming to cavity improves and the occurrence of sink marks is reduced.

Specifically, GPI (Gas Press Injection), Air Assist, Gas Ty-3 and the like are cited as examples. Incidentally, "Gas Ty-3" signifies the pressure forming-injection molding of the present invention.

(Molding Space)

"Molding space" signifies the space to fill with resin in a mold and is synonymous with "cavity". "Inside of a cavity" signifies the internal part, space or volume of a cavity.

(Injection)

"Injection" signifies an action of filling a cavity with a resin or introducing a resin into a cavity to a full extent, or the step (process) of such an operation.

(Filling)

"Filling" signifies an action of introducing a resin into a cavity in the manufacturing process of injection molding, or filing the cavity with a resin, or the said process.

"Filling rate" signifies the value expressed in percentage calculated by dividing the resin volume injected into the cavity by the cavity volume and multiplying the quotient by 100.

A filling of a resin of volume (capacity) smaller than the volume of the cavity is called "short-shot" or "short-molding".

A filling of a resin of volume equivalent to the volume of the cavity is called "full-shot" or "full-pack".

A filling of a resin of volume larger than the volume of the cavity is called "over-shot" or "over-pack".

Incidentally, in the case where resin pressure keeping is used to reduce sink marks and improve transcription performance, mentions such as "resin pressure keeping", "use of resin pressure keeping" etc. should be indicated in order to distinguish the process from "fluid pressurization" and "fluid pressure-keeping".

(Volume)

"Volume" signifies cubic volume (vol), weight (wt) or mass (mass) that is determined by means of a measuring device including a measuring cylinder (measuring cup), a syringe, a balance, etc. Since the acceleration of gravity on the earth is of an approximately constant value of 9.8 Newton (N), weight and mass are assumed to be synonymous.

[(Parting (PL)]

"Parting" signifies the part joining the movable side mold and the stationary side mold. A molding space is formed between the movable side mold and the stationary side mold that are joined at the parting, and the molding space is filled with a resin.

Here the mold on the stationary side is an example of a first mold. The mold on the movable side is an example of a second mold. Incidentally, in the present invention the mold on the stationary side may be called stationary side mold or stationary mold. Moreover, in the present invention the mold on the movable side may be called movable side mold or movable mold.

Meanwhile, the part at which the resin filled in the cavity has contact with the stationary side mold (surface forming the mold space) is called "parting on the stationary side mold" or "parting on the stationary side".

"Parting surface" signifies a flat surface connected with the parting. The surface connected with the stationary side is called "stationary side parting surface", and that connected with the movable side is called "movable side parting surface".

"Parting line" signifies, for example, the portion where the stationary side mold and the movable side mold join together.

The part at which the resin filled in the cavity has contact with the movable side mold (surface forming the mold space) is called "parting on the movable side mold" or "parting on the movable side".

The part at which the slide-core provided on the stationary side mold has contact with the resin filled in stationary side mold is called "parting of slide-core on the stationary side".

The part at which the slide-core provided on the movable side mold has contact with the resin filled in the movable side mold is called "parting of slide-core on the movable side".

Figure 2:
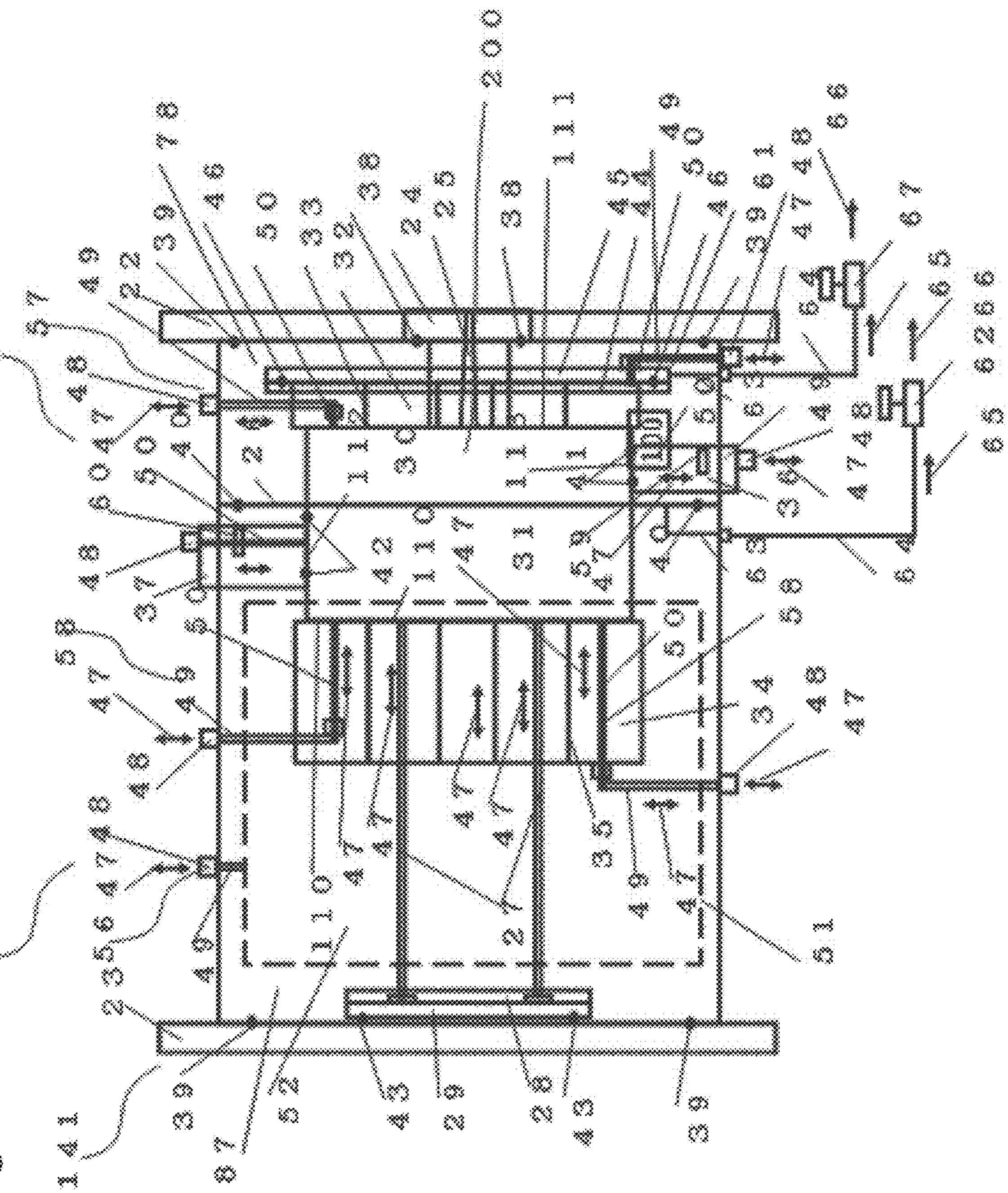
FIG. 2 is a schematic diagram of a sealed mold provided with an ejector box.
Figure 3:
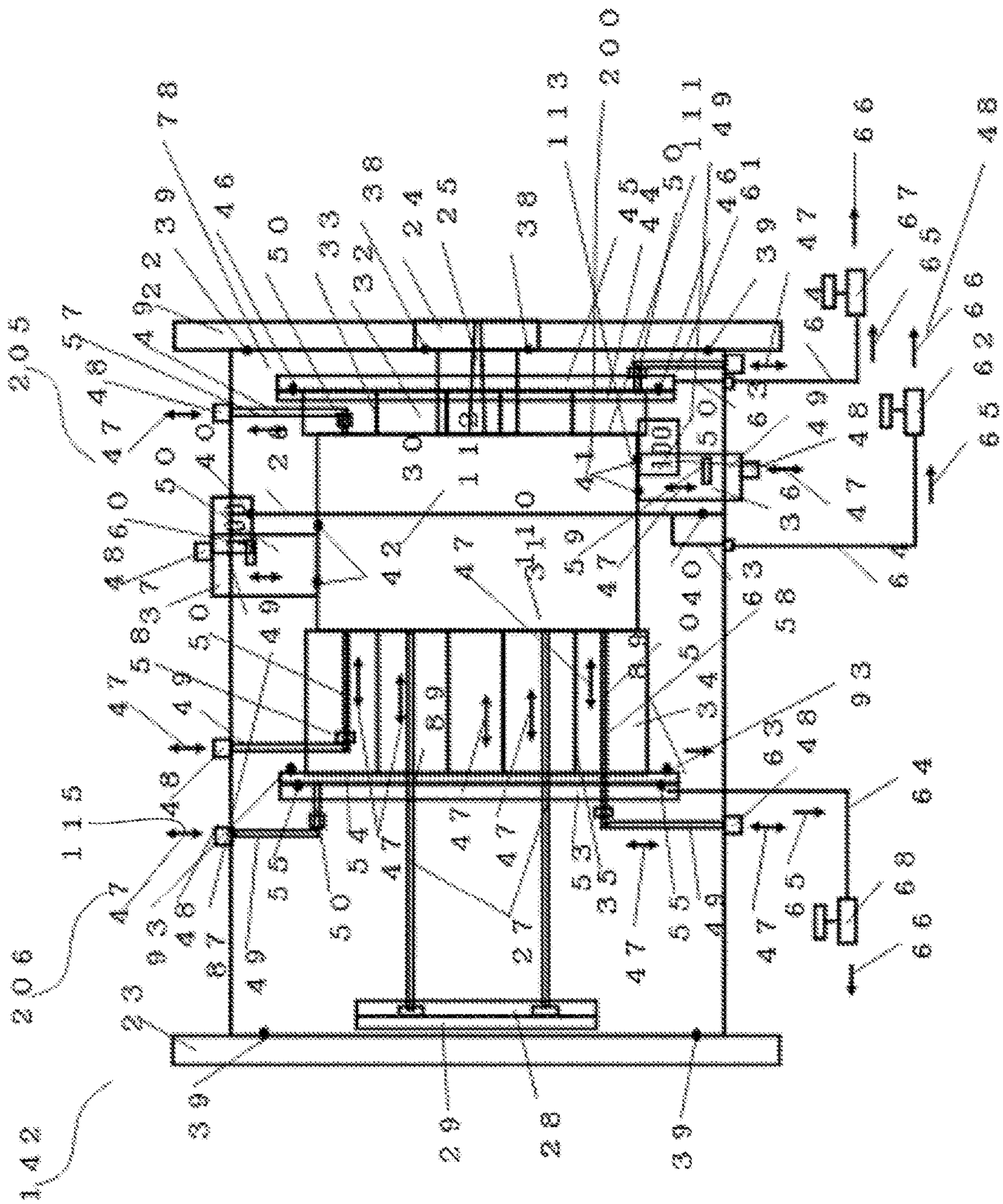
FIG. 3 is a schematic diagram of a sealed mold devoid of an ejector box.

"Mold device" signifies a molding mold that has incorporated a mechanism capable of effecting the fluid pressurization. The part that is subjected to the pressurized fluid in a mold device is, as shown in FIG. 2 and FIG. 3, pressurization part 111 on the stationary side mold, pressurization part 113 of the slide-core on the stationary side mold, pressurization part 110 on the movable side mold, or pressurization part 112 of the slide-core on the movable side mold.

(Clearance)

"Clearance" signifies a space where there is a void between two objects, and in the present invention it signifies mainly the part where a resin comes in contact with a mold (for example, between a resin injected into the cavity and the mold), or a metal comes in contact with another metal (for example a joint of a nested element).

(Nested Element)

In regard to "nested element", in mold making, the "structure of nested element" is used often in view of workability. For example, in the case where the shape of a small protrusion only exists in the mold form, if one attempts to make the mold as a solid unit by machining a single workpiece, one gets a low efficiency in material use, cannot finish the job in a single stroke, and therefore the operation is uneconomical. From the viewpoint of workability only, the shape of a protrusion is nothing but the existence of obstacle. Consequently, by making the shape of protrusion as a separate part, one can improve the yield ratio and the workability of mold material. This separate part is called "nested element".

In the case where a deep shape (for example, a high rib or the like in a molded article) is present in the mold, the gas becomes accumulated at the groove end in the course of flowing. As a consequence of this, there occur such defects in molding as short-mold, burns, etc. Hence it is necessary to draw off the gas [air (air in the cavity) compressed by filling the molten resin]. If a nested element is set up, joints (clearances) are necessarily created between the mold body and the nested element itself, through which the gas can be duly drawn off. A nested element is set up in order to "improve the yield ratio in machining the mold workpiece and to improve the workability in mold making", and with a view to "draw off the gas to prevent defects in molded articles". However, in the portion divided into nested elements, inevitably there appear partition-lines on the molded article to a more or less extent.

In certain cases, it may be inadvisable or no good (NG) to divide the mold by nested elements in the externally visible portion exposed to human eyes. If the use of a nested element is NG, by necessity, the mold is fabricated as a single solid piece, even though the workability has to be sacrificed to a certain extent. The mold with nested elements presents no problem, but in the one composed of a single solid piece, it is needed to provide in the cavity a means to draw off [discharge (blow-out, release)] the air when the cavity is filled with a resin.

In the case of injection molded article, as generally more often the stationary side deals with an ornamental (designed) surface and the movable side deals with a surface having a mechanism and function, it is more often the case that the movable side is configured to have a nested structure. As the fluid pressurization causes irregularities on the surface of the molded article due to fluid action and reduces extremely the ornamental quality of product, the fluid pressurization is carried out on the non-decorative movable side and the molded article is pressed by fluid pressure toward the decorative stationary side.

In such a case, a nested structure entails the leakage of pressurized fluid through clearances in it, and hence reduces the action and effect of fluid pressurization. Consequently, it is needed to provide sealing devices so that the pressurized fluid may not escape through clearances in the nested structure.

Or in an opposite way, if the pressurized fluid enters the bottom of a nested element, it is feared that the pressurized fluid issues forth from clearances in the nested element and disturbs the form of molten resin. For that reason, when the fluid pressurization is carried out, it is needed to ensure that the pressurized fluid does not flow in or out through clearances in the nested structure.

In the present invention, as an example of solution for this problem, a means for fluid pressurization has been proposed, wherein the bottom of a nested element is sealed to prevent the entry or escape of a pressurized fluid, and a pressurization ejector pin with such a feature as double structure is employed, and the fluid is ejected only from the tip of the pressurization ejector pin.

Moreover, in the case of a pressurization pin also, a double structure is adopted and a movable (retractable) mechanism is provided as needed to facilitate the entry of pressurized fluid into the clearance between a resin and the mold.

In the case of the aforementioned pressurization ejector pin also, it is designed as a movable type, and as needed is provided with a mechanism to make it possible to effect the backward movement (recession) in order to create a large clearance between the resin and the cavity to facilitate the entry of pressurized fluid.

(Pressurized Fluid)

"Pressurized fluid" signifies a gas compressed at a pressure higher than 1 atmospheric pressure [760 mm (millimeter) Hg] or a liquid. A supercritical or subcritical fluid is included in gas. In the present invention, a carbonated water dissolving a gas, micro-bubble water containing a gas and the like are treated as liquid. Moreover, in the present invention, "fluid" signifies a gas or a liquid.

(Gas)

Like a liquid, the "gas" is a fluid, wherein the thermal motion of molecules exceeds the inter-molecular force and hence molecules are able to move more freely than in the liquid state. In a gas, the variation of volume as a function of temperature and pressure is great. Furthermore, a gas does not have fixed dimensions of volume, and if the gas is put in a container, the gas fills the container, and the gas is highly mobile and by nature tends to expand always. The density of a gas is smaller than a liquid or a solid and the gas can be compressed with ease. The volume of the gas is proportional to temperature and inversely proportional to pressure.

(Vapor)

"Vapor" signifies an entity that is in the state of gas that has been created by vaporization of a liquid substance or by sublimation of a solid substance. In particular, a substance with a temperature below the critical temperature is called gas phase. In the present invention, a vapor is included in the category of gas.

(Vaporization)

"Vaporization" signifies a phenomenon wherein a substance changes from a solid or liquid state to a gas state. Vaporization is either evaporation or boiling.

(Liquid)

"Liquid" has a state wherein molecules exert their own attraction force to each other, is mobile, and changes its shape in conformity with that of a container. While the liquid presents the properties as a fluid same as the gas, the Pascal's law applies to the liquid because its compressibility is low as compared with the gas. A liquid maintains an almost constant density and, unlike a gas, does not expand to fill the entire volume of a container. The liquid has particular properties such as the ability to form its own surface, and as a special property presents the surface tension. Intuitively speaking, if a substance has a fixed geometry, it is a "solid", if it has no fixed geometry but a fixed volume, it is a "liquid", and if it has neither a fixed geometry nor a fixed volume, it is a "gas".

(Fluid Pressurization)

"Fluid pressurization" signifies an operation in which a pressurized fluid is introduced into the clearance between a resin in the cavity and the cavity surface to exert the pressure of the pressurized fluid on the resin and apply (transmit) pressure on the resin surface.

In the present invention, "fluid pressurization" may be alternatively called "pressurization by fluidic pressure", "pressure-keeping by fluid" or "fluid pressure-keeping". In the present invention, the operation of applying a pressure from outside to a fluid is called "compression".

(Pressure Forming)

"Pressure forming" signifies action, process and operation of application of pressure of pressurized fluid on the surface of a resin filled in a molding space before the resin solidifies in order to compress the resin from the surface, Pressure forming makes it possible to produce the action and effect to increase the density of molten resin, to improve transcription performance conforming to the mold surface and to reduce the occurrence of sink marks on the appearance.

In the case of thermoplastic resin or thermosetting elastomer, "pressure forming" is carried out before the resin or the elastomer filled in the mold cools down and solidifies completely. Cooling down and solidification implies that the thermoplastic resin filled in the cavity is made to start to cool down and solidify simultaneously with the filling process. The process of pressure forming is carried out when a portion or a whole lot (totality) of molten resin is above the glass-transition temperature. Here as indication of the completion of cooling and solidification, one adopts the state where the whole lot of molded article becomes below the glass-transition temperature.

In the case of thermosetting resin or rubber, the pressure forming is carried out before a portion or a whole lot of resin filled in the mold finishes forming crosslinking.

(Hollow)

In regard to "hollow", the means to create a vacant space (hollow) within a resin by filling the cavity with a molten resin and by injecting (introducing) a pressurized fluid into the resin is called "injection blow molding" and the internal vacant space is called "hollow part".

"Resin pressure keeping" signifies, for example, an operation in which a pressure is applied by the screw of the injection molding unit to a molten resin filled in the cavity, to increase the density of the molten resin, to improve the transcription performance conforming to the mold and to reduce the occurrences of sink marks in the appearance.

(Combined Usage)

"Combined usage" signifies that a factor is not used alone but used together or in combination with another one.

Then, the mold device is described.

(Mold Device)

When the pressurized fluid is introduced into the clearance (the clearance between a resin and a mold) between the resin injected in the cavity and the surface of the first mold or the second mold (an example of the surface forming a molding space), and the resin in the cavity is pressurized by the pressurized fluid, the pressurized fluid escapes through the clearances around ejector pins, and hence the pressurization effect by the pressurized fluid decreases. Here, an ejector pin is an example of shaft body.

As a means to solve the problem, a technique is known where seals (sealing components) such as O-rings, rubber-sheet and the like are provided to prevent the pressurized fluid from leaking to outside.

Besides, a rubber sheet makes a surface-to-surface contact and consequently its sealing effect is superior to that of an O-ring which makes a line-to-surface contact. A mold device provided with sealing properties is called a sealed mold. A mold device without sealing properties has a defect that a fraction of pressurized fluid leaks to outside.

Figure 32:
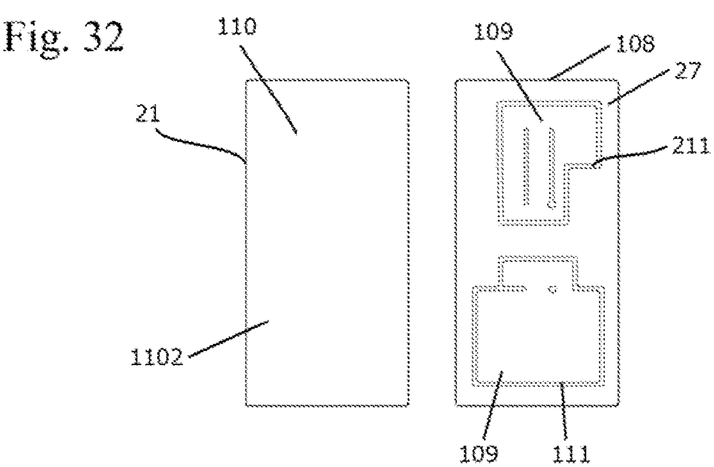
FIG. 32 is a test piece used in an embodiment wherein the part on the movable side is partially pressurized by fluidic pressure.

With respect to features of a molded article, as seen on the molded article 210 in FIG. 32, it is also possible to provide a rib 211 to prevent the leakage to outside of a gas as an example of pressurized fluid made to act in the clearance between the resin and the mold. In the present invention, the rib 211 is called "gas rib" or "pressurization rib" and may also be referred to as "rib for preventing the leakage of pressurized fluid".

Figure 34:
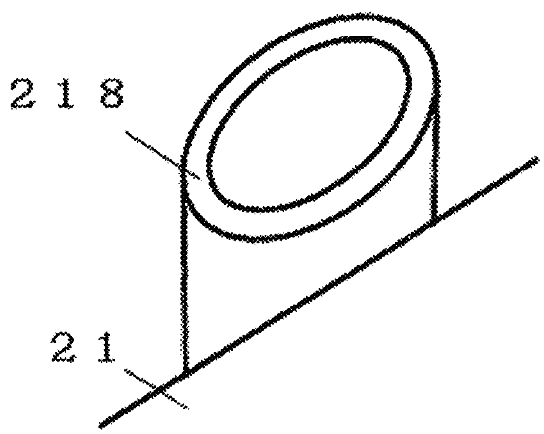
FIG. 34 is an oblique perspective view representing the end of the ejector pin in the schematic diagram of FIG. 34 representing a means of sealing an ejector pin by erecting a gas rib 218 around it.

218 in FIG. 34 is an example of gas rib that is configured so that a pressurized fluid may not enter the clearance between the mold and an ejector pin.

In the pressure forming-injection molding, the means to eject a pressurized fluid into the cavity by providing a gas rib on the molded article is employed in particular in the partial fluid pressurization. In the present invention, the process undertaken by using partially the fluid pressurization is called "partial pressurization". The "partial pressurization" may be applied by providing similar gas ribs in areas close to the end of an entire molded article, in order to prevent the leakage of pressurized fluid to outside.

Figure 35:
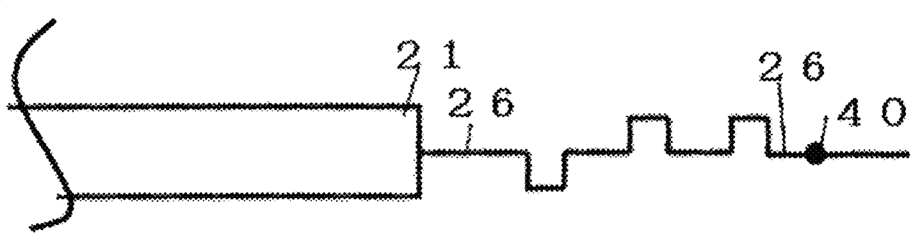
FIG. 35 is a cross-sectional diagram representing the structure of parting of a mold.

Since a certain degree of effect can be recognized even when the fluid pressurization alone is applied to a resin in the cavity, it is not necessarily required to use seals in the parting such as seal 40, seal 41, seal 42 in FIG. 2, for example, or to use gas ribs.

Where necessary, a variant structure of parting is utilized as shown in FIG. 35. Moreover, by increasing the surface pressure of the portion of parting close to the cavity, the flowing of pressurized fluid around into the non-pressurized opposite side is prevented.

(Structure of a Device for Preparing Pressurized Fluid)

Figure 1:
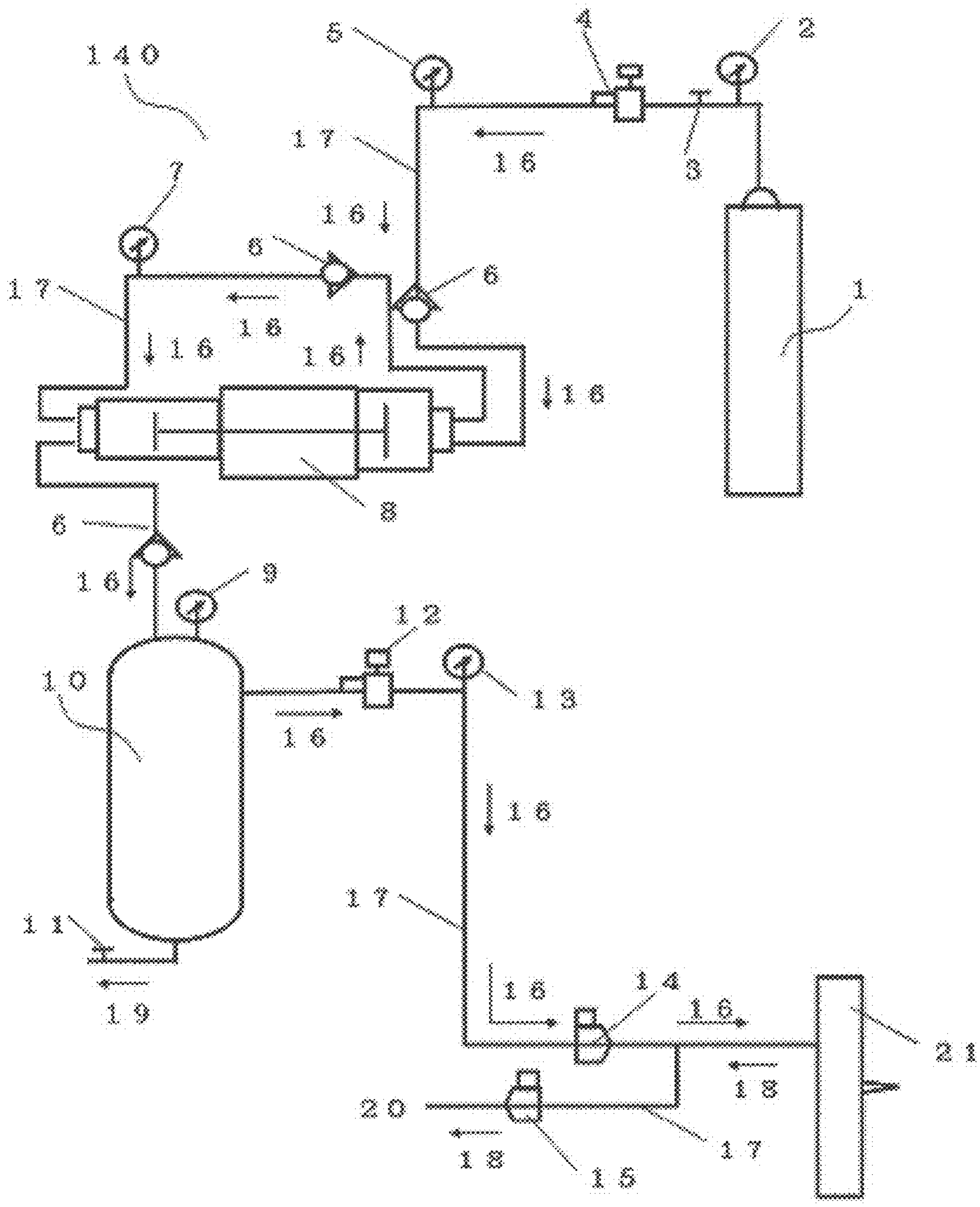
FIG. 1 is a circuit diagram of pressurized fluid (fluid compression) of a device for preparing pressurized fluid.

FIG. 1 is a circuit diagram of pressurized fluid (fluid compression) of a device 140 for preparing pressurized fluid.

If the interface and the like with other types of units including an injection molding unit (an example of molding devices) are modified, the device 140 for preparing pressurized fluid can be converted also for the application in gas-assist molding device, inner gas counter pressure (IGCP) device, MuCell, AMOTEC device, etc. In the following sections, the method for carrying out the pressure forming-injection molding by using the device 140 for preparing pressurized fluid shall be described.

"Molding device" includes: not only injection molding machine, mold, gas-assist molding device, inner-gas counter-pressure (IGCP) device, MuCell, AMOTEC device, molding machine nozzle with a ball-check, etc.; but also control device for mold temperature like chiller, temperature regulator, i.e. HEATCOOL steam-mold, etc.

The nitrogen gas cylinder 1 (in the case of carbon dioxide gas, it is needed to raise the temperature of the environment around a device as a whole to a value higher than the critical temperature of carbon dioxide to prevent the liquefaction of carbon dioxide) is filled with nitrogen gas (example of fluid)

injected at a pressure of 15 MPa. The nitrogen gas filled in the nitrogen gas cylinder 1 is depressurized once to a pressure of 1 MPa to 3 MPa by means of a regulator (pressure control valve) 4 and compressed to a pressure of 30 MPa to 50 MPa by using a gas-booster 8, for example. The compressed high-pressure nitrogen gas (an example of pressurized fluid) is accumulated in a receiver tank 10.

In the process of pressure forming-injection molding, when a resin in the cavity 21 is pressurized by fluidic pressure by using the high-pressure nitrogen gas, the gas can be depressurized by means of the regulator (pressure control valve) 12 for setting (adjusting) the gas pressure to an optimum level. Incidentally, the nitrogen gas can be also one which has been obtained by separation from the air by using PSA or a separation membrane. Here the PSA stands for the pressure swing adsorption system, a system for separating nitrogen gas from the air by adsorption on activated carbon. The gas booster 8 can also be replaced by a high pressure compressor.

The device 140 for preparing pressurized fluid is equipped with: manometer 2 indicating the pressure in the nitrogen gas cylinder 1; manual valve 3 to be closed when the nitrogen gas cylinder 1 is replaced; manometer 5 to verify the pressure set by the regulator 4; check valve 6 to prevent the backward flow of nitrogen gas; manometer 7 to verify the pressure of the intermediate stage of gas booster 8 during compression; manometer 9 to verify the pressure in the receiver tank 10; manual valve (drain valve) 11 to evacuate the high-pressure nitrogen gas in the receiver tank 10; manometer 13 to verify the pressure of pressurized fluid; and piping 17. Incidentally, the code (arrowhead) 16 indicates the flow direction of pressurized fluid and the code 18 (arrowhead) indicates that of exhaust (blowout) of pressurized fluid. Moreover, the code 20 relates to the pressurized fluid expelled into the atmosphere. While they are omitted from the illustration, safety valves are provided in necessary locations such as receiver tank 10, for example.

(Device Provided with Multiple Pressurization Circuits)

Figure 46:
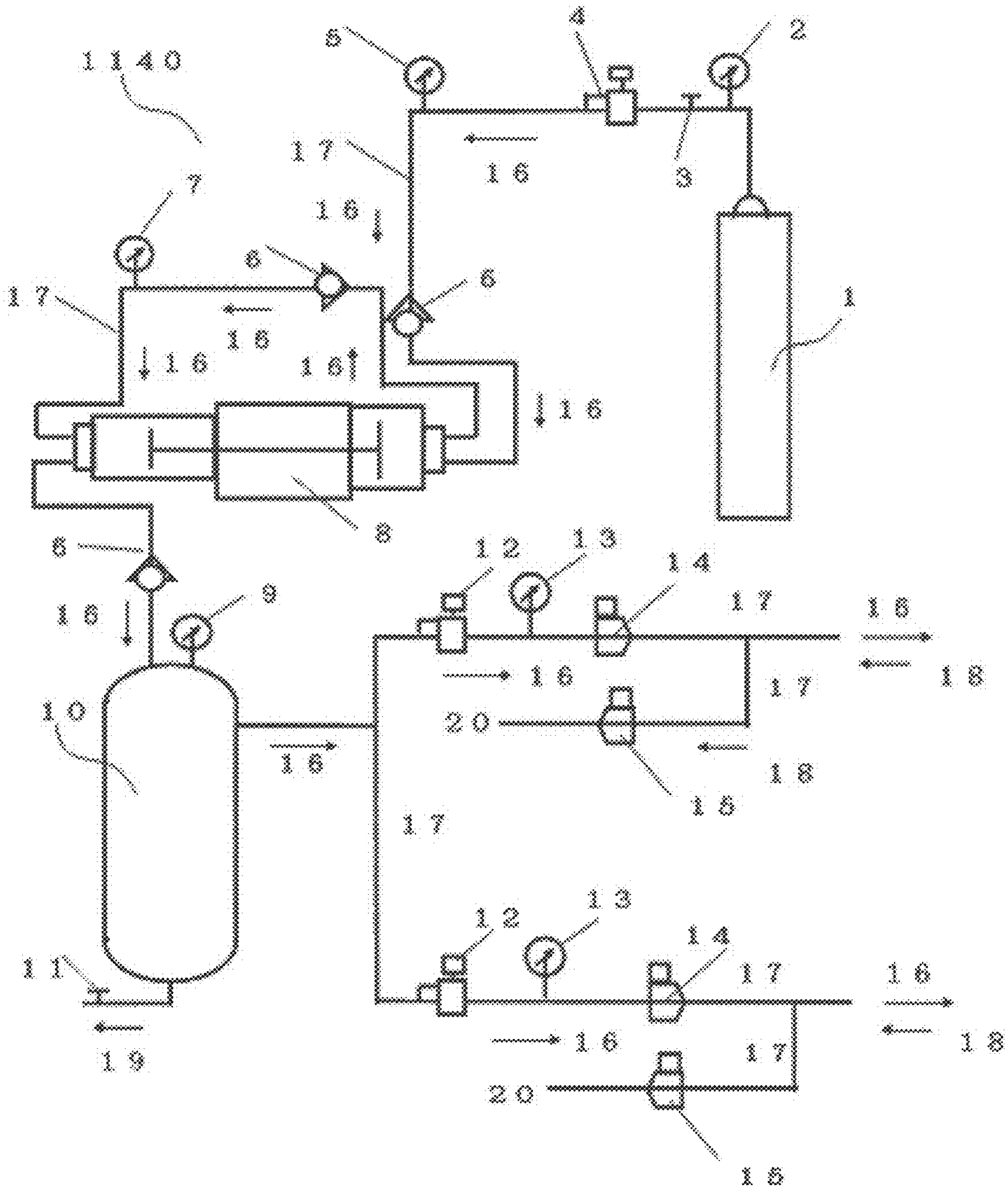
FIG. 46 is a circuit diagram of pressurized fluid of a device for preparing pressurized fluid provided with multiple pressurizing circuits.

The device 140 for preparing pressurized fluid shown in FIG. 1 comprises a unit of regulator 12 and a system of pressurization circuit. Consequently, the device 140 for preparing pressurized fluid is able to set up a set of operating conditions including the pressure of pressurization and the time of pressurization. Whereas, the device for preparing pressurized fluid 1140 presented in FIG. 46 is provided with two systems of circuit for ejecting fluid into the mold 21 in the downstream of the regulator 12 shown in FIG. 1. Consequently, the device for preparing pressurized fluid 1140 is able to set up separately multiple sets of conditions of pressurization pressure, pressurization time, etc., and regarding the conditions of ejection pressure, it is able to set them at a higher value for an early phase of operation and at a lower value for a later phase of it or vice versa. The device for preparing pressurized fluid 1140 is able set up individually at an optimum level for pressurization conditions for each one of molded articles in the operation for obtaining a paired article, two articles at a time, or multiple articles at a time. In this way, the provision of multiple pressurization circuits makes it possible to set up delicate conditions of fluid pressurization.

Figure 77A:
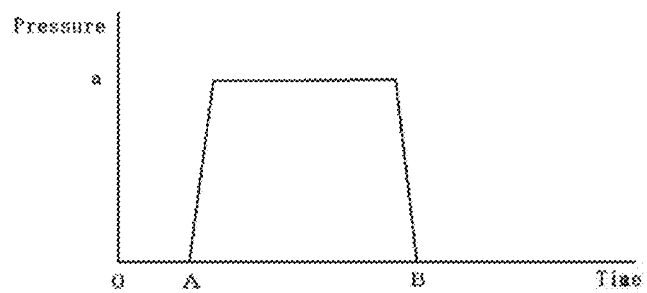
FIGS. 77A to 77C are schematic diagrams representing the profile of pressurization pressure.

FIG. 77A represents the profile (outline) of fluid pressurization in the case where the device of FIG. 1 is used. A process of fluid pressurization is started at the time point A and the pressure reaches the point B. Just before the point B, the discharge to the atmosphere is started and then completed. This profile shows that of operation with one pressure and one speed.

Figure 77B:
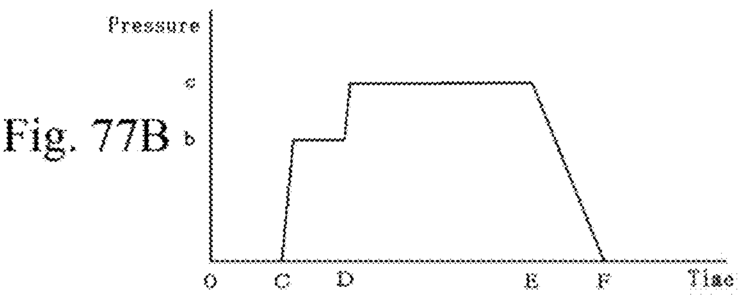

FIG. 77B represents the profile when the pressure is raised successively by two stages by means of the device of FIG. 46.

Figure 77C:
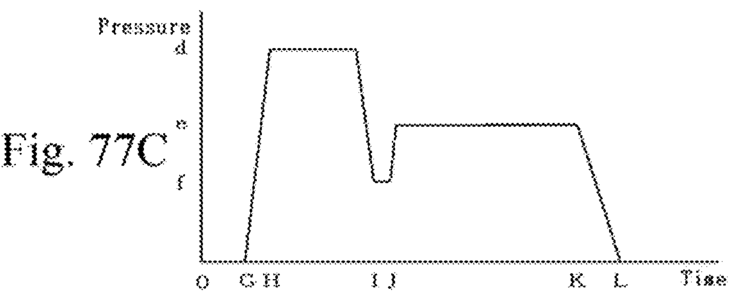

FIG. 77C represents the profile when the pressure is lowered successively by two stages by means of the device of FIG. 46. In all the cases of A to C, the retention time has not been set up.

(Means to Facilitate the Entry and the Exhaust of Pressurized Fluid)

In the pressure forming-injection molding, it is desirable to raise quickly the resin pressure in the cavity to a predetermined level, i.e., to increase the flow rate of passing fluid. For that end, larger dimensions are selected for the bore of pipe fitting (diameter of the part through which the pressurized fluid passes) and for the orifice, and also in selecting the regulator 12 and the filling valve 14 (also called pressurizing valve 14), those with a larger orifice and a Cv value (coefficient of volume) as large as possible are used.

If the orifices of regulator 12 and filling valve 14 are of a small dimension and consequently the flow rate is limited, multiple numbers of regulators 12 and filling valves 14 are used to increase the flow rate. Also in the exhaust process of pressurized fluid, a multiple number of exhaust valves 15 and a multiple number of pipe fittings 17 in the downstream of the regulator 12 are used to increase the exhaust speed.

(Structure of the Portion for Compressing a Pressurized Fluid)

Figure 83:
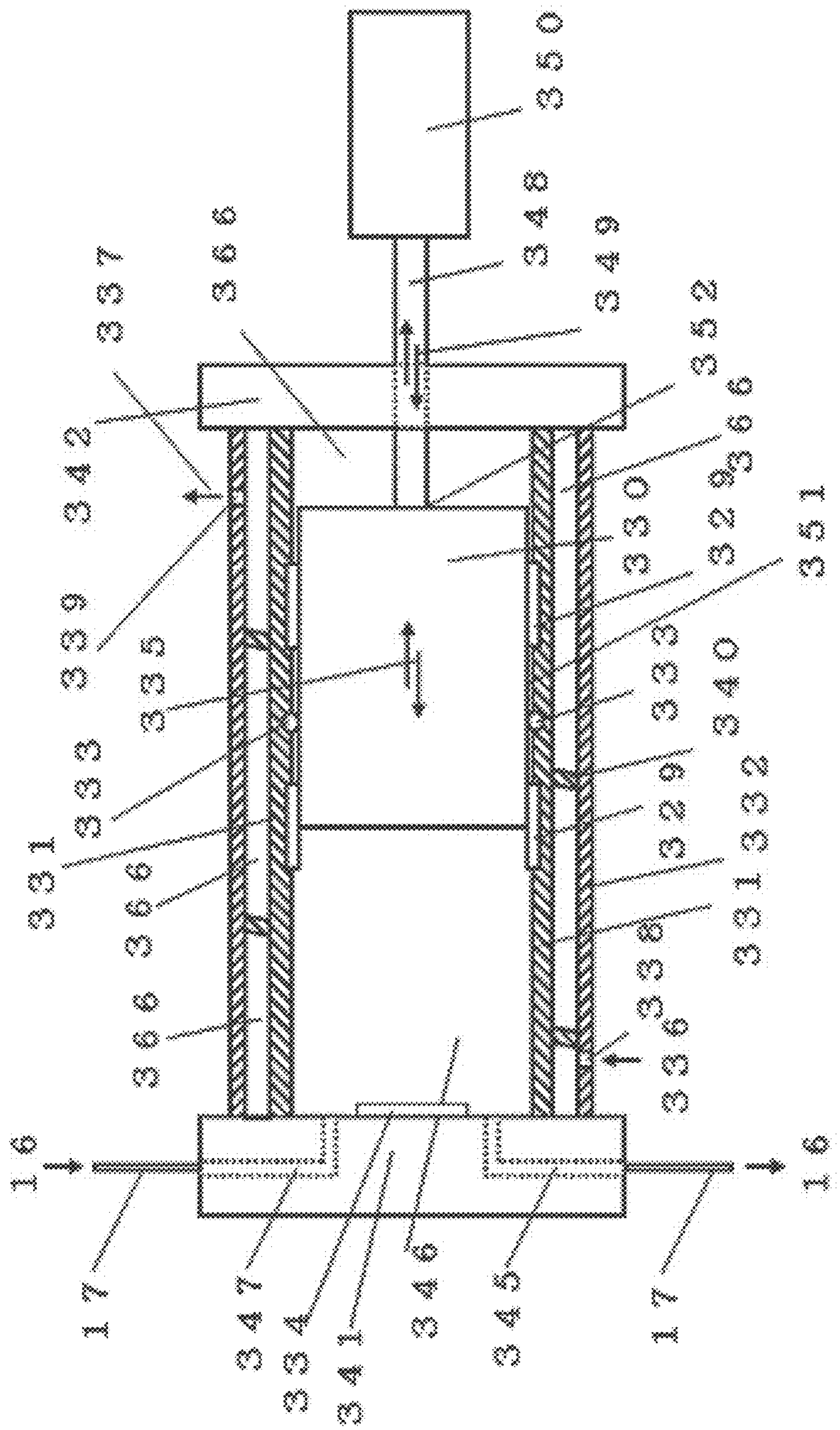
FIG. 83 is a schematic diagram representing a compression means of pressurized fluid.

FIG. 83 illustrates the portion for compressing a pressurized fluid which uses as seal 333 a seal-ring having the same structure as the seal-ring 89 used on an ejector pin, i.e., aforementioned Omniseal or Variseal, and L-shaped seal or U-shaped seal illustrated in FIG. 79. The positioning of piston 330 is constituted by seal 333 and slide rings (or wear rings) 329 preventing the contact between piston and cylinder. Generally seal 365 and slide ring 329 are fitted on a piston 330. It is easier to machine cylindrical piston 330 with a precision approaching a true circle and polish its surface cleanly than to fit seal 333 and slide ring 329 on piston 336 and to machine the inner surface of hollow cylinder 331 with a precision approaching a true circle and polish its surface with a high precision so as to reduce friction.

(Slide Ring and Wear Ring)

Figure 80:
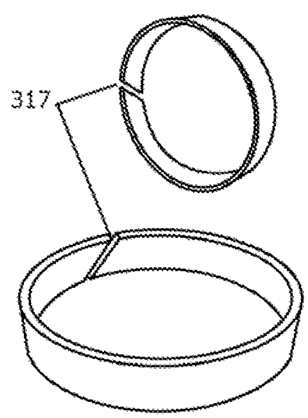
FIG. 80 is a schematic diagram representing a slide ring.
Figure 81A:
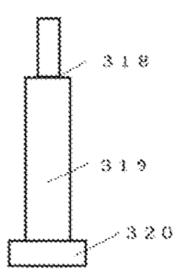
FIGS. 81A to 81D are schematic diagrams representing the principle of a core pin of high fracture resistance.
Figure 81C:
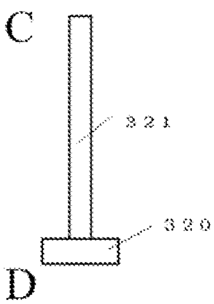
Figure 81B:
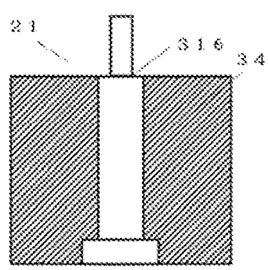
Figure 81D:
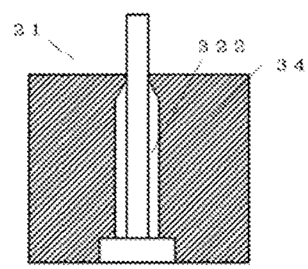

The purpose of slide ring and wear ring is to guide the piston and the rod of an operating cylinder and to absorb their lateral force. They prevent the metallic contact between sliding parts of piston 330 and those of cylinder 331, and ensure a good load distribution and a low wear in them. The slide ring 329 is made of a material with an excellent wear resistance as well as a low friction. Turcite is designed for the usage in low to medium radial load conditions, Himod for the usage in medium to high load conditions, Orkot for the usage in high radial load conditions, and the detailed specifications are available in the catalog of Trelleborg Sealing Solutions. FIG. 80 is a schematic diagram of a slide ring and reference numeral 317 indicates a slit portion.

(Intercooler)

Particularly when a gas is compressed, heat is generated due to adiabatic compression. In this case, if the gas is not cooled, the aforementioned seal 333 and slide ring 329 deteriorate and hence it is needed to cool the gas.

As means for cooling, the cylinder is made to have a double structure wherein the inner cylinder is cooled by letting a coolant (gas or liquid) flow over its external surface (through clearance 366 between inner cylinder 331 and outer cylinder 332) from the inlet port 338 toward the outlet port 339. Inside the clearance 366, baffle plate 340 is provided in order to enhance the cooling efficiency.

Each of reference numerals in FIG. 83 represents a functional element as follows: 335, arrowhead indicating the motion of piston; 341, cylinder head; 342, rear cylinder head; 345, passageway of pressurized fluid (before compression); 346, compression space; 347, passageway of pressurized fluid (after compression); 348, rod; 349, arrowhead indicating the movement of rod; 350, hydraulic or pneumatic cylinder, or electric motor; 351, clearance between cylinder 331 and piston 330; 352, connecting portion between piston 330 and rod 348, which can be, however, a mechanism without fixed connection between piston 330 and rod 348, because the return stroke of the piston 330 can be effected by pressure of the pressurized fluid introduced into the compression space 346 through 347, and it is required for rod 348 to have a single-acting mechanism to push only.

Although not illustrated, it is desirable to chill also the inside of cylinder heads 341 and 342 by coolant. Moreover, the interstices between cylinder 331 and cylinder head 341 as well as rear cover 342 of cylinder are sealed by means of rubber sheets, O-rings, etc. to prevent the leakage of compressed fluid and coolant 251.

In FIG. 83, reference numerals represent different elements as follows: 332, outer cylinder; 334, clearance; 336, coolant before cooling; 337, coolant after cooling; and arrowheads indicate the coolant flow. Element 334 is a cushion to prevent the collision between cylinder 330 and cylinder head 341.

(Interface)

Now, the interface between a device 140 for preparing pressurized fluid and an injection molding unit (communication between the actions of two systems) is described. Since a high pressure fluid is used in the pressure forming-injection molding, from the viewpoint and in consideration of security, it is needed to operate both the device 140 for preparing pressurized fluid and the injection molding unit while they mutually transmit as well as receive relevant signals.

In respect to the timings (times, points of time) of fluid pressurization in the injection molding, the following modes can be described, for example:

Fluid pressurization is carried out during the injection of resin into the cavity (Mode 1);

Fluid pressurization is carried out immediately after the injection of resin (Mode 2);

Fluid pressurization is carried out after the elapse of a certain period of time following the resin injection (Mode 3);

In order to lower the resin pressure filled in the cavity, the screw of the injection molding unit is retracted to a predetermined position immediately after the resin injection to make a suck-back, and the fluid pressurization is carried out immediately after the suck-back is started (Mode 4);

Fluid pressurization is carried out during the process of suck-back (after the elapse of a certain period of time, or the screw has passed a predetermined position) (Mode 5).

Fluid pressurization is carried out immediately after the process of suck-back has been completed (Mode 6).

Fluid pressurization is carried out after the elapse of a certain period of time following the completion of the suck-back (Mode 7).

Incidentally, in Mode 2 to Mode 7, when the retraction of pressurization pin or pressurization ejector pin [in order to distinguish the injector pin, one dares to call the element "pressurization ejector pin". "Ordinary ejector pin (conventional ejector pin)" is also called "standard ejector pin", and the pressurization ejector pin and the ordinary ejector pin are collectively called "ejector pin"] is selected, the fluid pressurization is carried out in the course of retraction of pressurization pin or pressurization ejector pin, or immediately or after the elapse of a certain period of time subsequent to the retraction of pressurization pin or pressurization ejector pin.

Upon receiving a signal indicating that pressurization pin 50, pressurization ejector pin 227 and pressurization ejector pin 500 have receded, an operation of fluid pressurization is carried out by opening the filling valve 14 in FIG. 1 and FIG. 46.

In the case of device 1140, even for a single molded article, one can choose separately one Mode from among fluid pressurization Modes 1 to 7.

(Operation of Device for Preparing Pressurized Fluid)

The device 140 for preparing pressurized fluid, after an operation of filling the cavity 21 with a resin has been started and when it receives from an injection molding unit a signal for starting the fluid pressurization on the resin in the cavity 21 (in the case where the Mode 1 to Mode 7 and the retraction of pressurization pin or pressurization ejector pin have been selected, upon receiving a signal indicating that the retraction has been completed), starts to carry out fluidic pressurization of the resin in the cavity 21 by opening the filling valve 14 in FIG. 1 and ejecting the pressurizing fluid into the movable side parting, etc. to inject (introduce) the fluid into the clearance between the resin and the mold.

For example, the device 140 or 1140 for preparing pressurized fluid closes the filling valve 14 at the stoppage (after expiration of a preset waiting time) of a timer (not illustrated) and then opens the atmospheric discharge valve 15. By these steps, the pressurized fluid in the cavity 21 is discharged into the atmosphere.

The device 140 or 1140 for preparing pressurized fluid does not necessarily have to open the atmospheric discharge valve 15 immediately after closing the filling valve 14 but it can also keep on containing after that for a while the pressurized fluid in the cavity 21 and then open the atmospheric discharge valve 15 to exhaust the pressurized fluid in the cavity 21. In the present invention, this maneuver is called "retention of pressurized fluid" and the duration of time while retaining the pressurized fluid is called "retention time".

The program (sequencer) stored in the control section (not illustrated) in the device 140 or 1140 for preparing pressurized fluid is reset (completes the operation) after receiving a signal, for example the signal of the end of mold opening, from the injection molding unit.

(Pressure Control and Volume Control)

The device 140 or 1140 for preparing pressurized fluid can also pressurize the resin in the cavity by using the pressurized fluid in the receiver tank 10 by opening the filling valve 14 after storing (after accumulating) under a pressure required for fluid pressurization the pressurized fluid in the receiver tank 10 irrespective whether the pressure control valve 12 is present or not. This mode of operation is called "pressure control (pressurization by controlled pressure)" of pressurized fluid.

In the device 140 or 1140 for preparing pressurized fluid, the gas-booster 8 can be replaced with a plunger and the receiver tank 10 can be dispensed with. In such a case, the plunger serves also as a receiver tank 10 with its function and mechanism, measures out an aliquot of fluid necessary every time (for each shot, for molding every article), and pressurizes the fluid. This mode of operation is called "volume control (pressurization by controlled volume)" of pressurized fluid. Here, a plunger signifies a device that consists of a piston and a cylinder as main constituents, where the piston makes a reciprocating motion with respect to the cylinder. In other words, in a plunger, a piston is moved in a direction to let in a desired volume of fluid into a cylinder, and then moved in the direction opposite to the first direction to pressurize the fluid in the cylinder as well as to eject the fluid into the cavity.

In FIG. 1 and FIG. 46 the code (arrowhead) 19 indicates the flow direction of pressurized fluid in the case where the pressurized fluid in the receiver tank 10 is discharged out to the atmosphere by opening the manual valve 11.

Among those fluids used in fluid pressurization, the gas is air, nitrogen, carbon dioxide (carbon dioxide gas), hydrogen, rare gas like helium and argon, superheated steam, oxygen, alcohol vapor, ether vapor, natural gas, and the like, or mixture of these gas. Normally, as a fluid, a gas containing nitrogen or air as a main component is used, in consideration of cost and facility for utilization including the safety.

Among those fluids used in fluid pressurization, as a liquid, water is normally used while ether, alcohol or liquefied carbon dioxide can also be used. In the case where a liquid of a low temperature is used for fluid pressurization, if the resin injected into the cavity is a thermoplastic resin or a thermoplastic elastomer, the cooling and solidification of a molten resin can be accelerated, and consequently the molding cycle can be expedited and the productivity can improve.

In a contrasting situation where a liquid of a high temperature is used for fluid pressurization, while the cooling and solidification is slowed down, the transcription performance conforming to the cavity surface is improved and molded articles with a clean appearance can be obtained. In the case where water is used for fluid pressurization, as the boiling point of water under normal pressure and at normal temperature is 100° C., water is used at a temperature below 100° C. In the case where glycerin is used for fluid pressurization, as the boiling point of glycerin is 290° C., it can be used at a higher temperature in comparison with the case of use of water. In the case where a fluid of high temperature is used in fluid pressurization, the setting of the mold temperature at a higher value makes it possible to obtain a more effective result.

In the case where an evaporable liquid, for example, liquefied carbon dioxide, ether, alcohol or the like is used, the liquid vaporizes due to the heat of a molten resin (particularly thermoplastic resin and thermoplastic elastomer). In other words, since the liquid takes out heat of the molten gas by vaporization heat, the cooling and solidification of molten resin is accelerated and hence the molding cycle can be expedited.

This means utilizing the vaporization heat is not limited to fluid pressurization in the pressure forming-injection molding, but it can also be applied to the blow molding and in the latter the cycle acceleration can be expected owing to vaporizing heat. A liquid ejected and injected into the cavity such as alcohol, ether or the like, is discharged out to atmosphere or retrieved after the end of every cycle. As for the retrieval means, for example, after the end of fluid pressurization, the gas or liquid in the mold and the piping is retrieved by means such as aspiration, cooled and compressed as needed and converted into a liquid.

(Combined Usage with Resin Pressure Keeping)

The pressure forming-injection molding is able to further improve the transcription performance conforming to mold by combined usage of one of the 7 said Modes of fluid pressurization 1 to 7 with the resin pressure keeping.

For example, in Mode 1, the molding process can be carried out first by injecting resin into the cavity while the resin is pressurized by pressurized fluid and then by applying the resin pressure keeping.

Moreover, in Modes applying the suck-back process, the suck-back operation can be carried out after first injecting resin into the cavity, and then applying the resin pressure keeping.

Furthermore, the fluid pressurization can be carried out after a resin has been injected into the cavity with a full-pack and at timings in association with the subsequent application of resin pressure keeping, i.e., simultaneously with resin pressure keeping, in mid-course of resin pressure keeping, immediately after the end of resin pressure keeping, or after the elapse of a certain period of time following the end of resin pressure keeping. In the case of pressure forming-injection molding of resin of low stiffness like PP, if the process of resin pressure keeping is used concomitantly, warpage and deformation are reduced.

(Process of Fluid Pressurization)

Process of fluid pressurization shall be described.

In the aforementioned Modes 1 to 7, the pressurized fluid is introduced into the clearance between a resin and the mold to effect fluid pressurization on the resin in the cavity, the fluid being ejected at one point or multiple points on at least one of the parting on the movable side and the parting on the slide-core on the movable side, or on at least one of the parting on the stationary side and the parting on the slide-core on the stationary side.

The modes of fluid pressurization in the pressure forming-injection molding include direct pressurization and indirect pressurization.

The "direct pressurization" is a method by which the pressurized fluid is directly introduced into the clearances between a resin in the cavity and the surface of cavity (parting on the stationary side or parting on the movable side). In the direct pressurization, the pressurized fluid is made to act directly on the surface of resin in the cavity through ejection port provided in the apical end of pressurization pin or pressurization ejector pin and to press the resin in the cavity onto the cavity surface.

The "indirect pressurization" is a method by which the pressurization pin for pressurized fluid is provided in a location other than the cavity, and through the flow channel of pressurized fluid, the pressurization takes place on a part or the entire body of resin that comes into contact with at least one of the parting on the movable side and the parting on the slide-core on the movable side, or with at least one of the parting on the stationary side and the parting on the slide-core on the stationary side.

The pressurized fluid can also be introduced from the bottom of a nested element and made to act on the resin in the cavity through an ejector pin, clearances between nested elements, a parting or the like.

It is feared that the indirect pressurization might disturb the shape, and hence care should be taken in selecting the place and the means of fluid pressurization.

Figure 78:
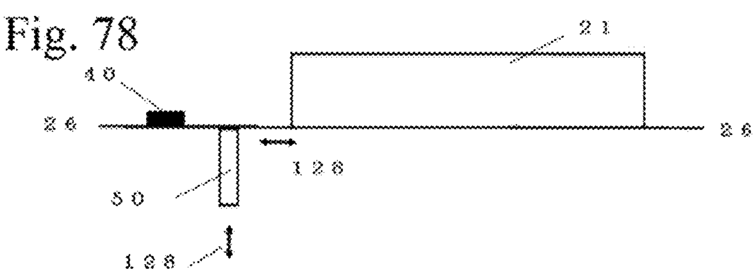
FIG. 78 is a schematic diagram representing the indirect pressurization from the parting.

A means of fluid pressurization through a parting is described by referring to FIG. 78. When the fluid pressurization of the cavity 21 is carried out through pressurization pin 50 and then parting 26, since a seal 40 is provided on the outer side of the pressurization pin 50, the pressurized fluid 128 does not leak out but enters the clearance between a resin and the mold surface in the cavity 21 and effects fluid pressurization. The pressurization pin 50 is provided on the inner side of seal 40.

It is often the case that in the majority of molded articles the face on the stationary side makes a decorative surface, and consequently, the pressure application is effected essentially by fluid pressurization (pushing) against the stationary side. However, unless the product is a part intended for an external appearance, the pressure application can be effected from any side or both sides of stationary side and movable side, so long as requirements in terms of mechanism and function are satisfied.

The configuration of FIG. 78 represents a means of indirect pressurization using a pressurization pin, but instead of the pressurization pin, a pressuring ejector pin or an ejector return pin that has been transformed into a form like a pressurization ejector pin capable of effecting the fluid pressurization can also be used.

Figure 18:
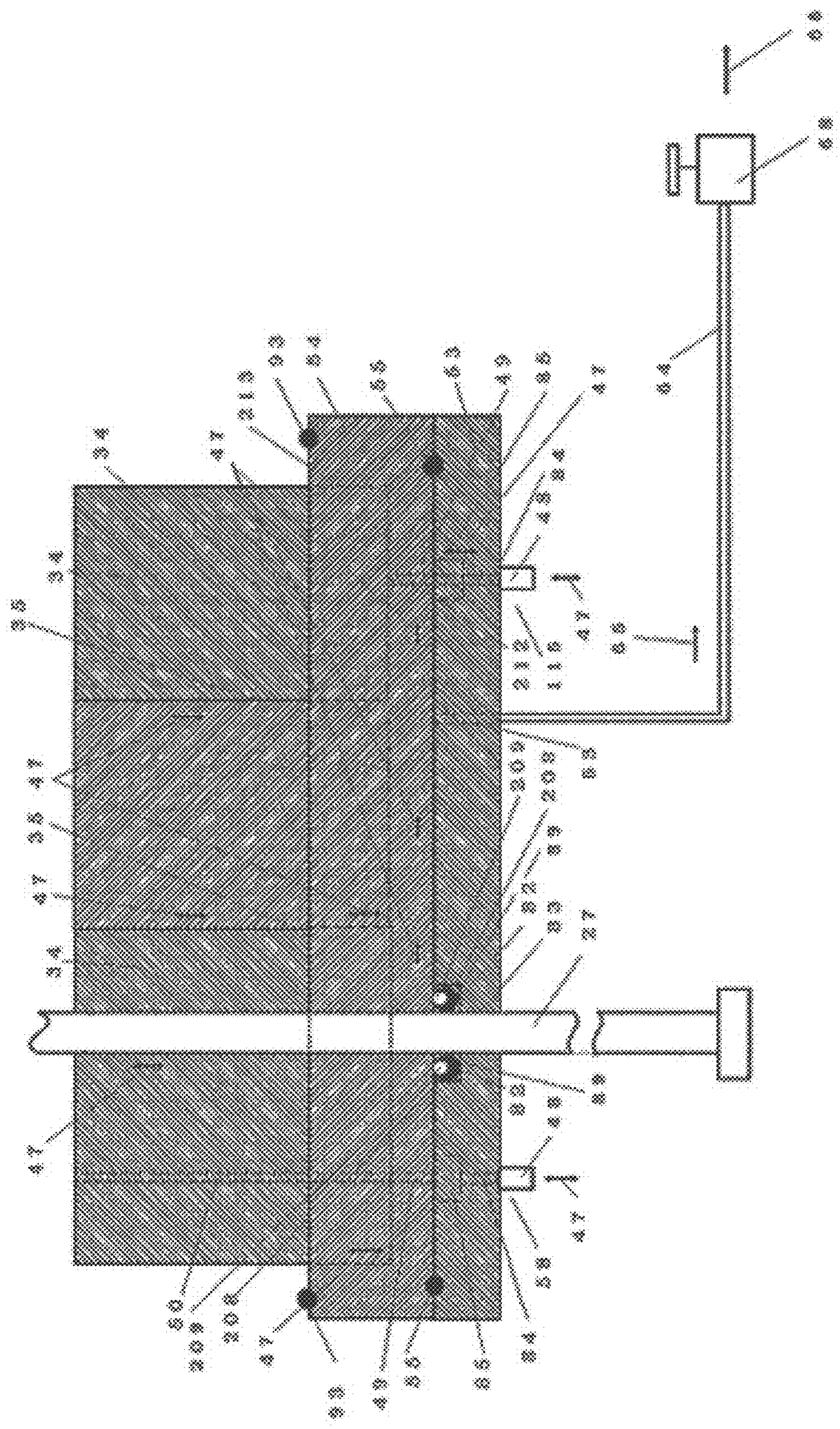
FIG. 18 is a schematic diagram presenting a means for sealing each of ejector pins in FIG. 3 by using a seal-ring.
Figure 19:
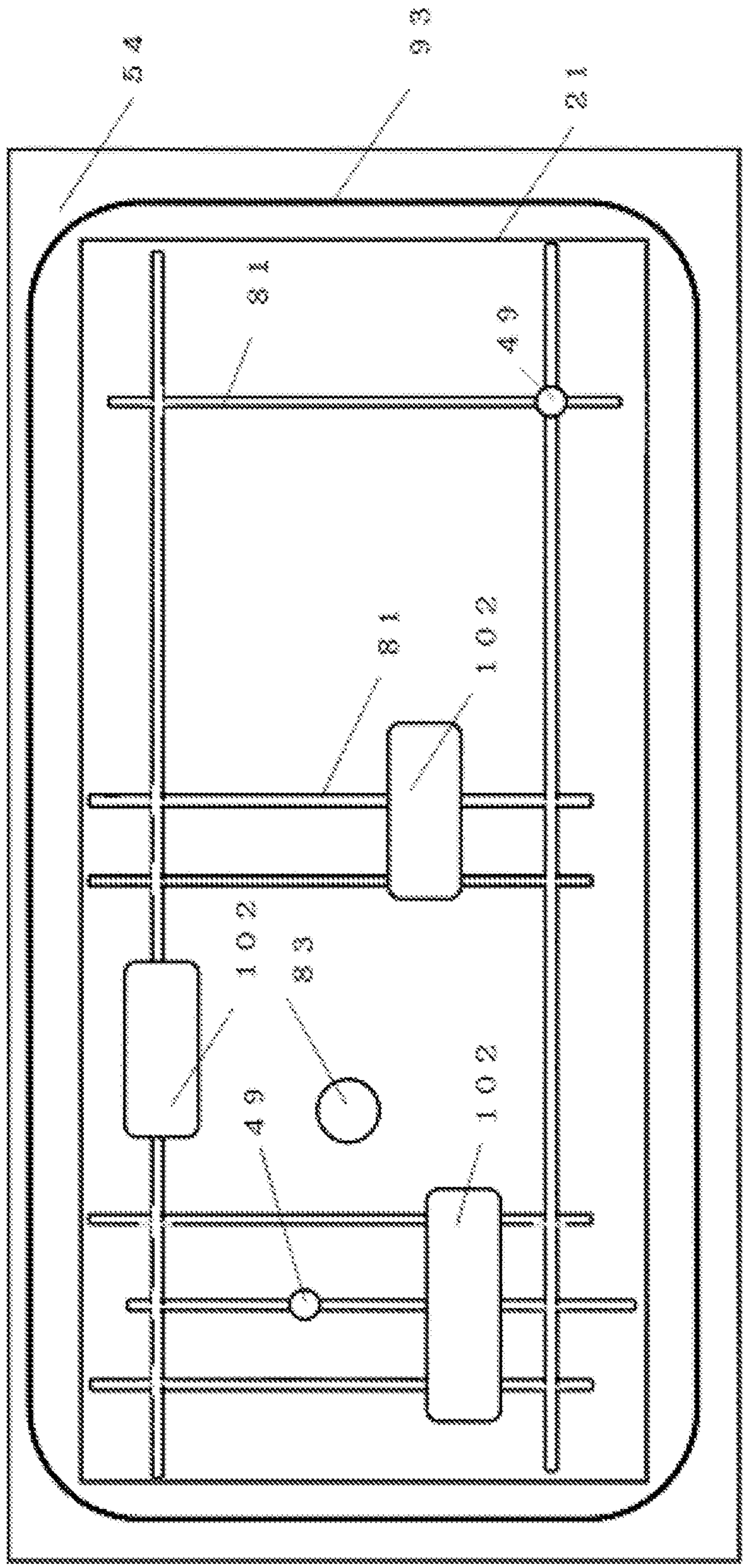
FIG. 19 is a schematic diagram representing the structure of plate 54 for fixing and sealing a part like a nested element.

In the indirect pressurization, as all the elements including a nested element and ejector pins are enclosed by seal 55 in FIG. 18 and seal 93 in FIG. 19, the entire system comprising the nested element, ejector pins, etc. is supposed to be pressurized. In the case where a mold has certain portions of which the fluid pressurization is not desirable, it is divided into blocks each of which is sealed separately by using individual sealing elements like seal 55 and seal 93.

(Delay Time)

In the aforementioned Modes 1 to 7, the time from the injection molding till the start of fluid pressurization may be made to last a little bit long. The lapse of time is called "delay time". In this case, both valve 14 and valve 15 are closed.

When the delay time is prolonged, the solidification of molten resin injected into the cavity advances, and consequently the action and effect of fluid pressurization is reduced. Where the thickness of molded article is thick, the pressurized fluid enters the molded article and creates void, but by prolonging the delay time, the surface layer where the cooling and solidification advances (called "skin layer" or "surface skin layer" in the present invention) is formed, and therefore the fluid pressurization is possible even in the case of a thick molded article.

Incidentally, the inner portion still in a molten state in which the phase of cooling and solidification has not yet terminated is called "molten layer" or "inner molten layer".

[Retraction of a Pressurization Pin or the Ejector Pin Provided with Mechanism and Function of Fluid Pressurization (Called "Pressurization Ejector Pin")]

In the operation of fluid pressurization, by retracting a pressurization pin or a pressurization ejector pin to create a space (clearance) between the resin and the tip [portion from which a pressurized fluid is ejected (let out)], the entry of pressurized fluid into the clearance between the resin and the mold is facilitated. A signal indicating that the retraction of pressurization pin or pressurization ejector pin has been completed and the fluid pressurization can be performed is transmitted to fluid pressurization device 140 or 1140, as needed.

The distance of retraction can be such as to be able to separate the resin surface to be pressurized from the pressurization pin or pressurization ejector pin, leaving a clearance between them. Normally, it can be around 1 mm to 5 mm, but a longer distance presents no problem as long as a guide (part supporting a pressurization ejector pin or an ordinary ejector pin) is available.

(Fluid Pressurization after the Retraction of Pressurization Ejector Pin)

Figure 13:
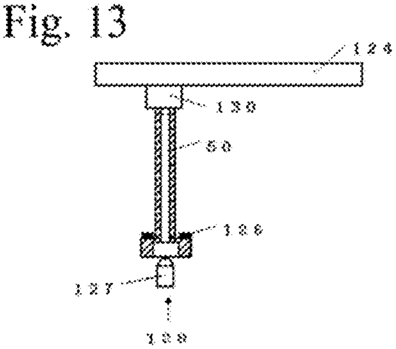
FIG. 13 is a schematic diagram representing the relative position between a pressurization pin 50 and the cavity 200.

For example, FIG. 13 described the configuration wherein the outer cylinder and the inner core are moved back from the product surface to make a protrusion on it in order to facilitate the entry of pressurized fluid into the clearance between the resin and the mold. However, in cases of resins with low viscosity in molten state like PP, PE, etc., as a pressurization pin or a pressurization ejector pin is in contact with the resin surface, the pressurized fluid does not enter the clearance between the resin and the mold but it intrudes into the molten resin and makes hollows in it.

If the pressure of pressurized fluid is increased with a view to enhancing the effect of fluid pressurization, the pressurized fluid infiltrates the resin in a similar fashion also even in cases of HIPS, ABS and the like. As a means to solve this problem, the pressurization pin or the pressurization ejector pin is retracted immediately or after the elapse of a certain period of time upon completing the filling of the cavity with resin to create a space between the resin and the pin to facilitate the entry of fluid into the clearance between the resin and the mold.

(Description of FIG. 63)

This mechanism is described with respect to a pressurization ejector pin.

Figure 63A:
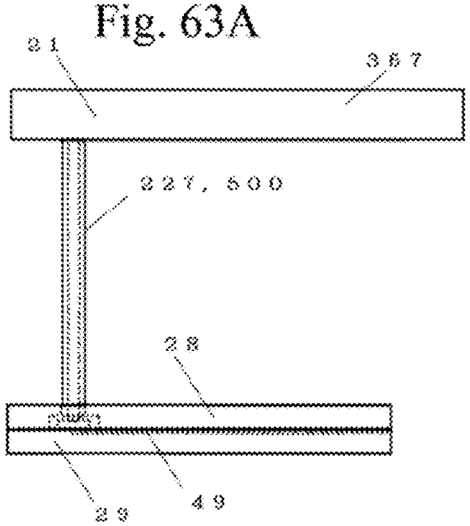
FIGS. 63A to 63C are schematic diagrams representing that the fluidic pressurization is facilitated by moving back the pressurization ejector pin.

FIG. 63A represents a state at the moment immediately upon completing the filling of cavity 21 with a molten resin 367 where pressurization ejector pin 227 or pressurization ejector pin 500 is in contact with the resin.

Figure 63B:
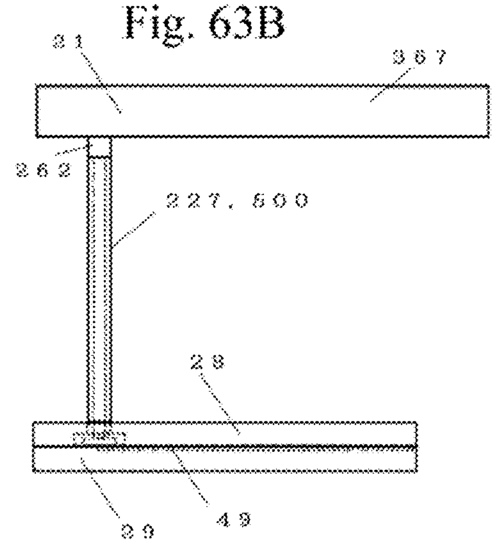

FIG. 63B represents a state at the moment where pressurization ejector pin 227 or pressurization ejector pin 500 has been retracted and a space (clearance) indicated by reference numerals 286, 306, etc. has been created between resin 367 and the pin.

Figure 63C:
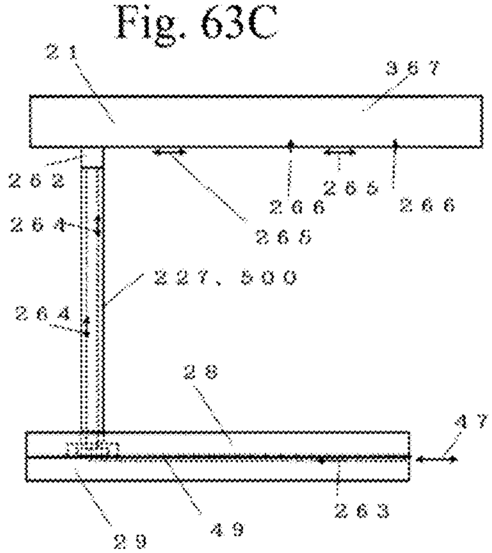

FIG. 63C represents a state at the moment where the fluid pressurization has started, and the pressurized fluid is flowing into the clearance between the resin and the mold. Code 263 indicates the flow of pressurized fluid in the circuit in the clearance provided between an ejector plate 28 and another ejector plate 29; code 264 indicates that in the ejector pin; and code 265 indicates that in the clearance. Incidentally, the arrowheads 266 oriented upward in the figure indicate that the flow 265 effects the pressurization on the resin.

The retraction of pressurization ejector pin can be carried out at any timing after the completion of filling the cavity with a molten resin, i.e., immediately or after the elapse of a certain period of time after it.

The fluid pressurization can be carried out at any timing after the completion of retraction of the pressurization ejector pin, i.e., immediately or after the elapse of a certain period of time after it. The aforementioned mechanism can be easily applied also to a pressurization pin 50.

(Description of FIG. 62)

(Means of Retraction of Ejector Pin)

The retraction of pressurization pin 50 is effected by the operation of driving device 260 represented by hydraulic mechanism, pneumatic cylinder, electric motor, etc. provided on the rear portion of pressurization pin 50. Incidentally, reference numeral 258 represents a rod connecting the pressurization pin 50 with device 260, and reference numeral 259 represents the movement of pressurization pin 50. Reference numeral 257 represents the space created by the retraction of pressurization pin 50 between the molten resin and pressurization pin 50, into which the pressurized fluid is ejected from pressurization pin 50. As a result of this, the pressurized fluid enters the clearance between the resin and the mold, and the fluid pressurization is facilitated.

Figure 66:
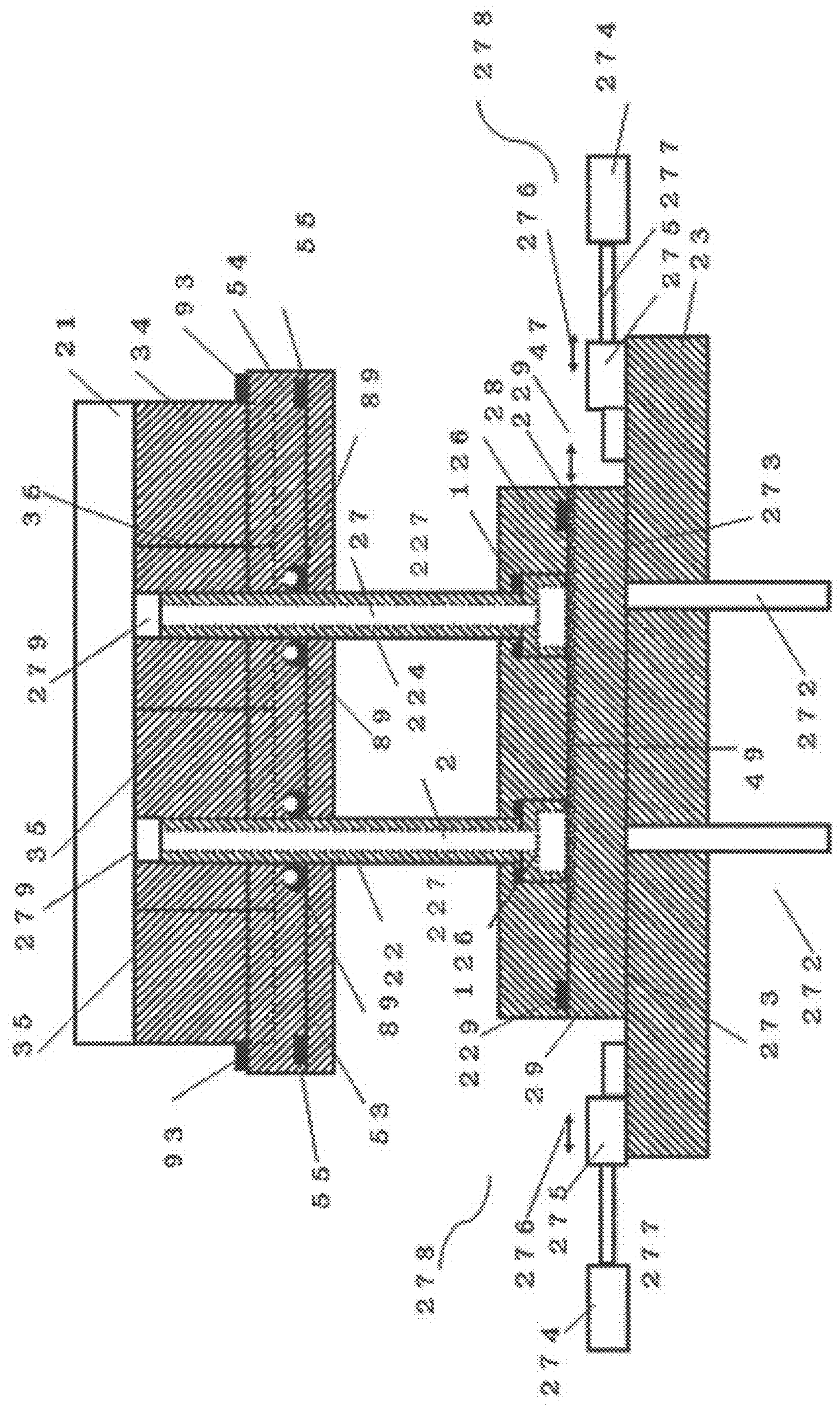
FIG. 66 is a schematic diagram representing the configuration wherein wedge blocks have been pushed back to make a space at the tip of pressurization ejector pin to make it possible to effect the fluid pressurization.

Incidentally, as FIG. 66 illustrates fully a mechanism where pressurization pin 50 is made movable, illustrations of the circuit and sealing means of pressurized fluid are omitted from FIG. 62.

Figure 64:
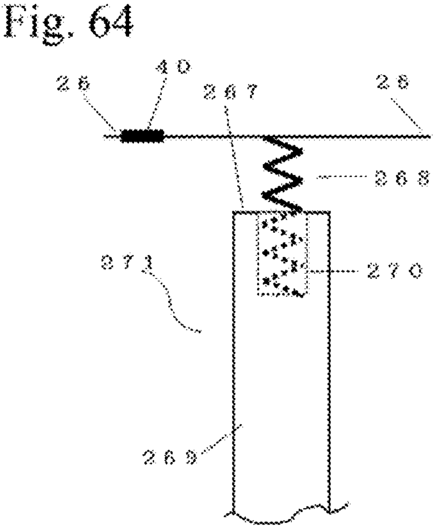
FIG. 64 is a schematic diagram representing the structure of a return pin provided with a mechanism to push back the ejector plate.

(Description of FIG. 64)

(Means of Retraction of Ejector Pin)

The retraction of pressurization ejector pin 227 provided with a mechanism of fluid pressurization is effected, as illustrated in FIG. 64 by the action of a spring 268 [provided on the tip of ejector return pin 269 (pin that pushes back the ejector mechanism when closing the mold) and accommodated at the time of mold clamping in housing structure (space) 270 formed within pin 269]. At the time of resin injection, the ejector pin is moved forward (tip portion 267 of 269 touches 26) by pushing the ejector plate with the ejector rod, and when the pushing action (this is a new mechanism in the injection molding unit provided for the pressure forming-injection molding) is stopped before fluid pressurization, ejector plates 28 and 29 are pushed back as far as mounting plate 23 due to the force of spring 268, the ejector pin recedes, and space 279 is created between the resin and the ejector pin.

The return stroke (retraction stroke) of ejector pin is determined depending on the lengths of return pin 269, ejector pin 27 and pressurization ejector pin 227. In other words, the return stroke is the distance of retraction.

Instead of spring 268, urethane rubber, hydraulic, pneumatic or electric motor can also be used. Incidentally, FIG. 64 illustrates only the tip portion of return pin, and the whole view of the mold into which the return pin is incorporated is omitted.

The injection molding unit is provided with a mechanism to lower the ejector rod (ejector rod thrusting ejector plates 28, 29). The ejector rod is lowered by a command signal to lower it issued from pressurized fluid device 140 or 1140 to the injection molding unit before fluid pressurization, and space 279 is created. The pressurized fluid is ejected into the space created between the resin and pressurization ejector pin 227 by the retraction of pressurization ejector pin. As a result of this, the pressurized fluid enters the clearance between the resin and the mold, and the fluid pressurization is facilitated.

When the molded article is to be taken out (pushed out, ejected) by opening the mold after completing a series of operations, it is needed only to operate the ejector rod directly.

Regarding the means to create a space between a resin and a pin by retracting the ejector pin, other different types of means can be considered as a mechanism to lower the ejector plate.

Figure 65:
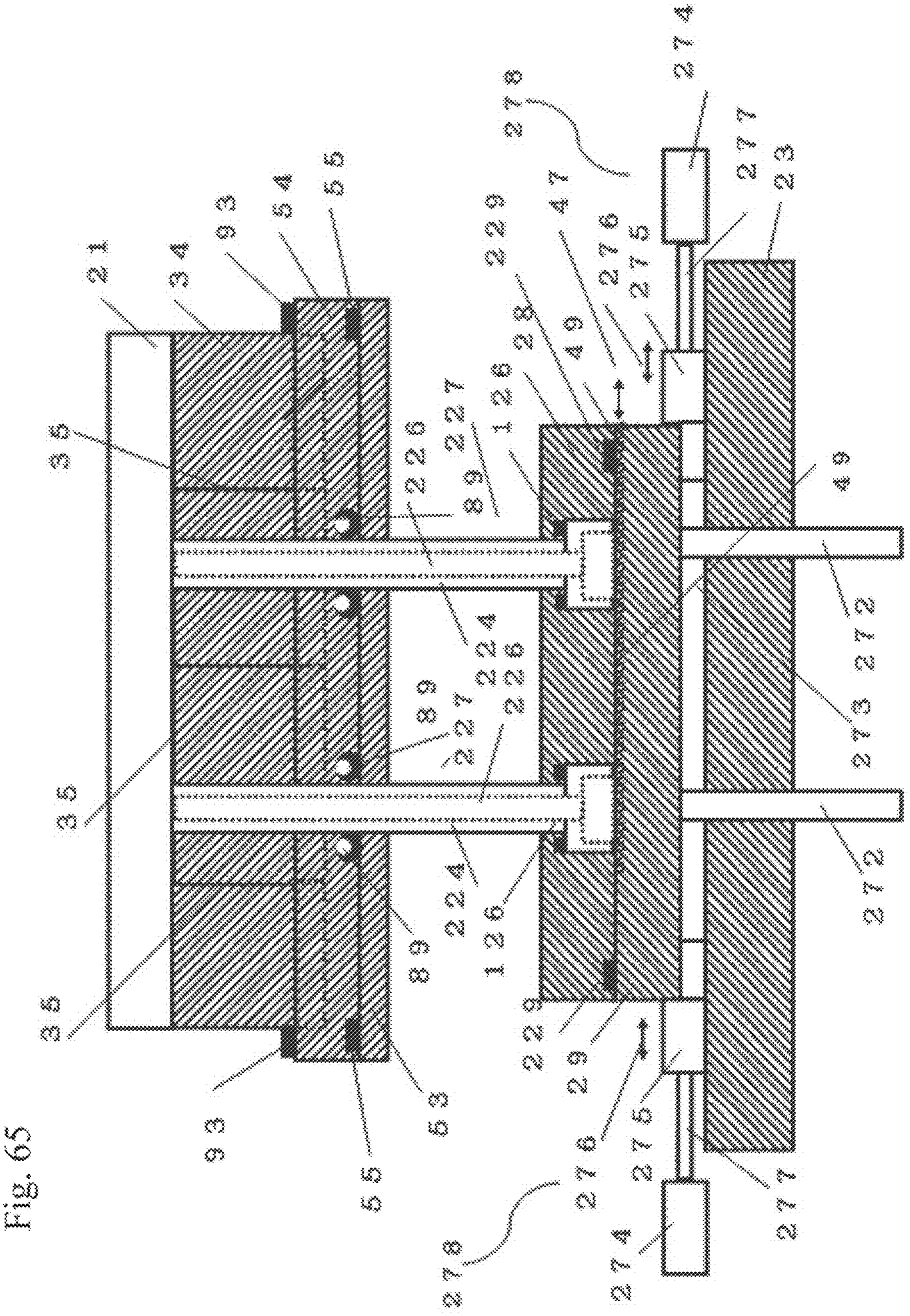
FIG. 65 is a schematic diagram representing the configuration wherein the pressurization ejector pins 227 have been moved back to facilitate the entry of pressurized fluid into the clearance between the resin and the mold, and wedge blocks have been inserted so as to sustain the resin pressure.

(Description of FIG. 65)

(Retraction of Pressurization Ejector Pin, Injection Molding Unit)

The means to retract a pressurization ejector pin are described by referring to FIG. 64 to FIG. 73.

FIG. 65 illustrates a mold into which return pin 271 depicted in FIG. 64 is incorporated. The pressurized fluid is introduced into the clearance between ejector plates 28 and 29 and the fluid is ejected from the tip portion of pressurization ejector pin 500.

Figure 57:
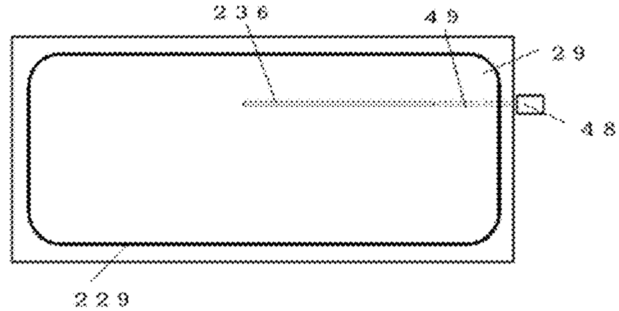
FIG. 57 is a schematic diagram of an ejector plate 29 representing the means of fluid pressurization through ejector pin.

The ejector plates are provided with grooves (not illustrated) 236, 237, 238, etc. depicted in FIGS. 57, 58 and 59 for conducting the pressurized fluid, and with a seal 229. Furthermore, plates 53 and 54 are provided with a circuit to discharge the air in the cavity when injecting a resin into the cavity, and with exhaust valves 62, 67 and 68 (not illustrated).

Although FIG. 65 illustrates the wedge unit 278 described below, the unit is dispensable when, as described below, the relationship F1<F2 exists with respect to the mechanism and function to push ejector rod 272 of the injection molding unit. Code 275 indicates a wedge block to be inserted into the clearance (space of reference numeral 273) between mounting plate 23 and ejector plate 29 in order to sustain the injection pressure of resin. Code 274 indicates a driving device to move the wedge consisting of a hydraulic or pneumatic cylinder or an electric motor incorporating a rack-and-pinion mechanism, or the like. Code 227 indicates a rod connecting wedge 275 with driving device 274, and code 276 indicates the reciprocating movement of wedge.

(Description of FIG. 66)

In FIG. 66, cavity 21 is filled with a resin; the injection molding unit receives a signal from device 140 or 1140; the mechanism for pushing ejector rod finishes its operation; the ejector rod moves back and at the same time wedge 275 gets away from space 273; and ejector rod moves back as far as mounting plate 23 due to the force of spring 268 incorporated in the return pin 271. As a result, space 279 is created at the tip portion of pressurization ejector pin or ejector pin. Into this space, the pressurized fluid is ejected from the tip portion of pressurization ejector pin 227, enters the clearance between the resin and the mold and effects fluid pressurization.

(Description of FIG. 65)

In FIG. 65, the mold is closed and ejector plates 28 and 29 move forward by means of push-out mechanism of the injection molding unit. The amount of forward movement is determined, as indicated by the structure of return pin 271 in FIG. 64, depending on the lengths of ejector pin 27 and pressurization ejector pin 227. Ejector plates 28 and 29 move forward and there is created a clearance (space) 237 between mounting plate 23 and these plates. At this moment the wedge 275 is inserted by using wedge unit 278. With inserted wedge 275 in place, the mold clamping force is increased to a desired level and the cavity is filled with a resin. After filling it with the resin, the resin pressure keeping is carried out as needed; following the completion of resin pressure keeping, if the ejector rod is pushed and wedge 275 is extracted as shown in FIG. 66, the ejector plate is pushed back by the spring fitted in return pin 271 as far as the plane where it touches mounting plate 23, and as a result, ejector pin 27 or pressurization ejector pin 227 recedes and space 279 is created between the resin and the ejector pin. The fluid pressurization is carried out immediately or after the elapse of a certain period of delay time subsequent to the recession of pressurization ejector pin 500 at the pressure prescribed by regulator 12 of device 140 or device 1140.

If upper ejector plate 28 and lower ejector plate 29 are fixed adequately by bolts and the like, they will not come apart due to the fluid pressure in the state depicted by FIG. 66 (even if they are not pushed by a return pin).

The process of fluid pressurization terminates after completing pressurization time, retention time and atmospheric discharge time. When both the signal of end of fluid pressurization and the signal of completion of cooling in the mold are sent to the sequencer of molding unit, and the mold gets ready for opening, the mold is opened, the ejector rod advances and the molded article is extracted. When the molding unit receives the signal of completion of extraction and the signal confirming the advance of ejector, a series of actions are completed and the starting process of mold clamping begins.

Figure 67:
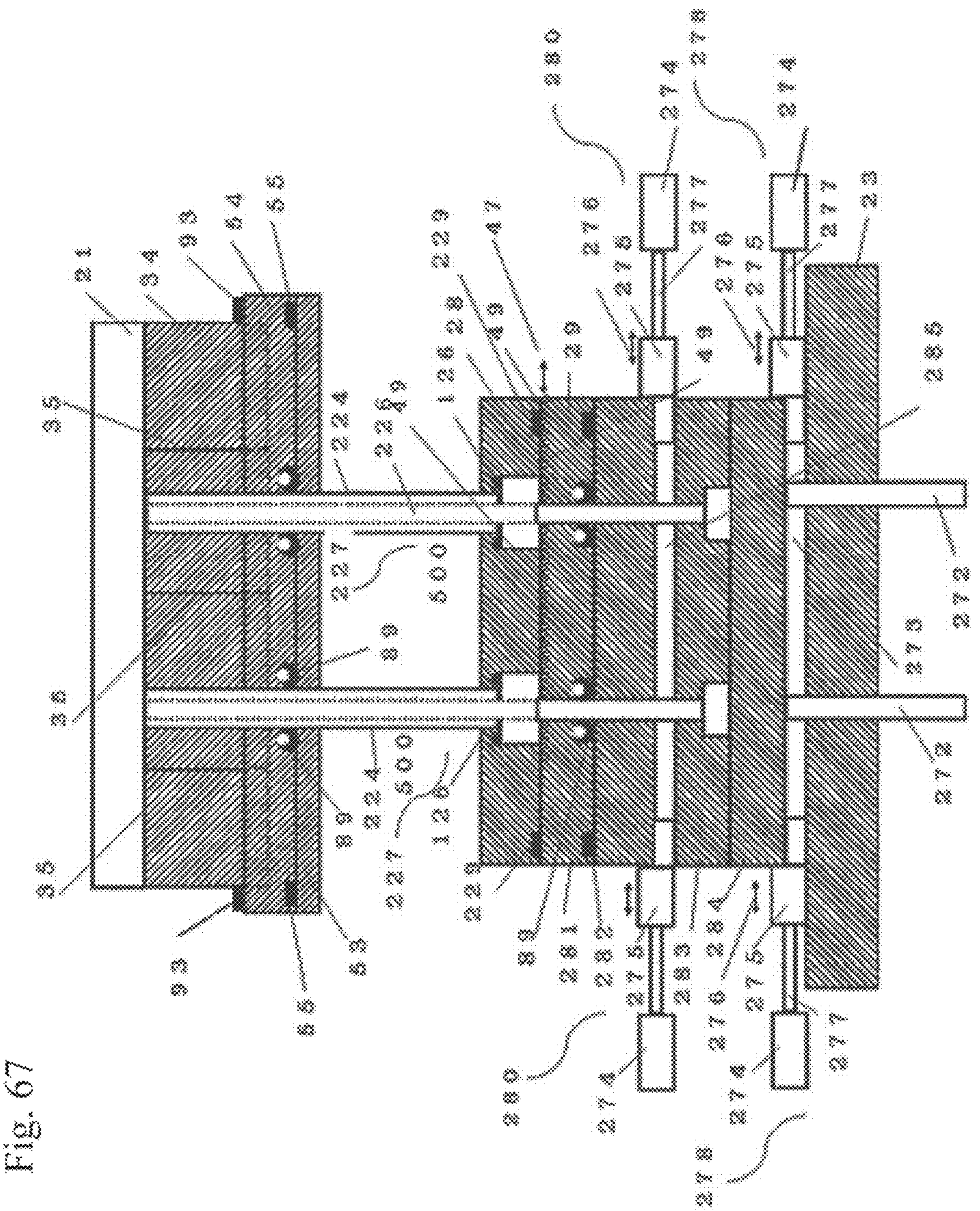
FIG. 67 is a schematic diagram representing the structure wherein the outer cylinder and the inner core can advance or recede simultaneously or separately.

(Description of FIG. 67)

In FIG. 67, in addition to ejector plates 28 and 29, three ejector plates 282, 283, 284 and wedge unit 280 are added as new elements.

By these additions, it is intended to retract separately from each other inner core 226 and outer cylinder 224 constituting pressurization ejector pin 227, to modify the shape of space 286 and thus to enhance the action and effect of fluid pressurization.

Figure 68:
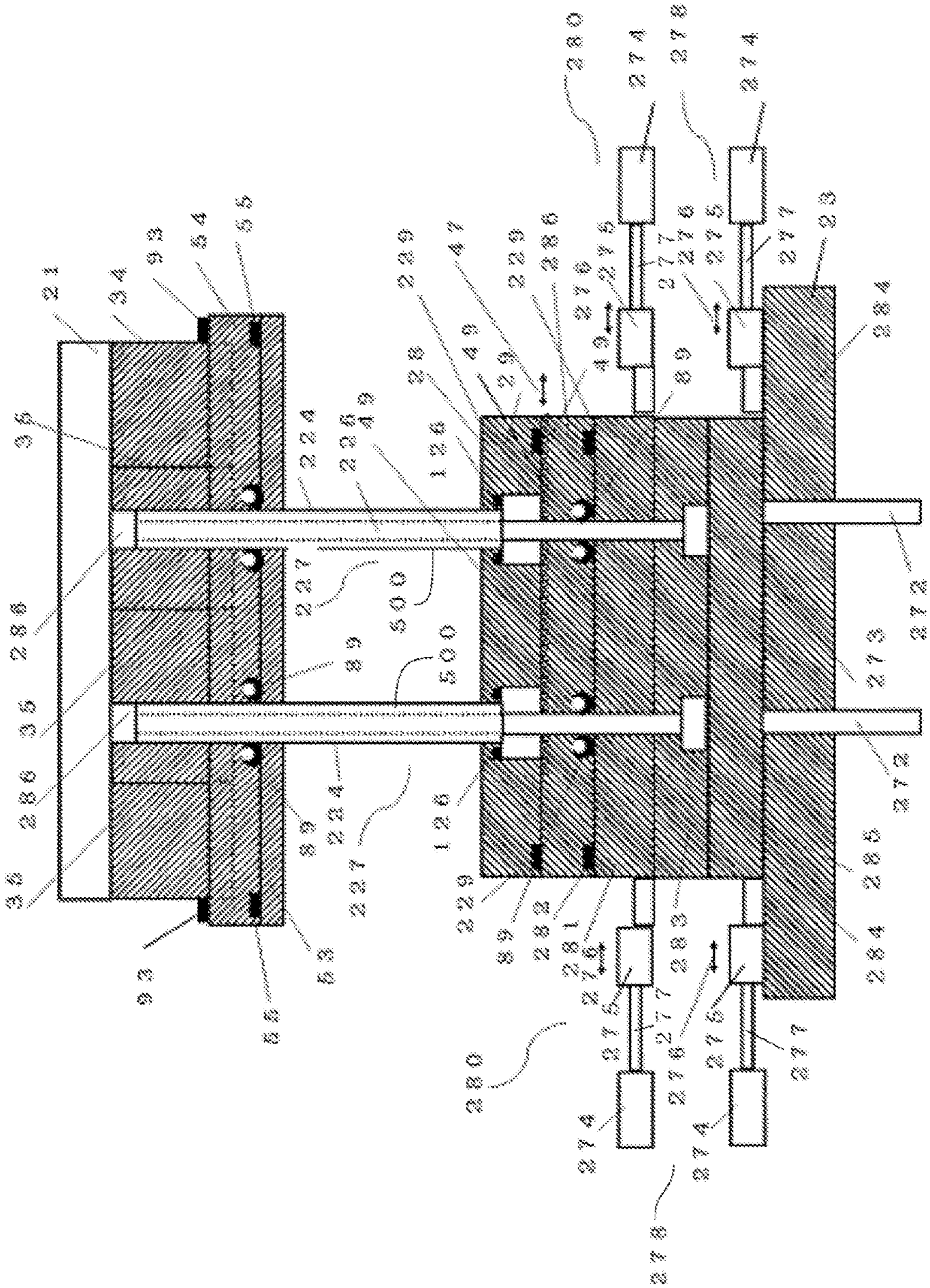
FIG. 68 is a schematic diagram representing the configuration wherein wedge blocks have been moved back to make a space at the tip of pressurization pin to enable the fluid pressurization.

(Description of FIG. 68)

FIG. 67 illustrates that the fluid pressurization is carried out by the configuration wherein the resin pressure exerted on pressurization ejector pin 227 is sustained by inserting wedge unit 278 and wedge unit 280, and FIG. 68 illustrates that the process is carried out by the configuration wherein wedge unit 278 and wedge unit 280 are removed.

In configurations depicted by FIG. 67 and FIG. 68, wedge units 278 and 280 were used, but when the number of pressurization ejector pins is small and the pressure exerted on pressurization ejector pins is low, the process can be carried out also by utilizing the push-out mechanism for ejector rod in the injection molding unit.

(Description of FIGS. 69A to 69F)

Figures 69A, 69B, 69C, 69D, 69E, 69F:
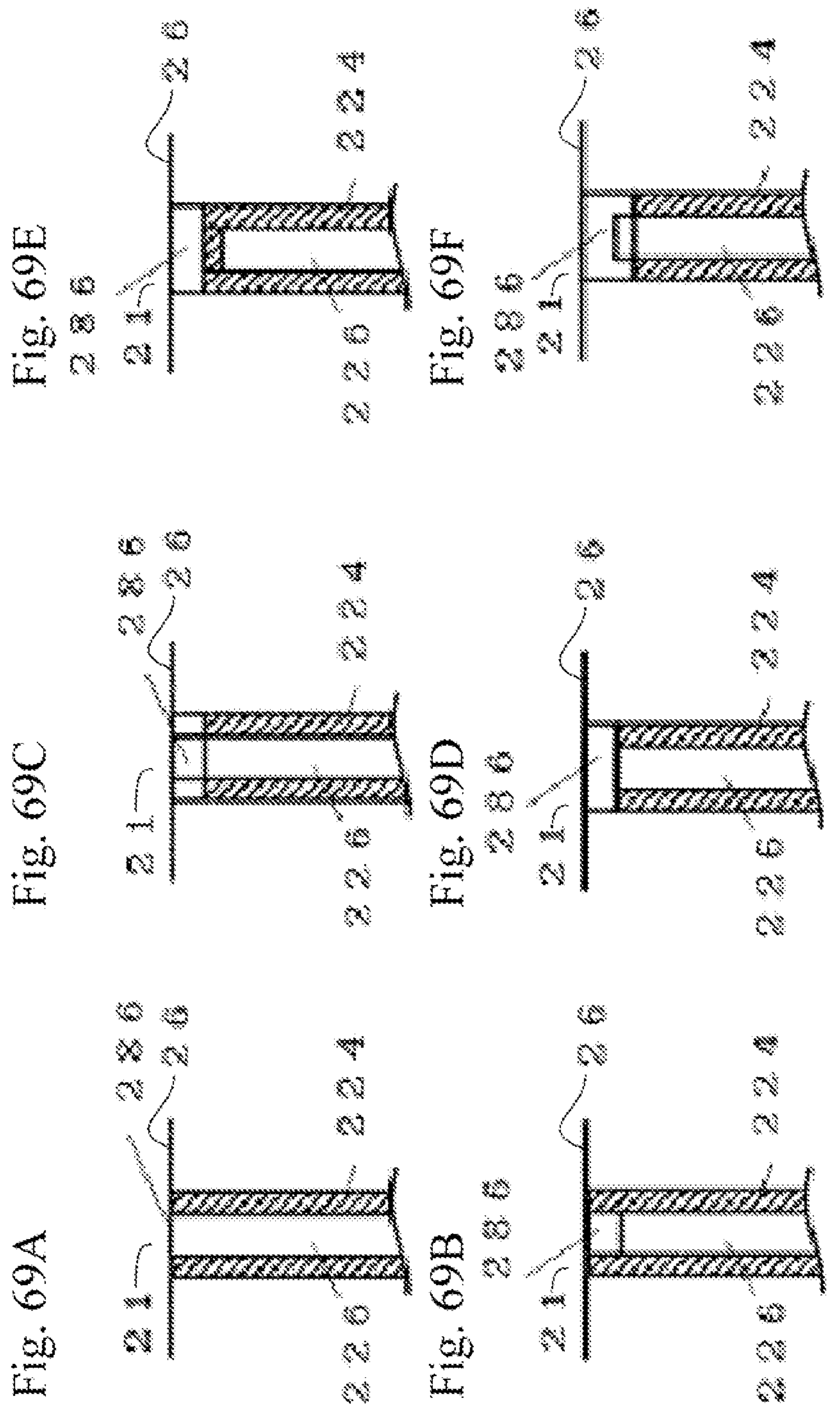
FIGS. 69A to 69F are schematic diagrams representing the form of tip when the outer cylinder and the inner core have been made to recede.

FIG. 69A depicts the state wherein, after cavity 21 is filled with a resin, both inner core 226 and outer cylinder 224 remain in contact with the resin surface. If the fluid pressurization is carried out in this state, when fluid pressure is high, product thickness is great and viscosity of molten resin is low, the pressurized fluid intrudes into the resin and makes hollows in it.

FIG. 69B depicts the state wherein, only inner core 226 is made to recede and form space 286. If the fluid pressurization is carried out in this state, outer cylinder 224 presents an obstacle and hence the pressurized fluid intrudes into the molded article and makes hollows in it. FIG. 69C depicts the state wherein only outer cylinder 226 is made to recede. In this case the pressurized fluid enters the clearance between the resin and the mold and exerts the action and effect of fluid pressurization sufficiently. FIG. 69D depicts the state wherein both inner core 226 and outer cylinder 224 are made to recede to the same position. In this case also, the pressurized fluid enters the clearance between the resin and the mold and exerts the action and effect of fluid pressurization sufficiently. FIG. 69E depicts the state wherein outer cylinder 224 is made to recede and inner core 226 is made to recede further than that. In this case also, the pressurized fluid enters the clearance between the resin and the mold and exerts the action and effect of fluid pressurization sufficiently. FIG. 69F depicts the state wherein inner core 226 is made to recede and outer cylinder 224 is made to recede further than that. In this case also, the pressurized fluid enters the clearance between the resin and the mold and exerts the action and effect of fluid pressurization sufficiently In the injection molding unit used in the pressure forming-injection molding, a new action is added to an ordinary ejector rod 272. In the process wherein, the mold having been closed, cavity 21 is filled with a resin, the force (pressure) exerted on the ejector plate is calculated by multiplying the pressure of injected resin by the sum total of cross-section areas of pressurization ejector pins and ejector pins that are used and is represented as F1.

The capability which the injection molding unit is provided with or the force by which the mold is opened and the molded article is pushed out (ejecting force of the injection molding unit) is defined as F2. In the pressure forming-injection molding, this force F2 is used.

The case of F1<F2 is described in the beginning.

In the injection molding unit, before the mold is closed and then filled with a resin, ejector rod 272 is pushed and held by an ejecting (push-out) mechanism provided on the molding unit. Although not illustrated in FIGS. 63-72, as described with respect to the structure of return pin 271 in FIG. 64, return pin 269 touches mold surface 26 of the parting on the stationary side and does not advance farther than it.

In the injection molding unit, while the ejector rod 272 keeps on exerting the force to push forward ejector plates 28 and 29, the mold clamping force is increased to a desired pressure level and the cavity is filled with the molten resin. After filling the cavity with the resin, the resin pressure keeping is effected as needed; after completing resin pressure keeping by ending the action of pushing ejector rod 272 (lowering ejector rod 272) by the molding unit, the ejector plate is returned as far as the position where it touches the mounting plate 23 by the force of spring 268 fitted in return pin 269; as a result, the ejector pin recedes and space (262 in FIG. 63, 279 in FIG. 66, 286 in FIG. 68) is created between the resin and ejector pin 27 or pressurization ejector pin 500. After ejector pin 27 or pressurization ejector pin 500 has been made to recede, immediately or after the elapse of a certain period of delay time subsequent to the recession, the fluid pressurization is carried out through pressurization ejector pin 500 at the pressure prescribed by regulator 12 of device 140 or device 1140. The process of fluid pressurization terminates after completing pressurization time, retention time and atmospheric discharge time. When both the signal of end of fluid pressurization and the signal of completion of cooling in the mold are sent to the sequencer of molding unit, and the mold gets ready for opening, the mold is opened, the ejector rod advances and the molded article is extracted. When the molding unit receives the signal of completion of extraction and the signal confirming the advance of ejector, a series of actions are completed and the starting process of mold clamping begins.

Normally as the ejector pin also recedes, a space is created there also, but the entry of pressurized fluid there presents no problem.

(Description of FIG. 65 and FIG. 66)

(Wedge Block of Ejector Plate)

Then, the cases of F1>F2 and F1=F2 are described. In these cases, the ejector pin is pushed back since the thrust of ejector mechanism of the injection molding unit alone is not enough and cannot cope with the resin injection pressure. In such a case, wedge unit 278 is used.

With regard to the pressure under which the cavity is filled with a specific molten resin, the level of pressure of injection into the mold of a multipurpose resin represented by ABS, HIPS and the like is approximately 35 MPa, and the pressure exerted on an ejector pin is a function of the cross-section of the pin on which the molten resin acts. An assumption is made that here is a mold provided with 10 ejector pins with a diameter of 10 mm (φ10). The pressure exerted on the pins is calculated as $(\varphi 10/2)^2 \times \pi$ (circular constant)×10=about 2.75 MPa. It is not a so high pressure, but as it acts on the ejector rod below the ejector plate through ejector pins for every shot, considering the stress on the molding unit, it is preferable to sustain mechanically the injection pressure by means of wedge block unit 278 rather than sustaining it simply by means of the mechanism for pushing ejector rod on the injection molding unit.

FIG. 67 illustrates a configuration wherein three more of ejector plates are added to those 28 and 29 and outer cylinder 224 and inner core 226 are made to move independently to each other. In the beginning, the reason (action and effect) is described. With the configuration in FIG. 65 and FIG. 66, both outer cylinder 224 and inner core 226 make the same movement simultaneously to create space 279.

(Description of FIG. 67)

FIG. 67 illustrates a configuration wherein ejector plates 281, 283 and 284 are added as new elements. The reason for addition is the intention to enable inner core 226 and outer cylinder 224 to recede independently so as to provide space 288 with diversity.

Figure 70:
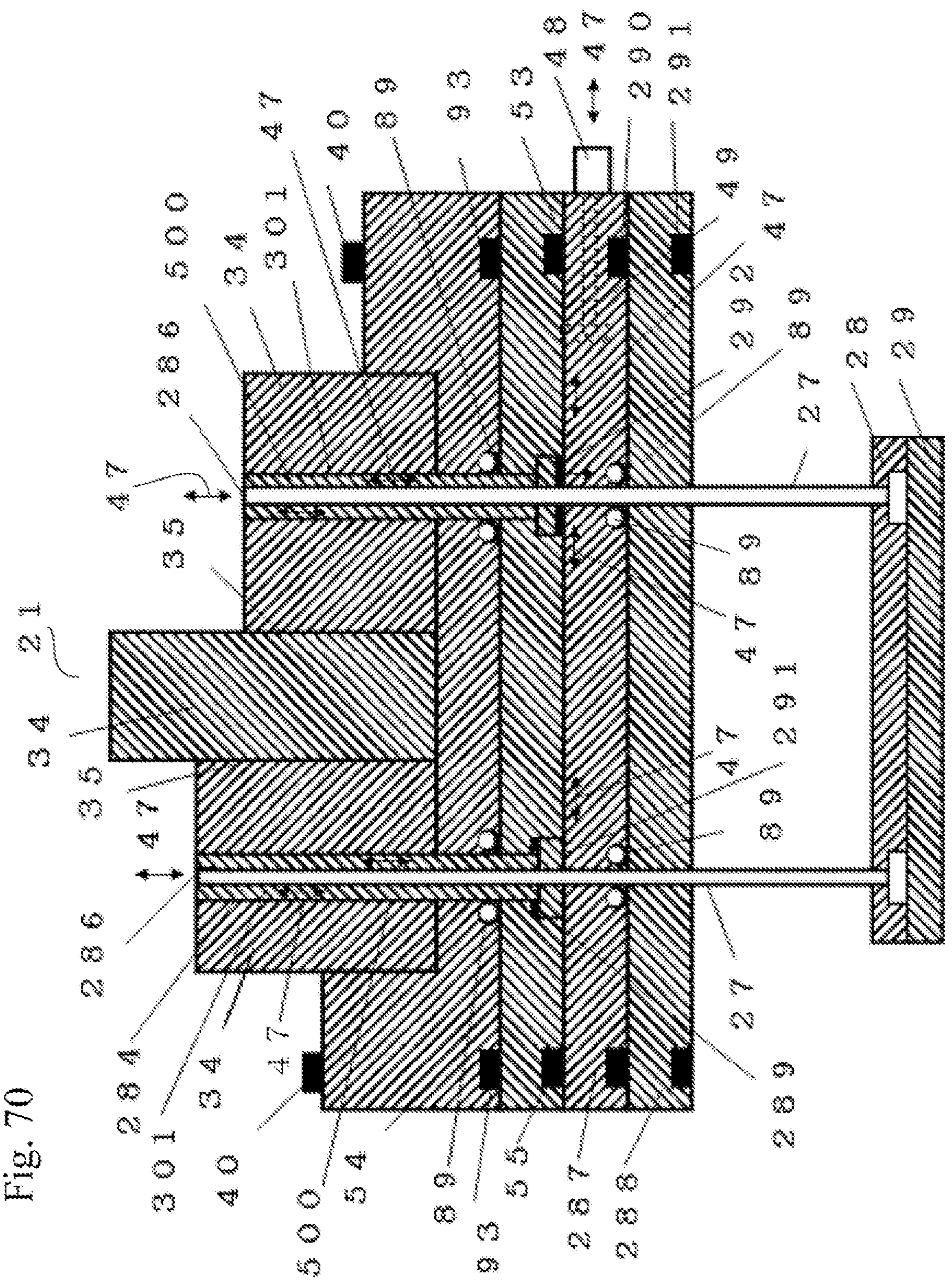
FIG. 70 is a schematic diagram representing the means of fluid pressurization wherein the outer cylinders are moved from an ejector plate to a plate and long ejector pins are used together with short ejector sleeves.

(Description of FIG. 70)

(Means of Fluid Pressurization by Using an Ejector Pin)

FIG. 70 illustrates a means of fluid pressurization from the outside of an ejector pin. The means to carry out fluid pressurization through the clearance of ejector pin was described in FIG. 18, wherein the fluid pressurization is effected also through the clearance of nested element, and as a result the shape of molded article is disturbed [as the fluid pressurization is carried out on the resin presenting a shape that has been obtained by filling the cavity with the molten resin and by thus reproducing the mold shape but not yet solidified by cooling of the resin, the shape is destroyed (broken, disturbed)]. As a means to solve this problem, as illustrated in FIGS. 52-59, a means to carry out the fluid pressurization was described wherein the ejector pin is made to have a double structure (pressurization ejector pin 227) from the inner side of which a pressurized fluid is ejected.

(Description of FIG. 70)

In order to carry out the fluid pressurization by using pressurization ejector pin 227 on a large-sized molded article or a deep molded article, a long ejector sleeve is needed, but the ejector sleeve has a limited length.

Figure 20:
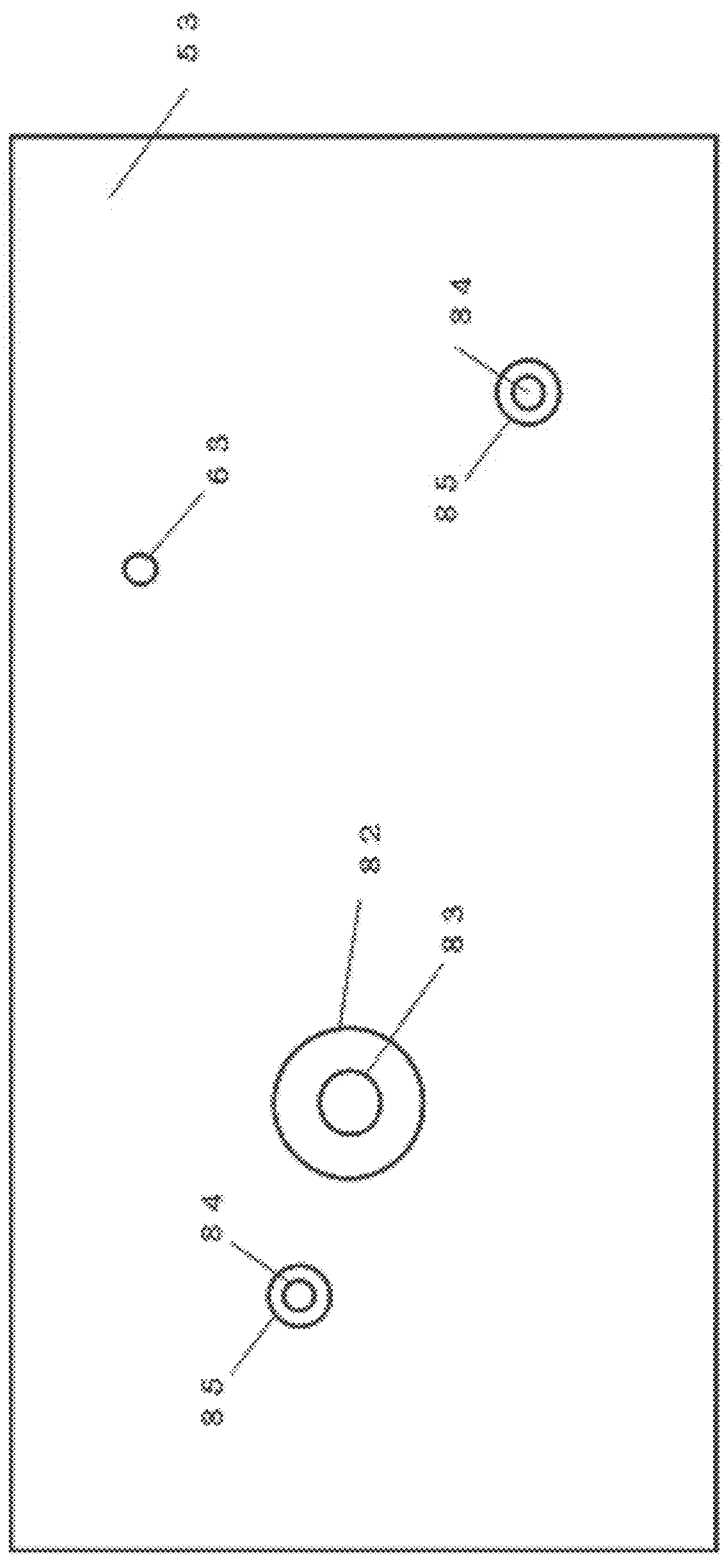
FIG. 20 is a schematic diagram representing the structure of plate 53 for fixing a seal-ring for sealing an ejector pin.

Consequently, a means to carry out the fluid pressurization by using a short ejector sleeve and a long ejector pin is described by referring to FIG. 70. Below a plate 55, the plates 287 and 288 are provided as a new element in which a short ejector sleeve is installed. This is called ejector pin guide and indicated by reference numeral 301. Ejector pin 27 is passed through the guide. The pressurized fluid is introduced between plates 55 and 287. Although not illustrated in FIG. 70, in the joining face between plate 55 and plate 287, a groove or the like for conducting pressurized fluid as illustrated in FIG. 19 and FIG. 20 is machined on plate 55 or plate 287. The pressurized fluid is ejected from the tip portion of the pin and guide assembly, after passing through the portion where the inner side of ejector pin guide 301 comes in contact with the outer side of ejector pin 27, and carries out the fluid pressurization on the resin in cavity 21. As illustrated, seal-rings 89 are used on ejector pin guides 301 and ejector pins 27. The seal-ring on an ejector pin guide 301 is fitted as 289 on the upper face of flange on the left-hand side of page and as 292 on the underside of flange on the right-hand side of page.

In ejector pin 27, the portion that enters the ejector pin guide 301 is machined in a form like D-shaped cross-section for providing a flow channel (not illustrated) of pressurized fluid. Codes 290 and 291 represent seals inserted between plates.

(Description of FIG. 70)

FIG. 70 illustrates a means to carry out the fluid pressurization by feeding the pressurized fluid from outside of the ejector pin (fluid pressurization through the clearance between ejector pin guide 301 and ordinary ejector pin 27).

(Description of FIG. 70)

(Means to Prevent the Fluid Pressurization Through the Ejector Pin)

Figure 50A:
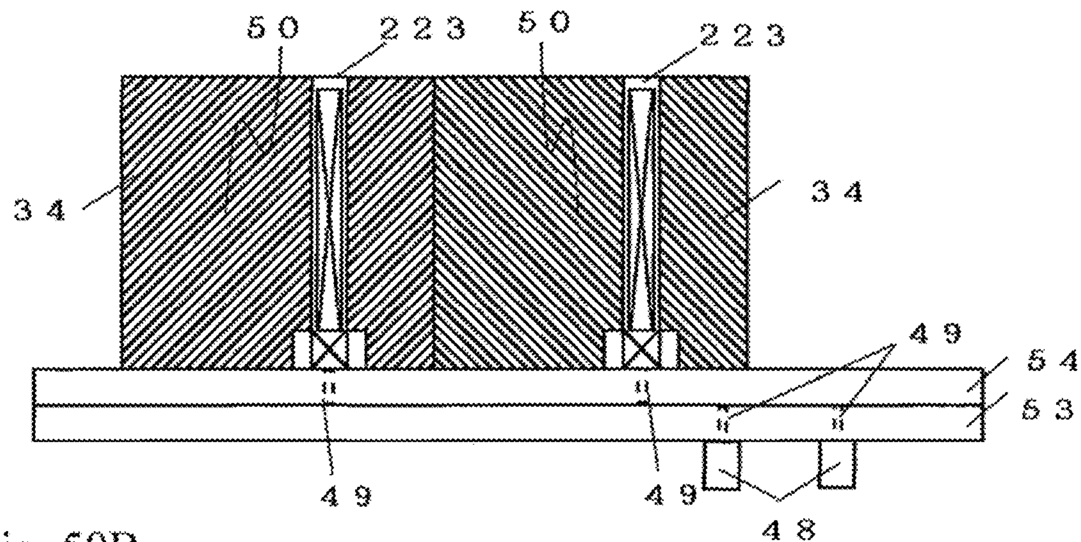
FIGS. 50A and 50B are schematic diagrams of a case where multiple circuits of pressurized fluid are provided on a single seal-plate in FIGS. 49A and 49B.
Figure 50B:
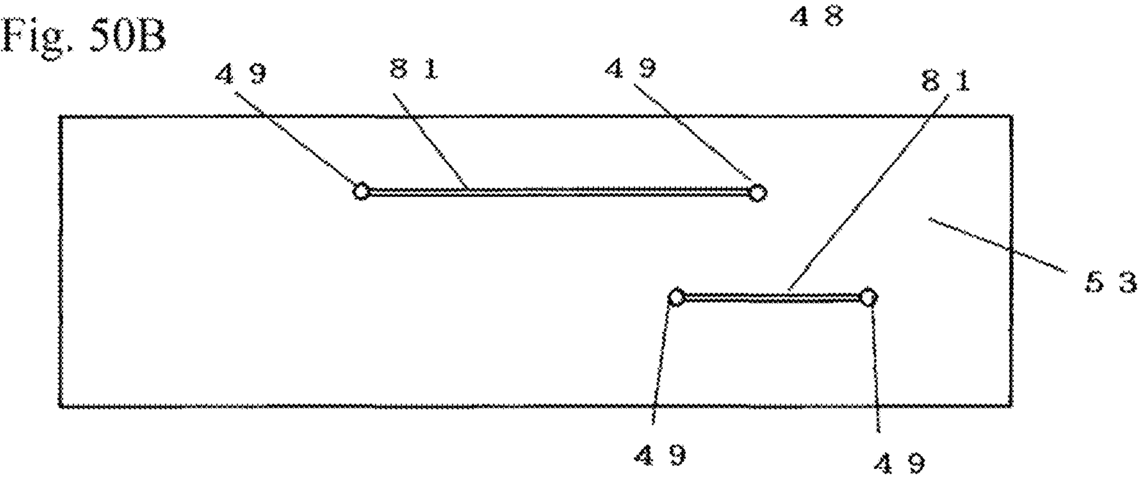

The location of seal on ejector pin guide 301 on the left-hand side of FIG. 70 is different from that on ejector pin guide 301 on the right-hand side of the figure, the seal 289 on the left-hand side being fitted on the upper face of ejector pin guide 301. Conversely, the seal 289 on the right-hand side is fitted on the upper face of ejector pin guide 301. Since the ejector pin guide 301 on the left-hand side is machined so as to be connected with the groove (similar to groove 81 illustrated in FIG. 50 and FIG. 51) machined on plate 53 or plate 287 for conducting the pressurized fluid, the pressurized fluid passes through the clearance 307 between ejector pin guide 301 and ejector pin 27 and is ejected from the tip portion.

The seal 292 provided on ejector pin guide 301 on the right-hand side of the page is fitted on the lower side of flanged portion. Furthermore, as the flanged portion of ejector pin guide 301 is not so machined as to be connected with the groove (similar to groove 81 illustrated in FIG. 50 and FIG. 51) machined on plate 53 or plate 287 for conducting the pressurized fluid (the flanged portion is not connected with the groove 81), the pressurized fluid does not enter the clearance between ejector pin guide 301 and ejector pin 27 and hence the fluid pressurization is not carried out through this pathway.

FIGS. 65-68 illustrate the means to create space 286 between the resin and an ejector pin, wherein pressurization ejector pin 227 or pressurization pin 500 comprising inner core 226 and outer cylinder 224 is made to recede to create it.

FIGS. 69A to 69F illustrate the forms of space 228 created when inner core 336 and outer cylinder 224 are made to recede independently to each other. In FIG. 70, when the fluid pressurization is carried out without retracting ejector pin 27 or by retracting only ejector pin 27 but without retracting ejector pin guide 301 by leaving it as it is, if the pressure of pressurized fluid is increased or if an olefin-based resin represented by low-viscosity PP is used, the molded article ends up often with hollows, as described in cases of FIG. 69A and FIG. 69B. And so, ejector pin guide 301 also is made to recede to create space 286 as illustrated in FIGS. 69C-69F and the pressurized fluid is ejected (introduced, injected) into it.

As ejector pin 27 is moved also inside ejector pin guide 301, a slide ring of FIG. 80 may be used also on an ejector pin in certain cases.

Figure 71:
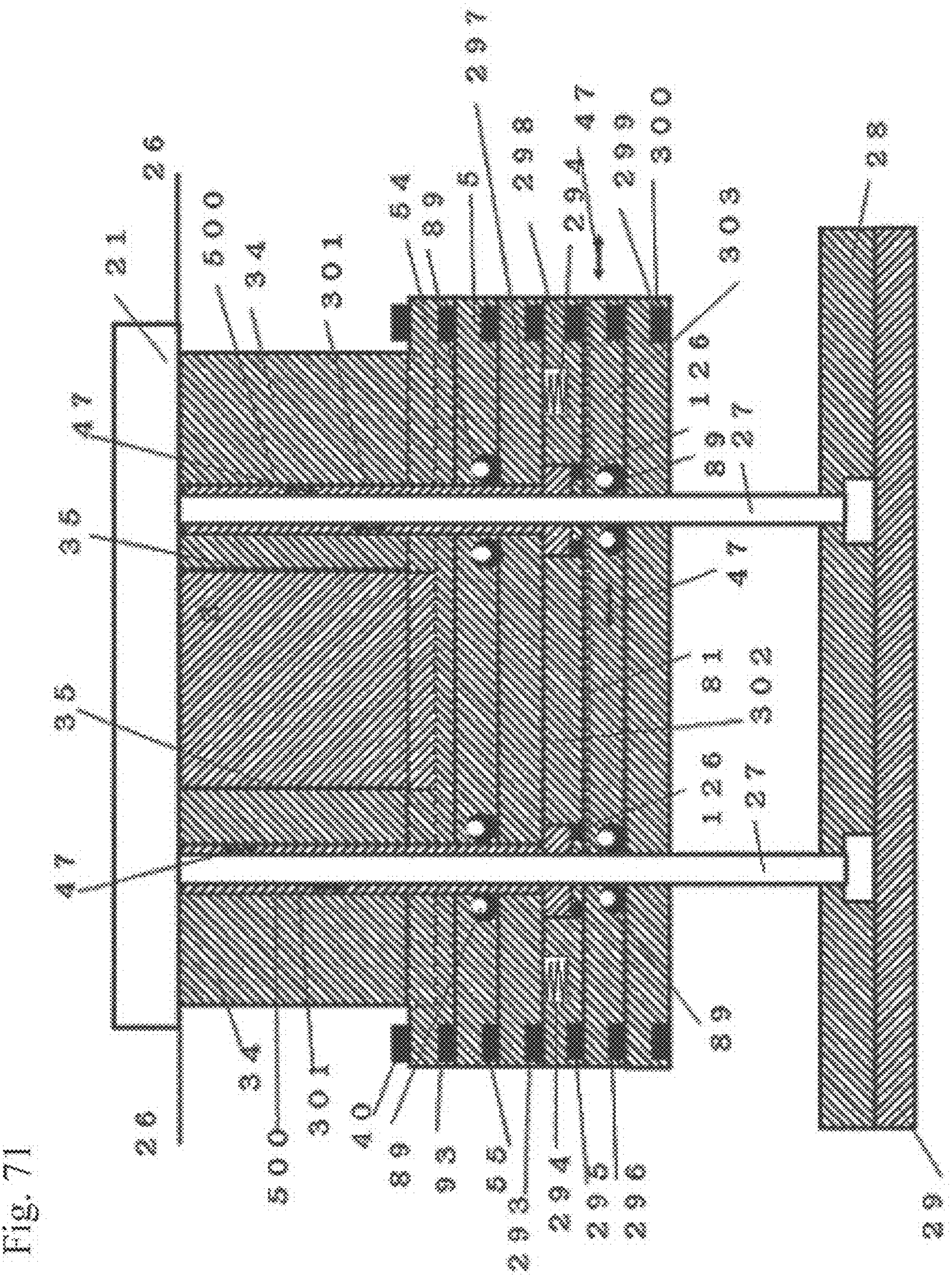
FIG. 71 is a schematic diagram representing a mechanism to make the outer cylinders in FIG. 70 recede.

(Description of FIG. 71)

With the configuration of FIG. 70, when the forward-backward reciprocating mechanism of ejector rod on the molding unit is used, ejector pin 27 only is retracted and consequently the ejector pin guide remains in contact with the resin as described in FIG. 69B, and it was noted that there was a risk of deriving a molded article with hollows in the pressurization at a high pressure.

Figure 72:
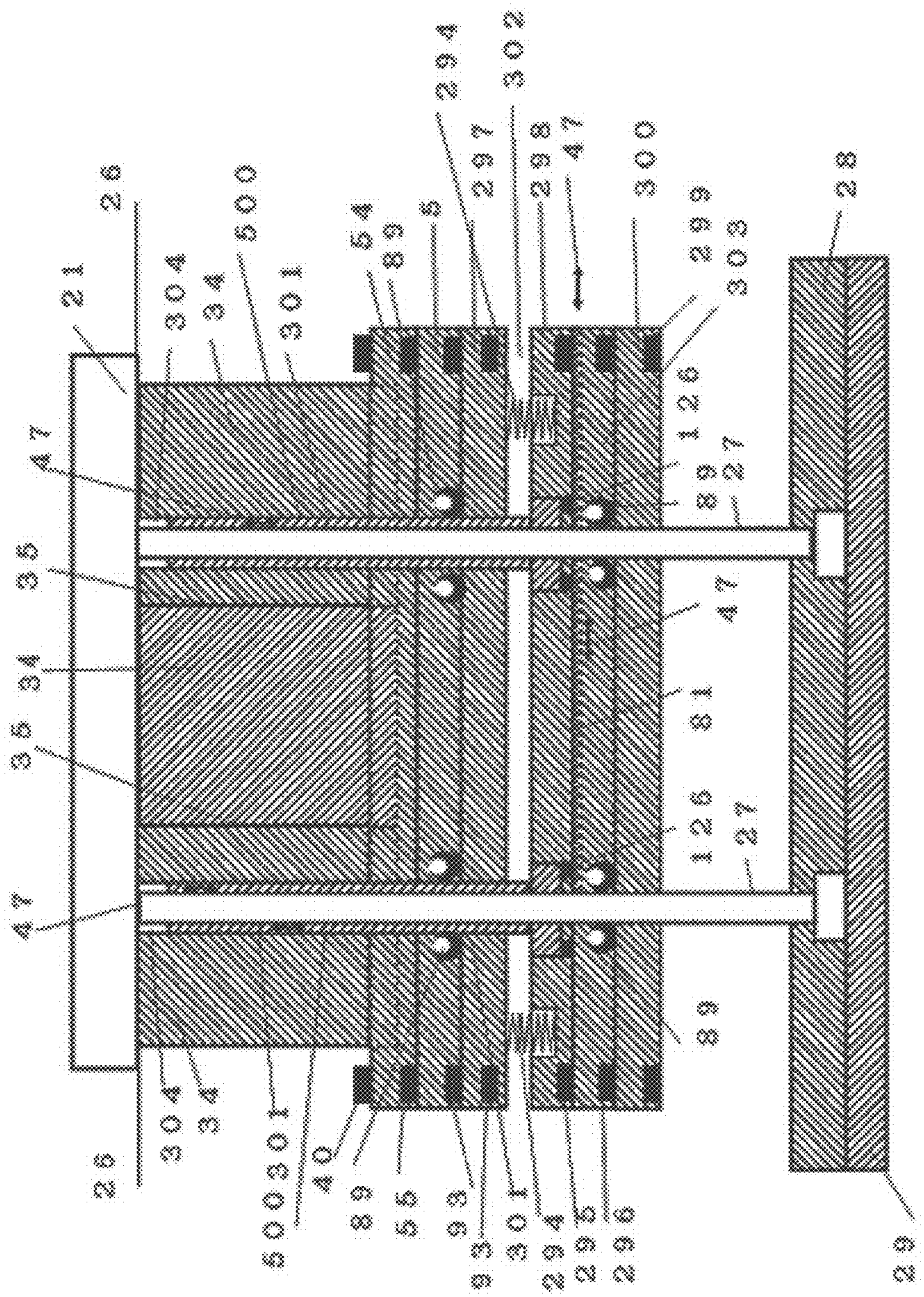
FIG. 72 is a schematic diagram representing the state wherein the outer cylinders in FIG. 71 have been made to recede.

(Description of FIGS. 71 and 72)

FIG. 71 and FIG. 72 describe a means to make ejector pin guide 301 recede before fluid pressurization. A proposed structure had springs 294 embedded between plate 297 and plate 298. This resembles the mechanism to push back the ejector plate with a spring as shown in FIG. 64.

After the mold is closed, the ejector plate is pushed by a mechanism of the molding unit. In case of F1>F2, the resin pressure exerted on ejector pins is sustained by using the aforementioned wedge unit. Before carrying out the fluid pressurization, the wedge unit is made to recede to create a space between the resin and the tip of ejector pin. Moreover, plate 298, plate 300 and plate 303 are made to recede to create space 302. As a result, ejector pin guide 301 also recedes, and ejector pin 27 and ejector pin guide 301 depart from the surface of the resin in the cavity to create space 304 to make it possible to carry out the fluid pressurization.

FIG. 71 illustrates a configuration wherein space 304 is created by retracting only ejector pin guide 301 without retracting the ejector pin. As mentioned previously, if it is intended to retract the ejector pin as well, it is needed only to make ejector pin 27 recede by means of the methods described in FIG. 64, FIG. 65 and FIG. 66.

Incidentally, as ejector pin guide 301 is a type of shaft body for extruding, it is rightfully sealed by using seal-ring 89.

In a manner similar to the cases of FIG. 65 and FIG. 66 wherein space 279 was created by pushing the ejector plate with the ejector rod and, as needed, by making both ejector pin 27 and pressurization ejector pin 227 recede by using a wedge unit, with the configuration illustrated in FIG. 71 and FIG. 72, space 304 (in FIG. 72, the retraction of ejector pin 27 is not illustrated) can be created just like the case of space 286 in FIG. 69D, FIG. 69E and FIG. 69F, by extending the ejector rod as far as ejector plate 300 (not illustrated) after letting the rod pierce the ejector plate, and by using concomitantly the ejecting mechanism of injection molding unit, by using wedge unit 278 depicted in FIG. 65 and FIG. 66, and by retracting also ejector pin guide 301 as well as ejector pin 27.

With pressurization pin 50, pressurization ejector pin 227 or pressurization ejector pin 500 also, when the thickness (diameter, φ, "dia" or D as abbreviated form) is small, it is likely that a molded product with hollows is derived, and thicker pin is less likely to derive a product with hollows.

A lower pressure of pressurized fluid can derive a molded article with a lower degree of internal distortion or warpage deformation.

(Description of FIG. 73)

FIGS. 73A-73E illustrate the configurations wherein ejector pin 27 is embedded in the ejector pin guide.

Figure 73C:
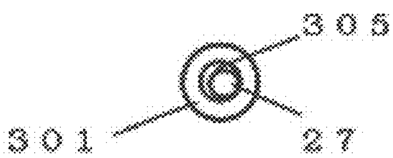
FIGS. 73A to 73E are schematic diagrams representing the ejection port of pressurized fluid at the tip at different relative positions of the outer cylinder with respect to the inner core.
Figure 73D:
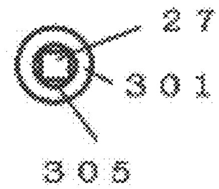
Figure 73E:
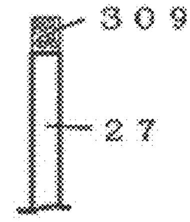
Figure 73B:
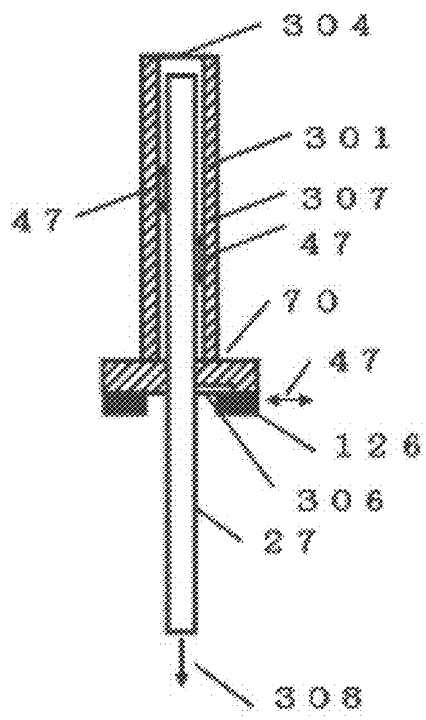
Figure 73A:
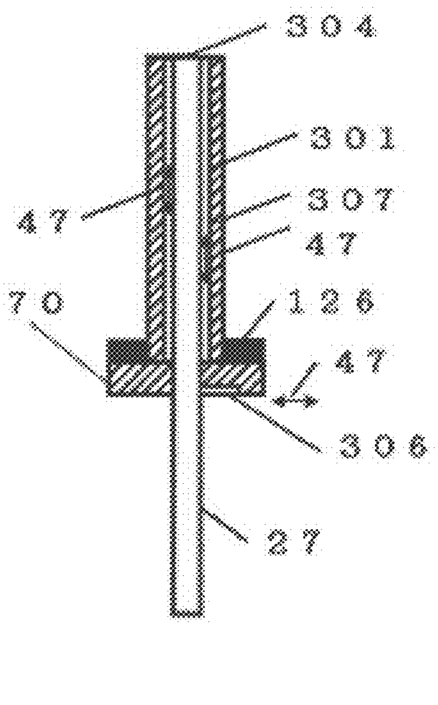

FIG. 73A illustrates a configuration wherein ejector pin 27 is fitted into ejector pin guide 301 and seal 126 is provided on the upper side of flanged portion 70. FIG. 73B illustrates a configuration wherein seal 126 is provided on the upper side of flanged portion 70. FIGS. 73C and 73D present the configurations of FIGS. 73A and 73B as viewed from the upper side of the page. FIG. 73C illustrates the configuration of ejector pin guide 301 into which ejector pin 27 with a round-shaped tip is fitted. The pressurized fluid is ejected through the clearance 305. FIG. 73D illustrates the case where ejector pin 27 with a square-shaped tip is fitted. The pressurized fluid is ejected from clearance 305. FIG. 73E illustrates a configuration wherein ejector pin 27 with tip portion 309 made of a porous material is fitted into ejector pin guide 301, and the pressurized fluid is ejected from portion 309.

Reference numeral 304 indicates a space; in the case of FIG. 73A, ejector pin 27 has not yet receded; in the case of FIG. 73B, ejector pin 27 has receded and created space 304. Reference numeral 306 indicates a circuit of pressurized fluid provided in flanged portion 70; reference numeral 307 indicates a clearance between ejector pin guide 301 and ejector pin 27, clearance through which the pressurized fluid flows. Flanged portion 70 is not illustrated in FIG. 73C and FIG. 73D.

(Description of FIG. 74)

Figure 74A:
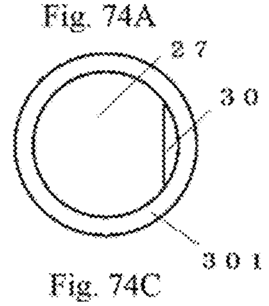
FIGS. 74A to 74D are schematic diagrams representing different types of ejection port of pressurized fluid.
Figure 74B:
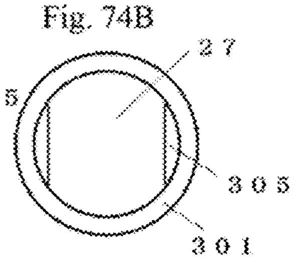
Figure 74C:
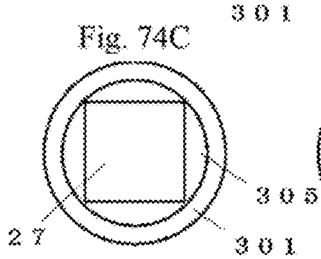
Figure 74D:
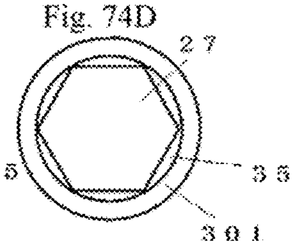
Figure 75A:
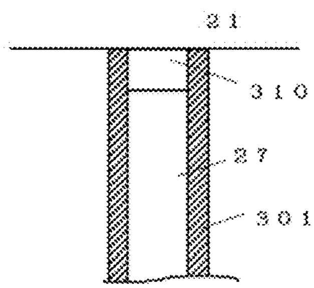
FIGS. 75A to 75D are schematic diagrams representing the conformity of the tip of pressurization pin and pressuring ejector pin with the shape of molded article.
Figure 75B:
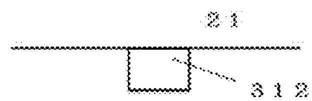
Figure 75C:
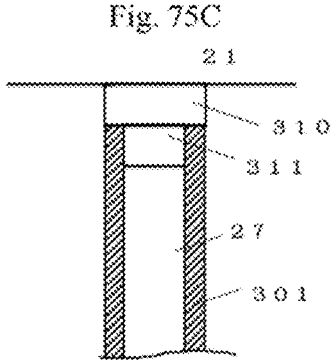
Figure 75D:
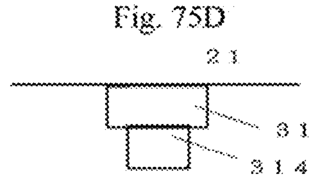

FIGS. 74A-D are graphics of pressurization ejector pins 500 composed of various types of ejector pins 27 embedded into ejector pin guide 301, as viewed from above. FIG. 74A illustrates ejector pin 27 with a tip one side of which is cut in D-shaped cross-section to form passageway (clearance) 305 for pressurized fluid. FIG. 74B illustrates ejector pin 27 with a tip both sides of which are cut to form passageways (clearances) 305 for pressurized fluid. FIG. 74C illustrates an ejector pin 27 with a tip cut in a square shape to form the passageways (clearance) 305 for pressurized fluid. FIG. 74D illustrates ejector pin 27 with a tip cut in a hexagonal shape to form passageways (clearance) 305 for the pressurized fluid.

These shapes apply similarly to pressurization pin 50 and pressurization ejector pin 227 as well.

(Description of FIG. 75)

FIGS. 75A to 75D illustrate the tip portion comprising ejector pin 27 and ejector pin guide 301, and the article shape formed by it. FIG. 74A shows the configuration wherein the ejector pin only is retracted to form space 301, and the molded article by this configuration is represented by 312 in FIG. 75B. In this case, as described previously, the pressurized fluid intrudes into the resin and form hollows. FIG. 74C of FIG. 75 shows the configuration wherein both ejector pin 27 and ejector pin guide 301 are retracted to form spaces 310 and 311. The molded article by this configuration is represented by 312 and 304 in FIG. 75D. In this case, as ejector pin guide 301 also is retracted, the pressurized fluid does not intrude into the resin but enters the clearance between the resin and the mold and carries out a fluid pressurization process.

Figure 76:
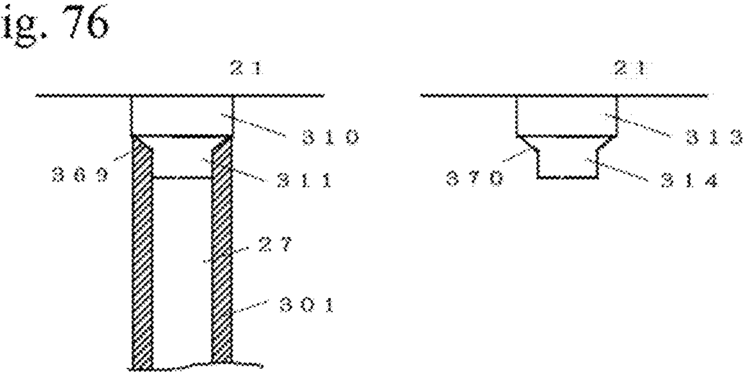
FIG. 76 is a schematic diagram representing the configuration wherein the ejecting portion at the tip was formed to present a tapered profile (slanted form).

(Description of FIG. 76)

As the inside of tip of ejector pin guide 301 in FIG. 76 was machined in an oblique shape (tapered), the entry of pressurized fluid into the clearance between the resin and the mold was facilitated more.

Figure 52:
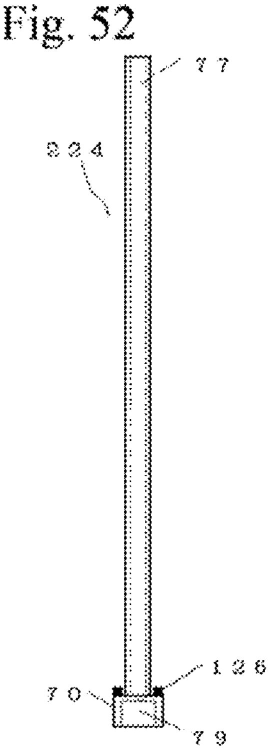
FIG. 52 is a schematic diagram of an outer cylinder 224 of ejector pin 226 when the fluid pressurization through ejector pin is carried out.
Figure 53:
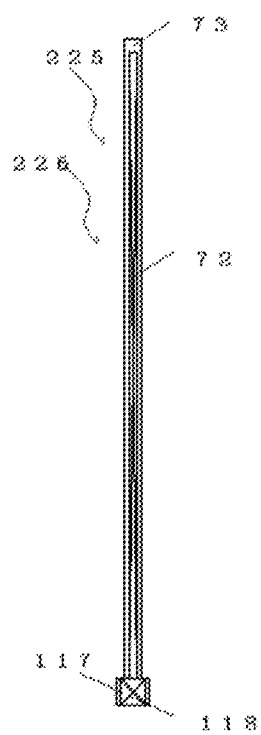
FIG. 53 is a schematic diagram of an inner core 225 of ejector pin 226 when the fluid pressurization through ejector pin is carried out.
Figure 54:
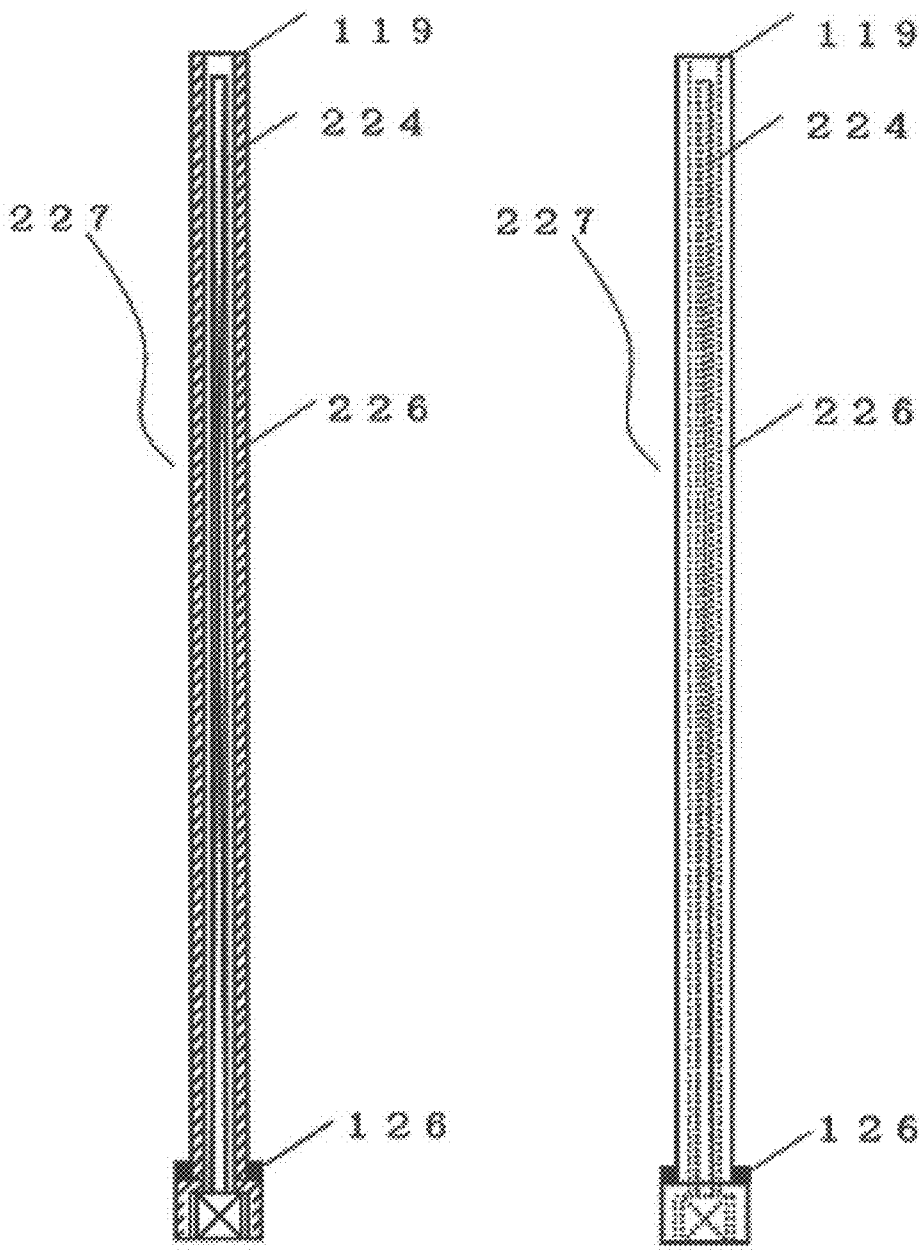
FIG. 54 is a schematic diagram of an ejector pin 226 when the fluid pressurization through ejector pin is carried out.

Exposition of the ejection device of pressurized fluid with a multiple structure "Device for ejecting pressurized fluid" signifies a specific type of pin presenting a double structure including: pressurization pin 50 illustrated in FIG. 4 to FIG. 9; pressurization ejector pin 227 illustrated in FIG. 52 to FIG. 54; pin for ejecting pressurized fluid described in FIG. 61A to FIG. 61J; and pressurization ejector pin 500 illustrated in FIG. 70 to FIG. 73.

Pressurization pin 50 illustrated in FIG. 4 to FIG. 9, pressurization ejector pin 227 illustrated in FIG. 52 to FIG. 54, and pressurization ejector pin 500 illustrated in FIG. 70 to FIG. 73 comprise an outer cylinder and an inner core. While the structure where an inner core is inserted into an outer cylinder is described as a double structure, the outer cylinder needs not be fabricated as a simple tube, but it can be constructed also as a double structure. Moreover, the inner core also can be constructed as a double structure or a structure of a higher degree of multiplicity. Besides, regarding the pins for ejecting pressurized fluid described in FIG. 61A to FIG. 61J, as they are essentially equivalent to pressurization pins 50 illustrated in FIG. 4 to FIG. 9, or pressurization ejector pins 227 illustrated in FIG. 52 to FIG. 54, that are used simply without using (inserting) the inner core, they are classified in the present invention as those presenting a multiple structure.

Figure 4:
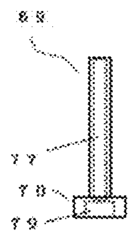
FIG. 4 is a schematic diagram of an outer cylinder 69 of a pressurization pin 50.

"Outer cylinder" signifies an element that presents a tube-like shape surrounding an inner core, for example one of those illustrated in FIG. 4, FIG. 52, FIG. 70, etc.; it needs not be in a cylindrical shape (circular cross-section) and the inside as well as the outside of it can be in a polygonal shape (polygonal column). "Inner core" signifies an element presenting a cylindrical shape to be fitted into an outer cylinder; it needs not be in a cylindrical shape and can be a polygonal column as long as it can be fitted into the outer cylinder.

The pressurized fluid flows through the clearance between the outer cylinder and the inner core. The resin in the cavity does not enter the clearance.

(Operation of the Device for Preparing Pressurized Fluid)

In the case where the resin injection into cavity 21 is started and device 140 for preparing pressurized fluid receives from the injection molding unit a signal for starting fluid pressurization against the resin in cavity 21 (and, in the case where the previously mentioned Modes 1-7 and the retracting action of pressurization pin 50 and pressurization ejector pin 500 are selected, receives from the unit also a signal of action of each of these elements), the operation of fluid pressurization of the resin in cavity 21 is started by opening filling valve 14 in FIG. 1 and by ejecting or injecting the pressurized fluid into the parting on the movable side and the like.

(Pressurization Time)

"Pressurization time" signifies, in the pressure forming-injection molding, the length of time during which a molten resin in the cavity is pressurized by fluidic pressure after valve 14 is opened following the elapse of a delay time. Valve 15 is closed.

The prolongation of pressurization time improves the transcription performance.

(Injection Time)

"Injection time" signifies, in the injection blow molding, the length of time during which the pressurized fluid is injected into a molten resin in the cavity after valve 14 is opened following the elapse of a delay time. Valve 15 is closed.

(Retention Time)

"Retention time" signifies the length of time from the end of pressurization time or injection time until the time of atmospheric discharge (blowout). During this period, both valve 14 and valve 15 are closed.

The retention time has the effect to reduce the strain within a molded article.

(Atmospheric Discharge Time)

"Atmospheric discharge time" signifies the point of time at which the fluid having pressurized or been injected into the resin in the cavity is discharged to outside.

Both valve 14 and valve 15 are opened or closed by the timer which can set up delay time, pressurization time, injection time, retention time and atmospheric discharge time for any chosen timings.

(Pressurization Pressure)

"Pressurization pressure" signifies the pressure of pressurized fluid at which a molten resin injected in the cavity is pressurized. The regulation of pressurization pressure is carried out by regulator 12. A lower pressurization pressure results in a lower transcription performance but in a lower strain as well.

(Pressurization Pin 50)

The pressurization pin 50 can be manufactured by machining additionally existing elements, for example, an ejector sleeve [outer cylinder (any one of the following types is applicable: straight ejector sleeve; straight ejector sleeve with an escape taper; stepped ejector sleeve; stepped ejector sleeve with an escape taper, etc.)] and an ejector pin [center pin (inner core)], products of Misumi Co., Ltd. In the following paragraphs, the pressurization pin 50 shall be described by referring to FIGS. 4-13.

(Differences Between the Presently Filed Invention and the Publicly Known Document of Japanese Published Unexamined Application No. H10-119077 and the Publicly Known Document of Japanese Published Unexamined Application No. H11-216748)

Figure 6:
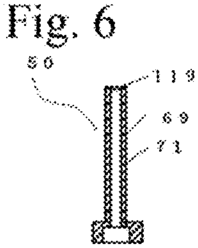
FIG. 6 is a schematic diagram of a pressurization pin 50.

Pressure pin 50 comprises, as shown in FIG. 6, outer cylinder 69 and inner core 71 inserted into outer cylinder 69. The structure of pressurization pin for the present invention differs (is distinct) from that described in the publicly known document of Japanese published unexamined application No. H10-119077 and from that described in the publicly known document of Japanese published unexamined application No. H11-216748: the pressurization pin (not only the pressurization pin but also including the ejector pin capable of effecting fluid pressurization) of the present invention is configured to have a double structure with a view, as described, to enabling pressurization pin 50 and pressurization ejector pin 500 to recede to create a space between the resin and the pin so as to facilitate the entry of pressurized fluid into the clearance between the resin and the mold, and, by carrying out the fluid pressurization, to meet the possible need for preventing the formation of hollows in the molded article, even when the pressure of pressurized fluid is increased.

With regard to gas injection pin 8 (referred to as pressurization pin 50 in the present invention) illustrated in FIG. 2, FIG. 3 etc. in the publicly known document of Japanese published unexamined application No. H10-119077, it is presented as a means for letting out a pressurized fluid from the clearance of an ejector pin that has been derived by an additional machining process and fitted into a hole bored on movable side mold 3 (seeing from FIG. 2 or FIG. 3, it is recognized that the mold has no nested structure but an integral structure) (as described later, unlike those pins described in the present invention, i.e., pressurization pin 50, pressurization ejector pin 227 and pressurization ejector pin 500, the said pin is not configured to have a double structure).

By the method of Japanese published unexamined application No. H10-119077, as the pressurization pin can attain only the same height as that of the nested element, in case of a thick molded article or of a resin with low viscosity in molten state like PP, the pressurized fluid enters the resin injected into the cavity and produces a molded article with hollows. If hollows are formed, a lower strength in the inner portion with hollows is feared.

As a solution of this problem, a means is proposed, wherein a space is created between the resin and pressurization pin 50 by retracting pressurization pin 50 (making it move back) before fluid pressurization and then the fluid pressurization is effected, so that the pressurized fluid may enter the clearance between the resin and the mold to carry out the pressurization without forming hollows in the molded article.

In a case where pressurization ejector pin 227 or pressurization ejector pin 500 is used, the structures illustrated in FIG. 64 to FIG. 76 are adopted and similarly as in the case of fluid pressurization by using pressurization pin 50, the fluid pressurization is carried out by retracting pressurization ejector pin 227 or pressurization ejector pin 500 before fluid pressurization to create a space between the resin and the pressurization pin.

In a case where pressurization ejector pin 27 using ejector pin guide 301 is applied, the fluid pressurization is carried out after ejector pin 27 as well as ejector pin guide 301 has been made to recede.

(Description of FIGS. 74A-74D)

(Means for Pressurization from within an Ejector Pin)

FIGS. 74A-74D are drawings of center pins (inner cores) 225 fitted into ejector sleeves (outer cylinders) 224 as viewed from above in which the form of flanged portion is omitted.

Figure 9:
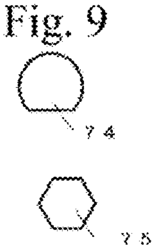
FIG. 9 is a schematic diagram of the apical end of an inner core 71.

The tip portion of about 5 mm in length of inner core 225 is cut in a D-shaped cross-section to create clearance 305 of approximately 0.001 mm-0.5 mm so that, when it is housed in outer cylinder 224, it may allow the passage of pressurized fluid but inhibit the entry of molten resin. This shape is similar to that of pressurization pin 50 illustrated in FIG. 9, and FIG. 74A shows an example of D-shaped cut on one face, 74B that on two faces, 74C on four faces and 74D on six faces, and the number of cut faces can be more than these examples, while a face can also be cut in a rounded shape.

(Means to Conduct the Pressurized Fluid Through a Channel within an Ejector Pin)

In order to facilitate the conduction of pressurized fluid in lower portion of inner core below its tip portion (portion below the above mentioned D-shaped cut portion), the lower portion is cut in a large D-shape 72 as shown in FIG. 53. The flange of inner core 225 also is machined to present large D-shaped cut 118 similarly as in the case of pressurization pin 50 to enable the conduction of pressurized fluid, and outer cylinder 224 also is machined to provide groove 120 or 131 similarly as in the case of FIG. 7 or FIG. 8, so as to establish a connection with the D-shaped cut.

In outer cylinder 224, seal 126 is provided on the upper face of flange to prevent the leakage of pressurized fluid.

When the pressurized fluid is introduced from below the flange of ejector sleeve, the fluid flows through the clearance between the ejector sleeve and the ejector pin and is ejected out of the ejector pin tip. This pressurized fluid enters the clearance between the resin and the mold and effects the fluid pressurization.

With this means (double structure), similarly as in the case of pressurization pin in FIG. 13, as the portion subject to fluid pressurization can be placed at a higher position than the surrounding product profile, it is possible to carry out the pressure forming without forming hollows in the product due to the infiltration of pressurized fluid into it.

By creating a clearance between the resin and the ejector pin 227 through the retraction of pressurization ejector pin 227 before fluid pressurization, it is possible to exert a higher degree of action and effect of pressure forming on the product, without forming hollows in the product due to the infiltration of pressurized fluid into it, even when the pressure of pressurized fluid is increased.

In the case where the fluid pressurization is carried out by using pressurization pin 50, with a simple profile like a flat plate presenting no feature to obstruct the flow of pressurized fluid like a rib, an adequate level of action and effect of fluid pressurization is achieved. However, when it is intended to pressurize by fluid the entire surface on the movable side of a molded article surrounded by a profile presenting features like ribs (for example, such a profile as that of FIG. 39), as it is needed to provide a pressurization pin separately to each one of surrounded portions, the mold structure becomes complex and is not economical.

In cases of a molded article with such a complex profile, the mold is constructed with a nested structure. Therefore, if the means proposed in the publicly known document of Japanese published unexamined application No. H10-119077 or that proposed in the publicly known document of Japanese published unexamined application No. H11-216748 is applied, the fluid pressurization is effected also through clearances of nested elements, and hence there occur disturbances in the product profile.

As a solution for this problem, a means of fluid pressurization is available which uses pressurization ejector pin 227 or pressurization ejector pin 500. In the case of mold with a nested structure, as the fluid pressurization is carried out by ejecting the pressurized fluid only out of the ejector pin tip to make the fluid enter the clearance between the resin and the mold, without ejecting the fluid from the clearances of the nested element, core pins, etc., the problem of disturbances in the product profile due to the pressurized fluid is solved. In the following paragraphs, the means of fluid pressurization by using an ejector pin are described. The means of fluid pressurization by using an ejector pin comprise:

1. Means to eject a pressurized fluid from the inside of an ejector pin;
2. Means to eject a pressurized fluid from the outside of an ejector pin.

[Ejector Pin with a Double Structure Capable of Fluid Pressurization (Ejector Pin Provided with a Mechanism of Fluid Pressurization)]

In the fluid pressurization using the fluid from pressurization ejector pins 227 as shown in FIGS. 52-60, as the pressurized fluid is ejected only out of the tip portion of pressurization ejector pin, the operation can suppress the aforementioned disturbances in profile of molded article. Moreover, as mentioned previously, the fluid pressurization using only the fluid ejected from ejector pins can cope with the need of molding article with a complex shape.

Incidentally, different types of pressurization ejector pins presented in FIGS. 61A1-61J4 are considered as equivalent to pressurization ejector pin 227 in the present invention.

Outer cylinder 69 comprises, as shown in FIG. 4: flanged part 70 formed at one end section (base end section) of the longitudinal direction; depressed part 79 formed in flanged part 70; and perforated hole 77 leading from depressed part 79 to the other end section (apical end section) of the longitudinal direction.

Figure 5:
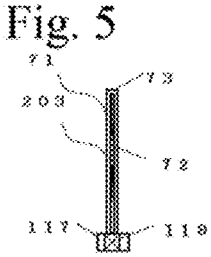
FIG. 5 is a schematic diagram of an inner core 71 of a pressurization pin 50.

Inner core 71 comprises, as shown in FIG. 5: flanged part 117 in cylindrical shape formed at one end section (base end section) of the longitudinal direction; core body 203 in a cylindrical shape connecting with flanged part 117; D-cut face 118 formed in flanged part 117; and D-cut face 72 formed in core body 203 extending from flanged part 117 to apical end section 73. D-cut faces 72 and 118 are formed to conduct the pressurized fluid. Incidentally, apical end section 73 of core body 71 retains a portion of about 5 mm in length where D-cut face 72 has not been formed.

Pressurization pin 50 is constituted by inserting core body 203 of core 71 into perforated hole 77 in outer cylinder 69. The inner diameter of perforated hole 77 and the outer diameter of core body 203 are so configured as to have clearances of about 0.01 mm to 0.1 mm at the apical end section of pressurization pin 50 so that it may allow the passage of pressurized fluid but inhibit that of resin.

Pressurization pin 50, as shown in FIG. 6, is configured to have apical end section 119 where the length of inner core 71 (the length of inner core 71 in the longitudinal direction) is made slightly shorter (by magnitude longer than 0.0 mm but shorter than 0.5 mm) than the length of outer cylinder 69 (the length of outer cylinder 69 in the longitudinal direction). Thus, by shortening inner core 71 as compared with outer cylinder 69, the ejection (and introduction) of pressurized fluid by pressurization pin 50 into the clearance between the resin and the cavity (the clearance between the resin in the cavity and the cavity wall surface) is facilitated.

In pressurization pin 50, the length of inner core 71 can be made also equal to that of outer cylinder 69. Moreover, in pressurization pin 50, the length of inner core 71 can be made also longer than that of outer cylinder 69. The length of inner core 71 and that of outer cylinder 69 are respectively selected in an actual application depending on the resin type and the shape of molded article.

Figure 7:
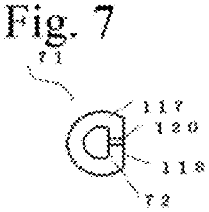
FIG. 7 is a schematic diagram of an inner core 71 as seen from above.

On the upper face of flanged part 117 of inner core 71, groove 120 is formed between D-cut face 72 and D-cut face 118 for conducting the pressurized fluid, as shown in FIG. 7. Groove 120 is a U-shaped groove, for example. Incidentally, FIG. 7 is an illustration of inner core 71 as viewed from above. In other words, FIG. 7 is an illustration of inner core 71 shown in FIG. 5 when it is turned 90 degrees in the circumferential direction and viewed from the upper side of the page toward the lower side of it.

Figure 8:
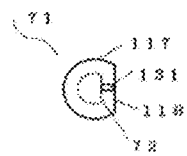
FIG. 8 is a schematic diagram of pressurization pin 50 as seen from below.

On the lower face of flanged part 117 of inner core 71, groove 131 is formed in the direction toward D-cut face 118 for conducting the pressurized fluid, as shown in FIG. 8. Groove 131 is a U-shaped groove, for example. Incidentally, FIG. 8 is an illustration of inner core 71 as viewed from below. In other words, FIG. 8 is an illustration of inner core 71 shown in FIG. 5 when it is turned 90 degrees in the circumferential direction and viewed from the lower side of the page toward the upper side of it.

Apical end section 73 of core body 203 of inner core 71, as shown in FIG. 9 (top), can be machined so as to form a D-cut face (apical end section 74) so that a clearance of about 0.01 mm-0.1 mm may result when it is assembled into outer cylinder 69. Moreover, apical end section 73 can have a polygonal cross-section (apical end section 75) as shown in FIG. 9 (bottom). Incidentally FIG. 9 is an illustration of the apical end section of core body 203 as viewed from above. In other words, FIG. 9 is an illustration of apical end section 73 alone of core body 203 shown in FIG. 5 as viewed from the upper side of the page toward the lower side of it.

Figure 10:
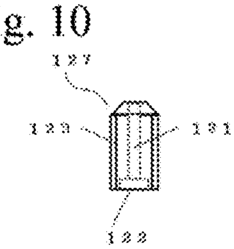
FIG. 10 is a schematic diagram of a setscrew.

In order to fix pressurization pin 50 on stationary side mold 201 or the like, setscrew 127 shown in FIG. 10 is used. Setscrew 127 comprises: threaded section 123 formed on the circumference part; depressed part 122 with a polygonal cross-section formed on one end of the longitudinal direction; and perforated hole 121 leading from depressed part 122 to the other end of the longitudinal direction.

Figure 11:
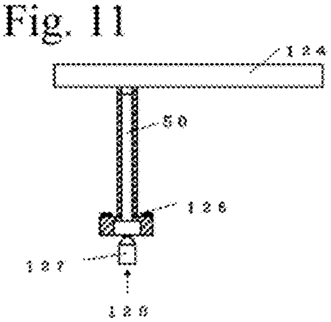
FIG. 11 is a schematic diagram representing the relative position between a pressurization pin 50 and the cavity 200.
Figure 12:
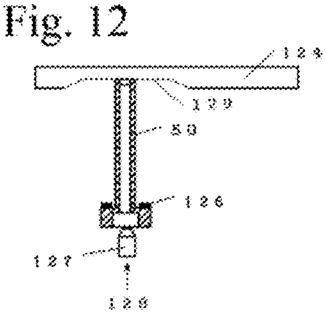
FIG. 12 is a schematic diagram representing the relative position between a pressurization pin 50 and the cavity 200.

FIG. 11, FIG. 12, and FIG. 13 indicate the location of pressurization pin 50 in relation to article 124 (molded article 124 in cavity 200) molded by cavity 200.

FIG. 11 illustrates the configuration in which the apical face of the apical end section of outer cylinder 71 of pressurization pin 50 is made to be flush (come in the same plane) with the surface of cavity 200, and the apical face of the apical end section of inner core 71 is made to recede slightly from the apical face of the apical end section of outer cylinder 71. Stationary side mold 201 or movable side mold 202 that employs the same configuration facilitates the ejection and injection of pressurized fluid into the clearances between the resin (molded article 124) in the cavity and the cavity wall surface.

FIG. 12 illustrates the configuration in which the cavity wall face around pressurization pin 50 has protrusion 129 which is made to protrude toward the cavity. Stationary side mold 201 or movable side mold 202 that employs the said configuration can facilitate the cooling and solidification of the portion of molded article 124 situated around such a protrusion, because, when the said configuration is considered in relation to the molded article, the portion of the latter situated around protrusion 129 becomes thin in thickness. In other words, stationary side mold 201 that employs the said configuration can facilitate the ejection and injection of the pressurized fluid into clearances between the resin and the mold (clearances between the resin in the cavity and the cavity wall surface), because the formation of skin (solidified) layer is facilitated in the portion with a thin thickness facing ejection port 50 of a pressurization pin.

Figure 36:
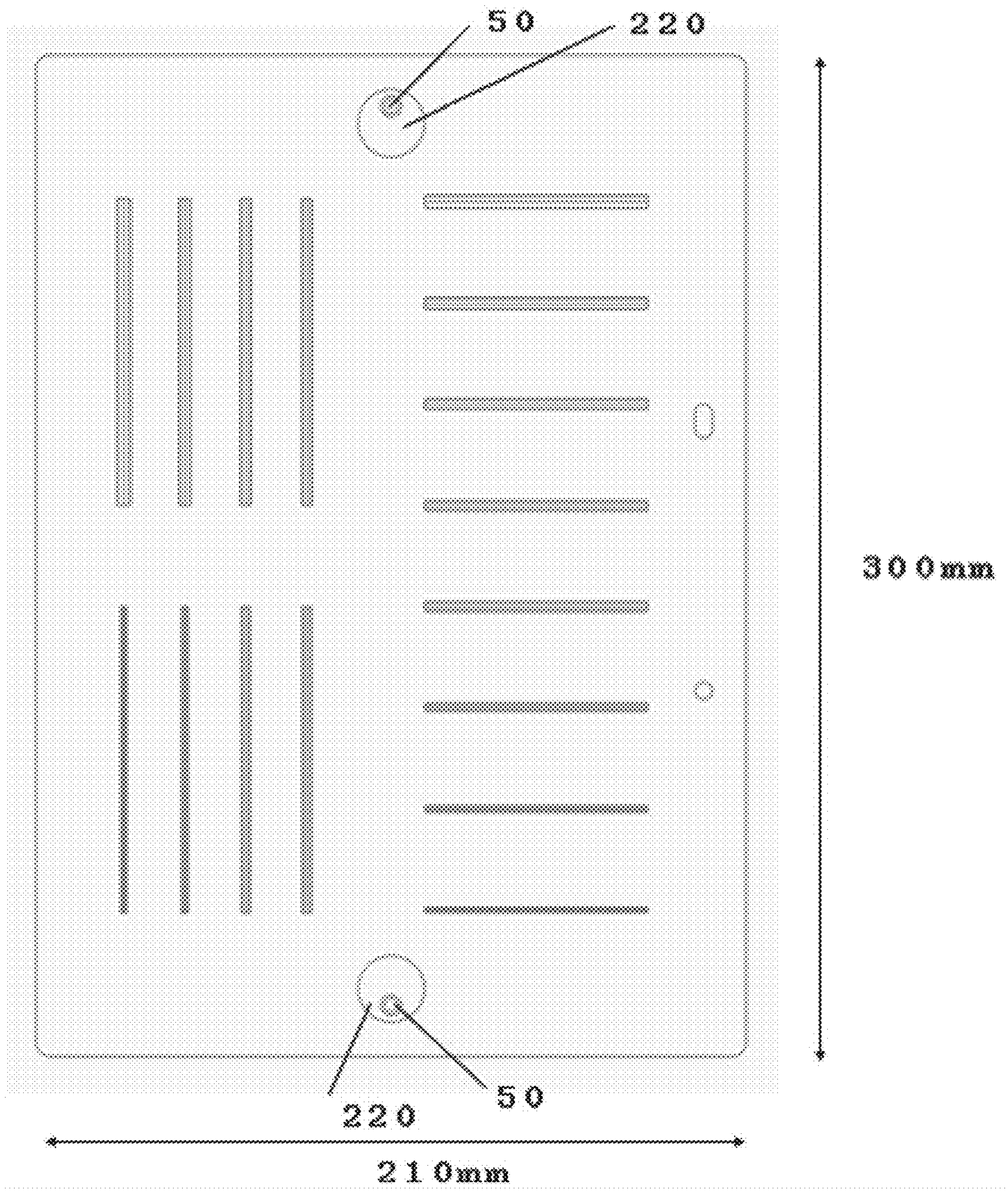
FIG. 36 is a schematic diagram of a molded article with which the extent of effect of pressure forming-injection molding was determined by varying the rib thickness as compared with a product thickness to identify the limit of effective rib thickness as compared with the product thickness.

By embossing the area around pressurization pin 50 coarsely with a grained pattern of about φ20 mm, the pressurized fluid can be made to enter clearances more easily. In practice, although not illustrated, the area around pressurization pin 50 in FIG. 36 is embossed coarsely with a slightly eccentric grained pattern of about φ20 mm (220 of FIG. 36).

FIG. 13 illustrates a configuration in which depressed part 130, slightly larger in diameter than the diameter of outer cylinder 69 of pressurization pin 50, is formed in cavity 200 for forming molded article 124. The diameter of depressed part 130 can be the same as that of inner core 71 of pressurization pin 50. Due to depressed part 130, a bossed part is formed on molded article 124. In certain cases the diameter of depressed part 130 is the same or slightly larger than that of outer cylinder 69.

As illustrated in FIG. 11, FIG. 12, and FIG. 13, pressurization pin 50 is fixed by setscrew 127 so that the center axis of pressurization pin 50 and that of setscrew may align approximately. Thus, through perforated hole 121 formed in the center of setscrew 127 and pressurization pin 50, the pressurized fluid is ejected and injected (introduced) into the clearances between the resin (molded article 124) in cavity 200 and the surface constituting cavity 200 (clearances between the resin in the cavity and the cavity wall surface, between the resin and the mold).

[Seal (Sealing Member)]

Pressurization pin 50 is provided with O-ring 126 as a seal (sealing component) for preventing the leakage of pressurized fluid. As O-ring 126 makes a line-to-surface contact, its sealing effect is insufficient. Hence, as a seal to be used on pressurization pin 50, it is desirable to use a rubber sheet cut out in a torus-shape. When a rubber sheet is used, as the seal is made by a face-to-face contact, the sealing effect is superior to a seal with a line-to-surface contact. FIG. 11, FIG. 12, and FIG. 13 illustrate a configuration in which O-ring 126 is provided on the upper face of flanged part 70. However, the seal can be provided also on lower face or lateral face of flanged part 70 as long as the sealing effect is ensured. Furthermore, the seal can be provided also on several surfaces like both upper and lower faces of flanged part 70. In the case where the seal is provided on several faces of flanged part 70, there is an advantage that it can realize a high sealing effect.

In the case where only one pressurization pin is provided in the vicinity of the gate for injecting resin into the cavity, it is possible to realize a higher pressure of the pressurized fluid in the vicinity of the gate and to realize a lower pressure of it at the flow end of fluid (location removed from the gate). By exploiting this property, the locations and the number of pressurization pins 50 to be provided are selected depending on the shape of a molded article. It is also possible to provide a number of pressurization pins 50 in the vicinity of gate and at the flow end, and eject the pressurized fluid at an optimum pressure and at an optimum timing for each of pressurization pins 50, for example by using a number of devices of FIG. 1.

The device of FIG. 46 is able to provide two sets (two systems) of conditions (pressure as well as time) of fluid pressurization. The number of systems of fluid pressurization can be made to be more than two.

(Other Configurations of Pressurization Pin)

In the following sections, other configurations of pressurization pin (configuration of pressurization pin 204) are described by referring to FIGS. 14-17.

Figure 14:
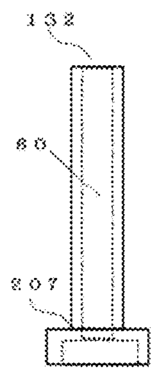
FIG. 14 is a schematic diagram of an outer cylinder 132 of pressurization pin 204.
Figure 15:
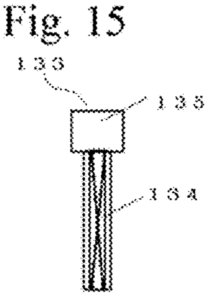
FIG. 15 is a schematic diagram of an inner core 133 of a pressurization pin 204.
Figure 16:
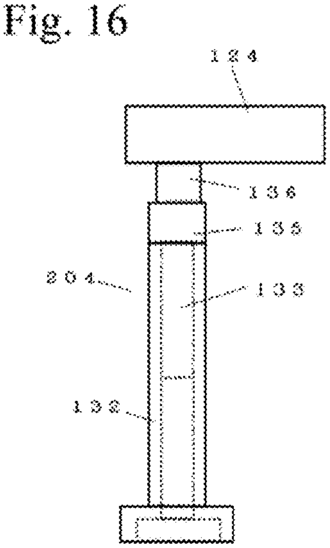
FIG. 16 is a schematic diagram of a pressurization pin 204.

Pressurization pin 50 described in FIGS. 4-13 was the one in which the ejection port was formed along the longitudinal direction. In contrast, pressurization pin 204, as shown in FIGS. 14-16, is the one in which the ejection port is formed along the direction intersecting the longitudinal direction of the pressurization pin. In other words, pressurization pin 204 has a structure in which the pressurized fluid is ejected from the lateral side of pressurization pin 204.

As shown in FIG. 16, pressurization pin 204 comprises outer cylinder 132 and inner core 133 that is inserted into outer cylinder 132.

As shown in FIG. 14, outer cylinder 132 comprises flanged part 207 formed at one end (base end) of the longitudinal direction, and perforated hole 80 leading from flanged part 207 to the other end (apical end section) of the longitudinal direction.

As shown in FIG. 15, inner core 133 comprises: cylinder-shaped flanged part 135 formed at one end (base end) of the longitudinal direction; a cylinder-shaped core body connected with flanged part 135; and D-cut face 134 formed between flanged part 135 and the other end (apical end section) of the said core body. D-cut face 134 is formed for conducting the pressurized fluid. Moreover, the longitudinal length (height) of flanged part 135 is about 1 mm to 5 mm, but it can be larger than that.

FIG. 16 shows the position of pressurization pin 50 with respect to molded article 124 molded by cavity 200 (molded article 124 in cavity 200). Depressed part 136 is formed in cavity 200. In other words, by means of depressed part 136, a boss is formed on molded article 124. The diameter of the depressed part is configured so as to become smaller than that of flanged part 135 of inner core 133. Although not illustrated in FIG. 16, flanged part 207 of pressurization pin 204 is provided with seal (sealing component) 126 for preventing the leakage of pressurized fluid.

The pressurized fluid pressurizes the resin in the cavity by fluidic pressure after the pressurized fluid has passed through the perorated hole 80 of outer cylinder 132 and D-cut face 134 of inner core 133, then flowed out through the clearance at the part where flanged part 135 of inner core 133 abuts the apical surface of outer cylinder 132, and then passed through the interstice between the surface constituting depressed part 136 and the resin injected into the depressed part (boss part).

(Other Configurations of Pressurization Pin)

The configurations of pressurization pin 50 shown in FIGS. 4-9 are almost similar to the structures of ejector pins capable of fluid pressurization shown in FIGS. 52-54. The configuration of pressurization pin other than those mentioned above is feasible also by using the configuration of an ejector pin shown in FIGS. 61A1-61J4. The unit presented in FIG. 61K is a pressurization pin or an ejector pin that is utilized at a location or in a case where the fluid pressurization is not desired; since this pin is not configured as a double structure and seal 126 is provided on the upper face of flanged part of an ordinary ejector pin, the pressurized fluid can be blocked by seal 126.

(Structure wherein Nested Element Provides Mechanism of Outer Cylinder 69)

The pressurization pin described by referring to FIGS. 4-17 is configured so as to have a dual structure wherein inner core 71 is inserted into outer cylinder 69.

The shapes 77 and 79 in FIG. 4 into which inner core 71 is inserted were created by machining directly nested element 32 and nested element 34 (221 in FIG. 48), and the inner core was inserted therein.

With this configuration, the height of inner core 71 can be made to be equal to, lower or higher than, that of molded article, and it is normally made to be lower. A seal 222 is provided for preventing the pressurized fluid at the bottom of inner core 71 from leaking to the outside.

Figure 48:
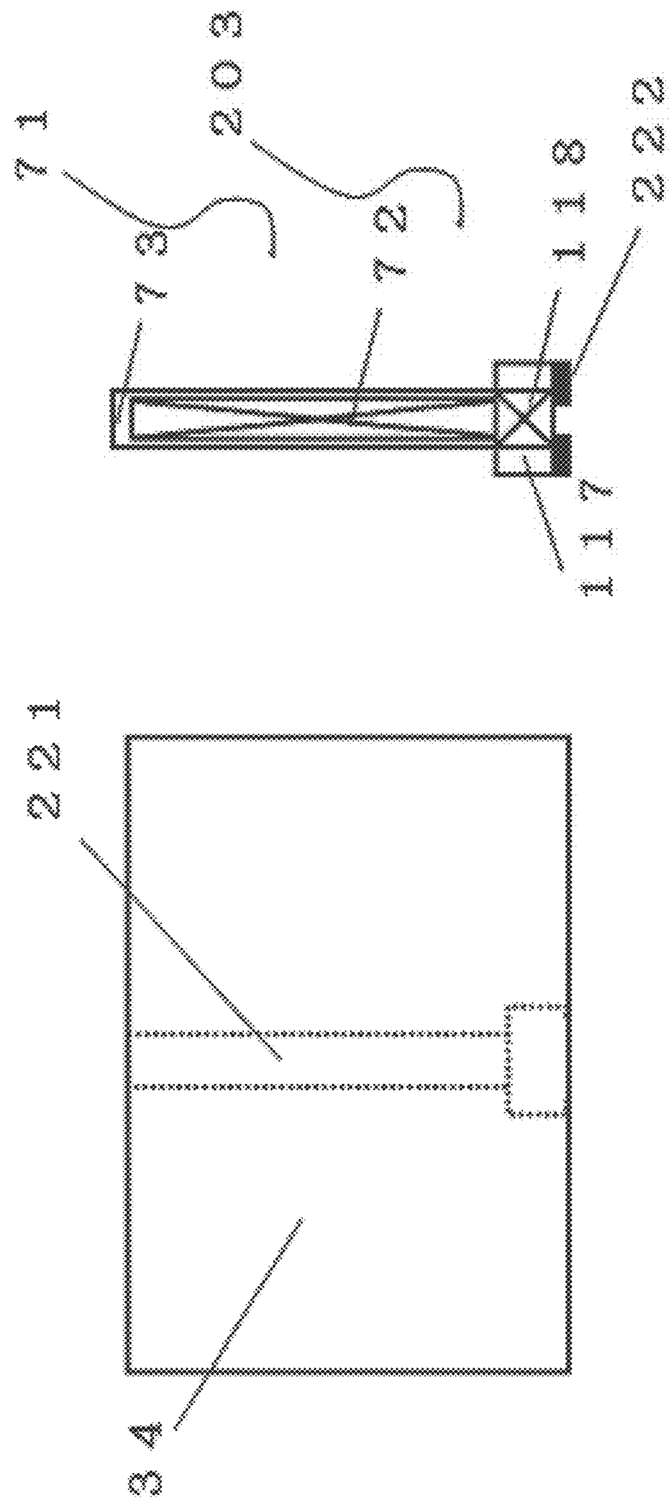
FIG. 48 is a schematic diagram of a nested element machined directly with the form of outer cylinder 132.
Figure 49A:
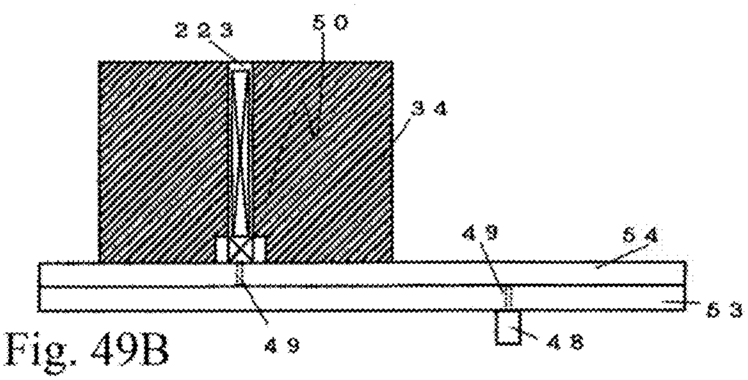
FIGS. 49A and 49B are schematic diagrams of a circuit of pressurized fluid in a seal-plate with a nested element machined directly with the form of outer cylinder 132 into which an inner core is inserted.
Figure 49B:
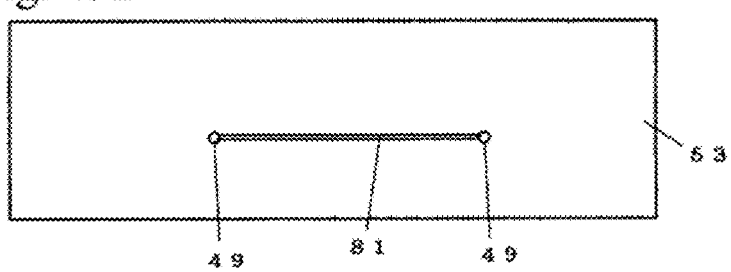

FIGS. 49A and 49B illustrate the case where inner core 71 is mounted by using the configuration of FIG. 48.

The bottom diagram in FIG. 49 is a schematic diagram (plan view) of plate 53 in the upper diagram as viewed from the upper side toward the lower side of page.

In the configuration depicted in FIG. 50, multiple sets of those elements in the lower diagram in FIG. 49, i.e., groove 81, passageway 49 and connecting port 48, were provided separately together with respectively a device for preparing pressurized fluid 1140 shown in FIG. 46, so that the conditions for fluid pressurization can be set up separately for each pressurization pin. Incidentally, as groove 81 is provided separately, the exhaust circuit including valve 68 is provided also separately, as a matter of course.

Figure 51A:
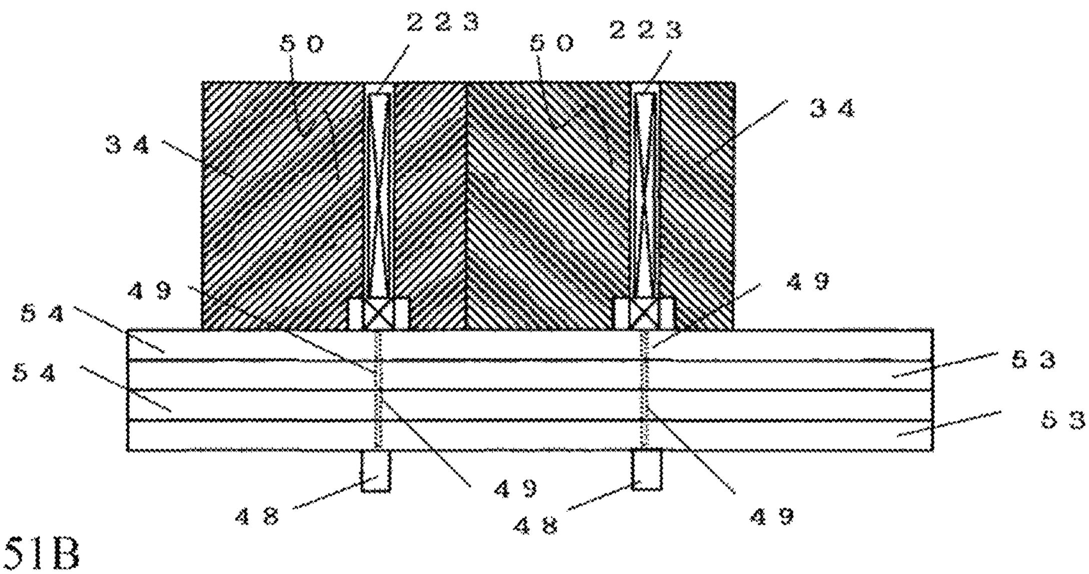
FIGS. 51A to 51C are schematic diagrams of a case where multiple seal-plates are used in FIGS. 49A and 49B, each seal-plate being provided with a circuit of pressurized fluid.
Figure 51B:
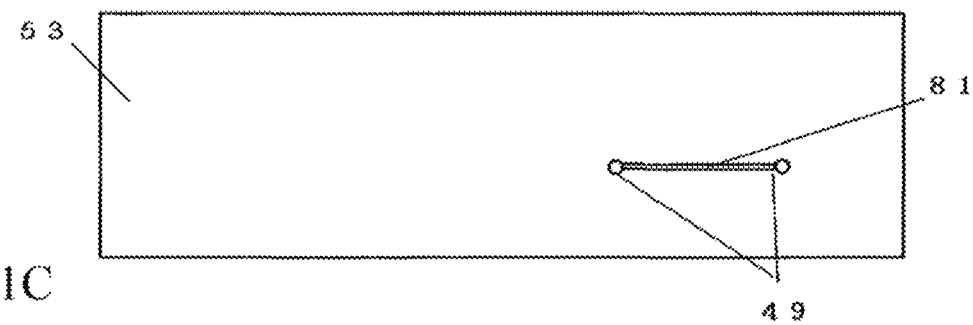
Figure 51C:
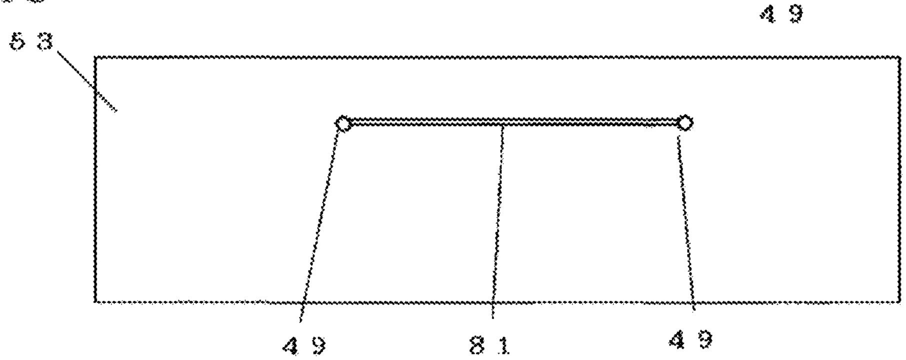

In the configuration depicted in FIGS. 51A to 51C, multiple sets of plate 53 and plate 54 depicted in FIG. 49A were used to constitute separately multiple sets of circuit for fluid pressurization so as to make it possible to set up the conditions for fluid pressurization separately for each pressurization pin by using respectively a device for preparing pressurized fluid 1140 shown in FIG. 46. In the similar manner as the description of the aforementioned FIGS. 50A and 50B, the exhaust circuit including valve 68 is provided also separately. Incidentally, in the configurations depicted in FIG. 49A, FIG. 49B, FIG. 50A, FIG. 50B, and FIGS. 51A-51C, seals 55, 91, 93, etc. indicated in FIG. 19, FIG. 20, etc. are used in the same manner but they are not illustrated therein.

Figure 17:
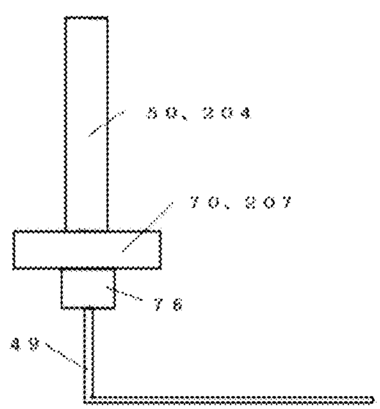
FIG. 17 is a schematic diagram representing the circuit of pressurized fluid of pressurization pin toward the mold.

FIG. 17 illustrates the state wherein pressurization pin 50 or 204 depicted in FIGS. 4-16 is provided on stationary side mold 201 or movable side mold 202. Pressurization pin 50 or 204 is connected to the circuit of pressurized fluid comprised of a stainless steel pipe 49 by using high-pressure fitting 76 coupled to flanged part 70 or 207. As high-pressure fitting 76, we can cite a high-pressure fitting supplied by Nippon Swagelok FST, Inc.

The number of pressurization pin can be single but can also be multiple. Moreover the number of ejection port provided at the tip of pressurization pin can also be single or multiple. When the number of pressurization pin is multiple and the pressurized fluid is ejected through respective ejection ports, the pressure of pressurized fluid ejected at different ejection ports can be uniform or differ from one to another. The ejection timings for respective ejection ports can also be set up individually. Here, the “ejection port” signifies the apical end from which pressurized fluid is ejected of pressurization pin 50 or of an ejector pin provided with a structure capable of fluid pressurization, and is also called “fill port”.

“Ejection” signifies that a pressurized fluid is let out from the apical end or the lateral face of an ejector pin, etc.

“Injection” signifies that either a gas or a liquid is, or both of them are, introduced into a space.

In the process of fluid pressurization of the present invention, a pressurized fluid is ejected from the tip (apical end) of pressurization pin 50, pressurization ejector pin 227 or pressurization ejector pin 500 so that the fluid may be injected into the clearance between the resin and the mold. If the fluid is injected into the resin, hollows are formed.

Figure 39:
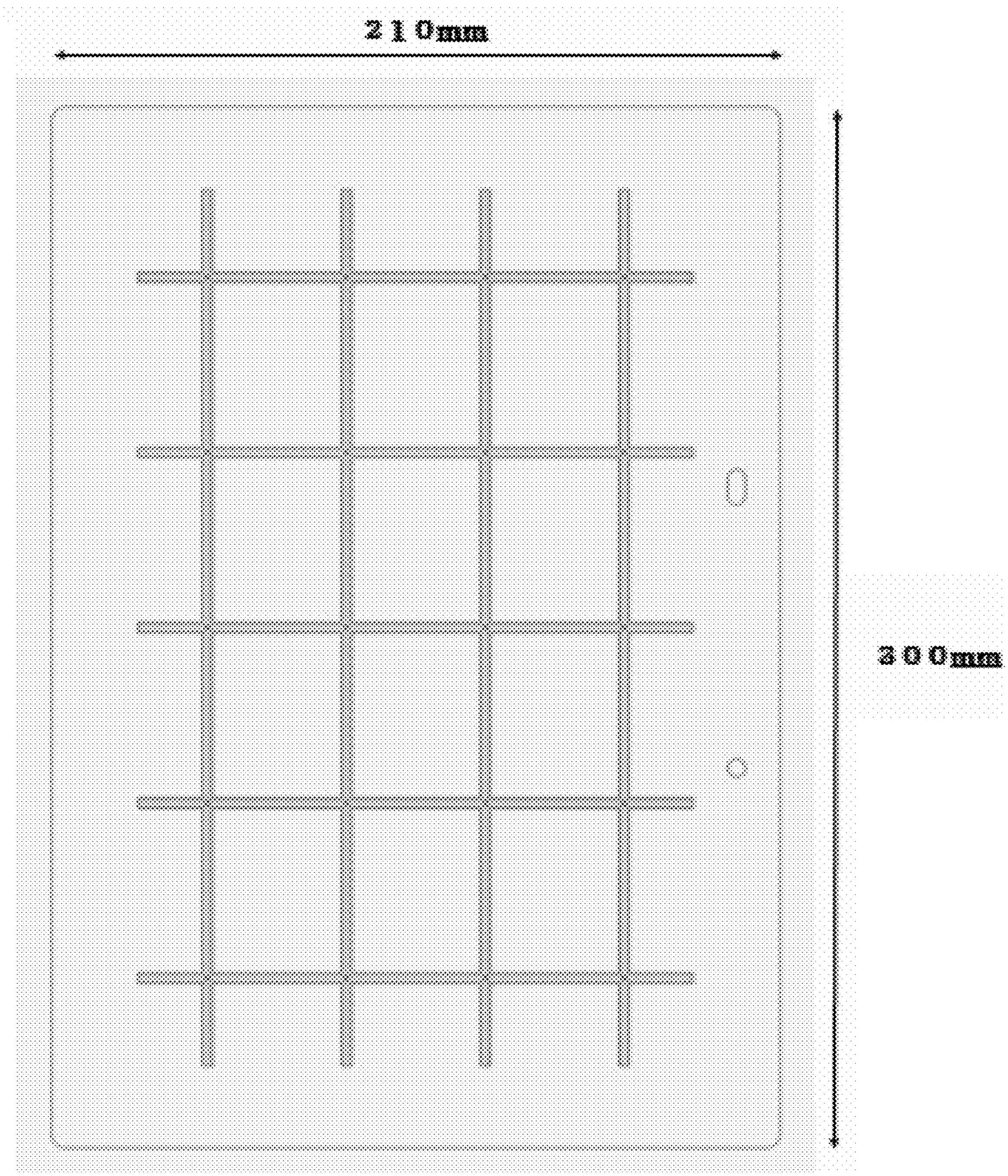
FIG. 39 is a schematic diagram of a molded article with which the action and effect of pressurized fluid was verified by injecting the fluid through ejector pins.
Figure 40:
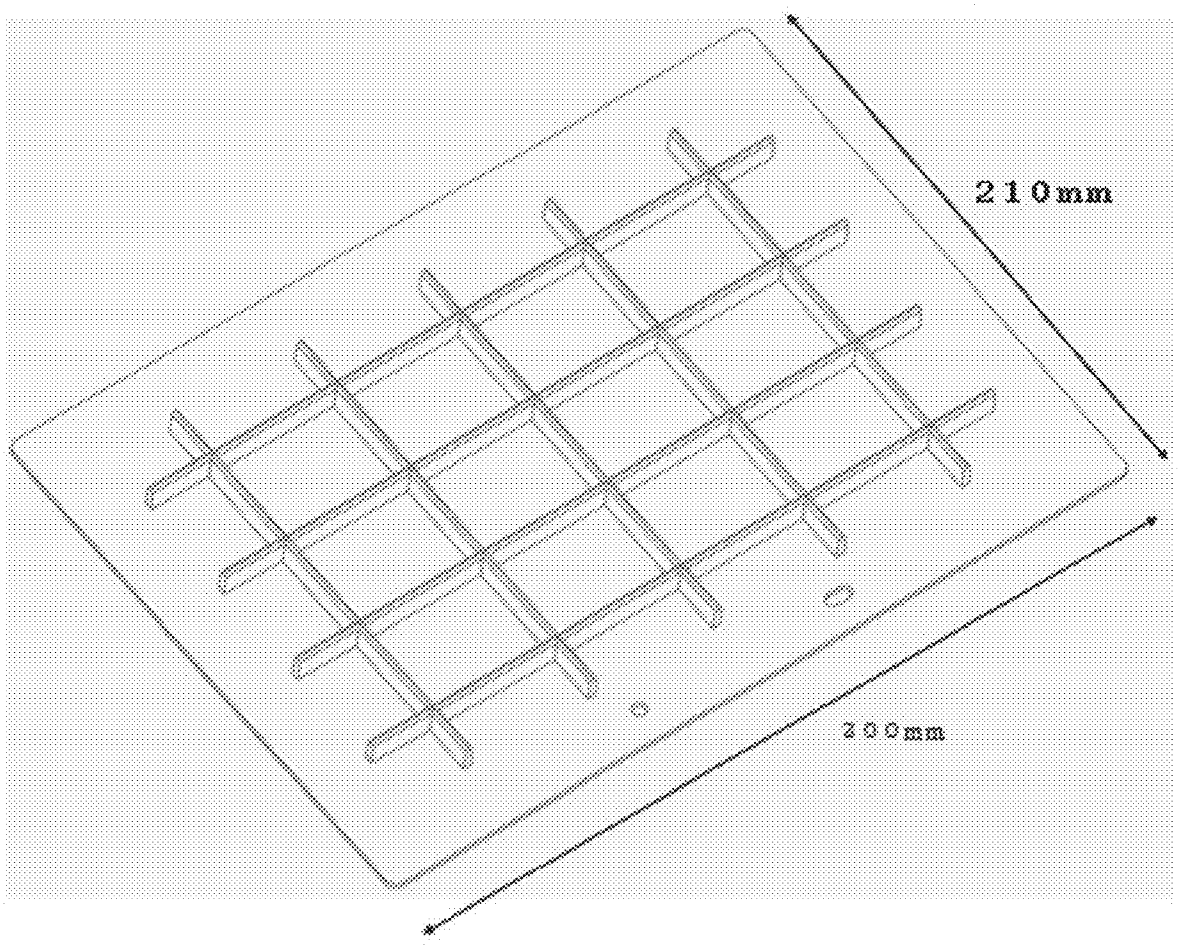
FIG. 40 is an oblique perspective view of the movable side of FIG. 39.
Figure 41:
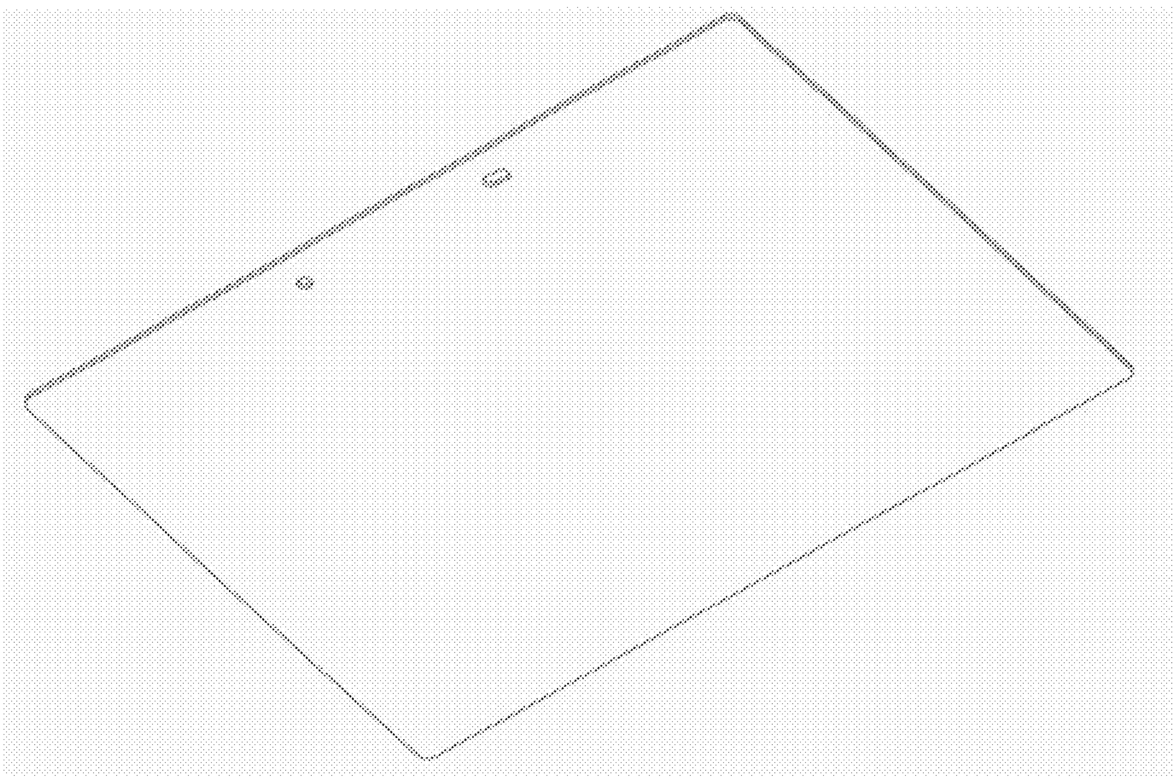
FIG. 41 is an oblique perspective view of the stationary side of FIG. 39.
Figure 42:
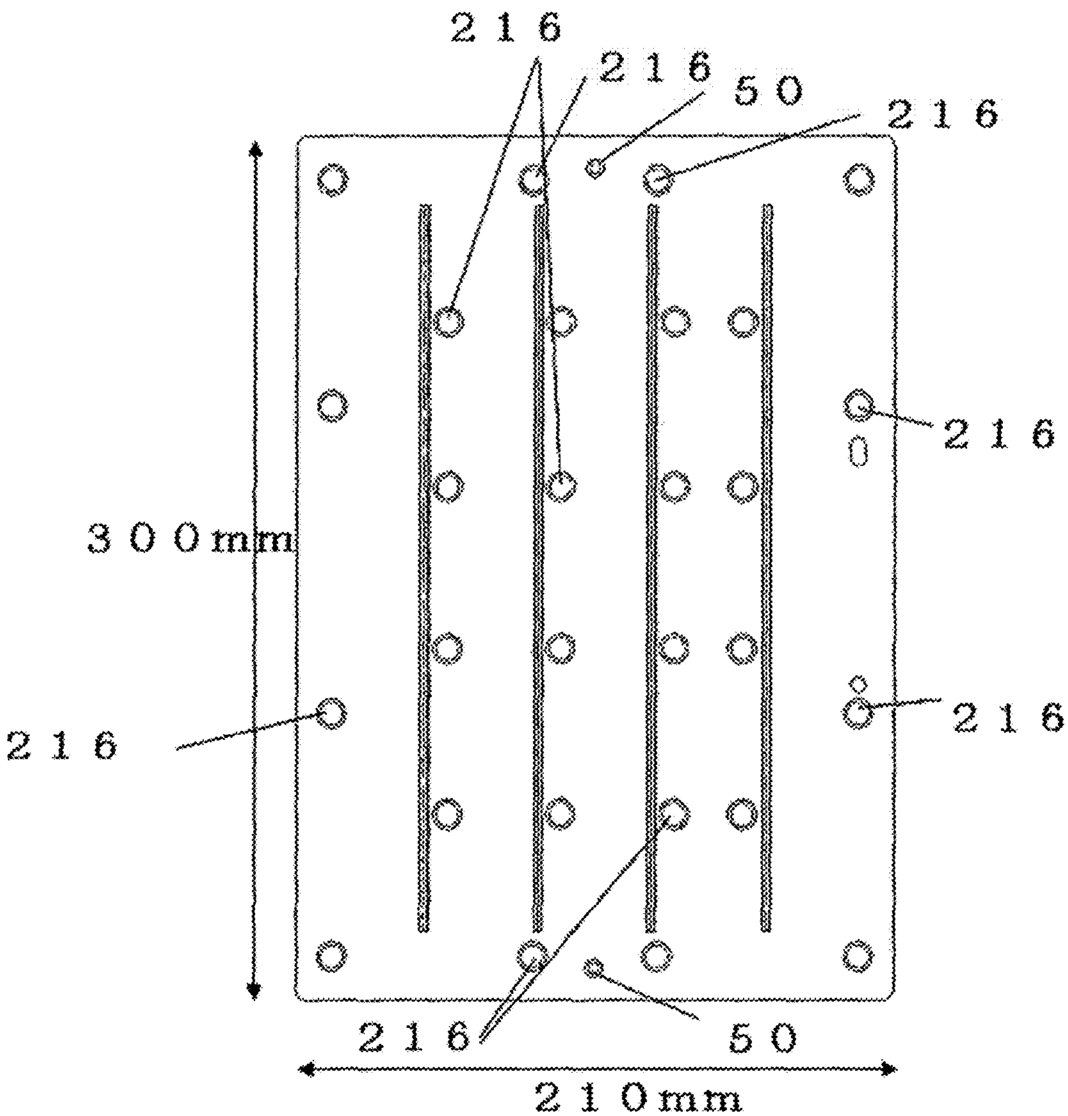
FIG. 42 is a schematic diagram of a molded article in which the gas leakage from ejector pins was prevented by providing gas rib 218 around ejector pins.
Figure 43:
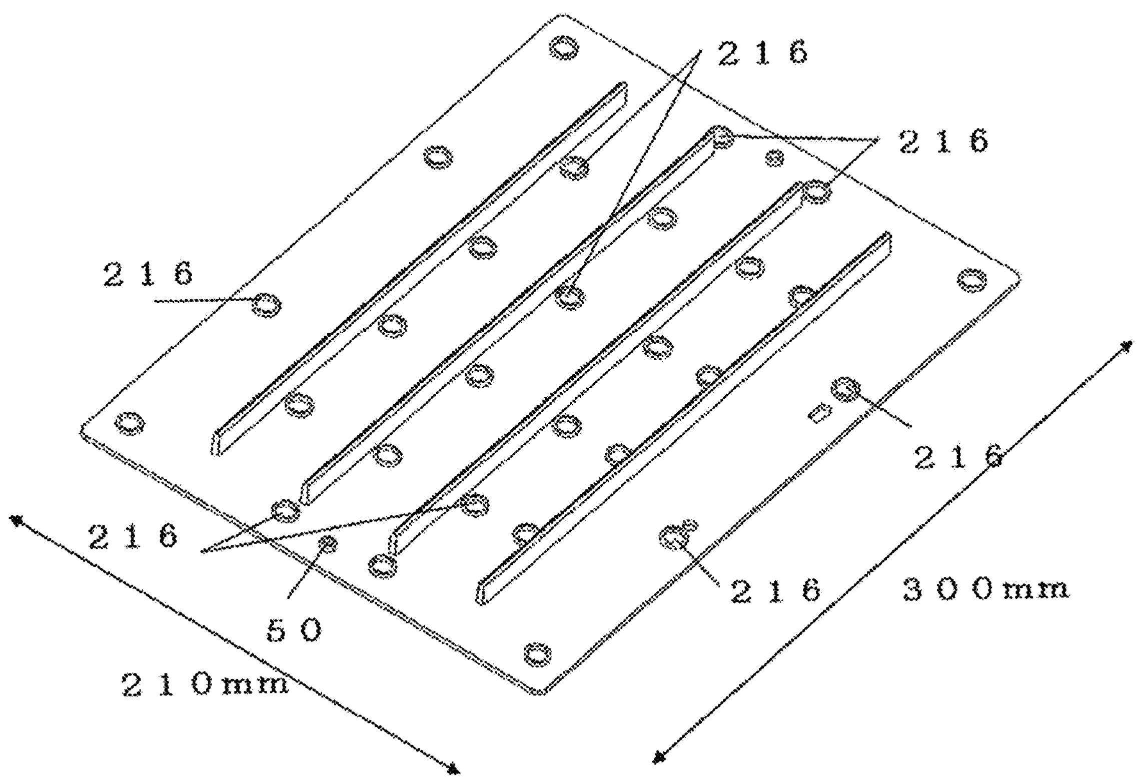
FIG. 43 is an oblique perspective view of the movable side of FIG. 42.
Figure 44:
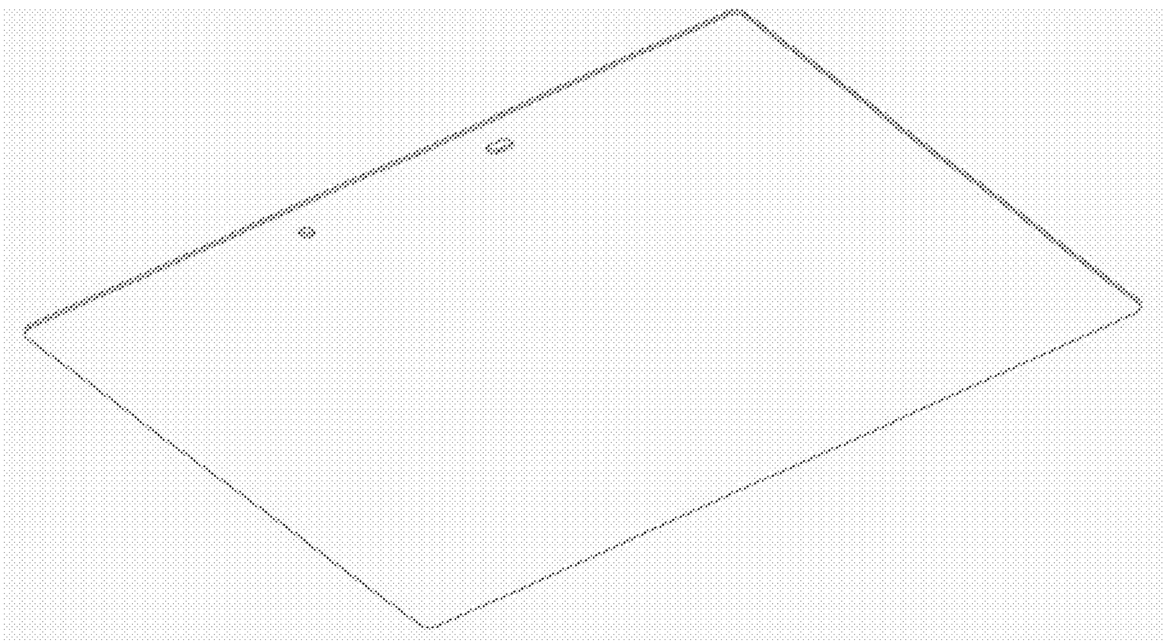
FIG. 44 is an oblique perspective view of the stationary side of FIG. 42.
Figure 45:
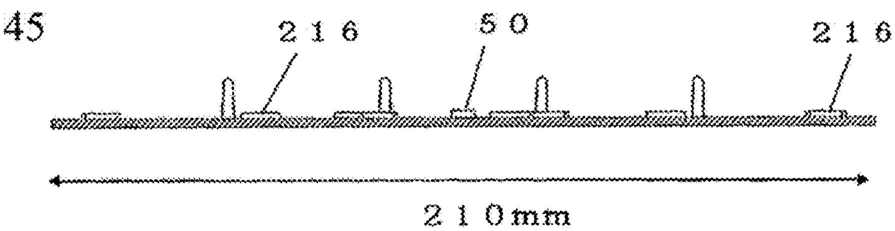
FIG. 45 is a cross-sectional diagram of FIG. 42.

In the case of pressurization pin 50, when the product profile is complex, for example when it is surrounded by ribs like those shown in FIGS. 39-41, as the pressurized fluid cannot surmount them, the fluid pressurization cannot be carried out unless a pressurization pin is provided in a surrounded section.

In most of cases with a product profile like those of FIGS. 39-4, as an ejector pin is provided, the fluid pressurization is carried out by using a pressurization ejector pin 227 or a pressurization ejector pin 500. A pressurization pin 50 is used when a pressurization ejector pin 227 or a pressurization ejector pin 500 cannot be provided. A method of fluid pressurization effected through the clearance of nested element is also feasible.

(Fluid Pressurization)

In the case where, in order to carry out the fluid pressurization from the movable side mold of an injection molding mold of a conventional structure, pressurization ejector pins 227 reaching the surface of resin in the cavity are provided on the mold, and a pressurized fluid is ejected into the cavity to pressurize directly the resin in the cavity, a portion of the pressurized fluid escapes to the outside of injection molding mold through clearances around the pressurization ejector pins 227. As a means to solve this problem, sealed mold 141 in FIG. 2 or sealed mold 142 in FIG. 3 is used.

The means of fluid pressurization using only the fluid from pressurization ejector pins 227 shall be described in concrete terms by referring to drawings.

The outer cylinder 224 of ejector pin shown in FIG. 52, similarly as in FIG. 4, comprises: hollow shaft part in which perforated hole 77 is formed to accommodate inner core 225; and flanged part 70 formed at one end of the said shaft part. In flanged part 70, depressed part 79 conducting to perforated hole 77 is formed so that flanged part 117 of inner core 225 can be inserted into it.

FIG. 53 is a schematic diagram of core part 226. Core part 226, similarly as in FIG. 5, comprises a shaft part and flanged part 117 formed at one end of the said shaft part. D-cut face 72 is formed in the shaft part, and D-cut face 118 is formed in the flanged part 117. The pressurized fluid passes over these D-cut faces 118 and 72. The apical end 73 is machined in a form similar to that of 74 or 75 of FIG. 9. Illustrations are omitted but the flanged part 117 is machined to create a groove shown in FIG. 7 or FIG. 8.

FIG. 54 illustrates pressurization ejector pin 227 with a structure of pressurization pin having outer cylinder 223 into which core part 226 is inserted. The pressurized fluid introduced from the base end section of pressurization ejector pin 227 (depressed part 79 and clearances of D-cut face 72) passes through clearances between perforated hole 77 and D-cut face 118 and is ejected out of the apical end 119.

(Structure Enabling to Eject a Pressurized Fluid from the Inside of Ejector Pin)

As a means to eject a pressurized fluid from the inside of pressurized fluid, the ejection of pressurized fluid from the tip of ejector pin can be effected if the ejector pins with a double structure illustrated in FIGS. 52-54 are used. As an example of structure of these ejector pins, it is possible to use a combination of an ejector sleeve [outer cylinder (any one of the following types is applicable: straight ejector sleeve; straight ejector sleeve with an escape taper; stepped ejector sleeve; stepped ejector sleeve with an escape taper, etc.)] and a center pin, products of Misumi Co., Ltd.

FIG. 53 is a schematic diagram of a center pin (inner core), i.e., a pin to be housed in an ejector sleeve. The tip portion of about 5 mm in length of the center pin is cut in a D-shaped cross-section to create a clearance of approximately 0.001 mm-0.5 mm so that, when it is housed in the ejector sleeve, it may allow the passage of pressurized fluid but inhibit the entry of molten resin.

As described with FIG. 53, at the tip of inner core 225, clearance 73 is provided for conducting the pressurized fluid.

In order to facilitate the conduction of pressurized fluid in lower portion of center pin below its tip portion (portion below the above mentioned D-cut portion), the lower portion is cut in a large D-cut cross-section. The flange of center pin 225 also is machined to present a D-cut cross-section similarly as in the case of pressurization pin 50 to enable the conduction of pressurized fluid, and a groove is provided so as to be connected with the D-cut portion (FIG. 7, FIG. 8).

FIG. 52 illustrates an outer cylinder 224 wherein on the upper or the bottom side, or on both the upper and the bottom side of the flanged part 70, the seals 126 are provided to prevent the leakage of pressurized fluid.

When the pressurized fluid is introduced from below the flange of ejector sleeve, the pressurized fluid flows between outer cylinder 224 and center pin 225 or center pin body 226 and is ejected from the tip of pressurization ejector pin 227. The pressurized fluid enters the clearance between the resin and the mold and effects the fluid pressurization.

(Reason for the Configuration of Double Structure)

Pressurization pins illustrated in FIGS. 4-9, pressurization ejector pins 227 provided with a mechanism of fluid pressurization illustrated in FIGS. 52-54 and FIG. 62, and pressurization ejector pins 500 provided with a mechanism of fluid pressurization illustrated in FIGS. 70-72 are all configured to constitute a double structure. The reason for configuring them as a double structure is, because it enables them to create protrusion 130 by lowering them from the surface of resin, as shown in FIG. 13.

By lowering inner core 71 as compared with outer cylinder 69 [configuration of protrusion in molded article (depression in mold)], the entry of pressurized fluid into clearances is facilitated more.

As illustrated in FIGS. 63-76, the outer cylinder and the inner core are configured so that they may be retracted simultaneously or separately.

An ejector pin can be configured so that the entry of pressurized fluid into the clearance between the resin and the mold may be facilitated in accordance with the profile of a molded product, properties of resin, molding conditions, etc. The configurations in this context include those wherein: only the inner core is retracted without retracting the outer cylinder as shown in FIGS. 69A and 69B; the outer cylinder as well as the inner core is retracted as shown in FIG. 69C and FIG. 65D; etc.

The height by which the outer cylinder is to be depressed is desirably in a range of about 0-5 mm with respect to the level of surrounding molded article, and the height by which the inner core is to be depressed further with respect to the level of the outer core is desirably in a range of about 0-5 mm.

If the inner core is made to protrude further than that with respect to the outer cylinder, a product with hollows often is derived instead of a product of pressure forming.

(Configuration of Pressurization Ejector Pin Tip)

As illustrated in FIG. 76, it is also possible to configure a tapered portion 369, 370 on the outer cylinder to facilitate the entry of pressurized fluid into clearances.

Figure 37:
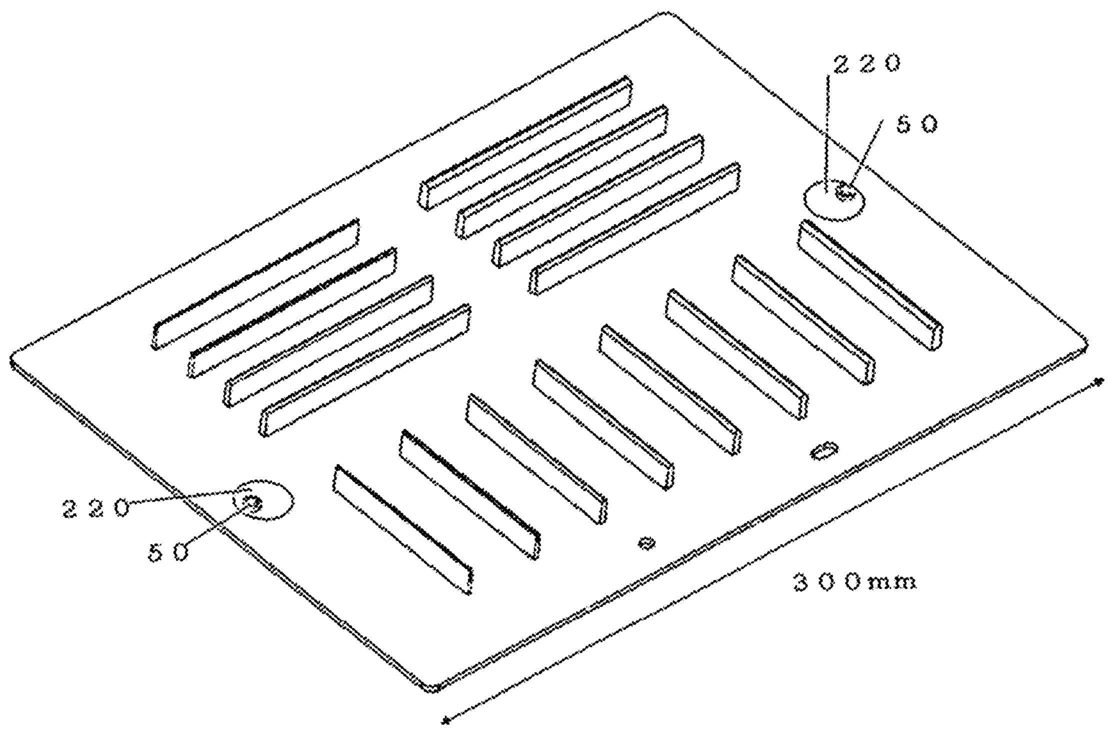
FIG. 37 is an oblique perspective view of the movable side of FIG. 36.

As illustrated in FIG. 37, by embossing the tip portion of outer cylinder and, as needed, the area around it, the pressurized fluid can be made to enter clearances more easily. Needless to say, the entire part to be pressurized by fluid can be embossed.

Above-described pressurization pin 50, pressurization ejector pin 227 and pressurization ejector pin 500 have been described as an element with a double structure comprising an outer cylinder and an inner core, but they may also be configured as an element with a multiple structure, instead of a double structure.

Apart from the configuration of pin tip, as an alternative solution for avoiding the intrusion of pressurized fluid into the molded article, the step of fluid pressurization may be carried out after the cooling and solidification of the article surface has been made to advance sufficiently by prolonging the delay time.

(Description of FIG. 61)

(Other Structures of the Ejector Pin Capable of Fluid Pressurization)

Apart from the above-mentioned structure of ejector sleeve using a center pin, it is also possible to use a structure in which the tip portion of outer cylinder is configured so that it may enable the passage (ejection, discharge) of pressurized fluid but may not allow the molten resin to enter it, as illustrated in: FIGS. 61A1 and A2; FIGS. 61B1 and B2; FIGS. 61C1 and C2; FIGS. 61D1 and D2; FIGS. 61E1 and E2; FIGS. 61F1, F2 and F3; FIGS. 61G1 and G2; FIGS. 61H1, H2 and H3; FIGS. 61J1, J2, J3 and J4. They are described in the following paragraphs as examples, but the solution needs not be restricted to them.

FIG. 61A1 depicts a structure wherein a porous material 244 is embedded in a portion of approximately 5 mm to 15 mm in length at the tip of ejector sleeve (outer cylinder), the porous material 244 being one represented by a sintered metal element that allows a pressurized fluid to pass with ease but blocks a molten resin. FIG. 61A2 is a diagram of the object of FIG. 61A1 as viewed from the top of page.

FIG. 61B1 depicts a structure wherein instead of (in place of, in exchange for, by changing from, as an alternative to) element 244 an element 245 in a form putting together several to several tens of thin plates is used so that the pressurized fluid may be ejected from clearances. FIG. 61B2 is a diagram of the object of FIG. 61B1 as viewed from the top of page.

FIG. 61C1 depicts a structure wherein instead of element with reference numeral 244 an element 246 in a form putting together several to several tens of quadrangular pyramids is used so that the pressurized fluid may be ejected from their clearances. FIG. 61C2 is a diagram of the object of FIG. 61C1 as viewed from the top of page. Incidentally, the quadrangular pyramids can be replaced with rectangular columns.

FIG. 61D1 depicts a structure wherein instead of shaped element 244 a shaped element 247 putting together several to several tens of circular cones fitted into the pin tip is used so that the pressurized fluid may be ejected from their clearances. FIG. 61D2 is a diagram of the object of FIG. 61D1 as viewed from the top of page. Incidentally, the circular cones can be replaced with circular columns. FIG. 61E1 depicts a structure wherein instead of shaped element 244 a quadrangular column 248 is fitted into the pin tip so that the pressurized fluid may be ejected from its clearances 249. FIG. 61E2 is a diagram of the object of FIG. 61E1 as viewed from the top of page.

FIG. 61F1 depicts a structure wherein the ejector pin is capped with, instead of shaped element 244, a shaped element 250 having a flange at the upper end which is to be closed when filling the molten resin. The shaped element 250 is lifted (advanced) by 0.1 mm-1.0 mm (although not illustrated, a stopper is provided inside; a mechanism to fix the spring is also incorporated.) due to the pressure of pressurized fluid, and the pressurized fluid is ejected laterally. When the pressurized fluid pressure decreases, the shaped element 250 is pushed back to the original position due to the action of spring 251. FIG. 61F2 is a diagram of the object of FIG. 61F1 as viewed from the top of page. FIG. 61F3 is a side elevational view of an isolated unit of shaped element 250.

FIG. 61G1 depicts a structure wherein, instead of shaped element 244, ball-check 252 is embedded in the ejector pin tip. When filling a resin, ball-check 252 is pushed back due to the resin filling pressure and moved back as far as a seat (not illustrated) for ball-check 252 provided at a middle part of outer cylinder 77; since the ball-check blocks the passageway, the resin does not intrude beyond that point (although not illustrated, a seat for ball-check is provided inside outer cylinder 224, and hence the molten resin does not break into beyond that point). When the fluid pressurization is carried out, the pressure thrusts forward ball-check 252 until it reaches the top end. At that time, because grooves are machined (not illustrated) on the place of contact between ball-check 252 and outer cylinder 77, the pressurized fluid is made to be able to exert pressure (apply fluid pressure) on the molten resin in the cavity. FIG. 61G2 is a diagram of the object of FIG. 61G1 as viewed from the top of page. FIG. 61H1 depicts a structure wherein instead of shaped element 244 square pyramids or circular cones 254 as shown in FIG. 61H3 are fitted into the pin tip so that the pressurized fluid may be ejected from their clearances. FIG. 61H2 is a diagram of the object of FIG. 61H1 as viewed from the top of page.

FIG. 61J1 depicts a structure wherein, instead of shaped element 244, round column 350 having a flanged part as illustrated in FIG. 61J2 is inserted into the ejector pin tip and fixed by setscrew 256, so that the pressurized fluid may be ejected from matching surfaces. FIG. 61J3 and FIG. 61J4 are diagrams of assembly of outer cylinder 244 and round column 350 having a flanged part.

Figures from 61A1 to 61J4 illustrate the apical portions of ejector pins used in the fluid pressurization; flanged portions, seals, etc. are not illustrated.

In the case where the entry of pressurized fluid is not desirable, the fluid is blocked, as shown in FIG. 61K, by providing seal 126 on the upper face of the flanged portion attached to ejector pin 27.

(Method for Introducing Pressurized Fluid into the Pressurization Ejector Pin 227)

Figure 55:
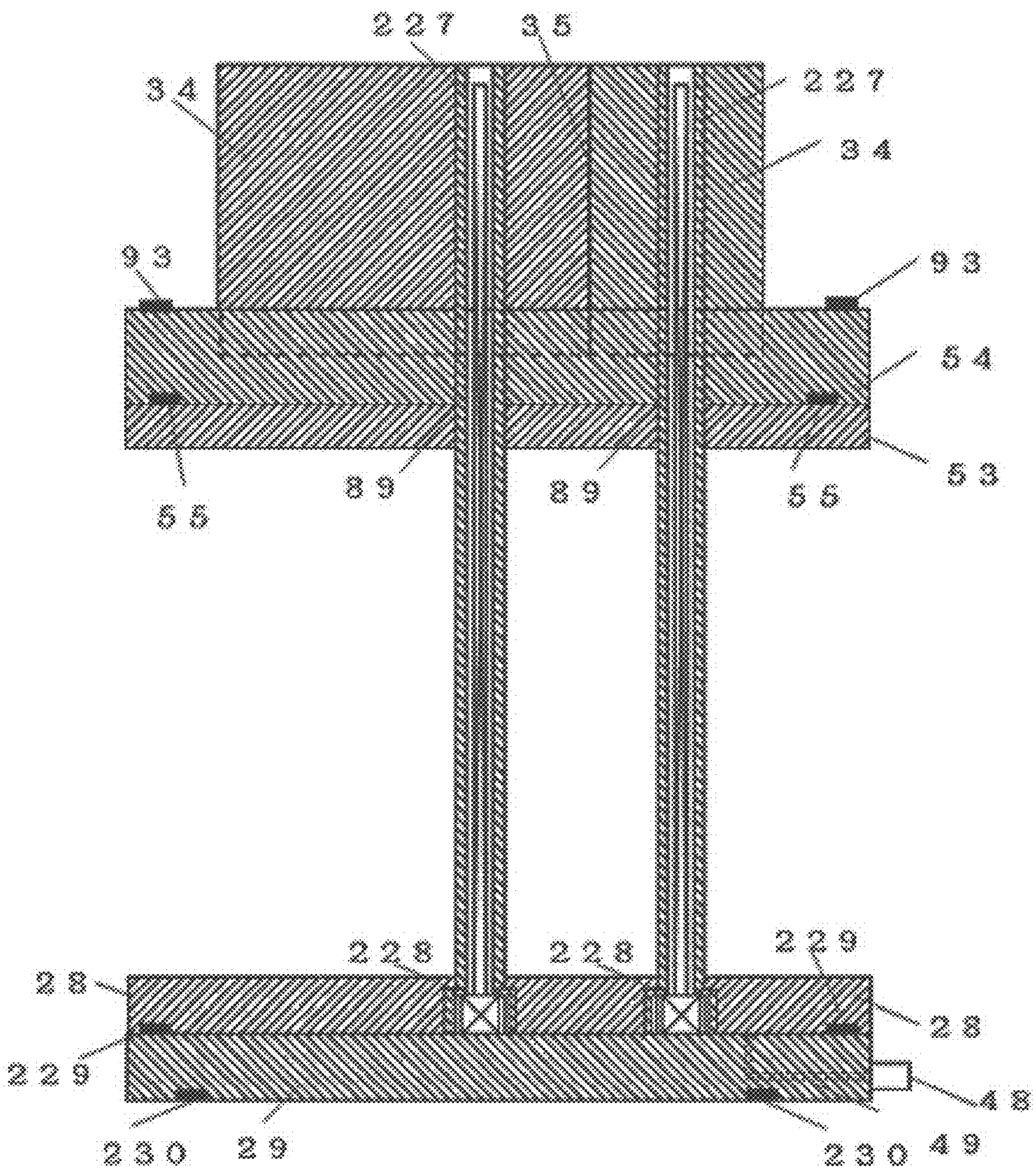
FIG. 55 is a schematic diagram representing the means of fluid pressurization through ejector pin.

FIG. 55 is a schematic diagram representing the mold structure incorporating pressurization ejector pins 227 into the mold. Code 34 in FIG. 55 is a nested element and code 35 is a clearance in the nested element. The structure for preventing leakage of pressurized fluid through clearances 35 in the nested element comprising seal 93, plate 53, plate 54, seal 55, and seal 89 on pressurization ejector pins 227 is the same as in FIG. 3.

In other words, the flanged part 70 of pressurization ejector pin 227 is held between plate 28 and plate 29. The seal 228 is provided between the upper face of flanged part 70 and plate 28. Between plate 28 and plate 29, seal 229 is provided to prevent leakage of pressurized fluid through the clearance between plate 28 and plate 29. Where necessary, the surface of contact between the bottom surface of plate 29 and the mounting plate 23 also is sealed by 230. The code 49 indicates the passageway of pressurized fluid, and the code 48 indicates the port for connection with device 140 for preparing pressurized fluid shown in FIG. 1 or device for preparing pressurized fluid 1140 shown in FIG. 46.

Figure 56:
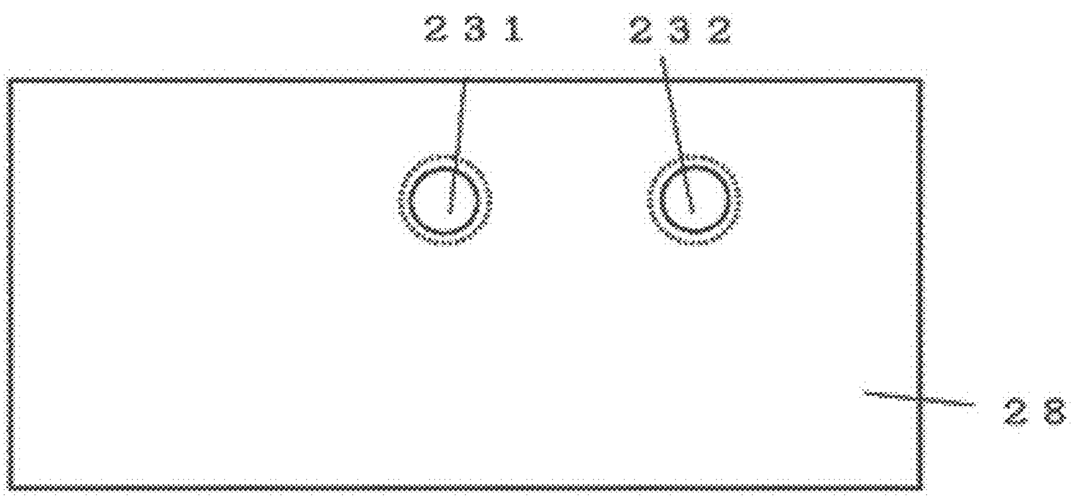
FIG. 56 is a schematic diagram of an ejector plate 28 representing the means of fluid pressurization through ejector pin.

Plate 28 indicated in FIG. 56 represents plate 28 in FIG. 55 as viewed from above the page, describing the formation of depressed part 231 and depressed part 232 accommodating flanged part 70 of ejector pin 227.

A plate 29 indicated in FIG. 57 represents plate 29 in FIG. 55 as viewed from above the page. In plate 29, groove 236 and passageway (perforated hole) 49 for conducting the pressurized fluid are formed. Passageway 49 is configured so that one end leads to groove 236 and the other end may be connected with port of connection 48. Incidentally, groove 236 makes up a passageway (air pressure circuit) for conducting the pressurized fluid when plate 28 and plate 29 are joined together. Furthermore, groove 236 is formed at a location where it leads to (connects with) depressed part 231 and depressed part 232 when plate 28 and plate 29 are joined together.

Figure 58A:
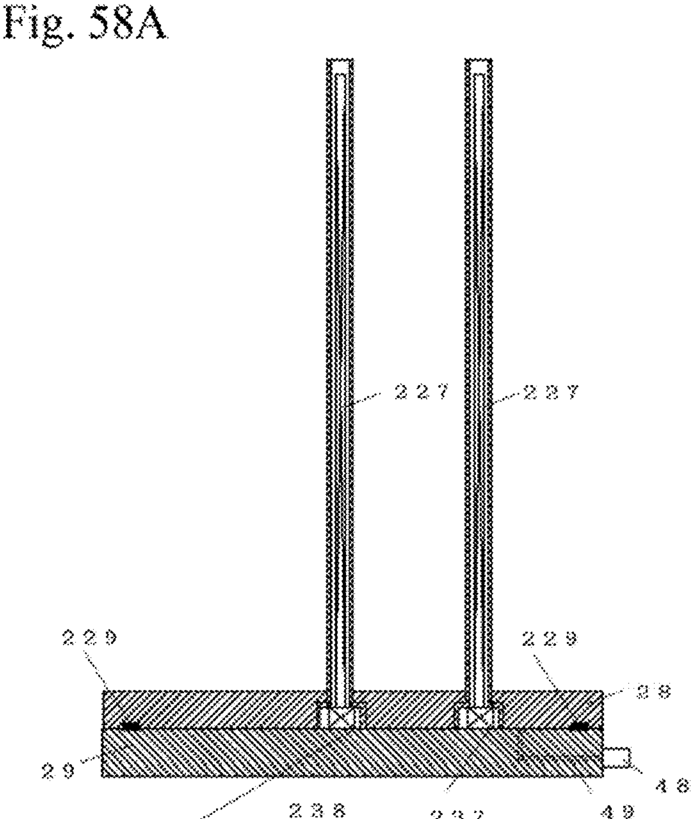
FIGS. 58A to 58C are schematic diagrams representing a case where multiple circuits of pressurized fluid are provided on a single ejector plate in FIG. 55.

FIG. 58A represents another embodiment of mounting of pressurization ejector pin 227 in the mold structure shown in FIG. 55. In other words, those components including seal 93, plate 53, plate 54, seal 55, nested element 34 and the like are omitted from the illustration in FIG. 58A to make descriptions more comprehensible.

Figure 58B:
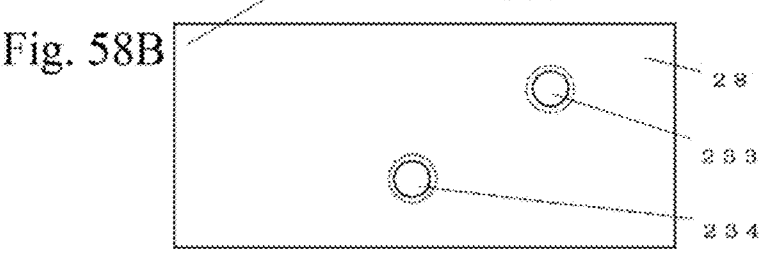

FIG. 58B illustrates the plate 28 in FIG. 58A as viewed from the upper side of page in FIG. 58A. Moreover, FIG. 58C represents the plate 28 in FIG. 58A as viewed from the upper side of page in FIG. 58A.

As shown in FIG. 58B, a perforated hole 233 and a perforated hole 234 are formed in the plate 28. Moreover, on the undersurface of plate 28, around perforated hole 233 and perforated hole 234 respectively, concave parts (countersinks) are formed at the location where the flanged part 70 of a pressurization ejector pin 227 is situated.

Figure 58C:
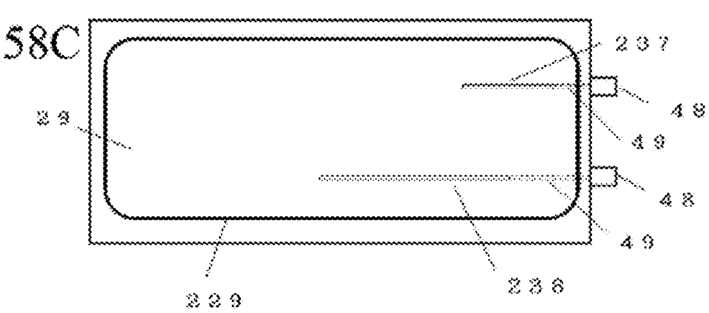

As shown in FIG. 58C, on the plate 29, groove 237, groove 238 and two passageways (perforated holes) 49 conducting pressurized fluid are formed. Each of passageways 49 is configured so that it leads to a groove (groove 237 or groove 238) at one end and can be connected to the connection port 48 at the other end. Incidentally, the groove 237 and groove 238 make up an air pressure circuit for conducting the pressurized fluid, by joining plate 28 and plate 29. Furthermore, groove 237 and groove 238 are formed at locations where they lead to (connect with) perforated hole 231 and perforated hole 232 when plate 28 and plate 29 are joined together. In other words, groove 237 and groove 238 are formed at locations where they lead to two concave parts into which flanged part 70 of pressurization ejector pin 227 is inserted when plate 28 and plate 29 are joined together.

The mold structure illustrated in FIG. 58A presents actions and effects that make it possible to manufacture molded articles under different conditions of fluid pressurization by connecting the fluid prepared by device for preparing pressurized fluid 1140 shown in FIG. 46 to separate connecting ports 48.

Figure 59A:
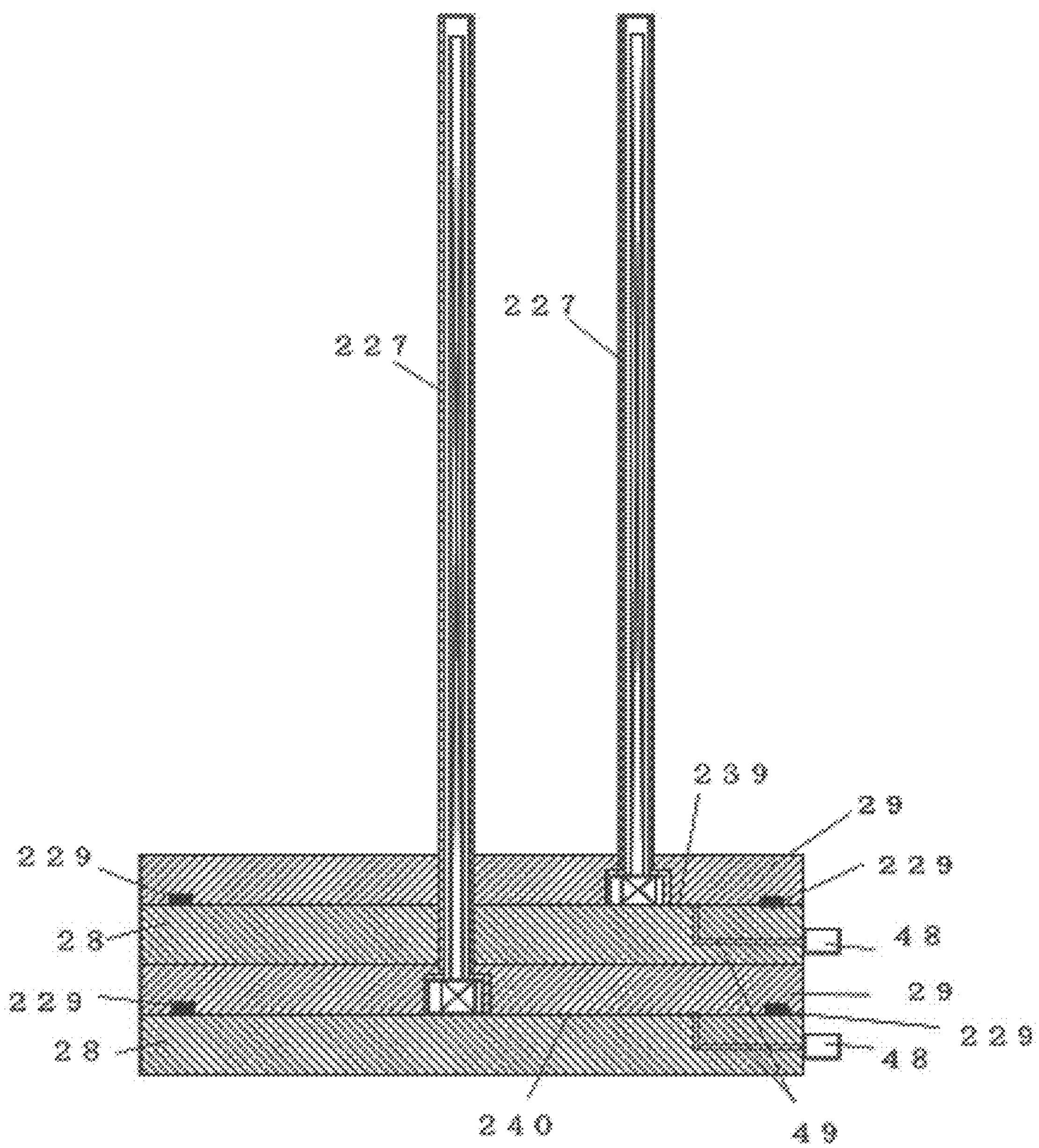
Figure 59F:
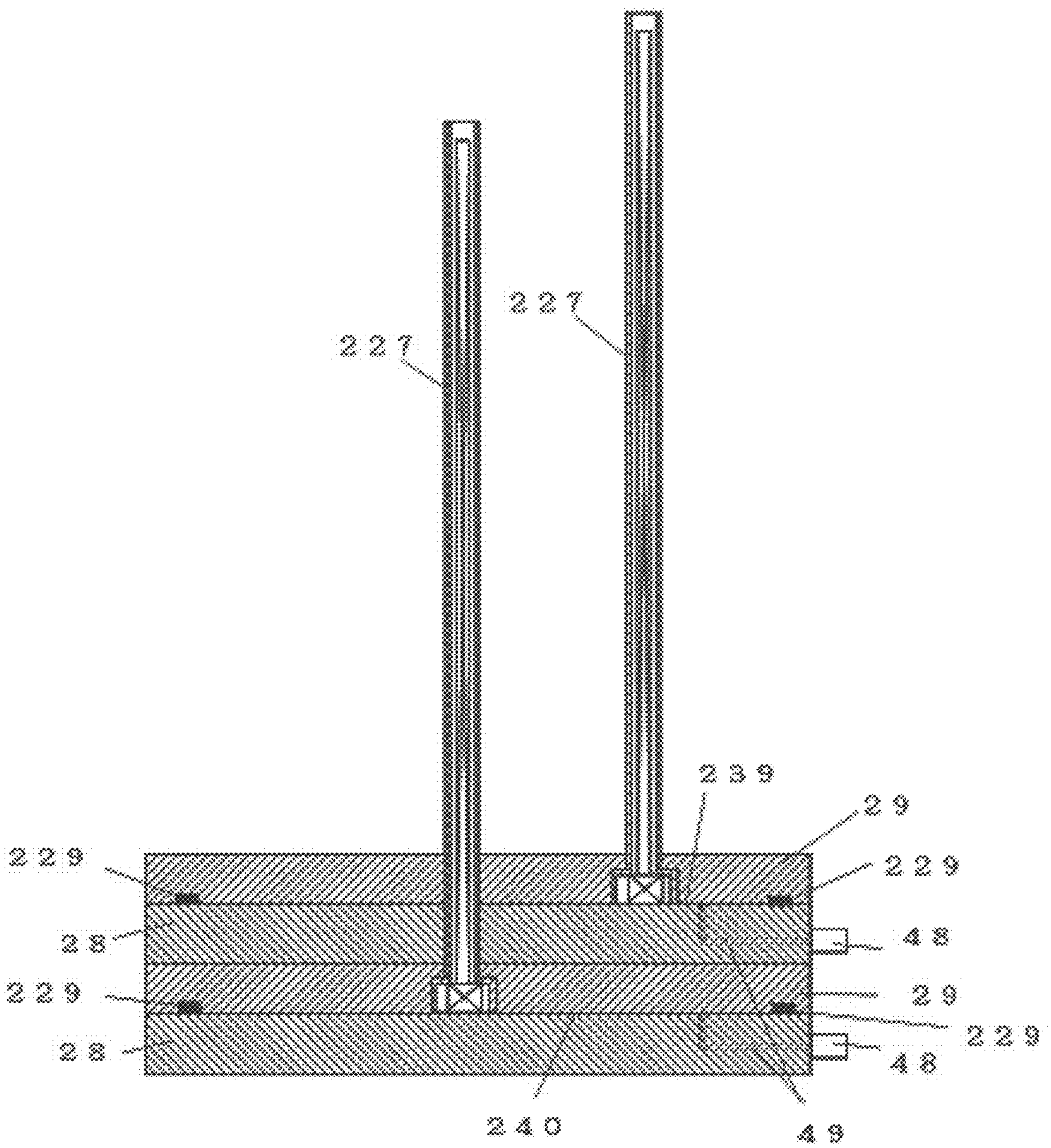

FIG. 59A and FIG. 59F show another embodiment of mounting of pressurization ejector pin 227 in the mold structure illustrated in FIG. 55.

In other words, those components including seal 93, plate 53, plate 54, seal 55, nested element 34 and the like are omitted from the illustration in FIG. 59A to make descriptions more comprehensible.

FIG. 59B represents the plate 29 at the upper side of page in FIG. 59A as viewed from the upper side of page in FIG. 59A. FIG. 59C represents the plate 29 at the lower side of page in FIG. 59A as viewed from the upper side of page in FIG. 58A. FIG. 59D represents the plate 28 at the upper side of page in FIG. 59A as viewed from the upper side of page in FIG. 59A. FIG. 59E represents the plate 29 at the lower side of page in FIG. 59A as viewed from the upper side of page in FIG. 58A.

Incidentally, in FIG. 59B and FIG. 59D, a perforated hole is formed at the same location as that of the perforated hole 235 shown in FIG. 59C, but its illustration is omitted.

The mounting structure of pressurization ejector pin 227 depicted in FIG. 59A is the one which uses a number of pairs of plates comprising plate 28 and plate 29 holding between them flanged part 70 of pressurization ejector pin 227. In other words, the said mounting structure is the one where each pair of plates erects ejector pin 227. In each pair of plates, a groove and a passageway for conducting pressurized fluid are formed. Consequently, the pressurized fluid prepared by device for preparing pressurized fluid 1140 shown in FIG. 46 can be fed separately to each pair of plates, and the system thus is able to manufacture molded articles under separate conditions for fluid pressurization.

FIG. 59F illustrates a case where the length of pressurization ejector pin is varied when the height of the shape of molded article varies.

Figure 60:
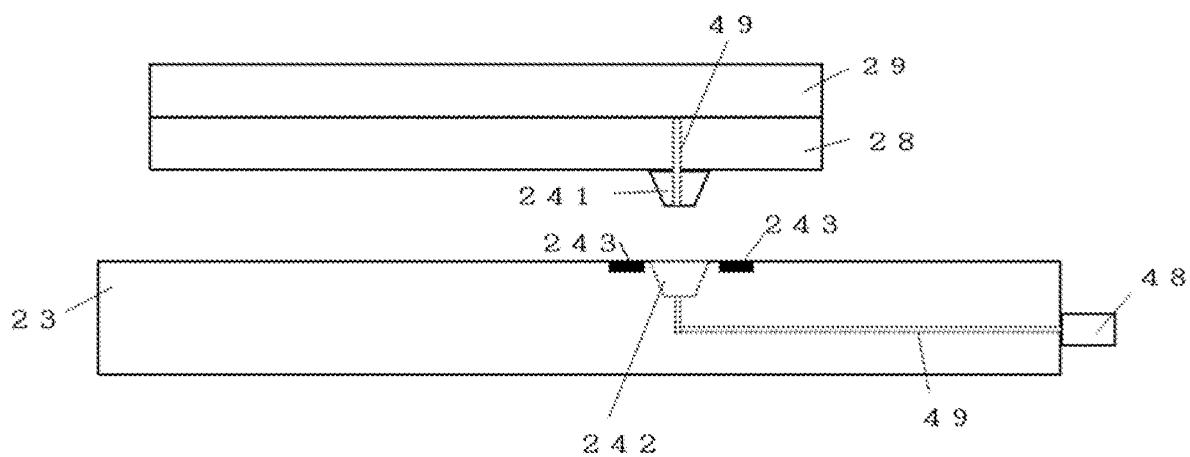
FIG. 60 is a schematic diagram representing the circuit through which the pressurized fluid is injected from the mounting plate on the movable side into the ejector plate.

FIG. 55 and others illustrate a means to conduct the pressurized fluid to pressurization ejector pin 227 by equipping plate 29 with connection port 48. FIG. 60 illustrates a means to supply the pressurized fluid from mounting plate 23 to plate 28 and plate 29. Mounting plate 23 is provided with connection port 48 which is machined to provide passageway 49 within it, the passageway leading to the bottom surface of depression 242. The plate 28 is provided with protrusion 241 fitting the depressed part 232, protrusion 241 being machined to provide passageway 49 in it, and although not illustrated, passageway 49 leads to passageway 49, groove 236, groove 237, groove 238, groove 239 and groove 240 in plate 28. When the mold is closed, protrusion 241 fits into depression 242 and a circuit of pressurized fluid is formed. Incidentally, the pressurized fluid cannot leak out to the outside, because seal 243 is provided at any one point among upper part of protrusion 241, lower part of depressed part 242, or the matching surface between plate 28 and mounting plate 23. FIG. 60 illustrates the case where the seal is provided on plate 28.

(Description of FIG. 70)

[Means to Eject the Pressurized Fluid from the Outside of Ejector Pin (Means to Conduct Pressurized Fluid Outside the Ejector Pin)]

In FIG. 70, the descriptions are made on the means to effect the fluid pressurization through the clearance between the outer side of ejector pin and the nested element (actually the clearance between ejector pin 27 and ejector pin guide 301).

Commercially available ejector sleeves present the limitations with respect to thickness and length. It is difficult to acquire commercially a slim and long ejector sleeve. Consequently, because of the difficulty in finding a long ejector pin available commercially, in molding a large-sized article or a deep article (article made by a thick mold), it is difficult to carry out the fluid pressurization by using pressurization ejector pin 227.

In FIG. 70, the descriptions are made on the means to effect the fluid pressurization by combining a short ejector sleeve and a long ejector pin. Below plate 53 shown in FIG. 18, seal plates 287 and 288, seals 290 and 291, and ejector guides 301 are added as new elements, wherein seal plate 53 and seal plate 54 are provided with only a mechanism to close off the pressurized fluid intruding from the clearances of nested element.

When the pressurized fluid is conducted on the lateral side of ejector pin 27, the fluid intrudes into also the clearance between seal plate 53 and seal plate 54 (see FIG. 18). As the pressurized fluid having thus intruded effects fluid pressurization through the clearances 35 of nested element on the molten resin injected into the mold cavity, the shape of molded article is disturbed.

As a solution for this problem, ejector guide 301 is provided in the holes of ejector pin 27 on both seal plate 53 and seal plate 54. Seal (O-ring, sheet) 289 and seal 292 are installed on upper side or lower side (portion), or both upper and lower side of the flanged part of ejector guide 301. (On ejector pin, ejector guide 253 on the left side of the page in FIG. 62) furthermore on the ejector pin 27, a seal ring 89 is provided between plate 287 and plate 288 so as to prevent the leakage of pressurized fluid to the outside.

Where necessary, ejector guide 301 also is provided with seal ring 89.

(Pressurization Ejector Pin 500)

The above-mentioned ejector pin provided with a structure capable of fluid pressurization with a view to carry out the fluid pressurization is called also "pressurization ejector pin".

In FIG. 70, code 21 indicates the cavity, 34 nested element and 35 clearance of nested element, and the structure is composed of plate 54, plate 53, seal 93, seal 55, ejector pin guide 301, seal 289, seal 292, etc. for blocking the pressurization gas that has flowed back from the nested element. The pressurized fluid is introduced into the clearance between plate 53 and plate 287. The pressurized fluid passes through the clearance between ejector pin guide 301 and ejector pin 27 and exerts pressure on the surface of molten resin injected into the cavity. The pressurized liquid flows back through the clearance of nested element but is closed off by seals 93 and 55, is prevented from escaping to the outside, and hence is able to effect fluid pressurization on the surface of molten resin in the cavity undergoing the process of cooling and solidification. Moreover, seal ring 89 provided on ejector pin guide 301 has also a mechanism to prevent the pressurized fluid from entering the clearance between nested element 34 and ejector pin guide 301 during the fluid pressurization.

In FIG. 70, on the matching surface of plates 53 and 287, there are provided a mechanism to hold down ejector pin guide 301 and a flow channel [passageway (groove 81 with a shape similar to that in FIG. 19)] to conduct the pressurized fluid to the bottom of flanged part of ejector pin guide 301. Ejector pin 27 is provided with a seal ring 89 to prevent the leakage of pressurized fluid. The pressurized fluid is fed through inlet port 48.

In ejector pin guide 301, as illustrated in FIGS. 73A-73D, a tip segment of about 5 mm serves as a guide for positioning (guide to prevent swaying) of ejector pin 27, and although not illustrated, the rest below it is configured in an escape shape (loose hole) to facilitate the passage of pressurized fluid.

Figure 84A:
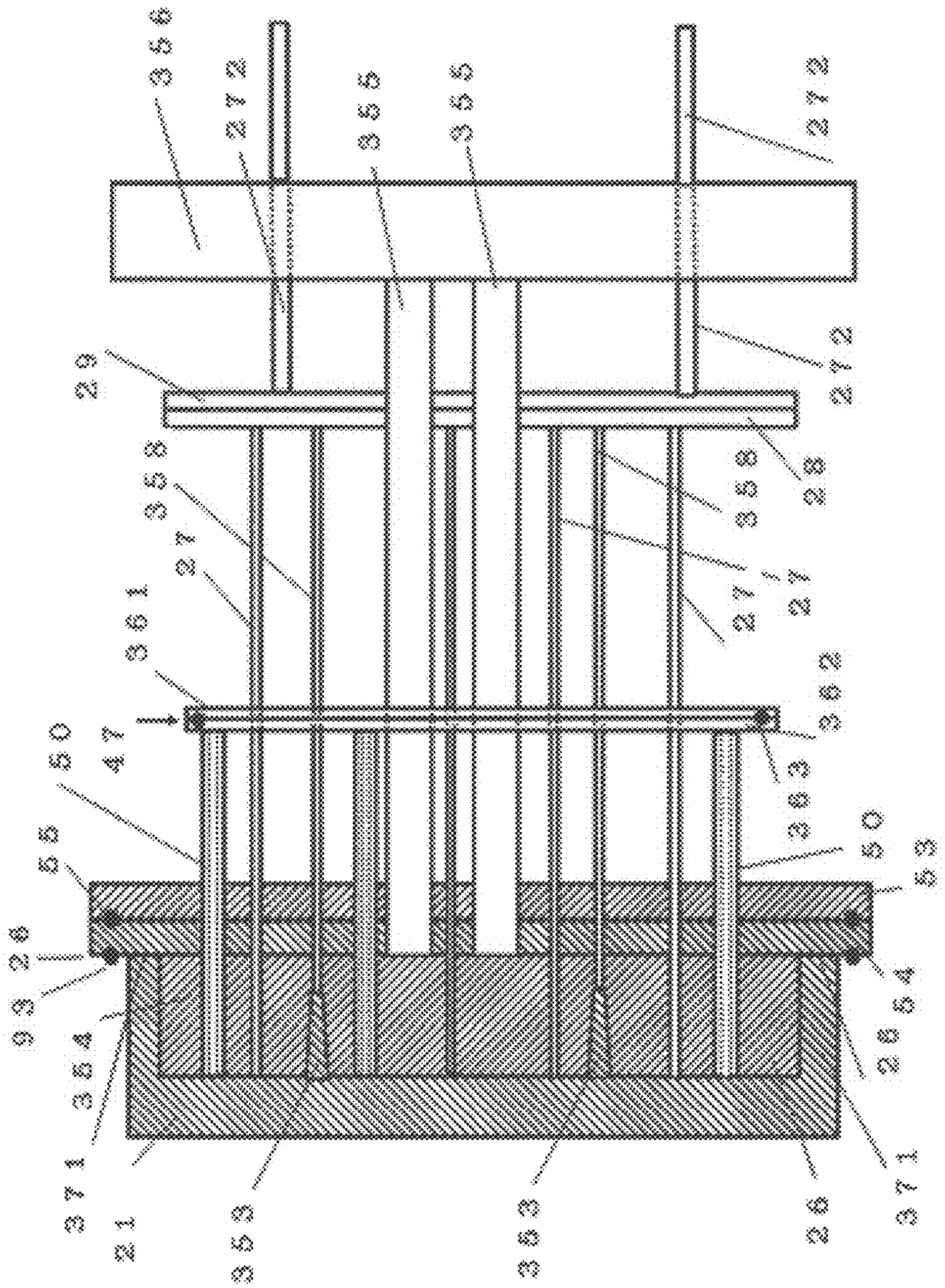
FIGS. 84A and 84B are schematic diagrams depicting the mechanism of core-backing.
Figure 84B:
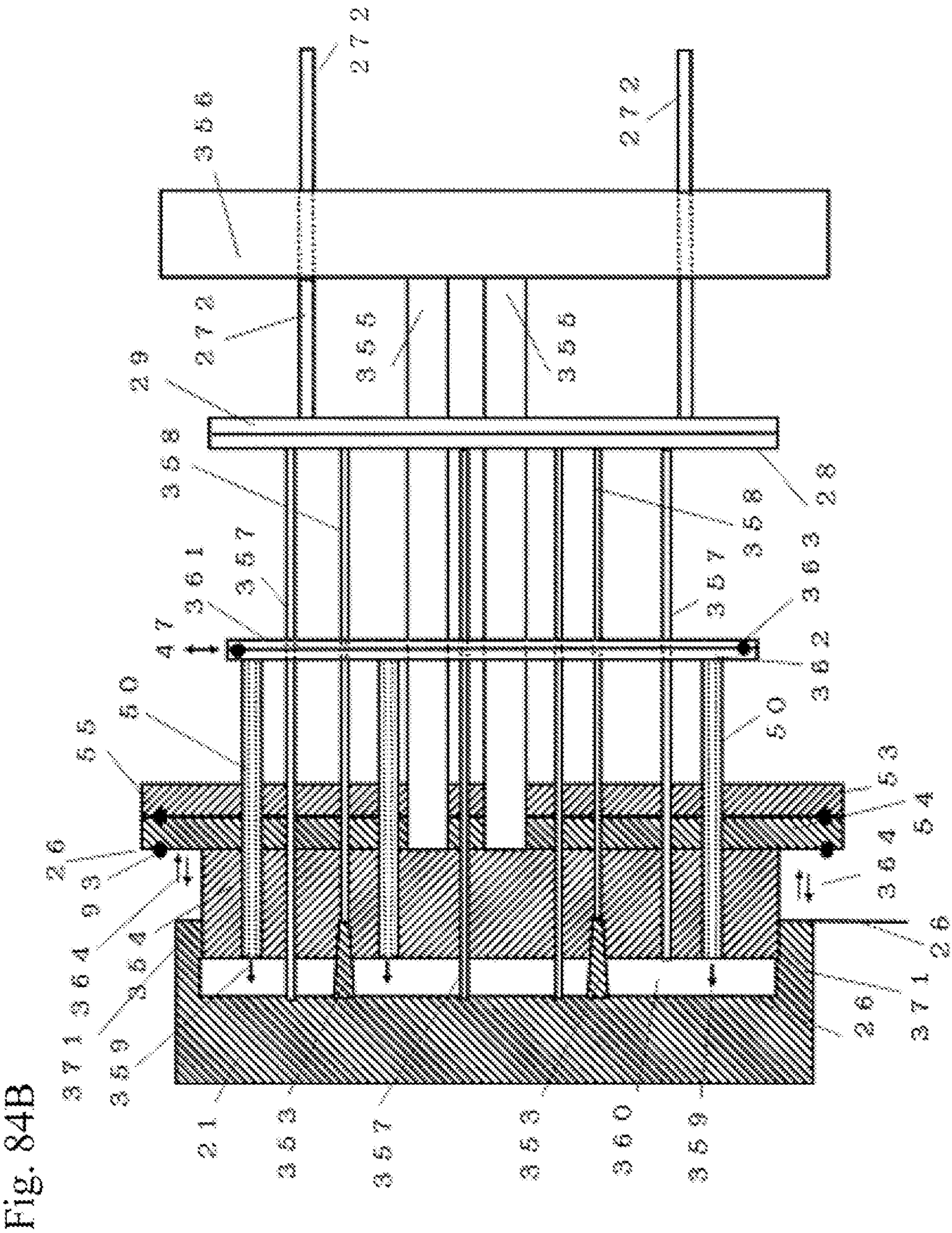

(Descriptions of FIG. 84A and FIG. 84B)

Figure 85:
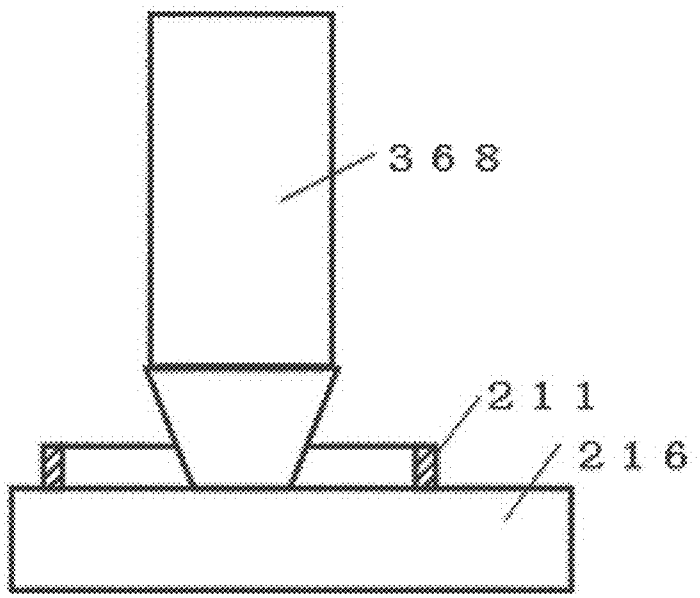
FIG. 85 is a schematic diagram representing the prevention of influx of pressurized fluid into a hot-runner.

Descriptions are made on the means for carrying out the fluid pressurization in a clearance, wherein the core is backed before fluid pressurization to create a space between the resin and the mold. FIGS. 84A, 84B illustrate the state before backing the core where cavity 21 is filled with a resin. Reference numeral 354 indicates a floating core; the pressure of resin injection cannot force open the mold since floating core 354 is linked to injection molding unit 356. Immediately after the completion of resin filling, or after the elapse of a certain period of time subsequent to it, the core is backed by moving backward rod 355 as shown in FIG. 85, to create space 360, the outcome of core-backing. The fluid pressurization is carried out from pressurization pins 50 on upper seal plate 362 and lower seal plate 361, while backing the core or after the elapse of a certain period of time subsequent to the completion of core-backing. Reference numeral 359 indicates that the pressurized fluid is ejected into the space 360 and effecting the fluid pressurization. After the completion of fluid pressurization, the mold is opened and the molded article is pushed out by operating ejector pins 357 and ejector pins 358 pushing the top of ribs. Reference numeral 353 in FIGS. 84A, 84B and FIG. 85 indicates ribs on which there are ejector pins of reference numeral 358. Reference numeral 357 also indicates ejector pins which serve as a mechanism to hold in place the resin injected into cavity 21 so that the resin may not be separated from the stationary side due to core-backing process. Reference numeral 363 is an arrowhead indicating a seal, and reference numeral 364 is that indicating the movement of core-backing process. While FIG. 84A and FIG. 84B describe the core-backing process on the movable side, the core-backing process is feasible on the stationary side as well. The seal of reference numeral 93 in FIG. 84A and FIG. 84B is the one employed in the case where the gas-counter-pressure is carried out. In the case of core-backing, by providing a rib-shaped element in the surrounding area, it serves as a gas-rib and prevents the likelihood of leakage of pressurized fluid even without seals on the parting.

(Shape Extrusion)

In the case of shape extrusion, as a columnar shape is provided like the case of ejector pin, it is needed only to seal this column by using seal ring 89. Like the case of inclined core illustrated in FIGS. 82A to 82C, the upper part of seal plates 54 and 55 is configured in a shape and the lower part of them is in a columnar shape, and hence it is needed only to seal the columnar part.

(Descriptions of FIG. 85)

(Gas Rib of Hot Runner)

Normally in many cases, the hot-runner is implemented from the stationary side and the fluid pressurization is carried out on the movable side. However, in rare cases where the fluid pressurization is carried out with a mold equipped with a hot-runner, it is desirable to use a hot-runner including a ball-check or a hot-runner provided with a valve-gate, so as to prevent the pressurized fluid from intruding into the hot-runner. If the hot-runner is otherwise open, it is surrounded by gas rib 211 as shown in FIG. 85 to prevent the intrusion of pressurized fluid into the hot-runner.

With a cold-runner as well, if a gas rib surrounding the gate is provided in the vicinity of gate like gas rib 211, it is possible to prevent the intrusion of pressurized fluid into the sprue-runner. With the side-gate as well, if the vicinity of gate is surrounded by a gas rib, the intrusion of pressurized fluid into the sprue-runner can be prevented.

(Descriptions of FIG. 79)

[An Example of Ring-Shaped Elastic Member (Seal Ring)]

In order to prevent a pressurized fluid present in the clearance between a resin and a mold from escaping from the clearance between the mold (or a nested element) and an ejector pin, it is needed to seal an ejector pin (seal an ejector pin with seal ring 89).

Figure 27:
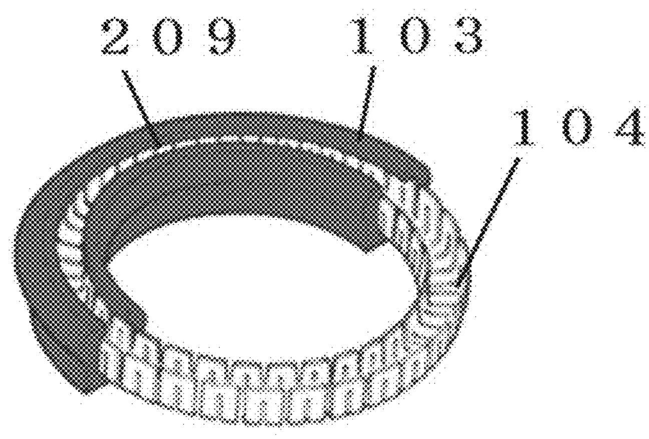
FIG. 27 is a schematic diagram representing the structure of a seal-ring 89 (Omniseal, Variseal).
Figure 28:
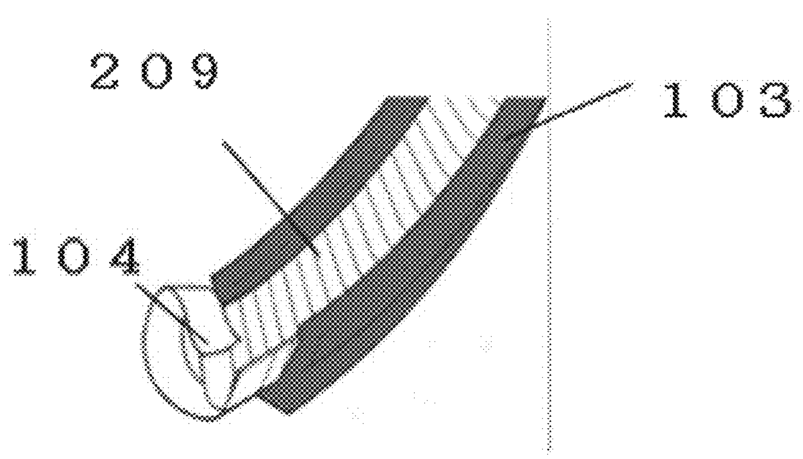
FIG. 28 is a schematic diagram representing the cross section of a seal-ring 89 (Omniseal, Variseal).

As seal ring 89 and seal ring 90 which support ejector pin 27 while sealing it, we can cite, for example: OmniSeal (tradename) supplied by Saint-Gobain (USA), Taf Trading Co. Ltd., Seal Tech Inc., Japan Seal Industries Co. Ltd, Nishiyama Corporation, etc.; Turcon (tradename), Variseal (tradename) supplied by Trelleborg Sealing Solutions Japan KK. Here, Turcon is a sign representing the material that is normally PTFE (polytetrafluoroethylene) but there are other products employing, besides PTFE, PE (polyethylene), and hence sometimes they may simply be called Variseal. As an example of seal ring, the configuration of seal ring is shown in FIG. 27 and FIG. 28. A seal ring is a packing of spring-loaded Teflon (tradename) comprising a seal part made of resin 103 and metal spring part (example of ring-shaped member in metal) 104. The spring part is fitted into the opening (inside of opening of sealing part 103) of ring-shaped elastic member to provide the action and effect to improve the sealing properties of seal part 103.

Since the seal part 103 is short of autogenous shrinkage properties, it is short of sealing properties if it is used as is. Consequently, if an element of reference numeral 104 having pressurizing properties (also called loading properties) is fitted into the opening, seal part 103 shrinks and improves sealing properties.

When the fluid pressurization is carried out, the pressurized fluid enters the opening and the seal ring expands due to the force (pressure) of pressurized fluid and adheres tightly to surrounding surfaces, and as, therefore, sealing effect to close off the pressurized fluid improves further, no leakage of pressurized fluid occurs.

The seal ring 89 and the seal ring 90 require sliding properties. For this reason, as materials used for the sealing part 103, one can cite: Teflon (tradename)-based resins represented by PTFE (polytetrafluoroethylene) and PFA; silicone-based resins; high-density polyethylene, etc. Spring part 104 can also be a commercially available O-ring which uses spring steel, stainless steel, or a resin, thermoplastic elastomer or NBR (acrylonitrile-butadiene rubber) [ring-shaped member made of (comprising) metal, ring-shaped member made of (comprising) resin].

Moreover the effect of a seal with loading or pressurizing properties can be sufficiently exerted also by an O-ring using fluorine-contained rubber, silicone rubber or polyurethane rubber, and with a cross-sectional shape of circle, circular arc, semi-circle, triangle, square or polygon (example of ring-shaped member made of resin), or also by a coil spring (example of ring-shaped member made of metal).

Spring part 104 can be either in a form of comb with cut slits or C-shaped wherein a small hole is provided at the summit of C so that the pressurized fluid can be introduced into it. A metallic spring part can be fabricated by sheet-metal processing, and the one in resin can be fabricated by machining or shaving by means of a machine tool, or by a resin processing means represented by injection solid molding, injection blow molding, pressure forming-injection molding, injection foam molding, etc. As a material in cases of resin, a thermosetting resin as well as a thermoplastic resin can be used. Alternatively, it can be a thermoplastic elastomer.

With respect to the loading direction of spring part 104, it is configured so that the seal ring may thrust the portion (sealing part 103 made of resin) in contact with the lateral face (sliding surface) of shaft body for extruding, for example the lateral face of ejector pin in the case of ejector pin.

Spring part 104 can assume a comb form as mentioned previously; the cross-section can be C-shaped, circular, polygonal, or in any other form without limitation as long as it can perform the function of tightening.

While it is not always needed to utilize a spring part, etc., the loading with a spring improves the properties of adhesion to ejector pin and can reduce the leakage of pressurized fluid from the ejector pin when the fluid pressurization is effected on the resin in the cavity. Seal part 103 made of resin and spring part made of metal (example of ring-shaped member made of metal) 104 are provided. The spring part is fitted into the opening of ring-shaped elastic member to furnish it with the action and effect to enhance sealing properties.

The height of the portion (inner lip) directly in contact with ejector pin in FIG. 27 is made to be preferably higher than that of the outer portion (outer lip), but both portions can be made to present an identical height.

Figure 79A:
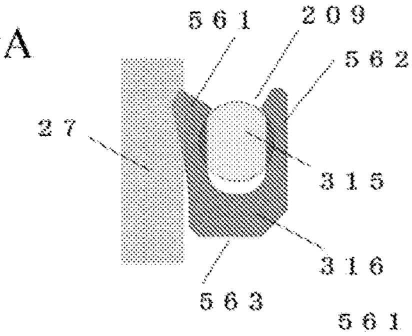
FIGS. 79A and 79B are schematic diagrams representing L-seal (L-shaped seal) and U-seal (U-shaped seal), L-seal and U-seal being collectively called "K-seal".
Figure 79B:
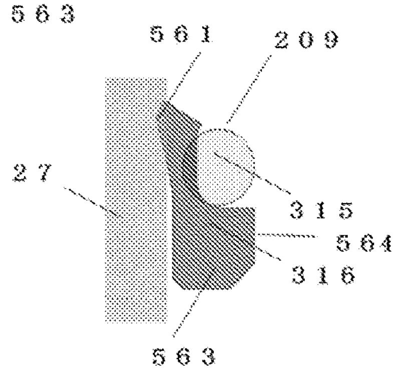

FIG. 79A and FIG. 79B illustrate other configurations of seal ring. Each of them is respectively referred to as: "L-shaped seal", L-shaped type" (FIG. 79A); or "U-shaped seal", U-shaped type" (FIG. 79B), indicating its characteristics. In the case of L-shaped seal, it is installed on outer side as shown in FIG. 79B. What corresponds to element of reference numeral 319 in FIG. 79A and FIG. 79B is element of reference numeral 103 in FIG. 27, what corresponds to element of reference numeral 315 in FIG. 79A and FIG. 79B is element of reference numeral 104 in FIG. 27. In FIG. 79A and FIG. 79B, cases were presented as examples where, instead of a comb-shaped element made of metal, commercially available O-rings were utilized. Needless to say, any shaped element including afore-mentioned comb-shaped one of reference numeral 104, afore-mentioned O-ring, coil spring, etc. can be utilized as long as it is a shaped element presenting pressurization or loading properties.

Omniseal, Variseal and U-shaped seal have a structure that incorporates an element to supplement the low elasticity of a U-shaped (concave) resin portion (reference numeral 103), for example an anti-corrosive metal (e.g., stainless steel) spring to boost the low elasticity of, for example, PTFE of PTFE cover (reference numeral 103). This structure enables the reinforced element to press the lip portion (reference numeral 561, reference numeral 562) against the seal surface to seal the device more securely, by the elasticity of metal spring when under a low pressure, or by the pressure of fluid as well as by the elasticity of metal spring when under a high pressure. Moreover, as the element of reference numeral 103 expands by pressurized fluid also on the surface 563, the pressure is exerted and produces a sealing effect. Thus, the sealing effect obtained by exploiting the differential pressure of pressurized fluid is called "self-sealing" and such a structure is called "self-sealing structure.

In the case of L-shaped seal, lip 561 is present only in the part where it comes in contact with the ejector pin. In this L-shaped seal, lip 561 performs sealing action by contacting ejector pin 27, and although lip 562 present in U-shaped seal is absent here, when it is used as a seal on ejector pin 27 for example, because seal 55 is used on lower seal plate 53 as well as on upper seal plate 54 and these seals 55 perform the sealing action, there is no problem. All of Omniseal, Variseal, and K-seal (U-shaped seal, L-shaped seal) expand by themselves and enhance the sealing effect. Where necessary, in certain cases, as a seal for an ejector pin, a commercially available back-up ring (not illustrated) or slide ring (FIG. 80) may be employed.

In the publicly known document of Japanese published unexamined application No. H11-216748, a solution employing a concave-shaped packing is illustrated in FIG. 3. However, no description is given about the device to ensure the adhesion to ejector pin (i.e., the solution described in the present invention: embedding into a concave-shaped element a spring of metal elastic body or an O-ring of ring-shaped elastic body). In the case of high pressure fluid, it is needed to ensure the adhesion to ejector pins etc. as indicated in the present invention even when the pressurization is not carried out.

The publicly known document of Japanese unexamined application No. 2011-255541 (the molding method of publicly known document of Japanese unexamined application No. 2011-255541 is not that of pressure forming-injection molding but that of gas counter pressure and different from that of present invention) describes the sealing of ejector pins by using a U-shaped packing, but this document also does not describe the feature of embedding an element like spring into the U-shaped element.

The publicly known document of Japanese unexamined application No. H11-216746 (the molding method of publicly known document of Japanese unexamined application No. H11-216746 is not that of pressure forming-injection molding but that of gas counter pressure and different from that of present invention) describes the sealing of ejector pins by using a seal member, but it does not present any specific description of the seal member.

As described above, no publicly known document presents the feature of combined use of a device to enhance the adhesion to ejector pins as described in the present invention (spring of ring-shaped member made of metal as exemplified by the spring or coil spring of reference numeral 104 in FIGS. 27 and 28, or O-ring of ring-shaped member made of resin).

Incidentally, a member signifies a component part constituting a structure.

In order to reduce the sway of ejector pins or the like and protect a seal ring to ensure the long service life of mechanism and function, a slide ring illustrated in FIG. 80 may be embedded.

A slide ring can be provided on both the upper side and the lower side of a seal ring by sandwiching it. A slide ring can be provided only on the upper or the lower side of it. In order to enhance the sealing properties, two or more of seal rings can be employed on a shaft body for extruding.

As a material for a slide ring, those with abrasion resistance, self-lubricating properties and sliding properties are desirable, including: Teflon, POM (polyoxymethylene), high-density PE (polyethylene), alloy of Teflon and PE, silicone resin, silicone rubber, etc.

In certain cases, in order to reduce the sagging of slide ring, such lubricants as Teflon grease, silicone oil may be applied. "Sagging" signifies the deterioration of function and performance of an element itself (Means to Form Hollows in Thick Portions)

(Both the Injection Blow Molding and the Pressure Forming-Injection Molding are Carried Out on a Same Molded Article)

Both injection blow molding and pressure forming-injection molding are carried out on a same molded article, to derive an article in which hollows are formed in thick portions and pressure forming is effected on other thin portions, and thus to obtain a molded article with few sink marks. Describing more concretely, in the beginning hollows are formed while the pressure forming is being effected (while the fluid pressurization is being carried out). On this occasion, with respect to pressure of pressurized fluid and time for carrying out pressure forming or blow molding, the parameters defining the relationship between pressure of pressurized fluid and time are identified as follows: for the process of pressure forming, P1 as pressure of pressurized fluid, T1 as delay time, T2 as pressurization time, T3 as retention time, T4 as atmospheric discharge time; for the process of blow molding, P2 as pressure of pressurized fluid, t1 as delay time, t2 as pressurization time, t3 as retention time, t4 as atmospheric discharge time. By setting up these parameters so that all of those for pressure forming may be higher than those for blow molding, i.e., P1≥P2, T1≥t1, T2≥t2, T3≥t3, a molded article without sink marks is obtained wherein hollows are formed only in thick portions and the pressure forming is effected in other portions.

The pressure of pressurized fluid can be reduced by installing the gas injection pin for blow molding at the flow end (portion where the injection pressure of molten resin is low). On the other hand, if the gas injection pin is installed in the vicinity of gate (portion where the injection pressure of molten resin is high), a molded article with a large hollow rate can be obtained. Needless to say, blow molding process can be carried out also by using pressurized fluid from the nozzle or the sprue runner of injection molding unit.

This mode of fluid pressurization is feasible also in the case of a resin provided with foaming properties; in this case also related parameters are set so as to ensure the relationships: P1≥P2, T1≥t1, T2≥t2, T3≥t3. T4 and t4 can be set at an appropriate value.

(Mold Structure: Ejector Box Type)

As shown in FIG. 2, sealed mold 141 presents a box structure enclosing an ejector mechanism. Here the ejector mechanism signifies ejector pins 27 and ejector plate. The ejector plate comprises upper ejector plate 28 and lower ejector plate 29. As shown in FIG. 2, the ejector plate fixes ejector pins 27 by holding the flanged part provided at the base end section of ejector pin 27 between upper ejector plate 28 and lower ejector plate 29, ejector pins 27 passing through holes perforated on ejector plate 28.

Incidentally, although the illustration is omitted, in mounting plate 23 on the movable side, perforated holes are provided in a part of area facing lower ejector plate 29. These perforated holes are those through which the ejector rods (not shown) linked to the clamping cylinder and platen of the injection molding unit are inserted. The ejector rods make a reciprocating movement driven by the reciprocating movement of an actuator, for example, a hydraulic cylinder or an electric motor. The ejector pins make a reciprocating movement in conjunction with the reciprocating movement of the actuator and the ejector plate.

With sealed mold 141, the pressurized fluid is injected (in this case, since the action concerns a large space that is ejector box, it has a more intense shade of meaning of injection rather than that of ejection) not only into cavity 200 composed of cavity 30 on the stationary side and cavity 31 on the movable side but also into space 52 formed by ejector box 51. In this case, as sealed mold 141 is able to make the pressurized fluid act on the surface of resin in cavity 200 through the clearances around ejector pins 27 as an example of shaft body, the effect of fluid pressurization can be fully achieved. Here, the clearances around ejector pins 27 signify those between ejector pins 27 and the perforated holes formed in nested element 34 constituting a part of movable side mold 202.

Incidentally, ejector box 51 signifies a structure (box structure) that encloses and hermetically seals off the ejector mechanism within an enclosed space and is represented in FIG. 2 with dashed lines.

Sealed mold 141 is provided with stationary side mold 201 and movable side mold 202. Here, sealed mold 141 is an example of mold device. Stationary side mold 201 is an example of the first mold. Movable side mold 202 is an example of the second mold.

Movable side mold 202 can be made to contact or separate from stationary side mold 201 with parting 26 serving as a boundary plane.

Stationary side mold 201 comprises: mounting plate 22 on the stationary side to mount stationary side mold 201 on the injection molding unit (not illustrated); and stationary side mold plate 78 mounted on mounting plate 22 on the stationary side. Mounting plate 22 on the stationary side is touched by the nozzle of injection molding unit, and fitted with a sprue bush 24 provided with a perforated hole to conduct a molten resin. Mold plate 78 is provided with: cavity 30 on the stationary side; sprue 25 to conduct the molten resin flowing from sprue bush 24 to cavity 30 on the stationary side; nested element 32 on the stationary side; and slide-core 36.

Movable side mold 202 comprises: mounting plate 23 on the movable side to mount movable side mold 202 on the injection molding unit (not illustrated); and movable side mold plate 87 mounted on mounting plate 23 on the movable side. Mold plate 87 is provided with: ejector pins 27 to expel a molded article from the cavity; upper ejector plate 28 and lower ejector plate 29 which fix the ejector pins as well as make them make a reciprocating movement; cavity 31 on the movable side; nested element 34 on the movable side; slide-core 37; connecting port 48 to introduce the pressurized fluid prepared by device 140 for preparing pressurized fluid into space 52 within ejector box 51; and passageway 49 of pressurized fluid.

Moreover, sealed mold 141 is provided with various types of seals in order to prevent the pressurized fluid from leaking to the outside of sealed mold 141. More specifically, sealed mold 141 is provided with: seal 38 provided for preventing the leakage of pressurized fluid from sprue bush 24; seal 39 between mounting plate 22 on the stationary side and mold plate 78 on the stationary side; seal 39 between mounting plate 23 on the movable side and mold plate 87 on the movable side; seal 40 installed on the parting; seal 41 on the surface of slide-core provided on the stationary side; seal 42 on the surface of slide-core provided on the movable side; seal 43 provided on lower ejector plate 29; lower seal plate 44 of the bottom of the nested element on the stationary side; upper seal plate 45 of the bottom of the nested element on the stationary side; and seal 46 provided between seal plate 44 and seal plate 45.

Incidentally, code (arrowhead) 47 indicates the flow direction of pressurized fluid. However, code 47 on stationary side mold 201 is omitted from illustration here because it is similar to that on movable side mold 202. Furthermore, code 33 indicates the clearance in the joining part of the nested element on the stationary side, and code 35 indicates the clearance in the joining part of the nested element on the movable side. Regarding pressurization pin 50, FIGS. 4 to 17 describe the detailed structure of it and the structure of its incorporation into the mold.

Sealed mold 141 is further provided with: injection means 56 for injecting the pressurized fluid into space 52 formed by ejector box 51; ejection means 57 for ejecting the pressurized fluid directly into the resin in cavity 200 so as to pressurize directly the resin in cavity 200 by fluidic pressure from the stationary side; ejection means 58 (ejection means 58 at upper side of the drawing in FIG. 2) for ejecting the pressurized fluid directly into the resin in cavity 200 so as to pressurize directly the resin in cavity 200 by fluidic pressure from the movable side; ejection means 59 for ejecting the pressurized fluid directly into the resin in cavity 200 from slide-core 36 on the stationary side so as to pressurize the resin in cavity 200 by fluidic pressure; and ejection means 60 for ejecting the pressurized fluid directly into the resin in cavity 200 from slide-core 37 on the movable side so as to pressurize the resin in cavity 200 by fluidic pressure.

In the case where the structure used in lower seal plate 44 and upper seal plate 45 is provided at the bottom of slide-core 36 on the stationary side and slide-core 37 on the movable side, it is possible to pressurize indirectly the resin in cavity 200 by fluidic pressure.

With ejection means 61, the resin in cavity 200 is pressurized by fluidic pressure from the stationary side through clearances of nested element 32 by injecting a pressurized fluid into the clearance between lower seal plate 44 and upper seal plate 45.

Figure 47:
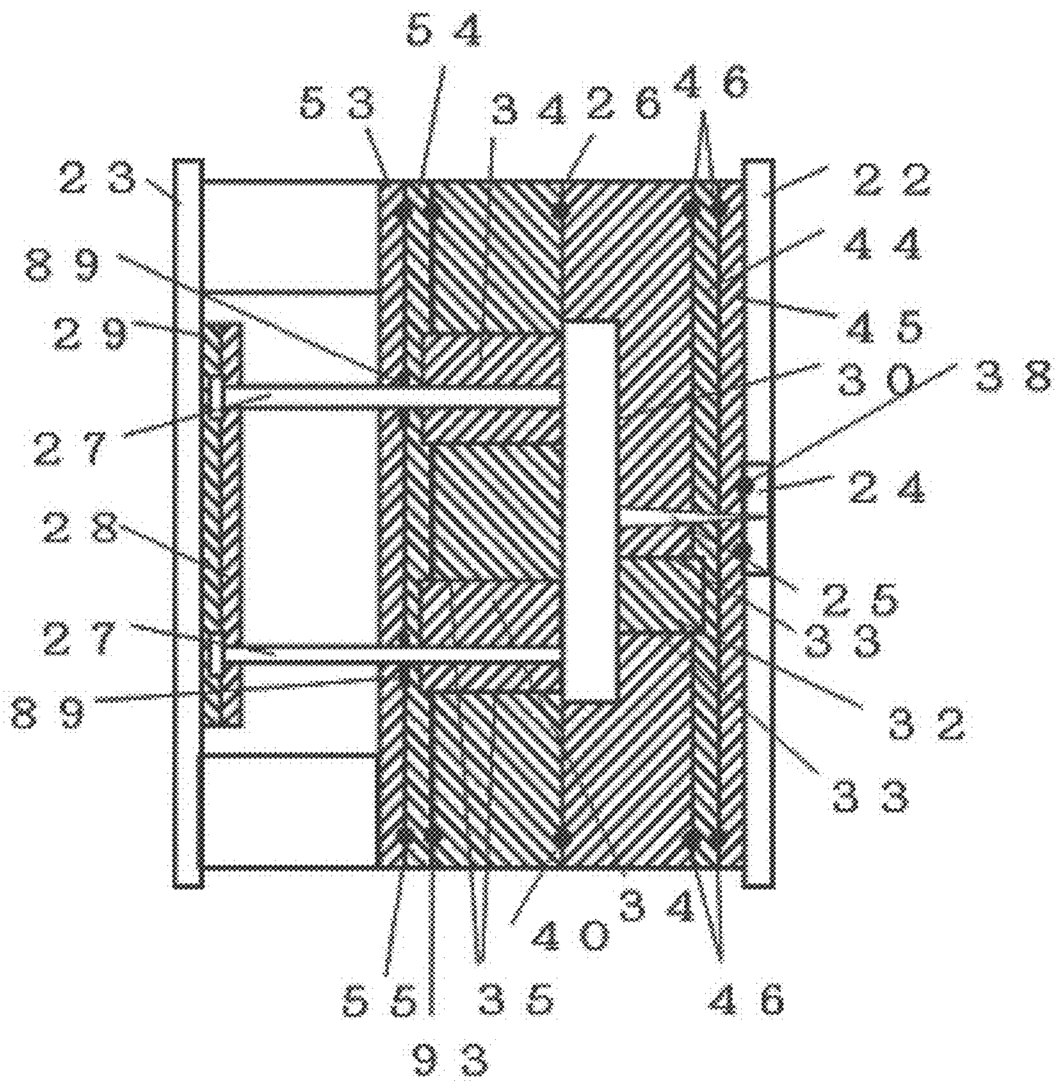
FIG. 47 is a schematic diagram of a mold wherein the seal-plate is extended to the outside of mold.

FIG. 3 illustrates a structure where plate 53 and the 54 are provided at the bottom part of the nested element. FIG. 47 differs from this, illustrating a structure where plate 53 and plate 54 are fixed by holding them between the ejector block and the movable side mold plate. The means like this can be exploited also in the slide-core on the stationary side.

Figure 23:
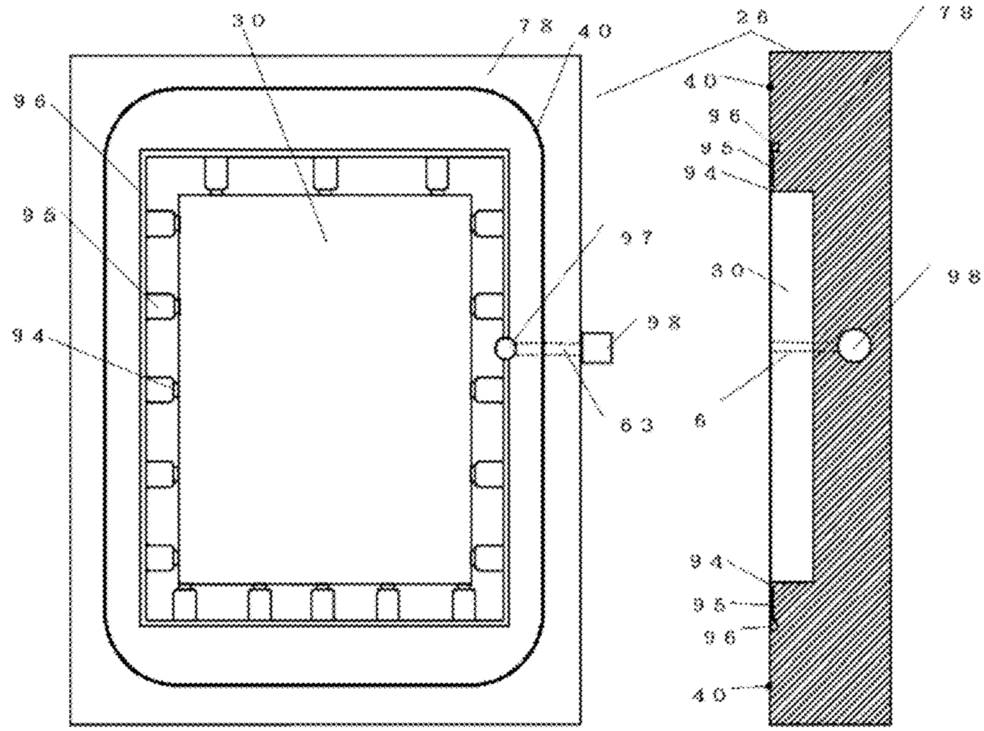
FIG. 23 is a schematic diagram representing a gas vent and the like at the parting of a mold.

The function of valve 62 is to prevent the occurrence of short-mold, discoloration or burn of molded articles by venting the air in cavity 200 to the outside of sealed mold 141 through parting 26, while the resin is injected into cavity 200. Valve 62 is kept open until cavity 200 is filled with a resin (injection of resin is completed), and the air displaced by filling cavity 200 with resin is expelled to the outside through this valve 62. FIG. 23 illustrates the detailed structure of the parting of mold configured as a means for venting the air.

The air in cavity 200 is exhausted from a gas vent (not illustrated) or the like provided in parting 26 through passageway 63 provided for exhaust within sealed mold 141. Code 64 is a pressure resistant hose with high-pressure specifications for connecting to valve 62 provided for exhaust of the air in cavity 200. Code (arrowhead) 65 indicates the flow of exhaust air in cavity 200. Code 66 indicates the air in cavity 200 that has been exhausted into the atmosphere.

As the air in cavity 200 is pushed out of it to lower seal plate 44 and upper seal plate 45 on the stationary side, valve 67 with the same function as that of valve 62 is provided on these seal plates.

It is also possible to let the automatic on-off valve 15 in FIG. 1 have the mechanisms and functions of valve 62, valve 67 and valve 68. Valve 62, valve 67 and valve 68 are abolished, and hose 64 is connected to automatic on-off valve 15. Valve 15 is kept open to exhaust the displaced air in the cavity while the cavity is being filled with a resin. Valve 15 is closed on completion of the filling and valve 14 is opened to pressurize the resin by fluidic pressure. By these measures, the fluid pressurization can be carried out without using such an element as valve 62 within the mold. Although the above description has indicated that the mechanisms and functions of valve 62, valve 67, and valve 68 are substituted by that of valve 15, the number of valves 15 employed needs not be one but it can be three corresponding to valve 62, valve 67, and valve 68, or it can be more than three.

Incidentally, other structural components provided on sealed mold 141, for example, mold support plate, support pillar, return pin and return spring of ejector, guide pin and guide post, and the like are not illustrated in FIG. 2.

As a fluid used in sealed mold 141, a gas is preferable rather than a liquid. Sealed mold 141 provided with ejector box 51 does not need to have plate 53, plate 54 and seal 55 in FIG. 3 to be described later.

(Ejector Box 51)

The characteristic of sealed mold 141 is that cavity 200 is closed and makes up a "hermetically-enclosed space (sealed mold)" at the stage where stationary side mold 201 and movable side mold 202 are clamped, and the nozzle of the injection molding unit touches sprue bush 24. In order to enable the system to realize this state, seals 38-43 are employed.

(Direct Pressurization and Indirect Pressurization)

"Direct pressurization" is a method to pressurize by fluidic pressure the resin in cavity 200 by making the pressurized fluid act directly on the resin in cavity 200 by means of pressurization pin 50, pressurization ejector pin 227 and pressurization ejector pin 500. "Indirect pressurization" is a method to pressurize by fluidic pressure the resin in the cavity by introducing the pressurized fluid into a space other than the mold cavity 200 and by letting the fluid get to the resin in cavity 200 through clearances 35 in nested element 34, clearances along ejector pin 27, clearances around core pin and the like. As methods other than these, there are such means as the one in which the pressurized fluid is introduced to the bottom of nested element 34 or the like component to move the nested element and pressurize by it.

(Direct Pressurization)

Ejection means 58 illustrated in FIG. 2 can be used in the case where the resin in cavity 200 is pressurized directly. Ejection means 58 is equipped with connection ports 48, passageways 49 for pressurized fluid, and pressurization pins 50. Connection ports 48 are linkage part for connecting one end of a pressure-resistant hose conducting pressurized fluid. The other end of the pressure-resistant hose is connected to piping 17 of the device for preparing pressurized fluid shown in FIG. 1. Specifically, the other end of the pressure-resistant hose is connected to the terminal part of piping 17 in FIG. 1. The direct pressurization can be carried out also by using means illustrated in FIG. 2 and FIGS. 63-73 (use of pressurization ejector pin 227 or pressurization ejector pin 500).

Passageways 49 is a hole formed in mold plate 78 on stationary side mold 201 or in mold plate 87 on movable side mold 202, the hole serving for conducting to cavity 200 and space 52 the pressurized fluid flowing out of the pressure-resistant hose through connection port 48. Pressurization pin 50 has ejection port formed at the apical end and a perforated hole connecting the ejection port to the base end section. Because the base end section of a pressurization pin 50 is connected to passageway 49, the pressurized fluid coming from passageway 49 is conducted through the perforated hole in the pressurization pin 50 and ejected into cavity 200 from the ejection port.

Because the ejection port formed at the apical end of pressurization pin 50 comes in touch with the surface of resin filled in the cavity, the pressurized fluid coming out of the ejection port enters the clearances between the resin in cavity 200 and the cavity wall. That is to say, in the case where the pressurized fluid is ejected into the movable side cavity through the ejection port provided on movable side mold 202, the resin is pressurized by fluidic pressure in the direction from movable side mold 202 toward stationary side mold 201. In other words, the resin in cavity 200 is pushed against stationary side cavity 30 by the pressurized fluid.

Moreover, in an opposite way, in the case where the pressurized fluid is ejected into the stationary side cavity through the ejection port provided on stationary side mold 201, the resin is pressurized by fluidic pressure so that it is pushed in the direction from stationary side mold 201 toward movable side mold 202. In other words, the resin in cavity 200 is pushed against movable side cavity 31 by the pressurized fluid.

Incidentally, in the case where the pressurized fluid is employed to pressurize the resin in cavity 200 by fluidic pressure, seal 40 is provided for the purpose of preventing the pressurized fluid from escaping to the outside from parting 26 which constitutes a matching surface between movable side mold 202 and stationary side mold 201. As a material for seal 40, O-ring, plate-shaped rubber sheet (sealing component) and the like can be cited for example. The said sealing component is provided on the entire surface or a part of parting 26.

Sealed mold 141 is sealed (encapsulated) by seal 43 provided in lower ejector plate 29, when the molds on the movable side and the stationary side are closed and ejector pins 27 retract. For this reason, sealed mold 141 is able to prevent the leakage of pressurized fluid through the clearances between the ejector rod (not illustrated) and the perforated hole (not illustrated) formed on movable side mounting plate 23 into which an ejector rod is inserted. In other words, sealed mold 141 is provided with seal 39 between movable side mounting plate 23 and ejector box 51, and a seal (not shown) also between ejector box 51 and movable side mold plate 87. As a material for seal 43, O-ring, plate-shaped rubber sheet (sealing component) and the like can be cited for example.

Although the pressurized fluid acting on the surface of resin in cavity 200, as aforementioned, enters space 52 of ejector box 51 after passing through the clearances along ejector pins 27 and the clearances in nested element 34, there is no possibility that the fluid leaks to the outside of sealed mold 141, since all the matching surfaces are sealed.

In the case where the pressurized fluid is made to pressurize by fluidic pressure the resin in cavity 200 by ejecting the fluid into cavity 200 only from ejection means 58, the pressurized fluid enters, as aforementioned, space 52 in ejector box 51. As a result, in the case where sealed mold 141 is employed to carry out the pressure forming-injection molding process, the action and effect of fluid pressurization is at a low level unless the pressure of pressurized fluid in space 52 in ejector box 51 becomes comparable to that of pressurized fluid acting on the resin in cavity 200.

In the case where sealed mold 141 is employed to carry out a pressure forming-injection molding process, it is desirable to eject the pressurized fluid into the space of cavity 200 from ejection means 58 and at the same time to inject the fluid into space 52 of ejector box 51 from ejection means 56 to fill space 52 of ejector box 51 with the pressurized fluid. By doing so, the pressure of pressurized fluid in space 52 of ejector box 51 can quickly be made comparable to that of pressurized fluid ejected into the resin in cavity 200 by means of ejection means 58.

Incidentally, the exhaust of the pressurized fluid injected into space 52 and the pressurized fluid injected into cavity 200 can be carried out simultaneously or separately by setting up a specific timing of exhaust for each compartment. Needless to say, in the case where ejection means 56 and 58 are used for exhausting the pressurized fluid, the pressurized fluid is not flowing in the pressure-resistant hoses connected to ejection means 56 and 58, and hence the said pressure-resistant hoses should be opened to the atmosphere. Specifically, it is the state where, with respect to the pressure-resistant hose connected to the end of piping 17 in FIG. 1, filling valve 14 is closed and the blowout valve 15 is opened.

The exhaust of the pressurized fluid injected and ejected into space 52 and cavity 200 can be carried out by using an exhaust means (not illustrated) provided exclusively for this purpose in the movable side mold, apart from using ejection means 56 and 58.

(Indirect Pressurization from Movable Side)

In the case where the indirect pressurization is carried out in the movable side mold, the pressurized fluid is injected into space 52 in ejector box 51 from ejection means 56. The pressurized fluid injected into space 52 enters cavity 200 through clearances 35 in the nested element, clearances along ejector pins 27, and the like, and effects fluid pressurization on the surface of resin in cavity 200 in the direction from movable side toward stationary side.

At locations requiring pressurization particularly, pressurization pins 50 presented in FIGS. 4-17 are provided as needed. The apical end of these pressurization pins 50 is configured so as to contact the surface of the resin in the cavity. Moreover, the rear end section (base end section) of these pressurization pins 50 is configured so as to fit into ejector box 51. By these means, if the pressurized fluid is injected into space 52 of ejector box 51, the fluid can perform the fluid pressurization at the necessary locations in cavity 200. Incidentally, the number of pressurization pin can be plural. Furthermore, in the case where the indirect pressurization is performed in the movable side mold 202, since the pressurized fluid is not ejected from ejection means 58, it is not needed to provide ejection means 58 in movable side mold 202.

Because sealed mold 141 with ejector box 51 is hermetically enclosed, the air in the cavity which causes, while the cavity is being filled with a resin, short-mold, discoloration or burn of molded articles relocates into space 52 through clearances 35 of the nested element, clearances along ejector pins 27 and the like. Thanks to this, the sealed mold 141 is able to inhibit the occurrences of short-mold, discoloration and burn.

(Fluid Pressurization from Stationary Side)

In the case where the direct pressurization is performed from stationary side mold 201, ejection means 57 presented in FIG. 2 and FIG. 3 is used. In the case where the indirect pressurization is performed from stationary side mold 201, ejection means 61 presented in FIG. 2 and FIG. 3 is used. If the pressurized fluid is ejected from at least either one of ejection means of 57 and 61, the fluid pressurization is effected on the resin in cavity 200 in the direction from stationary side mold 201 toward movable side mold. Detailed descriptions are omitted since ejection means 57 and 61 have the constituents similar to those explained for ejection means 58, i.e., connection port 48, passageway for pressurized fluid 49 and pressurization pin 50.

Ejection means 61 injects the pressurized fluid into the interstice between upper seal plate 45 and lower seal plate 44. As a consequence, the injected pressurized fluid enters stationary side cavity 30 and pressurizes by fluidic pressure the resin in cavity 200 in the direction from stationary side mold 201 toward movable side mold 202.

Incidentally, as aforementioned, for the direct pressurization of movable side mold 202, ejector box 51 can be provided with the rear end section of pressurization pin. Similarly, for the direct pressurization of the stationary side mold 201, stationary side mold 201 may be provided with a pressurization pin in such a manner as that the rear end section of the pressurization pin may be located between lower seal plate 44 and upper seal plate 44.

(Direct Pressurization from Stationary Side)

If ejection means 57 is employed to eject the pressurized fluid into cavity 200 to pressurize directly the resin in cavity 200, the pressurized fluid ejected into cavity 200 tends to escape through clearances 33 on nested element 32, similarly as in the case of fluid pressurization in movable side mold 202. In order to solve this problem, the bottom (face opposite to the side of cavity 200) of nested element 32 on the stationary side is received by lower seal plate 44, and seal 46 is provided between seal plate 44 and seal plate 45. By this disposition, the leakage of pressurized fluid through clearances 33 of nested element 32 can be prevented. Although not illustrated, it is desirable, as needed, to provide a seal on the bottom (face opposite to the side of cavity 200) of nested element 34 on the movable side. Moreover, it is desirable to provide seal 39 also between stationary side mounting plate 22 and stationary side mold plate 78.

Ejection means 61 is an ejection means of pressurized fluid used for injecting the pressurized fluid between lower seal plate 44 and upper seal plate 45. The pressurized fluid injected by using ejection means 61 flows through clearances 33 of nested element 32 and attains to the stationary side parting and pressurizes by fluidic pressure the resin in cavity 200 in the direction from stationary side mold 201 toward movable side mold 202.

At locations requiring pressurization particularly, pressurization pins presented in FIGS. 4-17 are provided as needed similarly as in the aforementioned case of the movable side. The fluid pressurization can be performed simply by injecting the pressurized fluid into the interstice between lower seal plate 44 and upper seal plate 45.

(Reason Why Pressurized Fluid can be Injected into (Can Enter) Clearances Between the Resin and the Mold by Ejecting Pressurized Fluid into Clearances)

The pressure at which a resin is filled into the cavity is called "filling pressure" or "injection pressure" and is expressed by a value in MPa, $kg/cm^2$ (square centimeter) or by a percentage (%) value over the maximum injection pressure of the injection molding unit.

Moreover, the velocity at which a resin is filled into the cavity is called "filling speed" or "injection speed" and is expressed by a value in mm/sec (second) by using the displacement speed of the screw of injection molding unit, or by a percentage value (%) over the maximum injection pressure of injection molding unit.

Furthermore, the hourly volume or weight of resin filled into the cavity is called "filling rate" or "injection rate" and expressed in ml (milliliter)/sec, cc/sec, $cm^3$ (cubic centimeter)/sec, or g (gram)/sec.

The process of filling a molten resin into the cavity is described separately for the period during which the filling proceeds and for the time at which the filling is completed. Incidentally, for simplifying the description, the ABS, a thermoplastic resin, is adopted as the resin to be used.

In the injection process of injection molding unit, the maximum pressure acting on the molten ABS in the heating cylinder is about 200 MPa, a very high pressure. However, the pressure of the said molten ABS is reduced to around 30 MPa when the resin arrives at the inside of cavity due to pressure loss while it flows through the nozzle, the sprue-runner of mold and the gate of the injection molding unit.

While the filling of cavity with resin is not yet completed, the pressure of such a resin in the process of filling, i.e., of around 30 MPa, is not so high. That is because there is still space left unfilled in the cavity. In other words, that is because the ABS in the cavity has not yet reached its flow end and is in a state of short-mold, and consequently it is not yet subjected to the force with which the cavity wall pushes back the resin when the cavity is eventually filled completely with resin (in this case the reactionary force developed by the wall).

Normally, as the surface temperature of cavity wall is lower than that of filled ABS, the surface of ABS is cooled and solidified at the same time when the cavity is filled with ABS, and a skin layer is formed on the ABS surface. In other words, because ABS is solidified from the molten state, a volume contraction takes place and a clearance is formed between the cavity wall surface and the ABS surface.

If the pressurized fluid is introduced into this clearance, the pressure of pressurized fluid acts on the cavity wall surface as well as on the ABS that is not yet cooled and solidified. Since the ABS surface is more easily compressed than the cavity wall surface, the former is pressurized and compressed due to the pressure of pressurized fluid. This phenomenon is called "wedge effect". Due to the wedge effect, the entire body of resin in the cavity reaching as far as parting on the movable side, parting on the stationary side, slide-core parting on the stationary side or slide-core parting on the movable side, etc. is pressurized. In the case where a gas rib is provided, the pressurized fluid expands in the gas-rib and the resin in the cavity is pressurized partially due to the wedge effect. Incidentally, in order to make the wedge effect work sufficiently, it is better to use a lower pressure for filling the cavity with ABS. In such a case, it is possible to lower the pressure of pressurized fluid.

In the case where the ABS of the same volume as that of the cavity is filled, the volume of ABS decreases as the solidification of ABS progresses. In the solid injection molding process, the resin pressure keeping is carried out to compensate for the volume decrease due to cooling and solidification, wherein the ABS in the cavity develops a high pressure only after the resin pressure keeping is carried out. When the resin pressure keeping stops, as the pressure acting on the ABS filled in the cavity disappears, the volume of ABS in the cavity decreases. In other words, there exists a relationship that the cavity volume is larger than the ABS volume, and the cavity volume never becomes smaller than the ABS volume.

In the case where the fluid pressurization is carried out while the resin pressure keeping at a high pressure is performed, even if the ABS pressure is higher than the pressure of pressurized fluid (pressure of pressurized fluid<ABS pressure), and when the pressure of pressurized fluid becomes higher than the ABS pressure (pressure of pressurized fluid>ABS pressure) as the ABS pressure decreases while the cooling and solidification of ABS proceeds, the pressurized fluid achieves fully the effect of fluid pressurization on ABS.

As a means to lower the ABS pressure after the cavity is filled with ABS, in addition to the operation of retraction or suck-back of the screw of injection molding unit, a dummy shape or a disposable shape (also called "disposable cavity") is provided at the cavity end. The molten resin is injected with a volume exceeding the cavity volume to fill a portion of the dummy shape to make a short mold and lower the ABS pressure in the cavity.

Incidentally, the dummy shape can be made to have a thick dimension. Furthermore, the dummy shape can also be configured so that a shutter is provided which will be opened after the cavity is filled with ABS with a full pack, and the ABS is pushed out into the dummy shape under the pressure of pressurized fluid to lower the pressure of the ABS in the cavity. As other means to make the wedge effect work, we can cite the cases where the cavity surface is embossed or coated.

In the case where the resin pressure keeping is employed, since the ABS pressure in the cavity increases, the pressure of the pressurized fluid to be ejected into the cavity needs to be made higher. In such a case, the transcription performance of molded article is improved. However, because of residual internal strains, warpages and deformations are feared.

In a contrasting situation, in the case where the pressure of pressurized fluid is lowered by means of a short-mold, a molded article with a large profile area can be molded by an injection molding unit with a lower mold clamping force. The molded articles have few internal strains, warpages and deformations.

Although there is no limitation as to the thickness of a molded article to be manufactured by embodiment of the present invention, in the case of a thermoplastic resin, it is thicker than 1 mm and thinner than 5 mm, preferably in an approximate range between 1 mm and 4 mm.

(Partial Pressurization and Total Pressurization)

The fluid pressurization can be carried out on the totality of the molded article (for example the totality of the parting on the movable side) or on a portion of the molded article.

In the total pressurization, the pressurization pins are provided on the surface one wishes to pressurize (parting on the stationary side or parting on the movable side) to carry out the fluid pressurization. The number of pressurization pins is determined according to the surface area and the thickness of molded article.

In the partial pressurization, it is needed to encircle with a gas rib the area around a pressurization pin (the extent of area one wishes to pressurize including the pressurization pin) by providing a gas rib high enough (for example 1.5 mm) to prevent the pressurized fluid from leaking to the outside. The partial pressurization is an effective means to limit the area exposed to the action of pressurized fluid to the part where one wishes to reduce the occurrence of sink marks or to improve the transcription performance.

In order to carry out the partial or total pressurization, if nested elements 32 and 34, and ejector pin 27 are absent in stationary side mold 201 and movable side mold 202, the fluid pressurization can be carried out by installing pressurization pin 50 in the cavity and by using only pressurization pin 50. However, in the case where nested element 32 or nested element 34, or ejector pin 27 exists in stationary side mold 201 or movable side mold 202, if the pressurized fluid ejected into cavity 200 leaks to the outside, lower seal plate 53 under nested element 34 on movable side mold 202 and upper seal plate 54 under the nested element on the movable side are used. The molded article 1 and the molded article 2 in the working example are molded articles manufactured by the total pressurization. The molded article 3 is an article manufactured by the partial pressurization.

(Venting of Air)

In the stationary side molds 201 and 205, because of the use of lower seal plate 44, upper seal plate 45 and seal 46, the air in cavity 200 is deprived of the space for venting during the filling of cavity 200 with resin. Similarly, in movable side molds 202 and 206, because of the use of lower seal plate 53, upper seal plate 54 and seal 55, the air in cavity 200 is deprived of the space for venting during the filling of cavity 200 with resin. For this reason, sealed mold 142 using stationary side mold 201 and movable side mold 202 can possibly cause the occurrences of short-mold, discoloration or burn.

In order to prevent the occurrences of short-mold, discoloration or burn, in sealed molds 141 and 142, a suitable way is contrived for venting the air in the cavity to the outside of cavity during the filling with resin by providing a means to discharge a fluid (an example of discharge portion) for letting out a gas from nested element 32 in stationary side molds 201 and 205, and by providing also a space at the bottom of upper seal plate 45 (face opposite to the side of cavity 200). In sealed molds 141 and 142, a suitable way is contrived for venting the air in the cavity to the outside of cavity during the filling with resin by providing a means (an example of discharge part) to discharge a fluid for letting out a gas from nested element 34 in movable side molds 202 and 206, and by providing also a space at the bottom of upper seal plate 54 (face opposite to the side of cavity 200).

Specifically, in stationary side molds 201 and 205, a small space is provided between upper seal plate 44, lower seal plate 45, and seal 46. In movable side molds 202 and 206, a small space (for example, spaces 102 in FIG. 19) is provided between upper seal plate 54, lower seal plate 53, and seal 55.

FIG. 18 illustrates the structure of lower seal plate 53, upper seal plate 54 and seal 55 in FIG. 3. Lower seal plate 53 and upper seal plate 54 differ from lower seal plate 44 and upper seal plate 45 in that, since stationary side molds 201 and 205 have ejector pin 27, the former two elements have hole 83 (FIG. 19) into which ejector pin 27 is inserted (in which it slides) and depressed part 82 accommodating seal ring 89 (an example of ring-shaped elastic member).

However, in stationary side mold 201 or 205, in the case where a push-out pin, kicker pin or knock-out pin is used, because ejector pin 27 is to be used, it is needed to form depressed part 82 to accommodate seal ring 89, in lower seal plate 44 and upper seal plate 45.

The means to discharge a fluid corresponds to valve 67 indicated in FIG. 2 and FIG. 3. Valve 67 is opened while cavity 200 is being filled with a resin to discharge out of sealed mold 141 the air displaced by filling with resin through clearance 33 in nested element 32 and through the groove provided between lower seal plate 44 and upper seal plate 45.

Incidentally, while FIG. 18 illustrates lower seal plate 53, upper seal plate 54 and seal 55 on movable side mold 206, since they differ from lower seal plate 44, upper seal plate 45 and seal 46 on stationary side molds 201 and 205 only in the aforementioned structure and are composed of almost the same elements, the description has been given by using FIG. 18.

As a means to discharge the fluid, instead of valve 67, it is possible to install a tank (not illustrated) with a volume several times as large as that of cavity 200 at the point where valve 67 is located. The air in cavity 200 displaced by filling the cavity with resin is transferred to the tank, and consequently the adiabatic compression can be prevented. For this reason, short-mold, discoloration and burn of the molded article can be prevented. However, the tank, as explained in regard to ejector box 51, needs to be filled with a pressurized fluid of the same pressure as that of the pressurized fluid.

In stationary side molds 201 and 205, in the case where there is an ejector pin or a kicker pin that is fixed and pushed out, it is needed to provide a configuration similar to that in ejector box 51. Stationary side molds 201 and 205 that have the same configuration as that of ejector box 51 can control the occurrences of short-mold, discoloration and burn, because the air in cavity 200 is pushed out by the filling of cavity 200 with resin. In this case, as the sealing action is effected by ejector box 51, lower seal plate 44, upper seal plate 45, and seal 46 can be dispensed with.

(Pressurization from Slide-Core)

The slide-core provided in stationary side mold 201 or movable side mold 202 has almost the same configuration as that of the aforementioned stationary side mold 201. In other words, the slide-core has, under the slide (bottom of nested element of slide), the same configuration as explained for the stationary side, comprising lower seal plate 44, and upper seal plate 45 and seal 46. Moreover, on the slide-core, in order to prevent the leakage of pressurized fluid from the matching surface between the core and the mold, a seal (seal 41 on the stationary side slide, seal 42 on the movable side slide, in FIG. 2) is provided likewise.

The ejection mechanism for pressurized fluid (direct pressurization, indirect pressurization) and the gas exhaust mechanism have the configuration similar to that presented for the aforementioned stationary side. Moreover, in the case where the occurrences of short-mold, discoloration and burn of molded articles are feared, it is also possible to provide valve 67 or a tank installed on stationary side mold 201, etc.

Figures 82A, 82B, 82C:
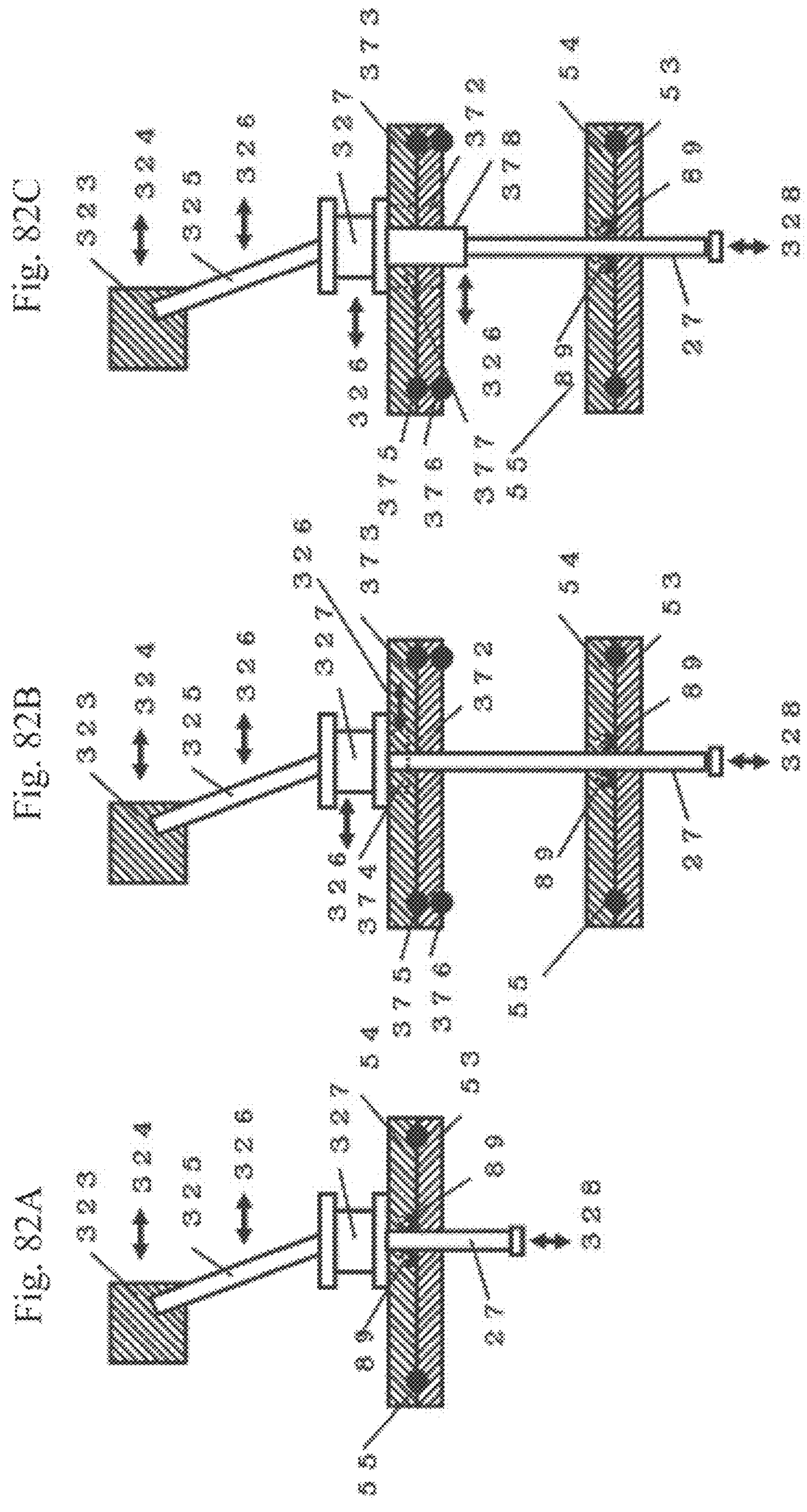
FIGS. 82A to 82C are schematic diagrams representing the sealing means of a slide (inclined core) of mold.

(FIGS. 82A to 82C)

FIGS. 82A to 82C illustrate the method to seal an inclined core (pin). In the case of inclined core, in the structure of ejector box illustrated in FIG. 2, a conventional structure can be utilized as is, wherein a slide unit is mounted on plate 28 and the slide unit is moved horizontally by the extrusion mechanism of ejector rod.

In FIG. 3, in order to seal the inclined core moving horizontally, the following configuration is implemented. As illustrated in FIG. 82A, it is needed only to mount a slide unit on seal plate 54, and to seal the ejector pin pushing the slide unit with seal ring 89. FIG. 82B illustrates the configuration wherein upper slide plate 372 and lower slide plate 373 are provided as new elements and a slotted hole of reference numeral 374 in which a slide unit moves is provided in either upper slide plate 372 or lower slide plate 373 (in this case on upper slide plate 372), or in both of them. FIG. 82C illustrates the case where the leg at the bottom of slide unit 377 is elongated. Reference numeral 375 indicates the slotted hole in which the slide unit moves; seal of reference numeral 375 and seal of reference numeral 376 serve for sealing to prevent the leakage of pressurized fluid from the matching surface between upper slide plate 372 or lower slide plate 373 and other plates.

In the case of a slide-core using an angular pin, the sealing needs are addressed within the boundary of seal 40 for both the stationary side slide and the movable side slide.

In the case of a slide-core using an inclined core or an angular pin, a gas rib is used as needed to prevent the leakage (intrusion) of pressurized fluid into the slide.

FIG. 81 illustrates the structure of a core pin of high fracture resistance. At first, descriptions are made on an ordinary core pin illustrated in FIG. 81A and FIG. 81B. When a molded article is released from mold, it shrinks at a stroke and an intense stress develops at the point identified as reference numeral 318 in the core pin, and the pin displays cracks and breaks at the part of 318. If the core pin breaks, it is needed to disassemble the mold and replace the pin. FIG. 81C illustrates a core pin which is made to have a straight configuration instead of one with a step of reference numeral 318. FIG. 81D illustrates a case where a core pin with this configuration is incorporated in a mold. Space 322 being provided in nested element 34 by which the stress exerted on core pin during mold release is absorbed or mitigated, the pin is resistant to fracture. Incidentally, the material of such a core pin is a maraging steel and the toughness of which has been enhanced by self-hardening treatment.

[Form of Embodiment]

(Mold Structure of Sealed Mold 142)

Sealed mold 141 employing ejector box 51 needs a large volume of pressurized fluid, because space 52 of movable side mold 202 has to be filled with the pressurized fluid.

The following sections describe, by referring to FIG. 3 and FIGS. 18-20, the mold structure of sealed mold 142 as a means to solve the above-mentioned problem. FIG. 18 is a schematic diagram of the mounting structure of nested element 34 in movable side mold 206 (an example of second mold) of sealed mold 142 in FIG. 3. FIG. 19 is a schematic diagram (plan view) of upper seal plate 54 as viewed from the upper side of page toward the lower side of it in FIG. 18. FIG. 20 is a schematic diagram (plan view) of lower seal plate 53 as viewed from the upper side of page toward the lower side of it in FIG. 18.

Incidentally, in sealed mold 142 shown in FIG. 3, regarding the components that are same as those of sealed mold 141 shown in FIG. 2, they are tagged with the same codes and the detailed descriptions are omitted. In order to make the descriptions more comprehensible, sealed mold 142 is described mainly in respect to the parts in which it differs from sealed mold 141.

Sealed mold 142 (an example of mold device), as shown in FIG. 3, differs from sealed mold 141 and is not provided with ejector box 51. Moreover, each of ejector pins 27 (an example of shaft body) in sealed mold 142 is sealed by seal ring 89 (an example of ring-shaped elastic member, an example of the first ring-shaped elastic member).

Here, seal ring 89, as shown in FIG. 18, is annular in shape (doughnut-shaped) and is an elastic body composed of a rubber material in which concave groove 208 having opening 209 along the circumferential direction is formed. Concave groove 208 formed in seal ring 89 is provided on one face perpendicular to the center axis of seal ring 89. Consequently, seal ring 89 presents specificity in orientation.

In seal ring 89, if the pressure of pressurized fluid is applied to concave groove 208, opening 209 of concave groove 208 is enlarged as a result of elastic deformation due to the pressure of pressurized fluid, and hence the sealing effect is enhanced.

In sealed mold 142, as shown in FIG. 3, in order to prevent the pressurized fluid ejected into cavity 200 from leaking to the outside through clearances 33 of nested element 32, lower seal plate 44, upper seal plate 45 and seal 46 are provided on the bottom (the face opposite to the side of cavity 200) of nested element 32.

Furthermore, on each of ejector pins 27 in sealed mold 142, as shown in FIG. 3 and FIG. 18, seal ring 89 is provided in order to prevent the pressurized fluid ejected into cavity 200 (an example of molding space) from leaking to the outside through clearances along ejector pin 27.

Furthermore, in sealed mold 142, in order to prevent the pressurized fluid ejected into cavity 200 from leaking to the outside through clearances 35 in nested element 34, lower seal plate 53, upper seal plate 54 and seal 55 are provided on the bottom (the face opposite to the side of cavity 200) of nested element 34.

On one surface of lower seal plate 53, as shown in FIG. 18 and FIG. 19, depressed part 82 to accommodate seal ring 89 is provided. Approximately at the center of depressed part 82 on lower seal plate 53, perforated hole 83 is formed into which ejector pin 27 is inserted.

Ejector pin 27 is sealed (hermetically fixed) by accommodating seal ring 89 in depressed part 82 on lower seal plate 53 as well as by placing seal 55 on one face of lower seal plate 53, covering the one face of lower seal plate 53 with upper seal plate 54, and then by inserting ejector pin 27 into the bore of seal ring 89.

The diameter of ejector pin 27 is larger than the inner diameter of seal ring 89 and smaller than the diameter of perforated hole 83. For this reason, ejector pin 27 is sealed by seal ring 89 accommodated in depressed part 82 and at the same time is supported in a state where it can slide in axial direction of ejector pin 27.

FIG. 18 illustrates a case where ejector pin 27 is provided with a piece of seal ring 89. Ejector pin 27 can be provided also with several seal rings 89 to enhance the sealing effect. In the case where stationary side mold 205 (an example of the first mold) is provided with a structure to push out the molded article or a kicker pin, seal ring 89 can be used.

In sealed mold 142, each one of ejector pins 27 is sealed by seal ring 89, and nested element 34 is sealed by lower seal plate 53, upper seal plate 54 and seal 55. For this reason, in sealed mold 142, when cavity 200 is filled with a resin by using an injection molding unit, there remains no space for escape for the air in cavity 200 unless there is a means for drawing off the fluid, and as a result it is likely that the air is compressed. Consequently, the occurrences of short-mold, deformation or burn of the molded article could be anticipated.

In cases where this problem occurs, as a means to solve it, one can cite the solution by providing sealed mold 142 with a means to discharge the fluid. The means to discharge the fluid is able to let out the air in cavity 200 that is displaced by a resin while cavity 200 is being filled with the resin.

Specifically, the means to discharge the fluid has: passageway 63 formed in movable side mold 206; pressure-resistant hose 64 connected to passageway 63; and valve 68 (an example of discharge portion) connected to pressure-resistant hose 64.

Passageway 63 is connected with: a clearance between one face of lower seal plate 53 and the other face of upper seal plate 54; clearance 35 in nested element 34; and groove 81 provided on upper seal plate 54 (see FIG. 19).

In other words, valve 68 is kept open while cavity 200 is being filled with a resin to let out to the outside of sealed mold 142 the air displaced by the filling of resin, through clearance 35 of nested element 34, groove 81, passageway 63, and pressure-resistant hose 64. Incidentally, although detailed descriptions are omitted, valves 62 and 67 are also a means (an example of discharge portion) to discharge the fluid and have the same mechanism and function as that of valve 68.

Valves 62, 67 and 68 as a means to discharge the fluid are kept open while cavity 200 is being filled with a resin. The means to discharge the fluid is closed after cavity 200 is filled with a molten resin. After the means to discharge the fluid is closed, the pressurized fluid is ejected into sealed mold 142 from device 140 for preparing pressurized fluid shown in FIG. 1.

The ejection of pressurized fluid into sealed mold 142 from device 140 for preparing pressurized fluid is carried out, for example, from ejection means 58, 115 (see FIG. 18), etc.

Ejection means 58 is an ejection means used for ejecting the pressurized fluid into cavity 200 (direct pressurization). Ejection means 58 comprises, as shown in FIG. 3 and FIG. 18: connecting port 48 to be connected with pressure-resistant hose 64 connected to device 140 for preparing pressurized fluid; passageway 49 (perforated hole formed in lower seal plate 53) leading to connecting port 48; and pressurization pin 50 (an example of ejection portion).

The clearance between perforated hole 77 (see FIG. 4) and core body 203 pressurization pin 50 is connected to passageway 49. That is, the pressurized fluid prepared by device 140 for preparing pressurized fluid pressurizes the resin in cavity 200 through the intermediary of pressure-resistant hose 64, connecting port 48, passageway 49 and pressurization pin 50.

Ejection means 115 is an ejection means used for ejecting the pressurized fluid into cavity 200 (indirect pressurization). Ejection means 115 comprises, as shown in FIG. 18: connecting port 48 to be connected with the pressure-resistant hose 64 connected to device 140 for preparing pressurized fluid; passageway 49 (perforated hole formed in lower seal plate 53) leading to connecting port 48; and pressurization pin 212 (see FIG. 18).

Passageway 49 is connected with the clearance between nested element 34 and upper seal plate 54, and clearance 35. That is, the pressurized fluid prepared by device 140 for preparing pressurized fluid is ejected into cavity 200 through the intermediary of pressure-resistant hose 64, connecting port 48, passageway 49 and pressurization pin 212, nested element 34, and clearance 35. If pressurization pin 212 is compared with pressurization pin 50, the former differs from the latter in longitudinal length but the constituents are almost the same.

Incidentally, code (arrowhead) 47 shown in FIG. 18 indicates the flow direction of pressurized fluid. Code (arrowhead) 65 indicates the direction of exhaust of the air in cavity 200. Code (arrowhead) 66 indicates the air in cavity 200 that has been discharged into the outside (atmosphere).

On one face of lower seal plate 53, as shown in FIG. 18 and FIG. 19, depressed part 85 is formed into which flanged part 70 (see FIG. 5) of pressurization pin 50 is inserted. Approximately at the center of depressed part 85 perforated hole 49 is formed. Seal 126 (see FIGS. 11-13) is provided between depressed part 85 and flanged part 70 that is inserted into depressed part 85.

On the bottom face of depressed part 213 in upper seal plate 54, as shown in FIG. 19, groove 81 is formed which is used for supplying the pressurized fluid to cavity 200 and for drawing off the air in cavity 200. Groove 81 is connected with perforated hole 49 and passageway 63 through the intermediary of: clearances between the perforated holes formed in upper seal plate 54 for pressurization pins and pressurization pins 50 and 212; and clearances between the perforated hole formed in the upper seal plate 54 for an ejector pin and the ejector pin 27.

Passageway 63 is connected with one end of pressure-resistant hose 64 for letting out the air in cavity 200. The other end of pressure-resistant hose 64 is connected with valve 68. Valve 68 is kept open while cavity 200 is being filled with a resin and closed after cavity 200 has been filled with the resin. As valve 68 is kept open while the cavity 200 is being filled with a resin, the air displaced by the resin is expelled from valve 68 into the atmosphere, through the intermediary of clearance 35 of nested element 33, groove 81, clearances along the ejector pins 27, passageway 63, etc. Valve 68 corresponds, specifically, to a solenoid valve, a valve with a pneumatic actuator driven by the power of air, etc.

In upper seal plate 54, as shown in FIG. 19, small space 102 is formed with a view to providing a cushioning effect so that the fluid pressure in groove 81 may not rise too rapidly. Small space 102 needs not necessarily be provided.

Valve 15 of device 140 for preparing pressurized fluid shown in FIG. 1 can be used as a means (first discharge portion) to discharge the fluid instead of valve 62, valve 67 and valve 68. The use of valve 15 as a means to discharge the fluid is effective for the case of ejection means 61 or ejection means 115 that carries out the fluid pressurization in lower seal plate 44, upper seal plate 45, lower seal plate 53, and upper seal plate 54 through the intermediary of clearances in nested elements 32, 34, and ejector pin 27. The operation of valve 15 is the same as that of valve 62, valve 67, and valve 68, where it is kept open while cavity 200 is being filled with a molten resin, and closed after the cavity has been filled with the resin and before the fluid pressurization of resin starts. Incidentally, valve 62 and the like can be provided in multiple numbers with a view to accelerating the discharge of fluid, if the cavity volume is large.

(Seals for Nested Element)

Then, the seals for nested element 34 are described by referring to FIGS. 18-20.

Upper seal plate 54 is a rectangular plate having a rectangular depressed part 213 in the center of one face of it. One end of nested element 34 in stationary side mold 206 is fitted into depressed part 213. In other words, the portion in nested element 34 which lies away from cavity 200 is surrounded by upper seal plate 54.

On the upper face of the peripheral part of upper seal plate 54, seal 93 is provided in a manner following the peripheral part. As the peripheral part of upper seal plate 54 is tightly fixed to movable side mold plate 87 (see FIG. 3) that constitutes movable side mold 206, seal 93 is held between movable side mold plate 87 and upper seal plate 54. In other words, movable side mold plate 87 and upper seal plate 54 are sealed by seal 93. For this reason, there is no likelihood that the pressurized fluid acting on the resin in cavity 200 leaks along the surface of contact between movable side mold plate 87 and upper seal plate 54.

The seal 55 is provided between the lower seal plate 53 and the upper seal plate 54. For this reason, there is no likelihood that the pressurized fluid acting on the resin in the cavity 200 leaks along the surface of contact between the lower seal plate 53 and the upper seal plate 54.

On one face of lower seal plate 53, as shown in FIG. 20, depressed part 82 is formed in a manner surrounding perforated hole 83, wherein seal ring 89 is to be inserted into depressed part 82. Furthermore, on one face of lower seal plate 53, depressed part 85 is formed in a manner surrounding perforated hole 84, wherein flanged part 70 of pressurization pin 50 or the flanged part of pressurization pin 212 is to be inserted into depressed part 85.

As seal ring 89 is inserted into depressed part 82, the pressurized fluid does not leak out of perforated hole 83. Furthermore, as depressed part 85 is sealed by using seal 126 when inserting the flanged part of an injection pin (see FIGS. 11-13), the pressurized fluid does not leak out of perforated hole 84.

In stationary side mold 205, stationary side slide-core 36 and movable side slide-core 37, when they use ejector pin 27 or a kicker pin, they are sealed by using seal ring 89 similarly as in the case of ejector pin 27 in movable side mold 206. In stationary side mold 205, stationary side slide-core 36, and movable side slide-core 37, when they do not use the ejector pin 27, needless to say, they do not have to use seal ring 89.

(Depressurization of Inside of Cavity)

Sealed mold 142 can have a means to depressurize the inside of cavity 200 after stationary side mold 205 and movable side mold 206 have been closed, and before the cavity is filled with a molten resin. The depressurization means is, for example, a vacuum pump or an apparatus (aspirator) to create a depressurized state by using a fluid causing the Venturi effect or the like.

Figure 21:
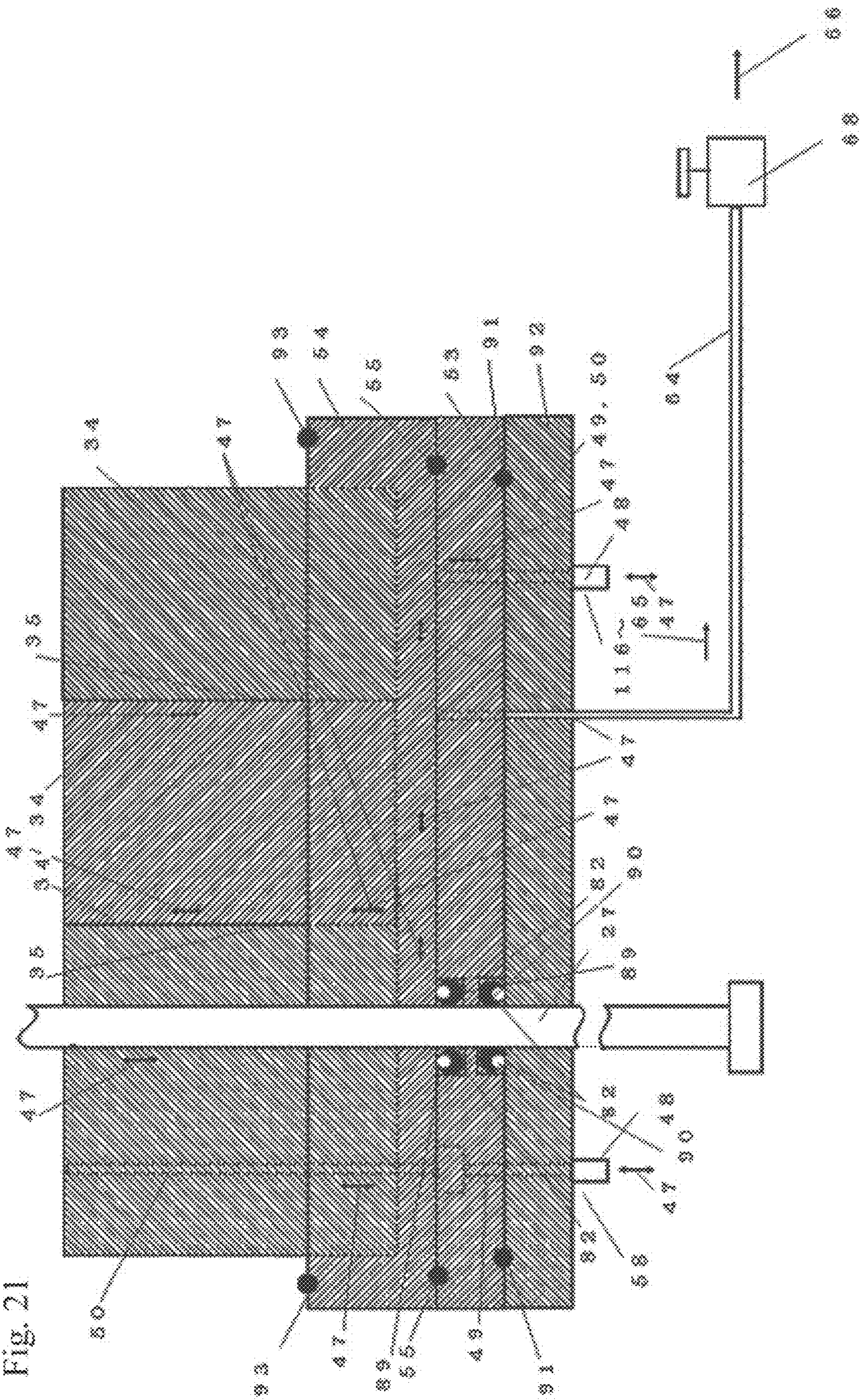
FIG. 21 is a schematic diagram presenting the means for sealing an ejector pin by using a seal-ring when the mold cavity content is aspirated by vacuum.
Figure 22:
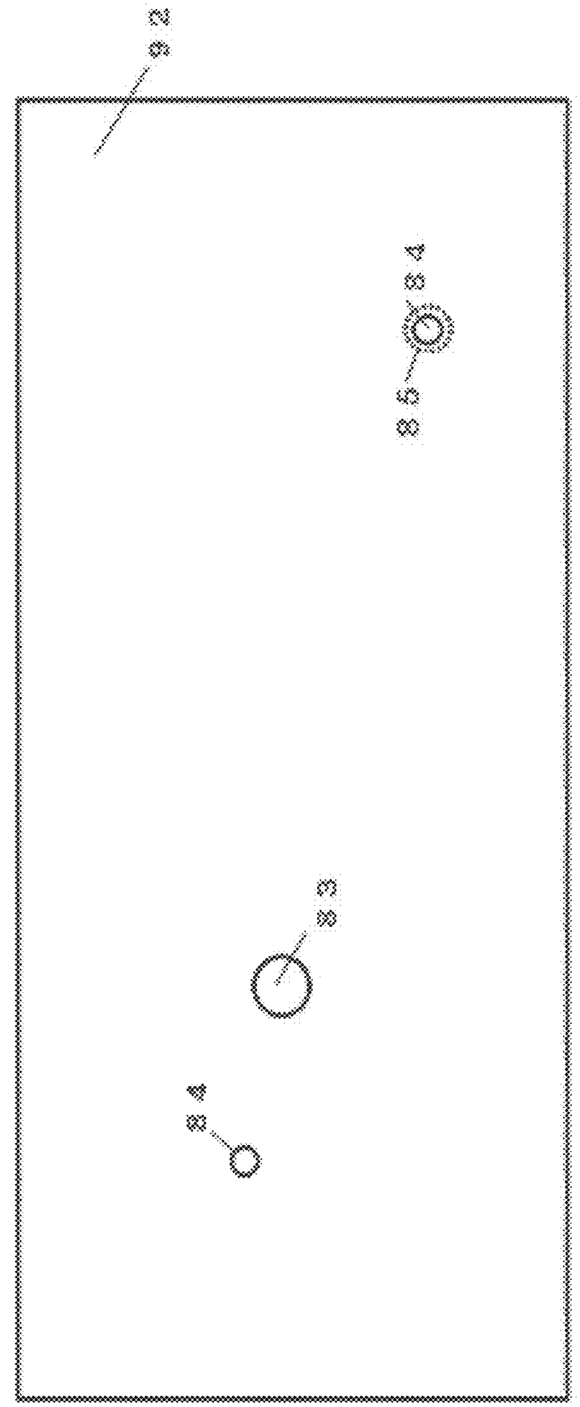
FIG. 22 is a schematic diagram representing the structure of plate 92 to fix the sealing means of an ejector pin by using a seal-ring when the mold cavity content is aspirated by vacuum.

In sealed mold 142, when the inside of cavity 200 is depressurized by aspirating by vacuum the air in it by using a depressurization means (an example of discharge portion), seal ring 90 is added to lower seal plate 53 as shown in FIG. 21. If it is described in more details, in lower seal plate 53, a depressed part for inserting seal ring 90 is formed on the other face of it. In the depressed part, a seal ring 90 is inserted with its opening 209 oriented toward the side opposite to the side of cavity 200. Then, on the other face of lower seal plate 53, seal 91 is placed along the peripheral part of lower seal plate 53 and then seal plate 92 is brought to touch and fix seal 91.

When a depressurization means is used in sealed mold 142, the configuration of lower seal plate 53 should not be that shown in FIG. 18 but it should be made to have the configuration shown in FIG. 21. The reason for that is described below.

As the seal ring presents specificity in orientation, in the case where lower seal plate 53 has the configuration shown in FIG. 18, when the air in cavity 200 is depressurized by the depressurization means, air will enter cavity 200. In other words, since opening 209 of depressed part 208 is oriented toward cavity 200 as shown in FIG. 18, the air pressure acts from the side opposite to the side of opening 209 of depressed part 208 of seal ring 89. For this reason, in the case where the air in the cavity is depressurized by the depressurization means, the sealing effect of seal ring 89 is not realized.

In order to make the seal ring realize its sealing effect even when the air in cavity 200 is depressurized by a depressurization means, it is needed to add seal ring 90 in which opening 209 is oriented toward the side opposite to the side of cavity 200, as shown in FIG. 21. By this addition, seal ring 90 on the lower side of page realizes enough sealing effect, since opening 209 opens when the air in cavity 200 is depressurized.

Incidentally, between lower seal plate 53 and plate 92, seal 91 is provided along the peripheral part of lower seal plate 53. Seal 91 can be dispensed with.

Moreover, the air in cavity 200 is aspirated by vacuum by connecting a depressurization means to at least one of valve 62, valve 67 and valve 68. The valve used for aspiration by vacuum shall be closed before the fluid pressurization starts. Incidentally, as valve 62, etc., it is necessary to use one compatible with the usage for aspiration by vacuum.

As the mounting structure of nested element 34 on the movable side in mold 206 shown in FIG. 21 closely resembles the mounting structure shown in FIG. 18, main differences only have been described. The configuration of seal plate 54 in FIG. 21 can be the same as that of seal plate 54 in FIG. 18. Furthermore, in the case where ejector pin 27 or a kicker pin is used in stationary side mold 205, the same mounting structure as that shown in FIG. 21 is used as a mounting structure of nested element 32.

(Injection of Inert Gas into Cavity)

As a means to control the short-mold of resin and the discoloration and burn of molded article, in addition to the aforementioned depressurization means, the means is available by which an inert gas like, for example, nitrogen gas is injected into cavity 200. The inert gas is injected into cavity 200 before cavity 200 is filled with a molten resin from at least one of valve 62, valve 67 and valve 68 in sealed mold 142, so as to replace the air in cavity 200 with the inert gas.

Figure 33:
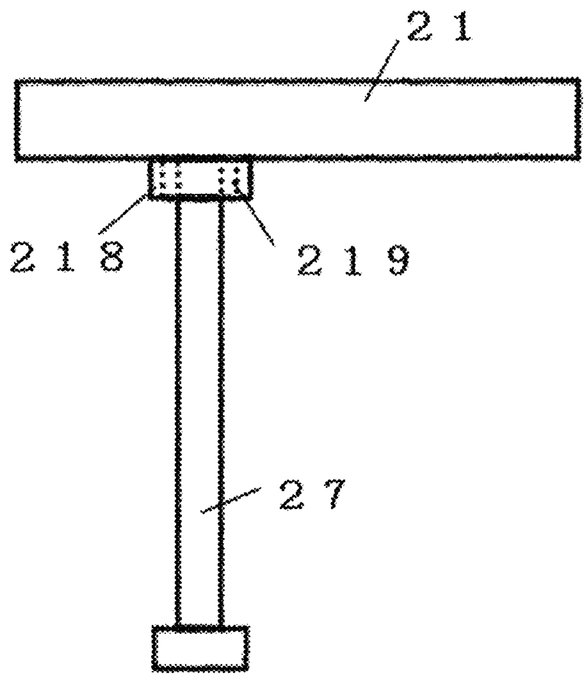
FIG. 33 is a schematic diagram representing a means of sealing an ejector pin by erecting a gas rib 218 around it.

As a means to seal ejector pin 27, a solution is available in which gas rib 218 is provided around the ejector pin in a manner surrounding ejector pin 27 as shown in FIG. 33 and FIG. 34, and the gas rib 218 carries out the same function as that of the gas rib to be described later. However, if the gas rib is provided so as to fit closely ejector pin 27, since the shrinkage of resin makes the separation from mold difficult, the gas rib is arranged to have a small clearance as shown in FIG. 33 and FIG. 34.

With a means in which a rib is provided around ejector pin 27, in a mold lacking a nested structure, for example, in a mold resembling a flat plate, it is not necessary to provide seal ring 89 to ejector pin 27. But in a mold having a nested structure, as the pressurized fluid leaks through the clearances of nested element, it is needed to employ plate 53 and plate 34 shown in FIG. 19 and FIG. 20 to prevent the leakage of pressurized fluid from the nested element, and in this case, because the leakage of pressurized fluid from ejector pin 89 occurs, it is required to seal ejector pin 27 by using seal ring 89.

Alternatively, if a structure is adopted in which a gas rib is provided around the ejector pin and in addition the nested element is also encircled by a gas rib to configure a structure to prevent the entry of pressurized fluid into the clearances of nested element, the plate 53 and the plate 54 are not required.

In the case where the pressurized fluid is introduced into the clearances between the resin filled in cavity 200 and the cavity surface of stationary side mold 205 or movable side mold 206, seal ring 89 is used of which the opening 209 is oriented toward cavity 200, in order to prevent the pressurized fluid from leaking out through the clearances between the perforated hole into which ejector pin 27 is inserted and ejector pin 27.

Moreover, in the case where cavity 200 is filled with a molten resin after the air in cavity 200 has been aspirated by vacuum, seal ring 90 (an example of the second ring-shaped elastic member) is used, in order to prevent the air from entering cavity 200 from the outside while the air in cavity 200 is aspirated by vacuum.

The "shaft body for extruding" in the present invention is a collective term for a particular type of components used in injection molding including: ejector pin 27 in the movable side mold 206; ejector pin 27, pressurization ejector pin 227, pressurization ejector pin 500, ejector rod or kicker pin, knockout pin, shape extrusion pin, pin at the lower portion of inclined core, etc. in the stationary side mold 205.

Pressurization pin 50 shown in FIGS. 4-10 is accommodated in sealed mold 142. To the bottom of flanged part 70 of pressurization pin 50, the pressurized fluid prepared by device 140 for preparing pressurized fluid is fed. The pressurized fluid pressurizes the resin filled in cavity 200. The structure and installation of pressurization pin 50 is shown in FIGS. 4-22.

(Means for Venting Gas in Parting 26)

Parting 26 of sealed mold 142 can be provided with a means for venting gas. The means for venting gas is described by referring to FIG. 23.

FIG. 23 is a schematic diagram representing the configuration of the means for venting gas provided in parting 26 of stationary mold 205. Incidentally, the venting gas is also called air venting, air vent, gas vent, vent, etc.

When cavity 200 in sealed mold 142 is filled with a molten resin, the air in cavity 200 is compressed unless it is drawn off. The air compressed in cavity 200 causes short-mold, and discoloration and burn on the resin surface.

In order to prevent the occurrences of aforementioned short-mold, etc., a means for venting gas is employed. As shown in FIG. 23, gas vent 94 as an example of means for venting gas is provided on parting 26 in a manner surrounding cavity 30 of stationary side mold 205.

Gas vent 94 is configured with dimensions that allow the air in cavity 200 to pass but make it hard for a resin in it to pass, when the filling of cavity 200 with a resin is started. The dimensions of gas vent 94 are set at, for example in the case where the resin is ABS, 5 mm or more but 10 mm or less in width, around 5 mm in length and 0.01 mm or more but 0.2 mm or more in depth. When it is less than 0.01 mm, it functions as a gas vent but the effect is low. When it is more than 0.2 mm, the occurrence of burrs is feared. If the pressurized fluid leaks from parting 26, a gas vent is not to be provided.

The air in cavity 200 is discharged out to the outside of sealed mold 142 from port 98 fixed to hole 63, through gas vent 94 after passing through, grooves 95 and 96, hole 97 and hole 63, provided for discharging gas on parting 26 of stationary side mold 205, and hole 97 and hole 63. Incidentally, groove 95 is configured, for example, so as to be 1 mm deep and 5 to 20 mm wide. Groove 95 can also be embossed coarsely.

As shown in FIG. 3, one end of pressure-resistant hose 64 is connected to port 98 and its other end is connected to valve 62. For this reason, the air discharged from port 98 is discharged actually from valve 62 by passing though pressure-resistant hose 64.

In order to prevent the pressurized fluid from leaking out of parting 26 while the resin in cavity 200 is being pressurized by the pressurized fluid, seal (sealing component) 40 is provided in parting 26. Seal 40 is embedded in a dovetail groove formed on parting 26 in mold plate 78 of stationary side mold 205. For this reason, seal 40 does not come off from parting 26 even when movable mold 206 is made to touch or separate from stationary side mold 205.

In case that the pressurized fluid leaks out and turns aside to non-pressurized (decorative) surface, the afore-mentioned gas vent is not to be provided or is configured as a narrow one.

The above descriptions have presented the configuration in which a means for venting gas is provided in parting 26 of stationary side mold 205, but the solution is not limited to this. The aforementioned means for venting gas can also be the one that has been provided in parting 26 of movable side mold 206 or in the parting of the slide-core on either the stationary side or the movable side.

(Means for Venting Gas in Nested Element)

Figure 24:
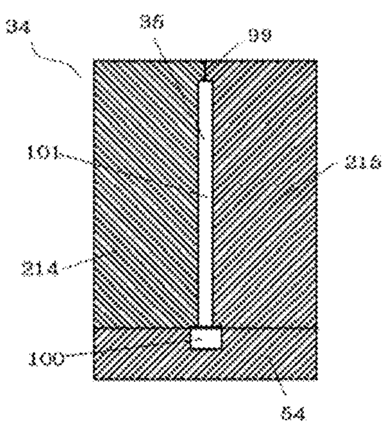
FIG. 24 is a schematic diagram representing gas venting and the like in the matching surface of a nested element.
Figure 25:
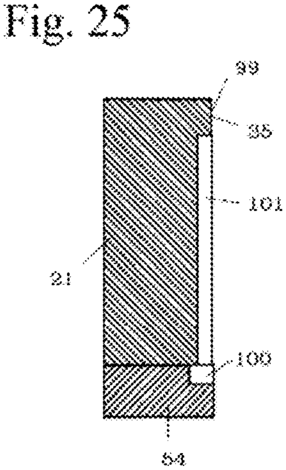
FIG. 25 is a schematic diagram of the lateral side of a nested element representing the form of gas venting and the like in the matching surface of the nested element.
Figure 26:
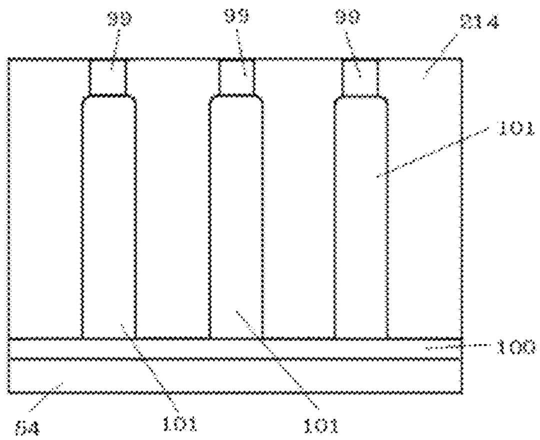
FIG. 26 is a schematic diagram of the front face of a nested element representing the form of gas venting and the like in the matching surface of the nested element.

A means for venting gas is provide in the nested element for preventing the occurrences of short-mold or discoloration and burn of the molded article. FIGS. 24-26 are referred to for describing nested element 34 having a means for venting gas to draw off gas from clearance 35. FIG. 24 is a schematic diagram of nested element 34. FIG. 25 is a schematic diagram of the view of nested element 214 and upper seal plate 54 shown in FIG. 24, when they are cut along the matching plane between nested element 214 and nested element 215. In other words, FIG. 25 is a view of simple vertical division in the middle of FIG. 24. FIG. 26 is a schematic diagram of nested element 34 and upper seal plate 54 divided as illustrated in FIG. 25, when they are looked at from the left of the page of FIG. 25 toward the right of it.

Nested element 34, as shown FIG. 3 and FIG. 24, is mounted on upper seal plate 54 of movable side mold 206. Nested element 34, as shown in FIG. 24, is formed by matching nested element 214 and nested element 215. In nested element 34, gas vent 99 as a means for venting gas is formed. Gas vent 99 is connected to groove 101 formed in nested element 34. Groove 101 is connected to hole 63 as an exhaust passageway.

The shape of gas vent 99 can be modified according to the size of nested element 34 and is configured so as to allow the air in cavity 200 to pass but make it difficult for the resin in it to pass. For example, the gas vent 99 used for ABS is configured to be 5 mm or more but 10 mm or less in width, around 5 mm in length, and 0.01 mm or more but 0.2 mm or less in depth.

The means for venting gas in nested element 34 shown in FIGS. 24-26 can serve also as a passageway of exhaust air when the air in cavity 200 is aspirated by vacuum.

Furthermore, when a resin in cavity 200 is pressurized by fluidic pressure by using ejection means 61 and ejection means 115 shown in FIG. 2 and FIG. 3, the pressurized fluid is ejected into cavity 200 by passing through the matching part between nested element 214 and nested element 215 in nested element 34, groove 101 provided in clearance 35 of nested element 34, and gas vent 99.

(Structure of Ejector Pin)

If the application is limited to the case of sealed mold 141 having ejector box 51 shown in FIG. 2, ejector pin 27 can be used as gas vent 99. In this case, if needed, a D-shaped cut is made on a part of the main body or the flanged part 117 of inner core 71 of ejector pin 27 (see FIG. 5) to make an air exhaust circuit. However, in sealed mold 142 shown in FIG. 3, as the ejector pin is sealed by seal ring 89, the aforementioned D-cut face or the like is not created.

(Molded Article)

The effect of fluid pressurization can further be enhanced by reducing the cooling speed of the surface of resin filled in cavity 200. The cooling speed of the resin surface can be reduced by forming coarse pear skin embossments on the cavity surface. If embossments are formed on the cavity surface, an air layer is formed at the bottom of embossment (summit of embossment in the molded article). As this air layer serves as a heat insulation layer, the cooling and solidification is slowed down in the case of thermoplastic resin and the like.

In order to enhance the pressurization effect of the fluid pressurization, as a means other than lowering the viscosity of molten resin or slowing down the cooling speed of resin surface, we can adopt various solutions including: raising the mold surface temperature; raising the temperature of molten resin; forming cutter marks on or embossing the cavity surface that molds surfaces of molded article other than decorative surfaces (surfaces exposed to human eyes). Particularly a stronger effect is realized when the surface subjected to fluid pressurization is embossed. Alternatively, the cavity surface can be plated with a ceramic coating material including: DLC (diamond-like coating), TiN (titanium nitride), CrN (chromium nitride), WC (tungsten carbide), etc. As the ceramic coating slows down the cooling speed of resin, it is implemented at least on either the stationary side or the movable side.

As a means to lower the viscosity of molten resin, in addition to setting of resin temperature at a relatively higher level, the measures enabling to enhance the fluidity of molten resin include: blending of a low molecular resin with the same molecular structure; and adding to (injecting into) the molten resin in the heating cylinder a gas or a liquid like liquefied carbon dioxide, butane, pentane, a low boiling point alcohol represented by methanol, ethanol and propanol, and an ether represented by diethyl ether, methyl propyl ether and butyl propyl ether.

The aforementioned injection of carbon dioxide, ether or alcohol is carried out at the stage of plasticization or during the metering process.

By raising the mold surface temperature, the cooling and solidification of molten resin filled into the cavity can be slowed down. The means to raise the mold surface temperature includes: method using a temperature regulator; method using the superheated steam; method by irradiating the mold surface with halogen lamp; method by irradiating it with a high-frequency wave; method by electromagnetic induction heating (in this case, it is preferable to nitride the mold surface); method by embedding a sheathed heater in the mold, etc. The effect will be higher, if the mold surface temperature is higher than the glass transition point (Tg) of the resin at the stage of filling the cavity with resin.

Figure 29:
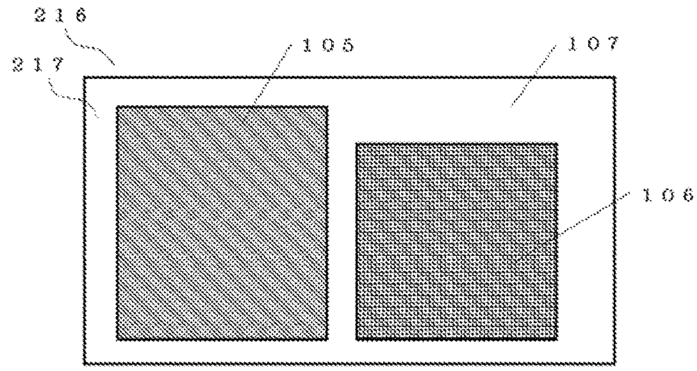
FIG. 29 is a schematic diagram representing that the pressurized fluid acts easily on an embossed portion.

FIG. 29 is a schematic diagram to present an example of molded article 216 manufactured by sealed mold 142. More specifically, FIG. 29 shows surface 217 of molded article 216 pressurized by fluidic pressure. Surface 217 can be molded, for example, if the cavity surface of movable side mold 206 is embossed and coated with a ceramic material, and the pressurized fluid is ejected into the clearance between the resin and the cavity surface (clearance between the resin and the mold) of stationary side mold 205.

Embossed part 105 in surface 217 is a part which was transcribed from the part embossed on the cavity surface of movable side mold 206. Part 106 in surface 217 is a part which was transcribed from the part coated with a ceramic film on the cavity surface of movable side mold 206. Incidentally, glossy part 107 of surface 217 is a glossy surface transcribed from the cavity surface that was neither embossed nor coated with a ceramic film. As glossy part 107 presents a high adhesiveness between the cavity and the thermoplastic resin, it is effective for reducing the leakage of pressurized fluid to the outside.

(Nozzle for Injection Molding Unit)

Although the present invention can be embodied also with an open nozzle, as there is a risk of intrusion of high pressure fluid into the heating cylinder, a ball-check nozzle used particularly in injection blow molding or the shut-off nozzle which is operated by hydraulic, pneumatic or electrical action is used.

The optimum plate thickness of molded article for embodiment of the present invention is 4 mm or less. In certain molded articles, there is a likelihood that a blow molding results, due to the entry of pressurized fluid into the resin in cavity 200 during the process of introducing the pressurized fluid into clearances between the resin injected into cavity 200 and the stationary side parting or the movable side parting. In such a case, the problem can be solved by delaying the timing of ejection of pressurized fluid into cavity 200. It is because the breakage of skin layer of molded article by pressurized fluid becomes less easy if the pressurized fluid is ejected after the cooling and solidification of the resin surface has advanced and a thick skin layer is formed.

Moreover, because the breakage of skin layer by pressurized fluid becomes less easy if the fluid pressurization is carried out, as mentioned previously, after pressurization pin 50, ejector pin 227, or pressurization ejector pin 500 has been retracted to separate the ejection port of pressurized fluid from the resin surface.

(Products of Application)

The present invention is preferably to be applied in manufacturing the molded articles requiring good transcription performance including office automation equipment, home electrical appliances, interior parts and exterior parts of vehicles, building materials, game equipment, miscellaneous goods and the like. As a molded article, one can cite a chassis, a case, an interior part, etc. The present invention can be applied also to the molding of an optical mirror used in office automation equipment like printer, digital copier etc., or molding of a reflector and an extension of headlamp for vehicles, etc.

(Details of Products of Application)

Products (molded articles) to which the present invention can be applied are cited for examples as follows:

As automotive parts: console box, bumper, glove box, armrest, door trim, instrument panel (commonly called "in-pane"), headlamp, fog lamp, center cluster, register, defroster nozzle, cup holder, glove box, illuminated scuff plate, assist grip, front pillar garnish, radiator grill, back door garnish, mud guard, wheel cap, air bag, steering wheel, register, door grab, popup display, sun visor, dash silencer, scuff ornament, rear shelf, etc.;

As home electrical appliances: housing for television, digital camera, video camcorder, facsimile, telephone set, personal computer, car navigation equipment, refrigerator, microwave oven, air conditioner, vacuum cleaner, wash machine, etc.

Other miscellaneous products including: tablet, mobile phone, smartphone, personal computer, loudspeaker, headphone, portable game equipment, frame of vertical pinball game equipment; housing or interior part for office automation equipment like printer, photocopier, facsimile, etc.; logistics equipment like container, palette, floor grate, collapsible container, table cart, dolly, board, cart, carriage, IC tray;

As agricultural and civil engineering machinery: grating; plastic parts for combine, tractor, cultivator, rice planting machine, chainsaw, lawn mower, chemical sprayer, etc.;

As housing equipment: ornamental cover, wash stand, wash-basin, bathtub, lavatory seat, lavatory seat cover, receptacle outlet cover;

As article of furniture: resin products used on chairs, tables, etc.

(GCP)

Sealed mold 142 can also be used as one that is used for the gas-counter-pressure (GCP) process as a means for obtaining the surface smoothness in expansion molding, if the operation of control valves is organized appropriately, for example, by opening valves 62, 67, 68, etc. to blow out the pressurized air in the cavity, in conjunction with the filling of resin.

If the diameter of pressurization pin 50, pressurization ejector pin 227 or pressurization ejector pin 500 is small, and if the pressure of pressurized fluid is high, the operation does not result in pressure forming-injection molding but in injection blow molding. Consequently, a larger diameter of these pins is preferable.

In those sections where neither pressurization ejector pin 227 nor pressurization ejector pin 500 can be accommodated, pressurization pin 50 is employed where necessary.

In those sections where any type of pin among pressurization pin 50, pressurization ejector pin 227 and pressurization ejector pin 500 cannot be accommodated, the fluid pressurization is carried out in a limited manner through the clearance of nested element by contriving a configuration to prevent the leakage of pressurized fluid to other parts (by sealing the bottom of nested element).

FIGS. 1-85 are schematic diagrams used for describing the contents of the present invention. Certain parts that should essentially be represented by broken lines or hatchings may be indicated by solid lines without hatchings to make it easy to describe them and to make drawings more comprehensible visually.

(Resin to be Used)

The types of resin that can be used in the present invention are listed in the database on properties in the Handbook of commercial trade of plastic molding materials (Ver. 1999, Ver. 2012) published by The Chemical Daily Co., Ltd.

The present invention can be applied to any type of thermoplastic resin as long as it is used for molding.

As thermoplastic resins with which the invention can be embodied, we can cite, for examples: polystyrene-based resin produced by polymerizing styrene-based monomers, for example, polystyrene (PS), high impact (impact-resistant) polystyrene (HIPS); styrene-derived resin which is a copolymer of nitrile-based monomer/styrene-based monomer, e.g., copolymer of acrylonitrile-styrene (AS); resin comprising nitrile-based monomer/styrene-based monomer/butadiene-based rubber, e.g., acrylonitrile butadiene styrene copolymer (ABS); styrene-based rubbers including AES having converted butadiene-based rubber into olefin-based rubber, ASA (AAS) having converted butadiene-based rubber into acryl-based rubber; polyolefin-based resins represented by polyethylene (PE), polypropylene (PP); polyphenylene ether (PPE), polyphenylene ether with denaturalized styrene (m-PPE); engineering plastics including, polycarbonate (PC), polyamide (PA), polysulfone (PSF), polyetherimide (PEI), polymethyl methacrylate (PMMA); polyester resins including polyethylene terephthalate (PET), polybutylene terephthalate (PBT); vinyl-based resins of polyvinyl chloride (PVC); and polyoxymethylene (POM).

Two or more types of thermoplastic resins can also be mixed to concoct a polymer alloy or a polymer blend. Similarly, two or more types of thermoplastic elastomers also can be mixed to concoct a polymer alloy or a polymer blend. Moreover, two or more types of thermoplastic resins and thermoplastic elastomers can also be mixed to concoct a polymer alloy or a polymer blend. A polymer alloy or a polymer blend is concocted, for example, through the kneading by the screw in an extruder, etc.

As resins applicable to the present invention, thermosetting resins are also available. Thermosetting resins include, for example: urea resin, melamine, phenol, polyester (unsaturated polyester) and epoxy, etc.

As elastomers, there are two types of them, i.e., the thermosetting type of elastomers (TSE) including urethane-rubber-based elastomer, fluorine-contained rubber-based elastomer, and silicone rubber-based elastomer, etc., and the thermoplastic type of elastomers (TPE) including styrene-based elastomer, olefin-based elastomer, polyvinyl chloride-based elastomer, urethane-based elastomer and amide-based elastomer, etc.

As rubbers we can cite: natural rubber; diene rubbers including SBR, IR, BR, CR and NBR; and non-diene rubbers including silicone rubber, butyl rubber, EPM, EPDM, urethane rubber, acrylic rubber, fluorine-contained rubber, polysulfide rubber, epichlorohydrin rubber, chlorosulfonated polyethylene rubber, bril rubber, etc. These rubbers form crosslinking when they are heated after filling the mold cavity.

For the resins to which the present invention is applied, as long as the concerned product does not adversely affect the mechanism and function of the system, the compounding chemicals described in the "Handbook of compounding chemicals for rubbers and plastics" published by Rubber Digest Co., Ltd. in March 1989 [newest edition], December 2003 [2nd revised edition] can be used.

Additives to be used include, for example: colorant, dye, reinforcing agent (glass fiber, carbon fiber, carbon nanotube), bulking agent (carbon black, silica, titanium oxide, talc), heat-resisting agent, anti-aging agent, oxidation-degradation inhibitor, antiozonant, antiweathering (light resistant) agent (ultraviolet absorber, light stabilizer), plasticizer, auxiliary foaming agent, foam-nucleating agent, lubricant, friction reducer, internal mold release agent, mold release agent, antifog additive, crystal nucleating agent, flame retardant, auxiliary flame retardant, flow modifier, antistatic agent, compatibilizing agent, etc.

It is also possible to obtain the molded article with a higher transcription performance by combining the present invention with other means for raising the mold temperature to improve the transcription performance, including for example, Heat and Cool, BSM (bright surface mold), etc. which improve the transcription performance by raising the mold temperature by means of superheated steam.

When molding operation was carried out by raising the surface temperature of mold embossed with fine glazing to 150° C. by high-frequency induction heating, a molded article was obtained in which the transcription efficiency of embossment was about 98% and no fingerprint was observed if it was touched by a hand.

It is also possible to embody the invention in the expansion molding in combination with other techniques including MuCell, AMOTEC, UCC, etc.

The means of compression in the present invention can be utilized also as a means of enlargement (expansion) of the cavity in the expansion molding represented by "Core-Back", "Recess (Recession)", etc.

The present invention is able to improve further the transcription performance in the molding transcription process in which a film is incorporated in the mold and transcribed by the injection pressure, if the invention is applied in combination with the process represented, for example, by the In-mold Molding Transcription system supplied by Navitas Inmolding Solutions Co., Ltd.

The present invention can be applied also in combination with a blow molding process.

[Fluid Pressurization from the Slide (Slide-Core)]

(FIG. 87, FIG. 88, FIG. 89, FIG. 90)

A slide consists of an inclined pin which causes sliding motion mainly by the forward thrusting force of ejector (pushing force, ejector force) and of a means to move the slide by utilizing the opening and closing of mold, and an angular pin is mainly employed. In addition to these, there are a wide variety of means used including those utilizing a hydraulic, pneumatic or electrical device or a unit of rack and pinion.

A slide is provided mainly in the movable side, but more often than not it is also provided on the stationary side. Moreover, in certain rare cases, a slide may be provided in another slide.

When a molten resin is filled in the cavity formed by a slide and the fluid pressurization is carried out, the slide moves back and forth and around or oscillates, and consequently such movements create a problem by deteriorating the appearance of molded article.

As a means to solve this problem, descriptions are made on: a structure following an example of the slide using an inclined pin in FIG. 87A, FIG. 87B and FIG. 88A, FIG. 88B; and a structure following an example of the slide using an angular pin in FIG. 89A, FIG. 89B and FIG. 90A, FIG. 90B.

Figure 87B:
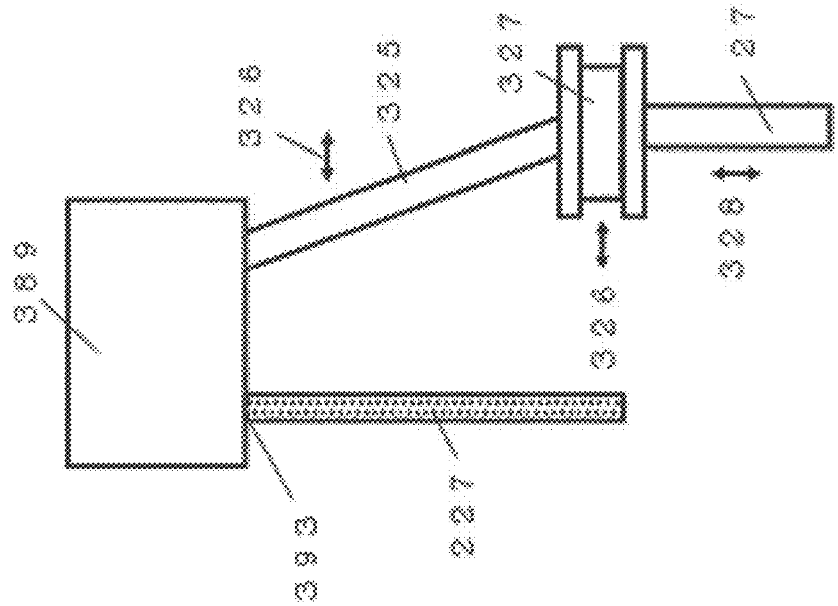
FIGS. 87A and 87B are schematic diagrams representing means to fasten a slide-core (inclined pin).
Figure 87A:
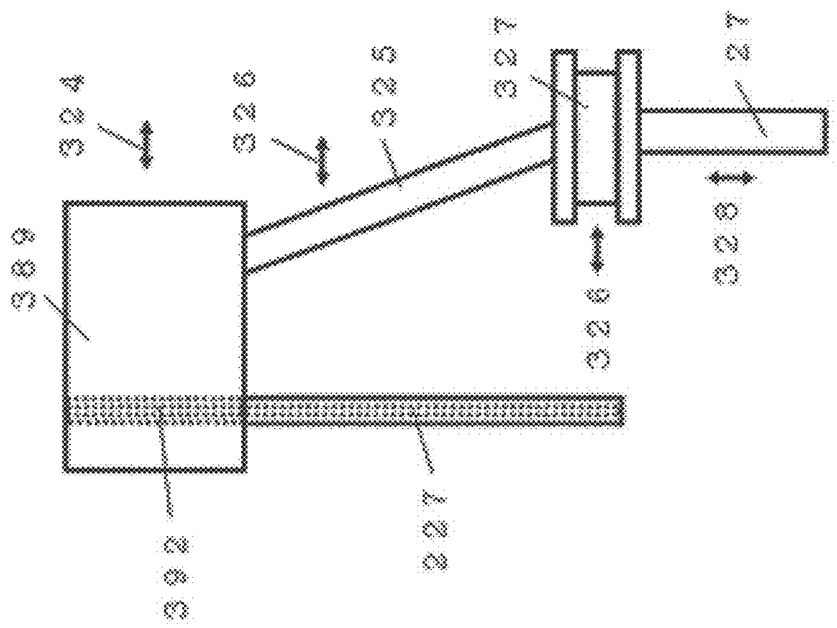

Reference numeral 389 in FIG. 87A indicates a slide-core in a mold to form the shape of molded article by using a slide-core, wherein a retractable pressurization pin illustrated in FIG. 62 or pressurization ejector pin 227 enters slide-core 389 to fix slide-core 389 so that the pin may sustain the resin pressure on the slide-core during molten resin injection or the fluid pressure on the slide-core during fluid pressurization, and so that it may prevent the slide-core from moving back and forth and around or from oscillating. The pressurized fluid is ejected from the upper side of slide-core 389 and enters the clearance between resin and slide-core 389 to effect fluid pressurization.

FIG. 87B depicts the configuration wherein a retractable pressurization pin or pressurization ejector pin 227 comes in contact with the lower side of slide-core 389 as shown by reference numeral 393 to fix slide-core 389 so that the pin may be able to sustain the resin pressure on the slide-core during molten resin injection or the fluid pressure on the slide-core during fluid pressurization, and so that it may be able to prevent the slide-core from moving back and forth and around or from oscillating. The pressurized fluid is ejected from the lower side of slide-core 389 and enters the clearance between resin and slide-core 389 to effect fluid pressurization.

Figure 88B:
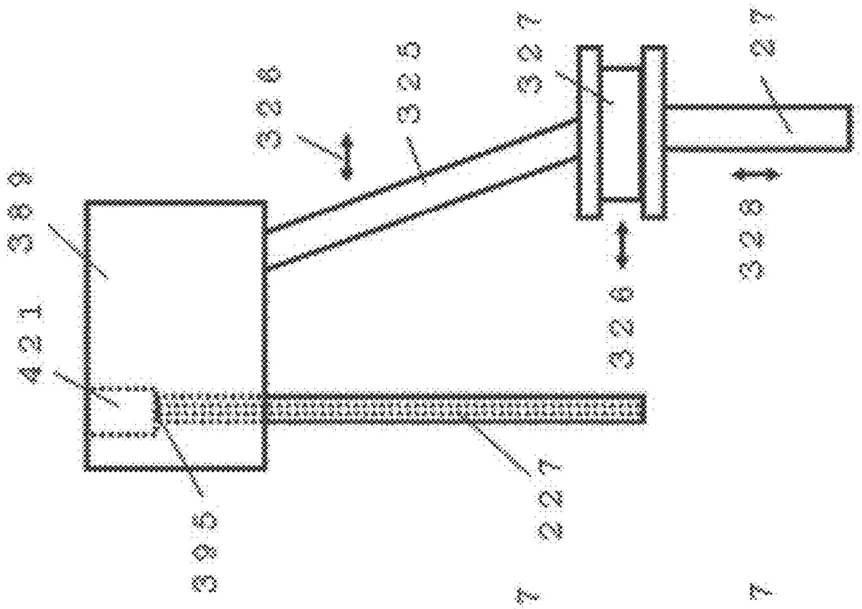
FIGS. 88A and 88B are schematic diagrams representing means to fasten a slide-core (inclined pin).
Figure 88A:
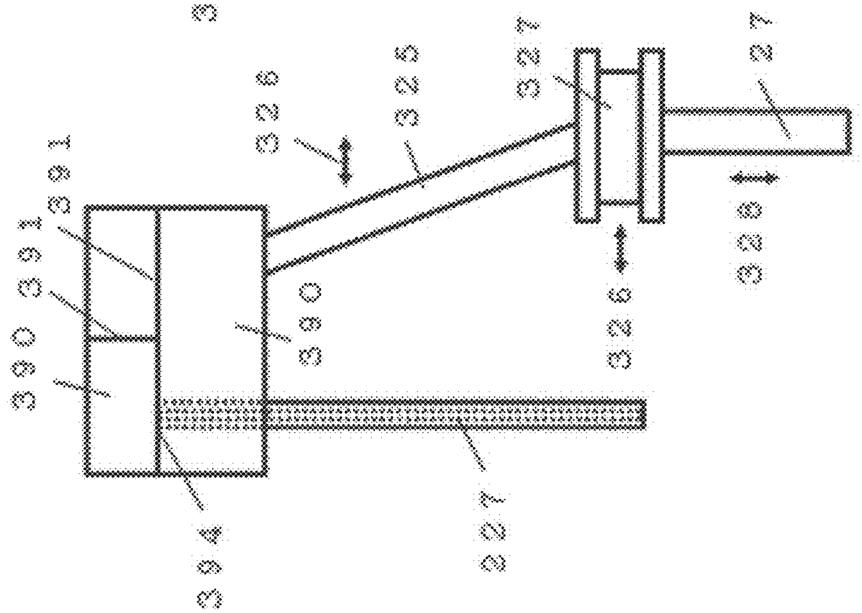

FIG. 88A shows slide-core 389 depicted in FIG. 87A that is configured as a nested structure as indicated by reference numeral 390 in FIG. 88A. A retractable pressurization pin or pressurization ejector pin 227 comes in contact with the matching surface of reference numeral 391 of nested element 390, the pressurized fluid is ejected at the point of reference numeral 394 touching the matching surface 391 of nested element 390, passes over matching surface 391 of the nested element, and enters the clearance between resin and the slide-core of nested element 390 to effect fluid pressurization.

FIG. 88B depicts a configuration wherein retractable pressurization pin or pressurization ejector pin 227 is introduced as far as into slide-core 389; the tip of the ejection portion of reference numeral 395 being fitted with a material of reference numeral 421 that blocks the passage of molten resin but allows pressurized fluid to pass, for example, a sintered metal element. The pressurized fluid is ejected from the upper side of slide-core 389, enters the clearance between resin and slide-core 389 to effect the fluid pressurization.

Figure 89B:
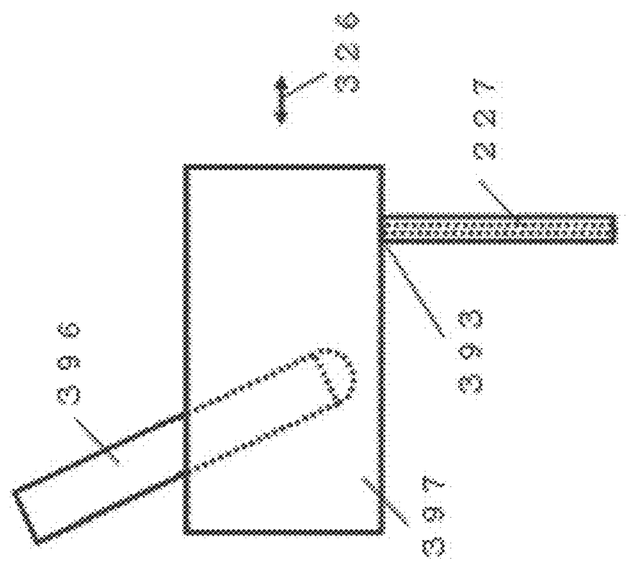
FIGS. 89A and 89B are schematic diagrams representing means to fasten a slide-core by using an angular pin.
Figure 89A:
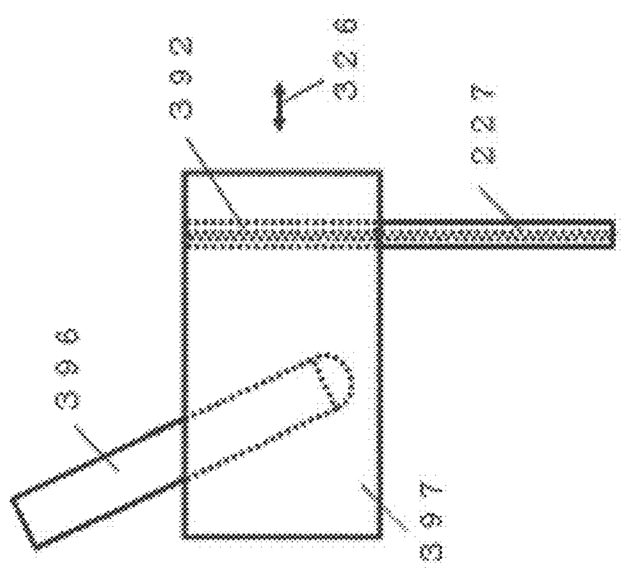
Figure 90B:
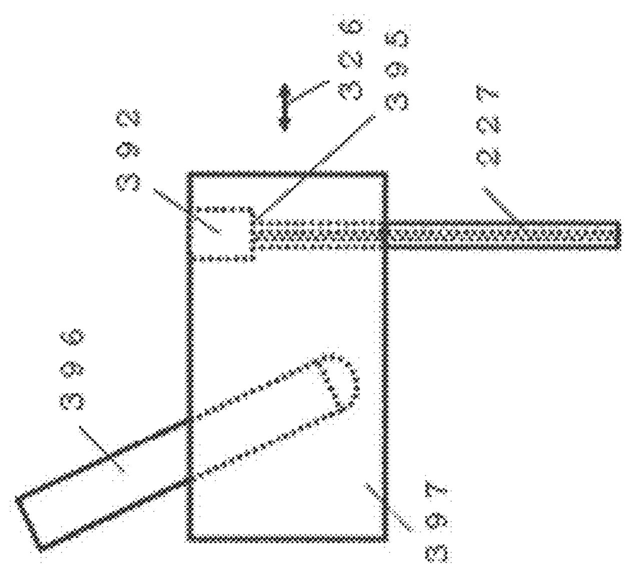
FIGS. 90A and 90B are schematic diagrams representing means to fasten a slide-core by using an angular pin.
Figure 90A:
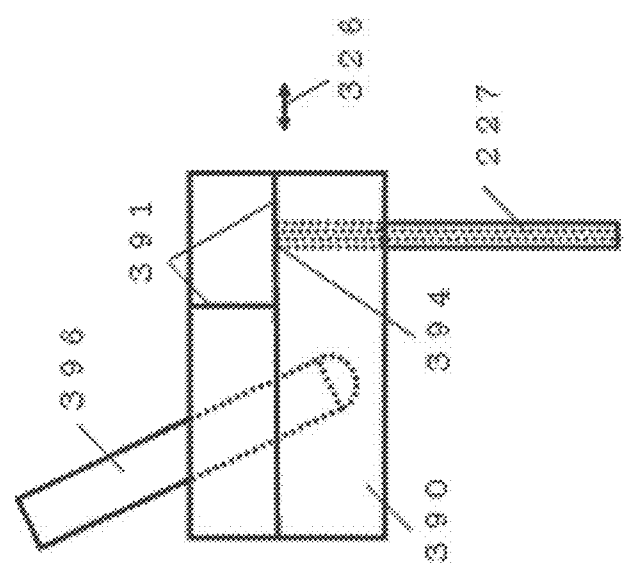

FIG. 89A, FIG. 89B, FIG. 90A, and FIG. 90B depict the configuration characterized by the angular pin of reference numeral 396 for the slide-core movement previously illustrated in FIG. 87A, FIG. 87B, FIG. 88A and FIG. 88B. Element of reference numeral 397 in FIG. 89A, FIG. 89B, and FIG. 90B is the slide-core which angular pin 396 enters, and the slide-core which angular pin 396 enters in FIG. 90A comprises nested element 390.

In the case where a slide-core is closed by the mold, a retractable pressurization pin or pressurization ejector pin 227 enters the slide-core after the slide-core is fitted into the predefined position. In the case where a slide-core is opened by the mold, a retractable pressurization pin or pressurization ejector pin 227 is extracted from the slide-core (separated from the slide-core) in advance so as not to obstruct the movement of slide-core.

By the nature of things, instead of pressurization ejector pin 227, the slide-core can be fixed by replacing the former with an ejector pin 27.

Needless to say, with structures illustrated in FIG. 87A-FIG. 90B, in certain cases, the pressurized fluid is likely to leak from the clearance of matching surface between the pressurization pin or pressurization ejector pin 227 and the slide-core of reference numeral 389, 390 or 397.

In the pressure forming-injection molding, if the pressure of pressurized fluid is increased from the beginning, in certain cases, the pressurized fluid may not enter the clearance between the resin and the mold but may enter the resin and the process may result in a blow molding. In particular, when the cavity is filled with PE, PP, etc. and the resin viscosity before fluid pressurization is low, a blow molding tends to occur.

As a solution for this problem, a space is created before carrying out the fluid pressurization by retracting the ejector pin for effecting fluid pressurization as described regarding FIG. 64, FIG. 65, FIG. 66, FIG. 67 and FIG. 68, or by retracting only the outer cylinder of ejector pin as described regarding FIG. 71 and FIG. 72, and the pressurized fluid is ejected into the space; or alternatively by effecting the core-backing operation as shown in FIG. 84A and FIG. 84B, the pressurized fluid enters the clearance between the resin and the mold, and consequently the fluid pressurization is effected without resulting in a blow molding process.

Or as an alternative means of fluid pressurization, since the high pressure from the beginning results in the injection blow molding without effecting the pressure forming-injection molding, if a means of pressurization is adopted wherein the fluid pressurization is carried out at a low pressure at first and at a high pressure subsequently as shown in FIG. 77B, a wedge is created between the resin and the mold because of the initial low pressure, and a sufficient degree of fluid pressurization can be effected due to the subsequent high pressure.

As other means for facilitating fluid pressurization, the embossment is made at the tip, or around the tip of pressurization pin or pressurization ejector pin for effecting fluid pressurization, or over an area larger than the cross-section of ejector pin for effecting fluid pressurization, or over a part of the area or the whole area to be pressurized by fluid pressurization.

(Diameter of Ejector Pin)

Alternatively, by enlarging (thickening) the diameter of pressurization pin or pressurization ejector pin, the pressure exerted on the molten resin surface is reduced and consequently the tendency to develop hollows is lessened.

In a pressurization pin or a pressurization ejector pin for effecting fluid pressurization on a resin with a relatively high viscosity in a molten state like PC, ABS, PS/ABS, PC/PS, PC/HIPS, modified PPE, engineering plastics, etc., the diameter of inner core or inner core body indicated by reference numeral 71, reference numeral 225, reference numeral 226, etc. has to be larger than φ4 mm or preferably larger than φ6 mm; on a resin with a low viscosity in a molten state like PE, PP, etc., larger than φ8 mm or preferably larger than φ10 mm.

Since the speed of cooling and solidification is accelerated if the molded article is thin, even when the fluid pressurization is carried out on such an article at a relatively high pressure, the pressurized fluid enters the clearance between the resin and the mold. On the contrary, if the molded article is thick, since the speed of cooling and solidification is slowed down, when the fluid pressurization is carried out on such an article at a high pressure, it tends to develop hollows.

As a solution for the problem, the fluid pressurization is carried out after a sufficient thickness of surface skin layer (cooled and solidified layer) has been formed by allocating a sufficient length of delay time before starting fluid pressurization.

In the case of injection blow molding, if the pressurized fluid is introduced by retracting first the inner core only before fluid pressurization, because a large aperture for entry of fluid is made, the atmospheric discharge of gas is effected smoothly, and the problem of burst in the injection blow molding is solved accordingly. On the other hand, in the case of pressure forming-injection molding, if the fluid pressurization is carried out by retracting first the outer cylinder or both the outer cylinder and the inner core before fluid pressurization, hollows do not develop.

In the case where the fluid pressurization is carried out following the core-backing described in FIG. 84A and FIG. 84B, care is taken so that the ordinary ejector pin is not made to recede (is not moved back). That is because, if the ordinary ejector pin also is made to recede, the resin is separated from the mold, and when, for example, the movable side is subjected to fluid pressurization, the pressurized fluid flows around in the stationary side as well.

In the ejector pin capable of effecting the fluid pressurization, for example as illustrated in FIG. 72, the outer cylinder only is retracted (made to move backward) without retracting the inner core (without making it move backward). The reason why the outer cylinder only is retracted without retracting the inner core is that care is taken so that the molded article may not be separated from the movable side when core-backing is carried out.

(Temperature of Mold Surface)

When the pressure of pressurized fluid is low, the strain in molded article is reduced, warpages and deformations are diminished and a molded article with a high stability in dimensions is obtained, but the fluid pressurization becomes less effective and sometimes sink marks may appear. As a solution for this problem, the mold temperature on the non-pressurized surface (generally decorative surface) is raised.

In cases of PC, ABS, PS/ABS, PC/PS, PC/HIPS and modified PPE, the mold surface temperature on the non-pressurized surface has to be higher than 35° C., preferably higher than 45° C., or more preferably higher than 65° C. In cases of PE, PP, etc., it has to be higher than 35° C. or preferably higher than 45° C. If the temperature is kept above glass transition temperature (Tg) of respective resins, it is possible to reduce welding or to achieve so-called "non-welding".

If the temperature of resin injected into the cavity is high, it takes a longer time until the cooling and solidification occurs, and consequently the fluid pressurization becomes more effective.

As seen from above, because such parameters as pressure of fluid pressurization, delay time, pressurization time, and retention time depend on molding conditions represented by mold surface temperature, resin temperature, injection time, injection pressure, etc., those parameters are generally set after verifying the appearances of molded articles by successively trying respective conditions (carrying out tests/trial molding processes).

Needless to say, it is also possible to carry out the fluid pressurization by combining a number of different means described above wherein at first the pressurization at a low pressure is effected by enlarging the diameter of pressurization pin, pressurization ejector pin, etc.

In cases where the leakage of gas is feared in a seal employed on a shaft body for extruding represented by ejector pin, including Omniseal (trade name), Variseal (trade name), K-seal, etc., it is recommended to use several units.

With a view to reducing the sagging of seal (fatigue; sealing function declining; sealing function being lost), the portion getting in contact with a movable surface like an ejector pin is coated with oil, silicone oil, grease, Teflon grease, etc. As an alternative solution, the material constituting a seal can be made to enhance sliding properties by mixing those substances which present sliding properties including: graphite, carbon fiber, carbon nanotube (CNT), silicone powder, Teflon powder, etc.

(FIG. 91)

FIG. 91 presents a detailed form of the contact between one of afore-mentioned seals and the surface of an ejector pin. These types of seals are configured, with a view to enhancing the sealing effect, so as to have a structure wherein, the terminal portion of sealing surface touches the pin on a line (linear contact) as indicated by reference numeral 400 but inflates and is crushed due to the pressure of pressurized fluid and touches the pin on a surface to enhance the sealing effect. The inner diameter of this portion, with a view to enhancing the sealing effect, is made smaller than the diameter of a shaft body for extruding, e.g., ejector pin by approximately 0.05 mm to 0.5 mm. The lower portion, with a view to reducing the sagging of seal, is made larger than the ejector pin by −0.05 mm to +0.5 mm in diameter.

The configuration is described in other words. With a view to enlarging the contact area, a portion is made to protrude as presented by reference numeral 400. The said protruding portion, reference numeral 400 in FIG. 91B, if it touches another element like an ejector pin, is crushed, and the contact area increases and enhances the sealing effect. By increasing the number of protruding portions, presented as reference numeral 400 in FIG. 91A and FIG. B, a higher degree of sealing effect is exerted.

The cross-section of reference numeral 400 in FIG. 91 has been configured in a triangle, but it can also be configured in a semicircle or an arc. The portion of reference numeral 399 is machined to present a rounded profile apt for reception so that when fitting in a shaft body like ejector pin it can be inserted smoothly without causing a blemish by forcing its tip. When fitting a shaft body like ejector pin, care is taken so that it is fitted in after having been coated with a lubricant like oil, grease or the like to enhance sliding properties. Although not illustrated, it requires scrupulous attention to ensure that the sealing surface of K-seal is protected against possible damages by matching the tip of ejector pin or the like snugly with the portion of reference numeral 400 through machining the tip to give it a light rounding-off or chamfering.

Figure 91A:
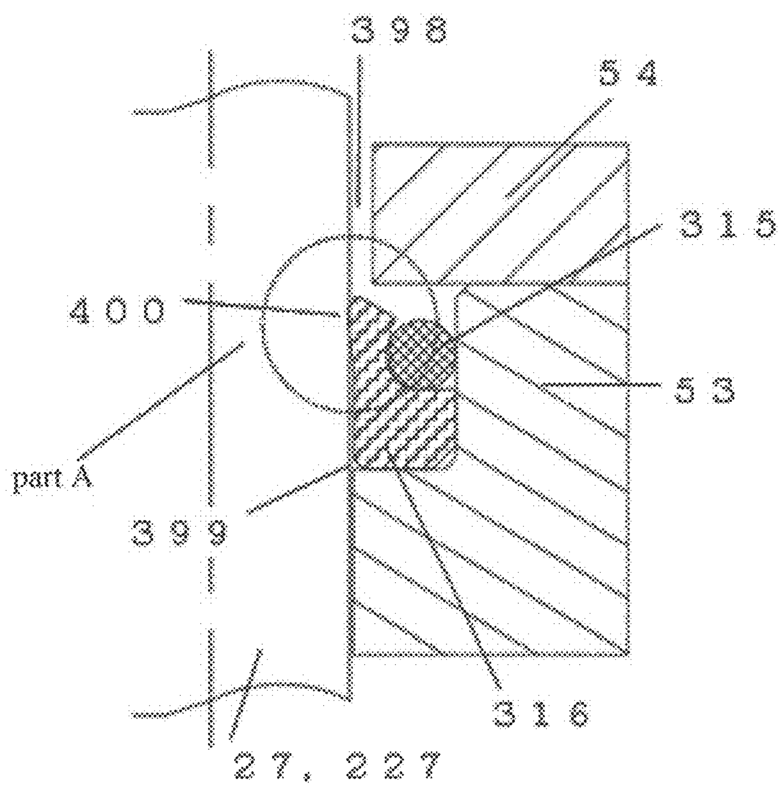
FIGS. 91A and 91B are schematic diagrams representing the sealing structure on an ejector pin.
Figure 91B:
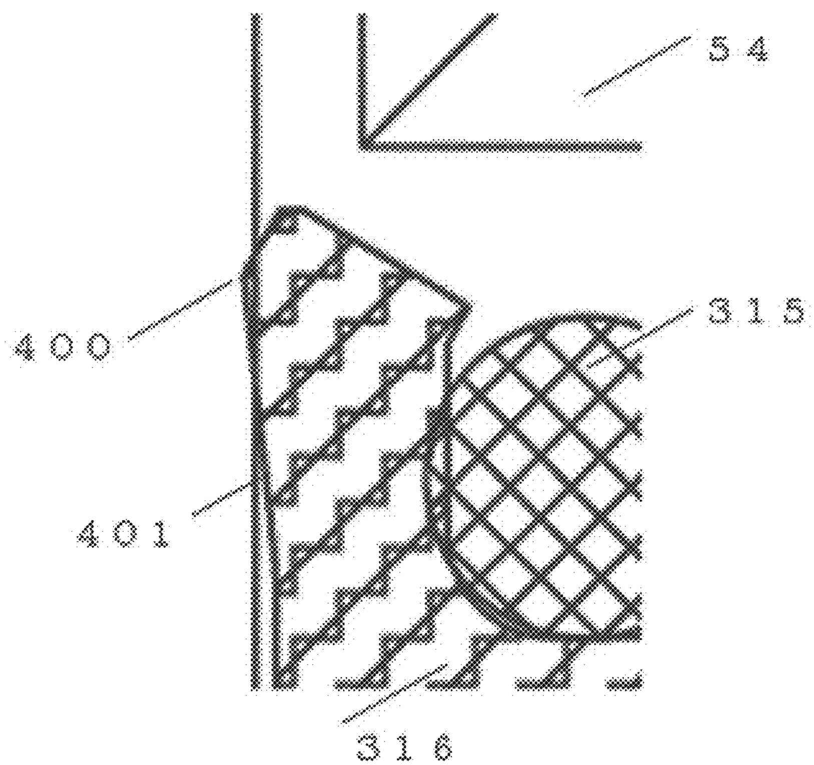
Figure 92:
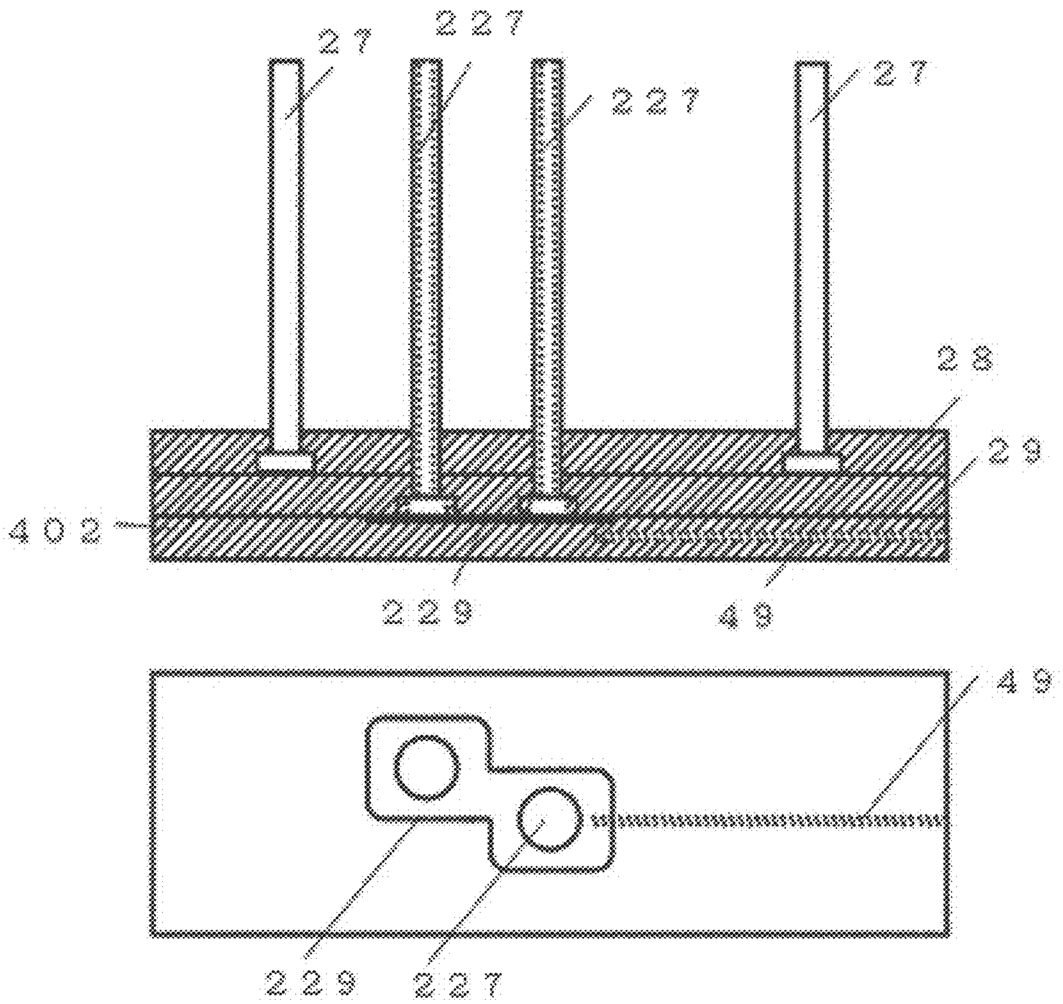
FIG. 92 is a schematic diagram representing a means to reduce the pressure of pressurized fluid sustained by an ejector plate.

FIG. 91B presents a detailed illustration of the part A in FIG. 91A. Reference numeral 398 in FIG. 91A and FIG. 91B is the clearance between the element of reference numeral 54 and ejector pin, etc., and moreover while the fluid pressurization is not effected, a clearance indicated by reference numeral 401 is provided between the shaft body (e.g., ejector pin, etc.) and the seal to reduce sliding resistance and to prolong the life of K-seal. Needless to say, when fluid pressurization is effected, clearance of reference numeral 401 is closed and sealing properties are enhanced. Where necessary, it is possible to use the slide ring structure depicted in FIG. 83 at one or several points also on a shaft body like ejector pin.

Figure 101:
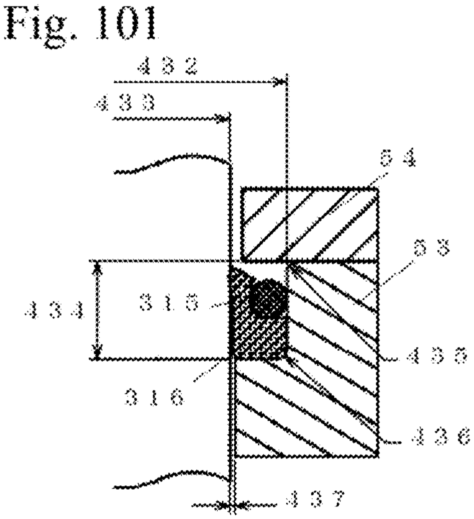
FIG. 101 is a schematic diagram describing the relationship between an ejector pin and its housing when an ejector pin of a different diameter is sealed by using a K-seal of L-shaped type according to Table 14, and indicating the locations of reference numerals in Table 14.

(Table 14, FIG. 101)

Table 14 and FIG. 101 present for reference the dimensions etc. of the housing (configuration for accommodating, configuration for fitting in) of L-shaped seal among K-seals used by the inventor (Table 14).

Explanation is made by using FIG. 101 and Table 14. Reference numeral 433 in FIG. 101 is the diameter of ejector pin and 432 is the size for housing L-shaped seal wherein the actual value is made wider by approximately 0.05 mm than that of reference numeral 432 specified in Table 14 so as to facilitate housing an L-shaped seal. Reference numeral 434 is the depth of housing for accommodating L-shaped seal, for which the inventor uses a value of 4 mm but the size is not limited to it. Reference numeral 437 is the tolerance of fit between ejector pin and L-shaped seal which the inventor has set at H7/f8. The reference numeral 435 is the lip of seal housing that is machined to give a C0.3 (chamfer of 0.3 mm) for facilitating the insertion of L-shaped seal, but instead of C0.3 it can be machined in a rounded profile or made larger or inversely smaller than that. Reference numeral 436 indicates that a rounded profile with a maximum radius of 0.4 mm was machined on the bottom of housing for accommodating L-shaped seal and element of reference numeral 436 corresponds approximately to the outer side of the bottom of housing for the L-shaped seal. Obviously, the provision of the rounded profile at the outer side of the bottom of L-shaped seal is intended for giving a guide to facilitate its fitting into the housing. Although the inventor has set the maximum value of radius for element of reference numeral 436 at 0.4, different values are equally acceptable since element of reference numeral 436 needs only to agree with the profile of outer side of the bottom of L-shaped seal.

The housing for accommodating L-shaped seal comprises seal plates of reference numeral 53 and 54 in FIG. 101.

Although not illustrated in FIG. 101, the tip portion of the ejector pin fitted with an L-shaped seal is machined to present a rounded profile apt for reception so as to protect the L-shaped seal against possible damages. As mentioned previously, it is coated with oil, grease, etc. when inserting.

When the pressurized fluid is introduced into the clearance between ejector plate 28 and ejector plate 29 as shown in FIG. 55, FIG. 59, FIG. 65, FIG. 66 and FIG. 67, it is needed to provide the ejector plates with a sufficient level of strength for enabling them to withstand the pressure of pressurized fluid. For example, ejector plate 28 and ejector plate 29 are fixed together by bolts or the like with a sufficient strength. As the magnitude of pressure exerted on an ejector plate is calculated as a product by multiplying the pressure of pressurized fluid by the area subjected to (sustaining) the pressure of pressurized fluid, if the molded article is large in size and the number of ordinary pins or pressurization ejector pins increases, ejector plate 28 and ejector plate 29 have to be fixed together by using a large number of thick bolts. Moreover, as the space above the ejector plate of reference numeral 28 is normally occupied by a spacer block or the like allowing no fixation (fixation is possible if an additional locking mechanism is provided), care should be taken to increase the plate thickness so that it may not yield to the force of pressurized fluid (the clearance between plate 28 and plate 29 may not open due to the force of pressurized fluid).

Element of reference numeral 402 is a plate provided in order to separate ejector plate 27 from ejector plate 227 by adding a new ejector plate, with a view to diminish the area subjected to the pressure of pressurized fluid.

Although not illustrated, in the structure presented in FIG. 71, FIG. 71 and FIG. 72, they are fixed by a spacer block. With this configuration, as it is easy to sustain the pressure by the mold clamping force, for instance, by core-backing mechanism of injection molding unit, and to prevent the opening of clearance, the implementation by this means is more preferable.

Where necessary, a locking mechanism for preventing rotation (configuration for preventing rotation) of ordinary ejector pin or pressurization ejector pin is provided, for example by making a D-shaped cut on the flanged part.

In the case where the mechanism of core-backing on injection molding unit is utilized, the fluid pressurization is carried out after the pressurization ejector pin is once pushed into the molded article against the decorative surface (after effecting an ejector-plate-press process) and after it is then separated from it. In the case of core-backing, the fluid pressurization is carried out after the core is once pushed against the decorative surface (after effecting a shape-press process) and after it is then separated from it.

Figure 93:
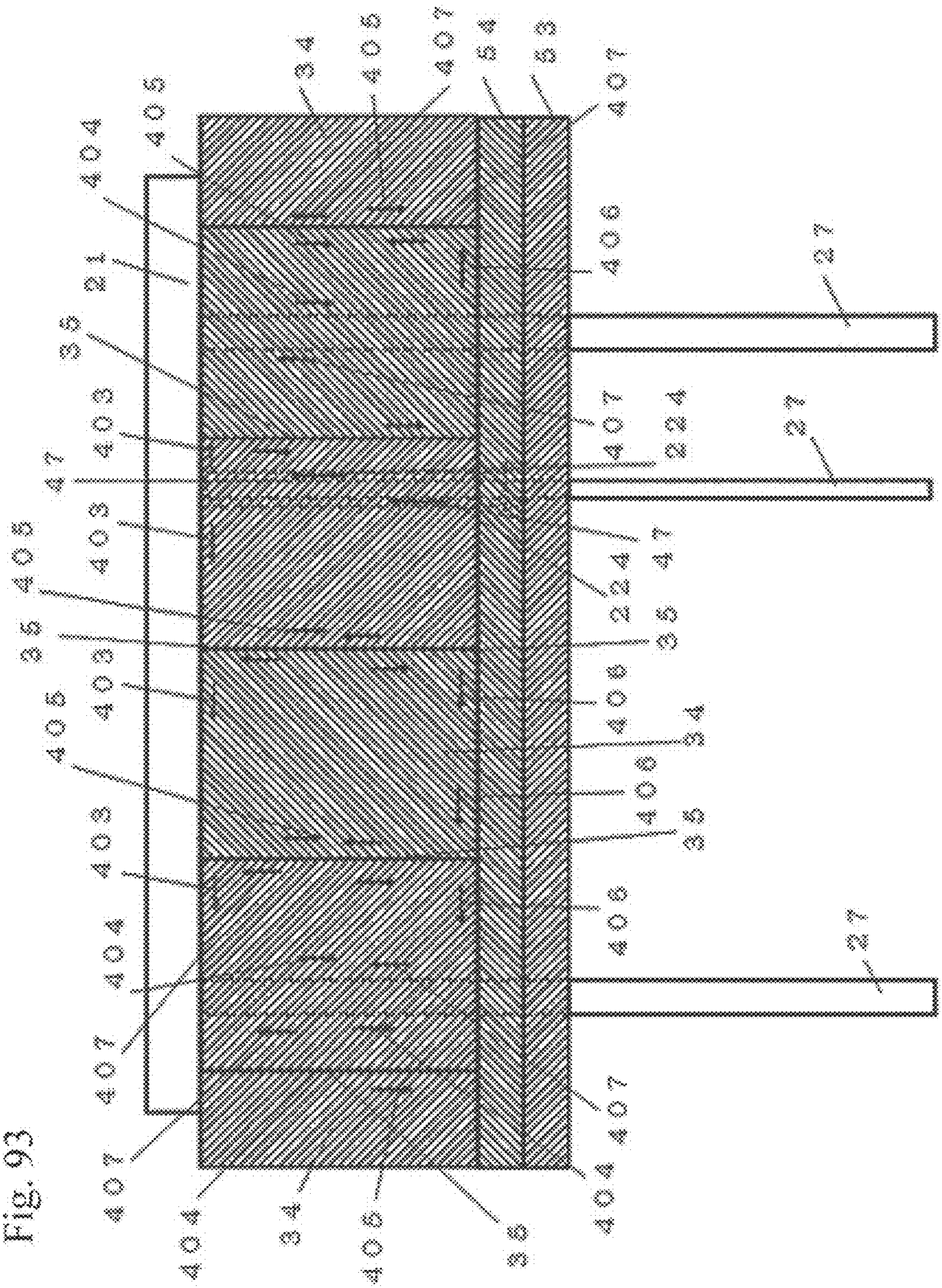
FIG. 93 is a schematic diagram representing the state wherein the pressurized fluid flows erratically.

(Erratic Flow of Pressurized Fluid) (FIG. 93)

As shown in FIG. 93, when fluid pressurization is effected as indicated by reference numeral 47,→(arrowhead), it can be presumed that the fluid enters the clearance between the resin and the mold [as shown by→(arrowheads) of reference numerical 403], circulates through clearances (reference numeral 35) between other nested elements as indicated by reference numeral 405 and through clearances around ordinary ejector pin 27 etc. as indicated by arrowhead of reference numeral 404, passes between the bottom of nested element and plate 54 etc. as indicated by arrowhead→of reference numeral 406, and may sometimes be ejected again as indicated by reference numeral 407. The ejection (renewed ejection) at an irrelevant location presents no problem, but the means for preventing a renewed ejection at a location where the fluid pressurization is not desired are described in the following paragraphs. Such an undesired ejection makes the fluid flow around to the decorative surface and deteriorates its quality extremely.

Figure 94A:
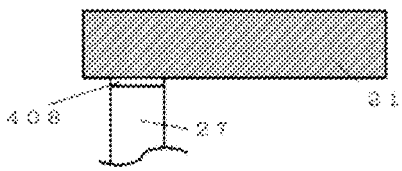
FIGS. 94A to 94C are schematic diagrams representing the means to close off the pressurized fluid flowing erratically at the level of ejector pin.
Figure 94C:
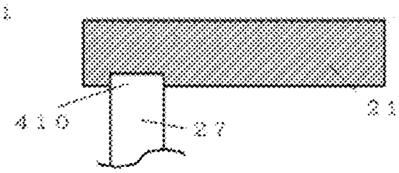
Figure 94B:
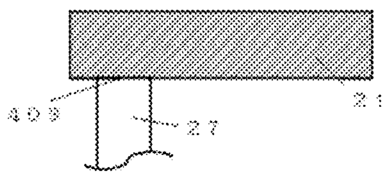

As a means to solve such a problem of loops and erratic flows ("loops" and "erratic flows" are collectively called "erratic flows") of pressurized fluid as illustrated in FIG. 93, with regard to an ejector pin, in the case where the molded article presents a protrusion (in the mold, the ejector pin is depressed) as indicated by reference numeral 408 in FIG. 94A, the pressurized fluid ejected again enters the clearance between the resin and the mold. Even in the case where the tip of ejector pin is at the same level as the surface of molded article as indicated by reference numeral 409 in FIG. 94B, the pressurized fluid ejected again enters the clearance between the resin and the mold. In the case where the molded article presents a depression as compared with the article surface (in the mold, the ejector pin protrudes) as shown in FIG. 94C, the pressurized fluid ejected again is obstructed by a slight step as indicated by reference numeral 410, remains where it is and does not leak out. By such a means, the renewed ejection of pressurized fluid from ejector plate is prevented.

As an alternative means to solve the above mentioned problem of erratic flows of pressurized fluid, where necessary, a unit of Omniseal, Variseal or K-seal is mounted inversely on an ordinary ejector pin or a pressurization ejector pin so as to prevent the reentry of pressurized fluid into the clearance between the resin and the mold.

Where necessary, a part or the entire part (entire circumference) of the lateral face of nested element is sealed by means of O-ring, rubber sheet, Omniseal, Variseal or K-seal so as to prevent the reentry of pressurized fluid into the clearance between the resin and the mold.

For example, it is assumed that the movable side constitutes a surface pressurized by pressurized fluid, and the stationary side constitutes a decorative surface. With this configuration, the pressurized fluid having pressurized the movable side flows around to the stationary side from the parting and pressurizes the stationary side as well which does not require the fluid pressurization. As a result of this, the quality of decorative surface on the stationary side deteriorates.

Figure 95A:
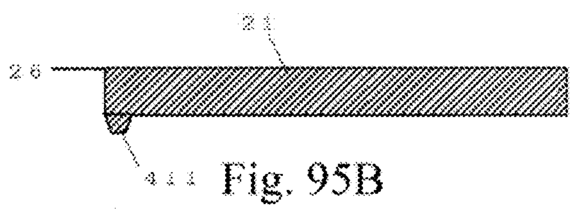
FIGS. 95A and 95B are schematic diagrams representing the provision of a gas rib for preventing the flowing around of pressurized fluid through the parting.
Figure 95B:

As a means to solve this problem, as illustrated in FIG. 95A, a gas rib of reference numeral 411 is provided in the vicinity of the parting on the movable side (on the edge of shaped element), and the fluid flowing around from the parting to the stationary side is obstructed. The said gas rib, as illustrated by reference numeral 412 in FIG. 95B, can alternatively be provided in the vicinity of the parting on the stationary side.

In the case where an ejector pin is placed in the vicinity of parting, the ejector pin is made to protrude as shown in FIG. 94C. There is available also an alternative means to prevent the erratic flows of pressurized fluid, wherein a gas rib of reference numeral 218 is provided also on the ejector pin as depicted in FIG. 33 and FIG. 34, so as to prevent erratic flows of pressurized fluid by confining the fluid within it.

(FIG. 102)

Figure 102:
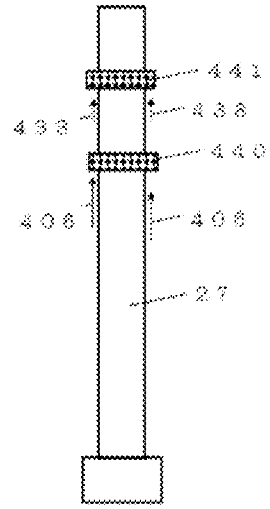
FIG. 102 is a schematic diagram representing the situation where a seal is fitted to an ejector pin by reversing the orientation.

In order to ensure that the pressurized fluid flowing erratically does not pass again through the clearance between an ejector pin and a nested element and effect fluid pressurization, the opening of seal ring 89 is oriented against the direction of intrusion of pressurized fluid flowing erratically. FIG. 102 depicts a configuration wherein, with a view to close off the pressurized fluid flowing erratically, a seal ring is installed in inverse orientation (with its opening oriented against the direction of intrusion of pressurized fluid on seal ring 89). In FIG. 102 element of reference numeral 440 is a seal for closing off the pressurized fluid flowing erratically.

The reason for mounting two seals of reference numerals 440 and 441 in FIG. 102 is the precaution wherein the seal 441 is provided in order to close off completely the possible slight leakage as shown by reference numeral 438 of pressurized fluid 406 flowing erratically when it cannot be closed off completely by seal ring 440.

(FIG. 103)

Figure 103:
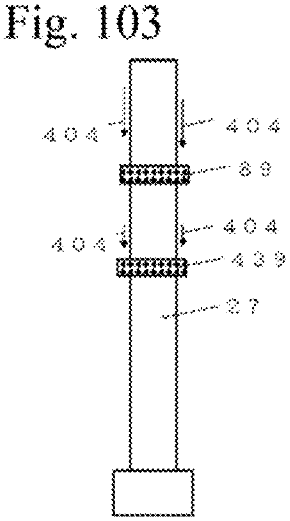
FIG. 103 is a schematic diagram representing the situation where a number of seals have been fitted on an ejector pin.

FIG. 103 depicts a configuration wherein a number of seal rings 89 are used to close off the fluid 404 flowing erratically. The reference numeral 440 indicates a small fraction of pressurized fluid that has leaked out without being closed off by the first seal ring 89. Pressurized fluid 442 is closed off by the seal of reference numeral 439.

(FIG. 104)

Figure 104:
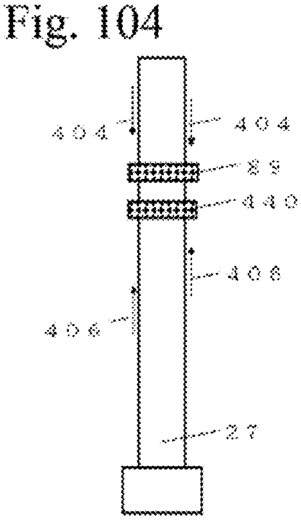
FIG. 104 is a schematic diagram representing the situation where the two seal rings 89 and 440 close off the pressurized fluid flowing erratically from both upper side and lower side.

FIG. 102 illustrates that the pressurized fluid flows erratically only from the lower side of ejector pin 27. FIG. 103 illustrates that the pressurized fluid flows erratically only from the upper side of ejector pin 27. FIG. 104 illustrates that when the pressurized fluid flows erratically from the upper side as well as from the lower side of ejector pin 27, both seal ring 89 and seal ring 440 are provided on the same ejector pin 27 to close off the erratic flows of pressurized fluid. Incidentally, where necessary if a plurality of these seals is provided, the sealing effect can be enhanced.

Omniseal, Variseal and K-seal employed in the present invention present the specificity in their orientation as is evident by their configurations, and consequently it is needless to say that they are able to close off the flow of pressurized fluid coming from only one direction.

(FIG. 95)

As a means to solve this problem, as illustrated in FIG. 95A, a gas rib 411 is provided in the vicinity of the parting on the movable side (on the edge of shaped element), and the fluid flowing around from the parting to the stationary side is obstructed. The said gas rib, as illustrated by reference numeral 412 in FIG. 95B, can be provided in the vicinity of the parting on the stationary side as well.

In the case where an ejector pin is placed in the vicinity of parting, the ejector pin is made to protrude as shown in FIG. 94C. There is available also an alternative means to prevent the erratic flows of pressurized fluid, wherein a gas rib of reference numeral 218 is provided also on the ejector pin as shown in FIG. 33 and FIG. 34, so as to prevent erratic flows of pressurized fluid by confining the fluid within it.

If the pressurized fluid flowing erratically out of an ejector pin is ejected, a seal is mounted with its orientation reversed. Incidentally, in FIG. 102 the illustration of seal plate to fix K-seal is omitted. Moreover, as described previously, when the pressure of pressurized fluid is high, a multiple number of seals are used. FIG. 103 presents a case where a multiple number of K-seals were used.

A pressurization pin or a pressurization ejector pin is made to exercise the effect of so-called "air-ejector" function by letting it eject the pressurized fluid when extracting the molded article from the inside of cavity after the mold is opened, because the fluid ejection facilitates the separation of article from the mold.

After closing the mold and before filling the cavity with a molten resin, by letting a pressurization pin or a pressurization ejector pin eject in advance an inert gas, for example, nitrogen gas, the oxygen concentration in the cavity is lowered, and consequently the function of reduction of welding, prevention of burns, etc. can be exerted.

(FIG. 96)

Figure 96:
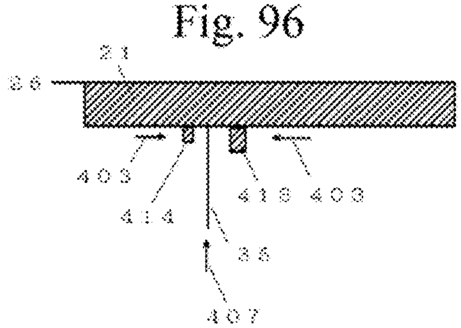
FIG. 96 is a schematic diagram representing a configuration wherein a gas rib was provided to prevent the entry of pressurized fluid into the matching surface (clearance) of nested element. The diagram also represents the situation wherein the pressurized fluid that flows erratically and is ejected again through the clearance of nested element is closed off (contained) by a gas rib.

As shown in FIG. 96, care is taken to ensure that, by enclosing the matching surface of a nested element with gas ribs, the pressurized fluid does not intrude into the nested element, or even if the pressurized fluid flows erratically and is ejected again from the clearance of nested element, it does not leak out of the enclosure of gas ribs. Care is taken to ensure that the pressurized fluid flowing erratically does not flow around from the parting to the stationary side.

(Partial Sealing of Nested Element)

(FIG. 97)

Figure 97:
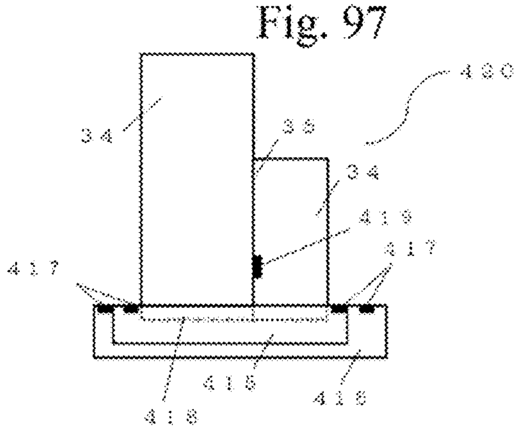
FIG. 97 is a schematic diagram representing the means to prevent the erratic flow of pressurized fluid in the nested element where the pressurized fluid flows erratically, by sealing the whole unit of nested element.

On plates of reference numerals 53 and 54, all the nested elements on the movable side are sealed as a whole. By relying on the same means, a structure is constructed wherein, as shown in FIG. 97, a set of limited number of nested elements only are sealed by using upper seal plate 415 and lower seal plate 416, and then the whole block of sealed nested elements indicated by reference numeral 420 is incorporated into the set of plate 53 and plate 54. The structure thus constructed is able to stop and block the erratic flows of pressurized flows.

Furthermore, where necessary, as shown by reference numeral 419, a seal is provided on the matching surface of nested elements to prevent a renewed intrusion, erratic flows after a renewed ejection and erratic flows of pressurized fluid. Seal 419 can be provided over the whole matching surface or on a portion of it.

(Fluid Pressurization from Movable Side as Well as from Stationary Side)

If the fluid pressurization is carried out simultaneously or at staggered timings on the movable side as well as on the stationary side, the action and effect of fluid pressurization is enhanced in comparison with the article of solid injection molding or with the case of fluid pressurization from only one side, for example, from only the movable side. Consequently, the fluid pressurization from two sides contributes to reducing product weight and material cost and to a higher dimensional stability.

(Eccentric Pressurization Pin and Pressurization Ejector Pin)

(FIG. 98)

Figure 98:
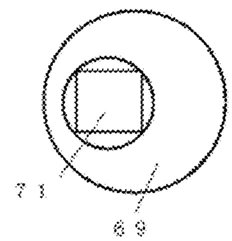
FIG. 98 is a schematic diagram, as viewed from above, of a pressurization pin or pressurization ejector pin in which the inner core is placed eccentrically.

With regard to the configuration of pressurization pin or pressurization ejector pin, the outer cylinder 69 and the inner core 71 need not be concentric to each other and can be made mutually eccentric as shown in FIG. 98. By making them mutually eccentric and thus defining the direction for ejecting pressurized fluid, the direction of fluid pressurization can be defined.

Figure 99A:
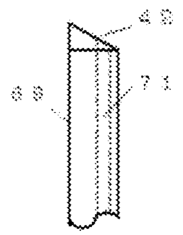
FIGS. 99A and 99B are schematic diagrams representing the configuration wherein the flow direction of pressurized fluid is controlled by giving a slanted form to the tip of pressurization ejector pin.
Figure 99B:
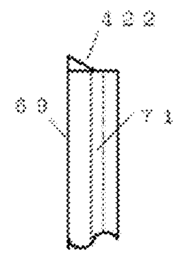

In the case where they are made eccentric to each other, if the ejection portion on the top is cut obliquely as shown by reference numeral 421 or 422 in FIG. 99A or FIG. 99B, the pressurized fluid is made (controlled) to flow in a specific direction.

In the injection blow molding, if an eccentric pin is used, the pressurized fluid is guided in an aimed direction and is able to form hollows therein.

In FIG. 99, the inner core 71 is made eccentric to the outer cylinder 69, but it can be made concentric with it as well.

(FIG. 100)

Figure 100A:
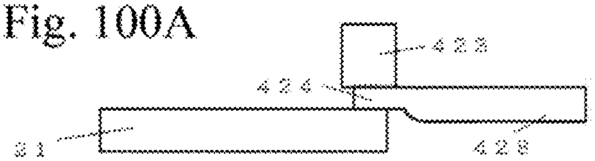
FIGS. 100A to 100C are schematic diagrams representing the operation of automatic gate-cut.
Figure 100B:
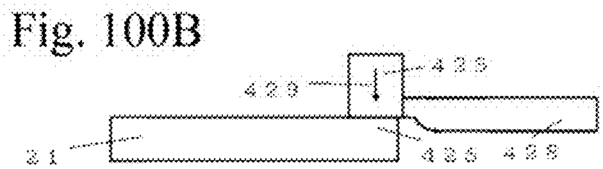
Figure 100C:
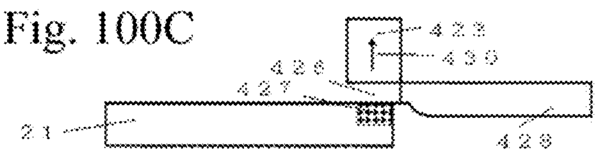

In the operation of pressure forming-injection molding, injection blow molding or injection foam molding of the present invention, unless resin pressure keeping is employed, the role of gate is finished once the cavity is filled with a molten resin. The automatic gate-cut can be carried out if, as shown in FIGS. 100A to 100C, a side mounted gate is used and by pushing the thrust pin of reference numeral 423 provided in the upper section. If this means is utilized, the width and the thickness of the gate of reference numeral 424 shown in FIG. 100 can be made wide and thick without any relevance, and consequently latitudes of injection molding conditions can be made wide.

The means of above-described automatic gate-cut is feasible not only in pressure forming-injection molding but also in injection blow molding and injection foam molding when resin pressure keeping is not used, and the means is called "press-gate" in the present invention.

FIG. 100A illustrates the state wherein cavity 21 is filled with a molten resin from sprue-runner of reference numeral 428 through the gate of reference numeral 424.

FIG. 100B illustrates that gate 424 has been pushed in by thrust pin 423 into the portion of reference numeral 425 in cavity 21.

FIG. 100C illustrates that the thrust pin has receded to original position and the automatic gate-cut operation has been completed.

In FIGS. 100A to 100C, reference numeral 429 is the arrowhead indicating the advance of thrust pin 423, reference numeral 430 the arrowhead indicating the recession of thrust pin 423, reference numeral 426 the space where gate-cut was carried out, reference numeral 427 the gate 424 having been pushed in into cavity 21.

(Core Backing in Injection Foam Molding)

The operation of injection blow molding is carried out with a foamable resin. The step of core-backing is retarded and a rib is erected inside. Or with the core-pin kept in a pushed-in position and by creating an unfoamed shaped element around it, the strength can be expected to become higher than that of a product consisting wholly of a foamed layer.

If the process of gas counter pressure is employed, the strength is further enhanced in comparison with the case where the process is not employed, because a skin layer is created on the surface.

(Mold Using a Ball-Check Nozzle Inside It)

Descriptions shall be made on the nozzle accompanying the injection molding unit in carrying out the processes of pressure forming-injection molding and injection blow molding. The processes of pressure forming-injection molding and injection blow molding can be carried out even with an open nozzle, but in the case of open nozzle, the pressurized fluid passes through a sprue-runner and intrudes into the heating cylinder of injection molding unit, and as a result, if the injection molding process is carried out with the pressurized fluid being present in the heating cylinder, problems of occurrence of silvering, short-mold, etc. are caused. Under a high pressure, it is even likely that the screw inside the heating cylinder is pushed back. As a means to solve this problem, in the aforementioned pressure forming-injection molding and injection blow molding, a shutoff nozzle actuated by a hydraulic, pneumatic or electric motor, etc. is employed. Even in the case where a shutoff nozzle is employed, if the pressure of pressurized fluid is raised, the pressurized fluid intrudes from around the area where a needle housed inside the shutoff nozzle comes in contact with the tip portion of nozzle, and consequently the fluid pressurization cannot be carried out at such a high pressure.

Furthermore, in the injection molding unit using a shutoff nozzle, the pressure loss and the speed loss when injecting and filling a resin are significant, and consequently the latitude of molding condition [range (extent) within which a molding parameter can be set] is made narrower.

As a means to solve these problems, a nozzle with a ball-check (ball-check nozzle) used in pressure forming-injection molding or injection blow molding of the present invention has been developed (FIG. 105A to FIG. 105D).

Figure 105A:
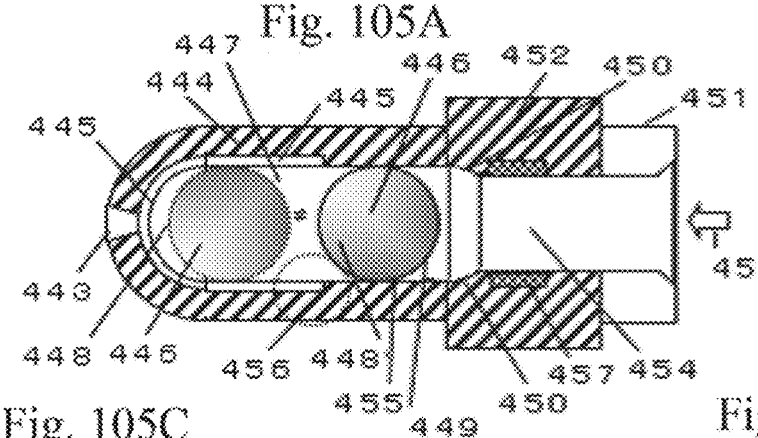
FIGS. 105A to 105D are schematic diagrams representing the configuration wherein a ball-check is incorporated.

The structure of ball-check nozzle is described. In FIG. 105A, element of reference numeral 443 is the hole in the nozzle tip through which a molten resin flows out and it is normally shaped straight or tapered as illustrated in the figure. Element of reference numeral 444 is the nozzle cap, the ball of reference numeral 446 advances to the anterior part of nozzle cap 444 due to the injection force of molten resin (flowing force of molten resin, injection pressure of molten resin); as a groove indicated by reference numeral 445 has been engraved on the inside of nozzle cap 444, clearance is formed between groove 445 and ball 446 when ball 446 advances. The molten resin is filled into the cavity from clearance formed by groove 445 and ball 446 and through hole of reference numeral 443.

Element of reference numeral 447 is a space in which ball 446 moves back and forth, through which the molten resin in the heating cylinder of injection molding unit passes and then is filled into the mold cavity from the hole of reference numeral 443 and through the sprue-runner.

The cavity is filled with a molten resin, and the fluid pressurization is effected by carrying out a process of pressure forming-injection molding during the filling step or upon completing it. Or if a process of injection blow molding is carried out, the pressurized fluid intrudes into the nozzle from the hole of reference numeral 443 after passing through the inside and the outside of sprue-runner, but as the pressure is sustained by the surface indicated by reference numeral 448 (front face of ball), ball 446 is moved back, and the surface of reference numeral 449 (rear surface of ball) touches the surface of reference numeral 450 or reference numeral 509, closes the passage, and prevents the intrusion of pressurized fluid beyond that point (intrusion of pressurized fluid into the heating cylinder of injection molding unit). Element of reference numeral 450 is shaped so as to conform to the spherical profile of ball 466, i.e., to have an identical spherical surface, and to constitute a seal by surface-to-surface contact. Element of reference numeral 509 is shaped in a conical form (funnel shape, funnel type) so as to constitute a seal by making a line-to-line contact with ball 446. Element of reference numeral 451 is a threaded part for connecting with the heating cylinder of injection molding unit and element of reference numeral 452 is the nozzle body which is machined, although not illustrated, to present a D-shaped cut cross-section on one side or both sides or a hexagonal cross-section so as to facilitate the tightening with a spanner.

Between the outer surface of ball 446 and the inside surface of the bore of reference numeral 447 (space through which element of reference numeral 466 passes or a molten resin flows), there is provided a gap (backlash, clearance) 455 of approximately 0.01 mm to 1 mm large enough for allowing easy displacement of ball. The distance of displacement back and forth of ball 446 can be sufficient as long as a passage for the resin is created when ball 446 reaches groove 445. Reference numeral 453 indicates the flow of molten resin. Element of reference numeral 454 is the flow channel of molten resin 453.

With regard to ball 446, it is moved back by the pressure under which the pressurized fluid intrudes into the nozzle or the reverse flow of the resin injected into the cavity as far as it gets in touch with element of reference numeral 450 or that of 509 and forms a seal; if it is desired to increase the sealing effect of the ball, element of reference numeral 457 may, in certain cases, be made of a magnet which attracts ball 446 (of ferromagnetic substance) and enhances the sealing effect. The magnet can be a ferrite magnet, but it is desirable to use a magnet with a strong magnetic force made of one of rare earthes like neodymium, samarium, etc. Moreover, when an ordinary ferrite magnet is used, in certain cases, a means may be adopted wherein the magnetic force is concentrated by sandwiching a magnet with a non-magnetic material like brass.

Figure 105B:
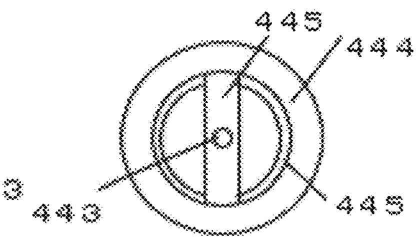

FIG. 105B illustrates the inside of element of reference numeral 444. It illustrates a view of the inside when the element is looked into from the right of page in FIG. 105A and FIG. 105D; elements of reference numerals 443, 445, etc. can be identified.

Figure 105C:
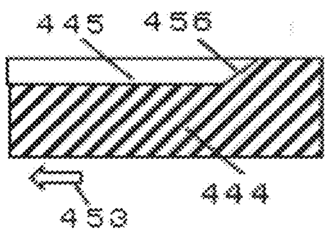

FIG. 105C illustrates a configuration wherein the end portion [rear end portion (reference numeral 456)] of groove 445 is machined to present an inclined surface so that the resin may not accumulate there. If it is machined to present a configuration like reference numeral 456, it becomes a guide for the pressurized fluid, and hence it is feared that the pressurized fluid might intrude into the heating cylinder of injection molding unit. In that case, if the end portion is machined to present a vertical rise or an inverse tapered shape which is opposite to reference numeral 456, the resin accumulates at this portion of 456, and it is feared that the accumulated resin produces foreign matters and causes contamination, although, on the other hand, it increases the pressure exerted on the element of reference numeral 448 and consequently can enhance the sealing properties.

Figure 106A:
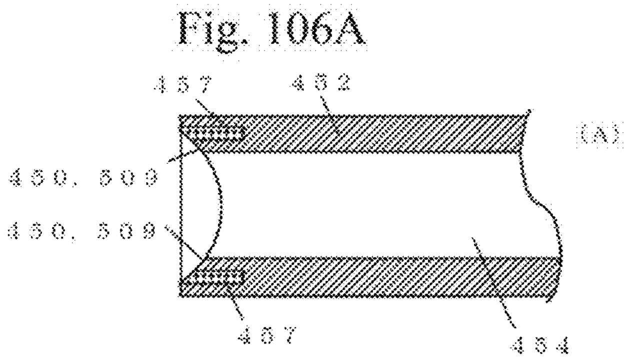
FIGS. 106A and 106B are schematic diagrams representing the configuration wherein sealing properties are enhanced by using a magnet.
Figure 106B:
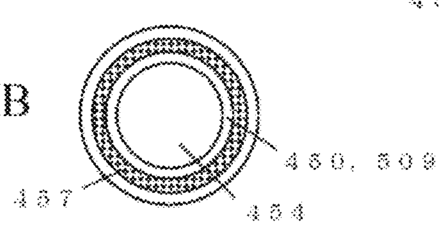

FIG. 106A and FIG. 106B present the drawings of a structure wherein a magnet is incorporated into the nozzle body. FIG. 106B presents a view of the inside of element of FIG. 106A when it is looked into from the left of page.

Figure 105D:
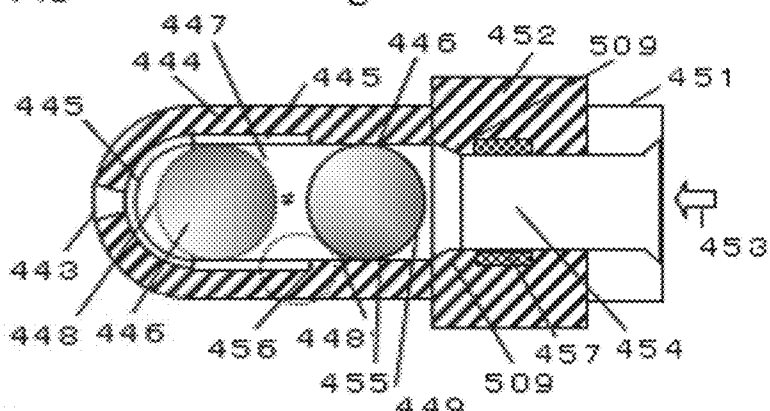

Needless to say, although not illustrated in FIG. 105A to FIG. 105D, FIG. 106A and FIG. 106B, heating devices and temperature sensors for on-off control of heating devices are incorporated in the illustrated elements. Moreover, as the ball 446 has to be placed inside the nozzle, the nozzles illustrated in FIG. 10A to FIG. 105D are configured to have a structure that can be assembled by joining two or three separate pieces by screwing them together.

Ball 446 moves back due to the pressure of pressurized fluid, touches the element of reference numeral 450 and prevents the intrusion of fluid into the heating cylinder. However, the sealing properties are enhanced by fitting a ring-shaped seal (O-ring) on the surface of 450, and the intrusion of pressurized fluid into the heating cylinder can be prevented. As a material for the said seal, because it is placed inside the nozzle of injection molding unit, it is needed to employ a highly heat-resistant material like silicone resin, Teflon resin, or a metal like cupper, brass, silver, aluminum, spring steel, stainless steel, etc. Previously mentioned products like Variseal, Omniseal, K-seal, etc. can also be employed.

The said seal can be fitted also on the element of reference numeral 449, 459 or 460 illustrated in FIG. 107A to FIG. 107L.

Instead of ball 446, other shaped elements illustrated in FIG. 107B to FIG. 107L can also be employed. FIG. 107A depicts the ball 446 presented in FIG. 105, and FIG. 107B depicts a bale-shaped element. FIG. 107C depicts an element derived from the above-shown bale-shaped element by adding to it a guide of reference numeral 462, so that guide 462 is housed in element of reference numeral 454 when the shaped element is moved back due to a force like the pressure of pressurized fluid, and so that the positioning is performed. FIG. 107D depicts an element derived by replacing the portion 449 of FIG. 107B with a flat surface 460. FIG. 107E depicts a shaped element derived by fitting element 462 on that of FIG. 107D. Needless to say, if the configuration of reference numeral 460 is employed, sealing effect is not realized unless the element of reference numeral 450 or 509 also is made to have a flat surface. FIG. 107F depicts an element derived by replacing the spherical shaped element of reference numeral 449 with a conically shaped element of reference numeral 459. FIG. 107G depicts a shaped element derived by fitting a guide 462 on the shaped element of FIG. 107F. Needless to say, if the rear portion is made to present a conical shape, the element of reference numeral 450 also needs to present the same but inverted conical shape. FIG. 107H depicts an element derived by replacing the spherical element of reference numeral 448 of tip portion of element of FIG. 107D with a conical shaped element 458. FIG. 107I depicts an element derived by replacing the element of reference numeral 448 of tip portion of element of FIG. 107B with a conical shaped element 458. FIG. 107J depicts an element derived by replacing a part of element 449 of FIG. 107B with a flat surface of reference numeral 461. FIG. 107K depicts an element derived by replacing a part of element 459 of FIG. 107F with a flat surface of reference numeral 461. FIG. 107L depicts an element derived by fitting a guide 462 on the element of FIG. 107A. Although not illustrated, guide 462 has about the same diameter as that of element 454. As the guide presents an obstacle (hindrance) to the injection of molten resin if it remains inserted when injecting the molten resin, a passageway for molten resin is created by machining a D-cut of reference numeral 463 and the like. Although not illustrated, the end face of guide 463 is machined to present an R-chamfer or C-chamfer plane. In a nozzle using an element of FIG. 107C, FIG. 107E or FIG. 107G if guide 462 is withdrawn completely out of bore 454, the flow channel of molten resin can be secured, and consequently the above-mentioned D-cut 463 is not needed. In such a case, the long shaped element as a whole serves for positioning and guidance.

The shaped element of FIG. 107D or FIG. 107E effects a seal by a surface-to-surface contact. In this case, above-mentioned magnet of reference numeral 457 and seal of reference numeral 460 can be fitted on the element of reference numeral 460 in FIG. 107D. As long as the attraction (attraction between north pole and south pole) is established, there is no problem even if both 457 and 460 are magnetized.

Needless to say, the magnet can be mounted also on both spherically-shaped element of reference numeral 449 and conically-shaped element of reference numeral 459.

In the nozzles depicted in FIG. 105A to FIG. 105D, only one ball 446 was used, but with a view to enhance further the sealing effect, two or more balls 446 are used as illustrated in FIG. 108. FIG. 108 exemplifies the case where two balls 446 are used, but any one of shaped elements depicted in FIG. 107A to 107L can be combined respectively. (FIG. 108)

The material for ball 446 shown in FIG. 105 and for different types of shaped elements shown in FIG. 107A to 107L needs not be a metal but can also be a ceramic. If an element is of ceramic, as it is not attracted by the embedded magnet, in certain cases a magnet may be embedded in a shaped element made of ceramic. In certain cases, a ceramic and a metal may be combined. For example, in FIG. 107C, the bale-shaped element is to be of ceramic and guide 462 is to be of metal.

In FIG. 105A, element of reference numeral 450 is made to have the same spherical shape as reference numeral 449 or to be a spherical socket with a diameter slightly larger than that of ball 446 so as to receive the element of reference numeral 449. If a resin is trapped between elements of reference numerals 449 and 450, the clearance is enlarged and the pressurized fluid intrudes. As a means to solve this problem, if the element of reference numeral 509 is made to have a conical shape as shown in FIG. 105D so as to make a seal by line-to-line contact with the element of reference numeral 449, the problem is solved. Similarly also in cases of shaped elements shown in FIGS. 105A, B, C, I, J and L, in certain cases, the shaped element of the opposite side receiving them may be made to have a conical shape illustrated as element of reference numeral 509 in FIG. 105D, so as to make a seal by line-to-line contact. In cases of conically-shaped elements shown in FIGS. 107F, G and K, a seal by line-to-line contact is made by configuring a spherical shape like the element of reference numeral 450. In cases of FIGS. 107D, E and H, in addition to the configuration by flat surface, the configuration by elements of reference numerals 450 and 509 makes it possible to establish a line-to-line contact.

When the nozzle for the use in pressure forming-injection molding and injection blow molding as described above and illustrated in FIG. 105 to FIG. 108 is used in injection solid molding, as the resin having been injected into the cavity does not flow back (make back-flow) into the heating cylinder of injection molding unit, the effect of resin pressure keeping is enhanced.

The nozzle for the use in pressure forming-injection molding and injection blow molding as illustrated in FIG. 105 to FIG. 108 can be used also as a nozzle for hot-runner. It is also possible to embed in the primary sprue of mold the nozzles illustrated in FIG. 105 to FIG. 108.

(Hot Runner Provided with a Valve Structure)

Figure 117A:
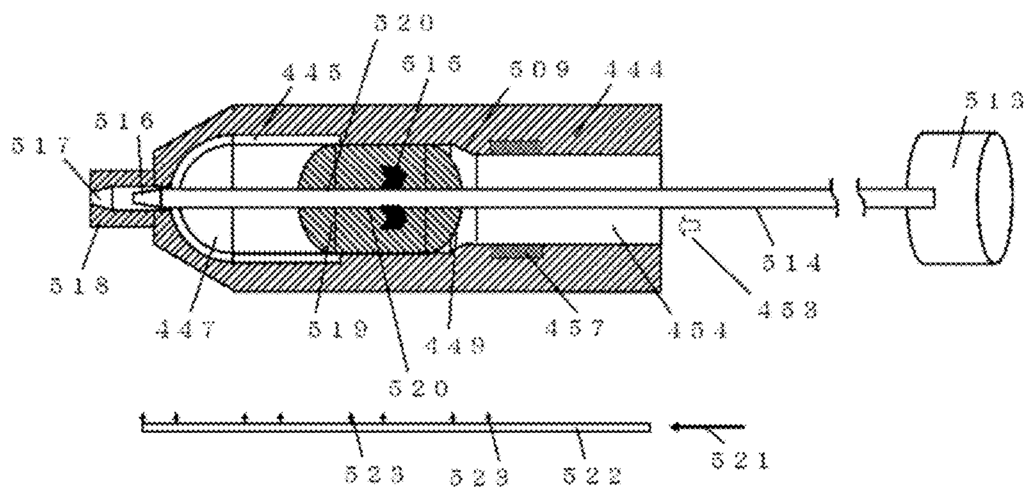
FIGS. 117A and 117B are schematic diagrams of hot-runners that can be used in the pressure forming-injection molding and the injection blow molding.
Figure 117B:
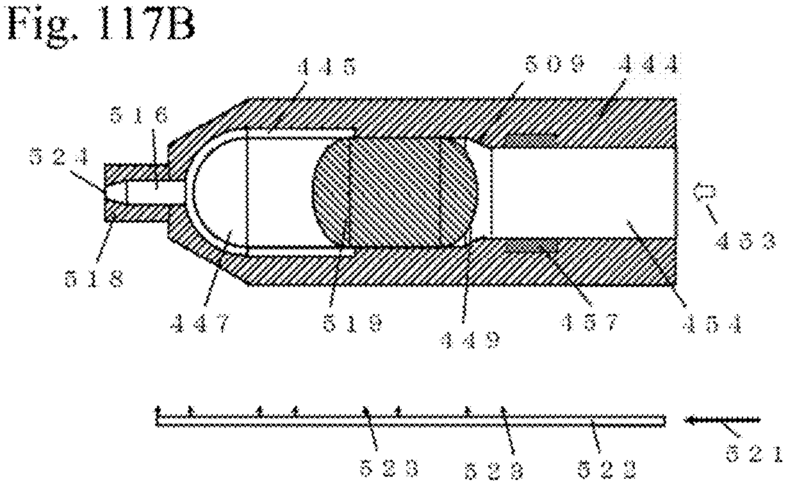

With respect to the hot runner to be employed in pressure forming-injection molding and injection blow molding, a hot runner of valve-gate type is used for the purpose of preventing the pressurized fluid from intruding into manifold, into nozzle of injection molding unit and into heating cylinder of injection molding unit. In this case however, if the pressure of pressurized fluid is increased, similarly as in the case of previously described shut-off nozzle, the pressurized fluid may be able to intrude through the clearance at the matching part between valve pin of reference numeral 516 and element of reference numeral 517 (into which the element of reference numeral 516 fits, with the hot runner being closed upon completing the injection of molten resin). As a means to solve this problem, it is desirable to use a type of hot runner having a structure provided with an internal valve as depicted in FIG. 117A and FIG. 117B. When the valve-pin of reference numeral 514 fails to prevent the intrusion of pressurized fluid, a valve of reference numeral 519 (in FIG. 117, the element of FIG. 107B) is incorporated to prevent the intrusion of pressurized fluid beyond that point. However, as the fluid intrudes through the clearance indicated by reference numeral 520 between valve 519 and valve-pin 514, the intrusion beyond that point is blocked by a seal of reference numeral 515. The seal 515 is made to have the same structure and function as that of the seal of reference numeral 89, but as it is placed inside the hot runner, a seal made of material having an excellent heat resistance like Teflon is used. In certain cases, instead of Teflon, an elastic material or a metal like stainless steel with an excellent elastic property may be used. Element of reference numeral 513 is the mechanism for driving element of reference numeral 514, activated by a hydraulic, pneumatic or electric motor or by a magnet or the like. Element of reference numeral 518 constitutes the apical end section of hot runner and fitted into the mold.

The function as a hot runner can be performed sufficiently even with a structure in which valve-pin of reference numeral 514 is not incorporated but only valve 519 is incorporated as shown in FIG. 117B.

FIG. 117A and FIG. 117B are schematic diagrams illustrating the nozzle portion of hot runner; other elements like manifold are omitted from FIG. 117A and FIG. 117B.

Reference numeral 521 indicates the air for cooling the nozzle of hot runner. The hot runner is equipped with a heating element (not illustrated) and a thermocouple (not illustrated). If the hot runner including a manifold is cooled by means of air, as the switching on and off of the heating element occurs frequently, and hence the variation of controlled temperature becomes small, a stable molding process can be carried out with features like capability to reduce burns of resin around the nozzle. Element of reference numeral 522 is a pipe fitting provided with a view to cool the nozzle, and arrowheads (↑) of reference numeral 523 indicates the air blown to the hot runner nozzle.

(Means of Fluid Pressurization)

FIG. 55 etc. illustrate a means of fluid pressurization through pressurization ejector pin 227 by introducing the pressurized fluid into the clearance between upper ejector plate (reference numeral 28) and lower ejector plate (reference numeral 29). In this case of introduction of pressurize fluid through ejector plates, there occur leakages of pressurized fluid and the separation of upper ejector plate 28 from lower ejector plate 29, unless the ejector plates have a sufficiently high level of strength. It is difficult to confine the pressure of pressurized fluid without any leakage by means of an ordinary method of simply fastening together the upper ejector plate 28 and the lower ejector plate 29 with bolts by relying on only the strength of these bolts.

Figure 109:
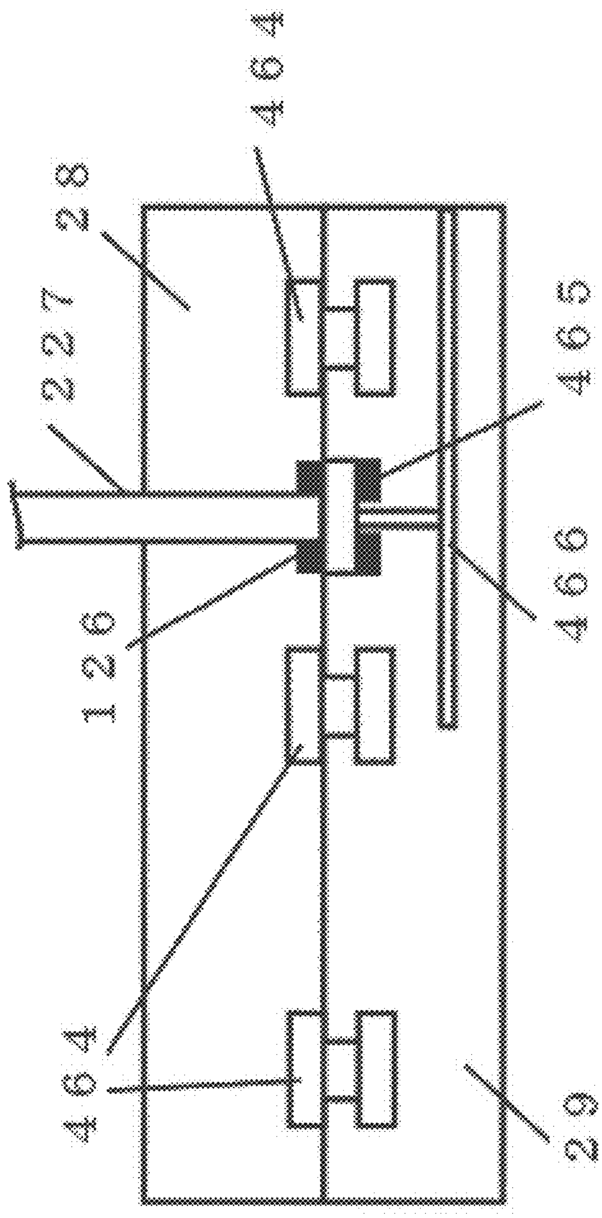
FIG. 109 is a schematic diagram representing the means to ensure the strength of connection between ejector plate 28 and ejector plate 29.

As a means to solve this problem, it is possible to secure the joint strength of upper ejector plate 28 and lower ejector plate 29 by fitting them up with rail-shaped elements of reference numeral 464. (FIG. 109)

Needless to say, upper ejector plate 28 and lower ejector plate 29 are fastened together with bolts (not illustrated) after fastening them together with rails 464. Seal 126 and seal 465 are provided on the flanged part of pin 227. Element of reference numeral 466 is a passageway of pressurized fluid provided in lower ejector plate 29 and connected to the underside of flanged part of 227. By providing a seal 465 on the underside of flanged part of 227, the pressure exerted by pressurized fluid is diminished so as to prevent the separation of ejector plate 28 from ejector plate 29 due to the effect of pressurized fluid. Although not illustrated, in certain cases, a seal 229 may be provided on the matching surface between ejector plate 28 and ejector plate 29.

(Means of Fluid Pressurization from Mounting Plate on the Movable Side)

With FIG. 55 etc., the means to introduce the pressurized fluid through the clearance of ejector plates were described. FIG. 109 illustrated a means to enhance the strength of ejector plates. With the structure presented in FIG. 110, by providing a pressurization pin 467 on mounting plate 23 on the movable side, a sufficiently high level of strength can be ensured even if the pressure of pressurized fluid is exerted.

Element of reference numeral 477 is the die plate (platen) of injection molding unit, element of reference numeral 472 is the plate to fix the pressurization pin 467; a seal 465 being employed below the flanged part of the pin. Where necessary, seal 126 is employed on the upper side of the flanged part. Element of reference numeral 478 is a support pillar capable of sustaining adequately the pressure exerted when the fluid pressurization is carried out. Element of reference numeral 269 is a return pin in the tip of which a mechanism (a spring, etc.) as shown in FIG. 64 is embedded; the clearance 475 being adjusted by the length of return pin 269.

The said spring is not always needed to be provided only on the tip of return pin, but it can be installed also in other locations (on the plate 28 and other locations). In addition to a spring, a gas spring, urethane rubber, and pneumatic or hydraulic cylinder can also be used.

Clearance 475 is opened (created) by the advance of ejector mechanism (mechanism to push out the ejector plate) of injection molding unit. Outer cylinder 470 of fluid pressurization mechanism is mounted on ejector plate 28 and ejector plate 29, and moved forth by the mechanism of ejector plates and moved back by the mechanism of previously mentioned spring and the like. Due to the backward movement, outer cylinder 470 is separated from the point where its tip comes in contact with the molten resin in the cavity, and space 491 or space 493 is created. The pressurized fluid is ejected into this space, enters the clearance of molten resin injected into the cavity and effects the fluid pressurization.

Outer cylinder 470 is at an advanced position due to the function of ejector mechanism of injection molding unit or the like while the molten resin is being injected into cavity 21. At the stage where outer cylinder 470 is at an advanced position due to the function of ejector mechanism of injection molding unit, the molten resin is injected into the cavity. When outer cylinder 470 is in an advanced position, it is subjected to the injection pressure of resin, but the pressure is sustained by the ejector mechanism of injection molding unit. If the area subjected to resin injection pressure is large, as the force available on the ejector mechanism cannot adequately sustain the pressure, a mechanism, for example, like the wedge unit of reference numeral 278 is provided.

Element of reference numeral 473 is a plate for conducting the pressurized fluid to the bottom of pressurization pin 467; a circuit of pressurized fluid 471 being machined in the plate. Seals 476 are provided between plate 472 and plate 473. Seal 476 is installed in the rear part (back side) 468 of flanged part of pressurization pin 467 so as to reduce the pressure exerted on mounting plate 23 by preventing the leakage of pressurized fluid to elsewhere.

Needless to say, sealing means are employed on pressurization pin 467 and outer cylinder 470 by providing K-seals, seals of the parting and the like to prevent the leakage of pressurized fluid. 471 indicates a passageway of pressurized fluid, reference numeral 469 indicates inlet/outlet port for pressurized fluid; care is taken so as to prevent the leakage of pressurized fluid into the clearance between 472 and 473 by sealing it with element of reference numeral 474.

(Movements of Ejector Pin)

Figure 111A:
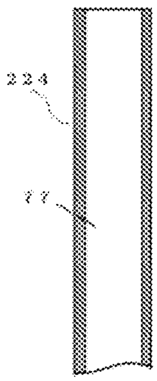
FIGS. 111A to 111I are schematic diagrams representing the structure and the movement of pressurization pin.

The movements of ejector pin employed in the present invention are described. The structure of ejector pin capable of effecting the fluid pressurization is illustrated in [FIG. 111A to FIG. 111I, FIGS. 112A and 112B, FIG. 113A to FIG. 113E] and FIG. 111A to FIG. 111D. FIG. 111A depicts the terminal portion of the outer cylinder 244 depicted in FIG. 52.

Figure 110:
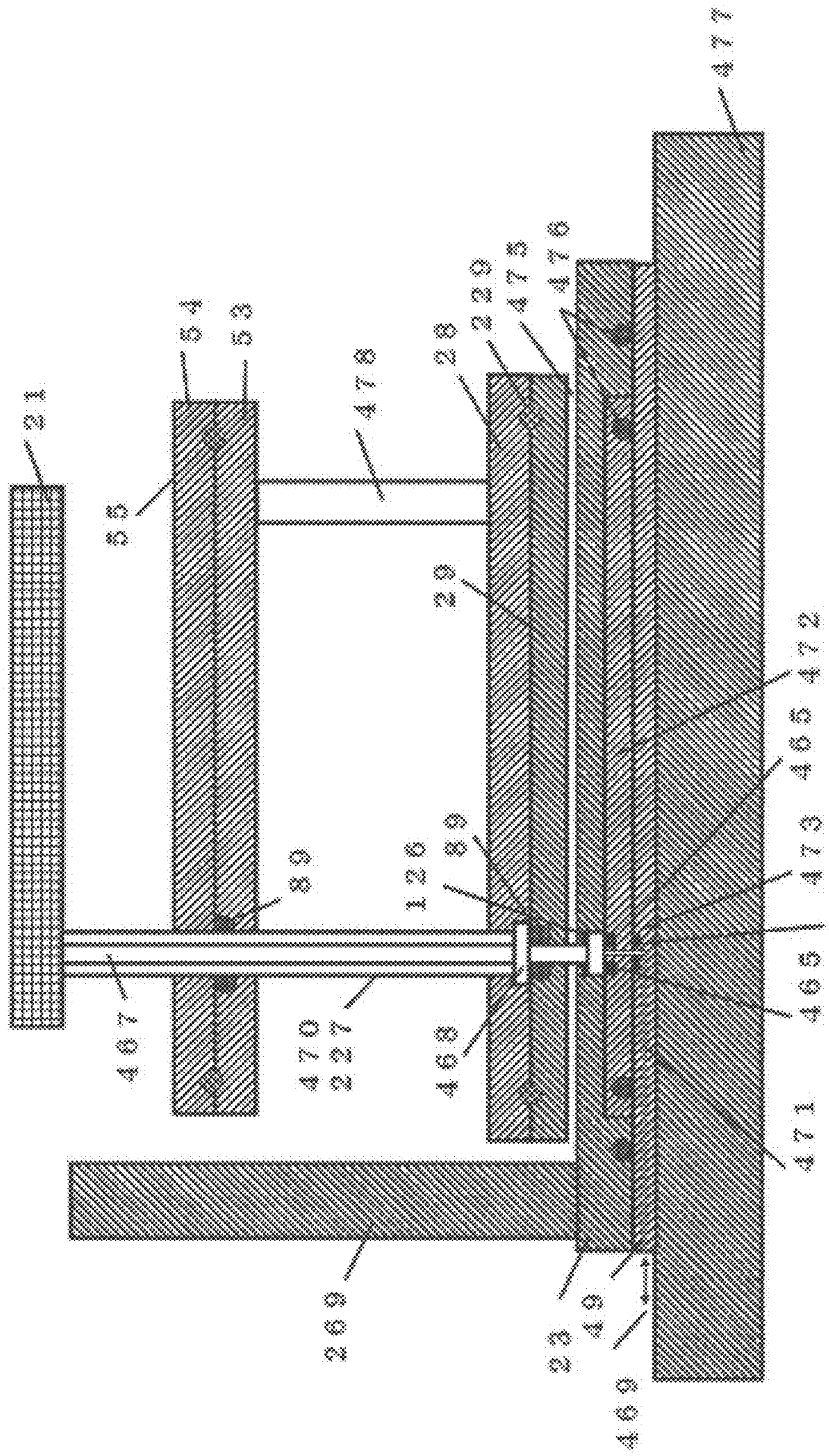
FIG. 110 is a schematic diagram representing the condition that a sufficient level of structural strength is ensured by mounting pressurization pin 467 on plate 23 on the movable side, even when the structure is subjected to the pressure of pressurized fluid.

This bottom part corresponds to the outer cylinder of reference numeral 470 depicted in FIG. 110. As the element of reference numeral 470 is mounted on the ejector plate, the ejection of molded article is effected by the element of reference numeral 470. In other words, the outer cylinder of reference numeral 470 serves as an ejector pin.

Figure 111B:
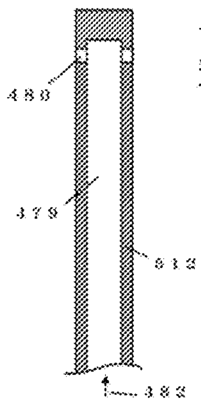
Figure 111C:
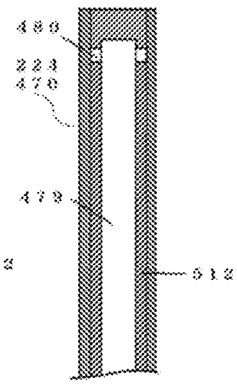
Figure 111D:
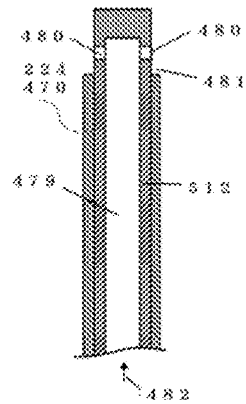

FIG. 111B illustrates an ejector pin through which a bore (reference numeral 479) is drilled by using a super-drill, gun-drill or the like, and across which a hole of reference numeral 480 leading to element of reference numeral 479 is drilled on the lateral face. FIG. 111C illustrates the state where element of reference numeral 244 in FIG. 111A is incorporated in the pin in FIG. 111B. Element of reference numeral 470 is at an advanced position. In this state, the cavity is filled with the molten resin. While the cavity is being filled with resin, or immediately or after the elapse of a certain period of time upon completing the filling of the cavity with resin, the ejector plate comprising elements of reference numerals 28 and 29 illustrated in FIG. 110 is retracted to create the space indicated by reference numeral 481. The pressurized fluid indicated by reference numeral 482 is ejected into this space 481 through elements of reference numerals 479 and 480, enters the clearance of the molten resin filled in the cavity and carries out the fluid pressurization. FIG. 111B corresponds to element of reference numeral 467 in FIG. 110. The extrusion of molded article is carried out by element 470 provided on the ejector plate. Reference numeral 512 indicates an ejector pin through which a bore 479 and a hole 480 have been drilled.

Figure 111E:
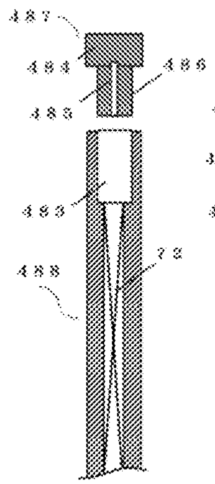

FIG. 111E illustrates a configuration wherein a hole 483 is opened in the tip of inner core 227. Element of reference numeral 487 is a cap put on (made to fit into) hole 483. Cap 487 comprises tip 484, inner hole 485 and a portion (reference numeral 486) entering hole 483. Although not illustrated, the inner surface of element of reference numeral 483 and the outer surface of reference numeral 486 are threaded.

Figure 111F:
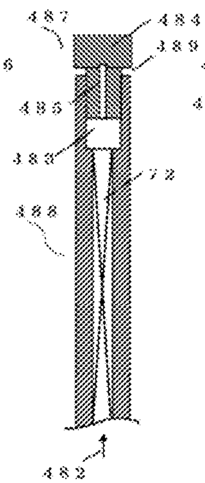

FIG. 111F illustrates a state where cap 487 has been put on (screwed in); although not illustrated, the portion where the lower face of 487 comes in contact with the upper face of 488 is machined to provide a cavity through which the pressurized fluid flows, for example a U-shaped groove. Element of reference numeral 489 is the said cavity constituted of an element like a U-shaped groove through which the pressurized fluid flows, and connected to previously mentioned U-shaped grooves machined on elements 485 and 486 and to other elements like D-shaped cut section indicated by reference numeral 72.

Figure 111G:
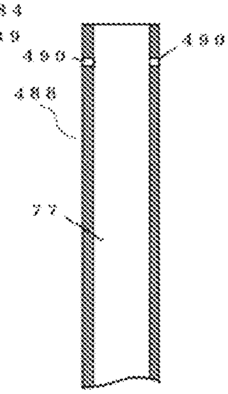
Figure 111H:
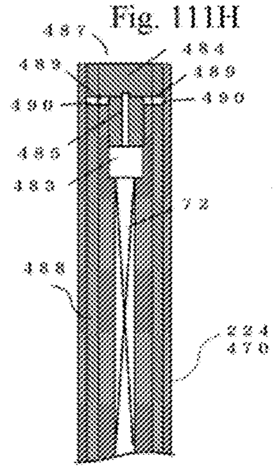

FIG. 111G shows the outer cylinder of reference numeral 488 derived by drilling a hole 490 on the lateral face of element of FIG. 111A. FIG. 111H illustrates a triple (three-layered) structure wherein element of FIG. 111G is fitted into element of FIG. 111F that is furthermore enclosed in an outer cylinder of reference numeral 470 without provision of hole 490. Similarly as in previously mentioned cases illustrated in FIG. 111A to FIG. 111D, the molten resin is injected into the cavity while the element of reference numeral 470 is at this advanced position.

Figure 111I:
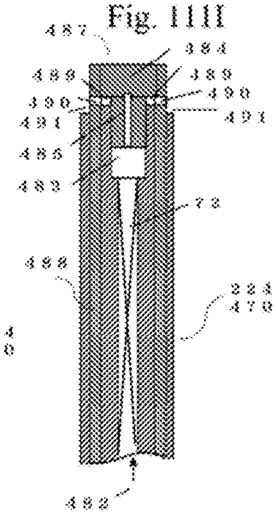

The space indicated by reference numeral 491 is created, as the element of reference numeral 470 recedes by retracting the ejector plates comprising reference numerals 28 and 29 while the cavity is being filled with resin, or immediately or after the elapse of a certain period of time upon completing the filling of the cavity with resin [FIG. 111(I)].

The pressurized fluid indicated by reference numeral 482 is ejected into this space 491 through elements of reference numerals 72, 489 and 490, enters the clearance of molten resin injected into the cavity, and carries out the fluid pressurization.

Upon completing the fluid pressurization, when the cooling and solidification of resin injected into the cavity is completed and the molded article gets ready for extraction, the mold is opened and the molded article is pushed out by the advance of element of reference numeral 470 provided on the ejector plate.

Figure 112A:
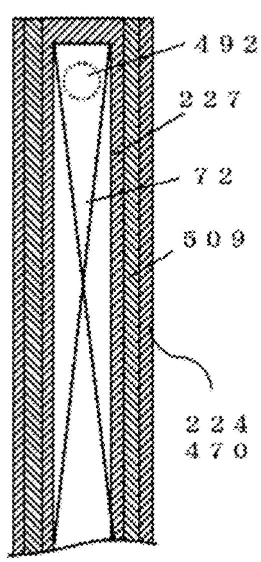
FIGS. 112A and 112B are schematic diagrams representing the structure and the movement of pressurization pin.
Figure 112B:
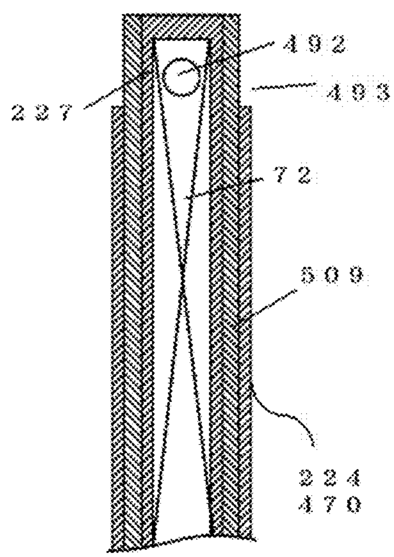

FIG. 112A and FIG. 112B illustrate a triple structure that is constructed by enclosing the ejector pin provided with a mechanism capable of fluid pressurization as shown in FIG. 53 and FIG. 54 with an additional outer cylinder 470. Incidentally, location of installation, function, action, etc. of this pin provided with the function of fluid pressurization are similar to those of the case previously presented in FIG. 110. The hole of reference numeral 492 provided on outer cylinder 509 is connected with a D-cut section 72. Similarly, when outer cylinder 470 recedes, space 493 as well as hole 492 appears (expressed by the change from a broken line in FIG. 112A to a solid line in FIG. 112B) and it becomes possible to carry out the fluid pressurization. The pressurized fluid is ejected into space 493 through hole 492.

In cases of FIG. 111 and FIG. 112, outer cylinder 470 only was moved back, but it is also possible to move backward the inner part for conducting pressurized fluid (pin portion for fluid pressurization), if the mold structure is taken into account. For the purpose of distinguishing a retractable ejector pin from a non-retractable pin, it needs only to use a plurality of ejector plates. In certain cases, the rod to push out the ejector plate may be configured as a stepped element and used in combination with an ineffective distance (backlash), etc.

Figure 113A:
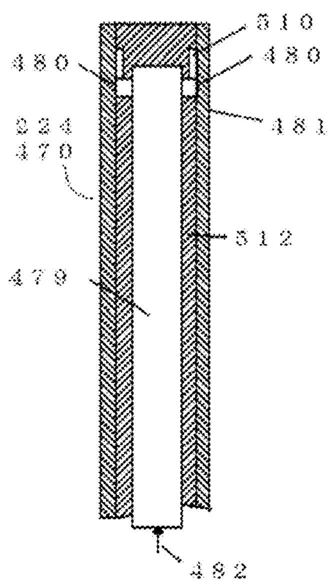
FIGS. 113A to 113E are schematic diagrams representing the structure and the movement of pressurization pin.
Figure 113B:
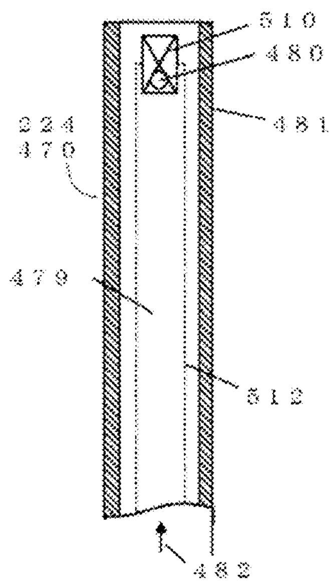
Figure 113C:
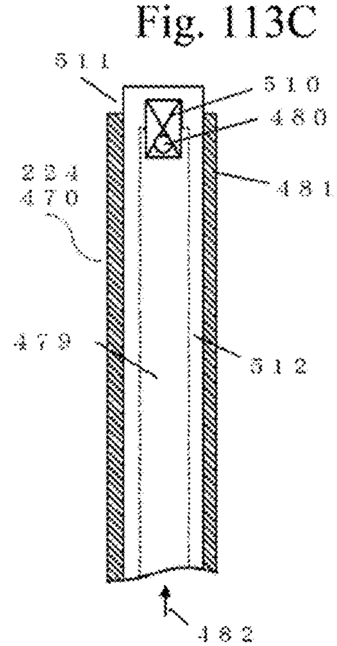
Figure 113D:
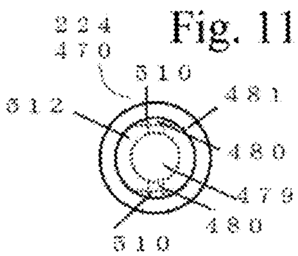
Figure 113E:
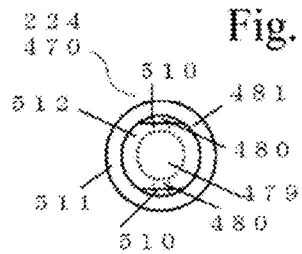

With the configuration depicted by FIG. 111A to FIG. 111D, outer cylinder 470 is moved back as far as the position where hole 480 appears. As a precaution against the risk of the molten resin intruding into hole 480, D-cut section 510 leading to hole 480 is machined to present a configuration as shown in FIG. 113C so that element 470 at the time of fluid pressurization may not recede as far as the position where hole 480 appears. As it is not needed to eject the pressurized fluid from the tip, D-cut section 510 is not machined as far as the tip. As shown in FIG. 9, it is not needed to eject the pressurized fluid from the tip. The pressurized fluid flows through 479 and 480 and is ejected through the clearance formed between 470 and 510. FIG. 113A is a cross-sectional view; FIG. 113B is a cross sectional view of element of FIG. 113A as it is looked at from the right of Figure, projected on a plane perpendicular to the page; FIG. 113C illustrates that outer cylinder 470 has been moved back for a distance at which D-cut section 510 is revealed but hole 480 does not appear, so as to create a space 511 for effecting the fluid pressurization. FIG. 113D is a plan view of element of FIG. 113B as it is looked at from the top of drawing; as D-cut sections 510 are housed inside element 470, they are indicated by broken lines. FIG. 113E illustrates the state where outer cylinder 470 has moved back and reveals D-cut sections 510 that were previously indicated by broken lines but now are depicted by solid lines because they are visible.

D-cut section 510 has a width that allows pressurized fluid to pass but prevents the passage of molten resin; for instance with ABS, the maximum width being approximately 0.2-0.03 mm.

The movements back and forth of outer cylinder illustrated in FIG. 110 to FIG. 113 can be effected not only by the ejector mechanism of injection molding unit but also by incorporating a hydraulic cylinder into the injection molding unit or into the mold.

(Puller Bolt)

Figure 114:
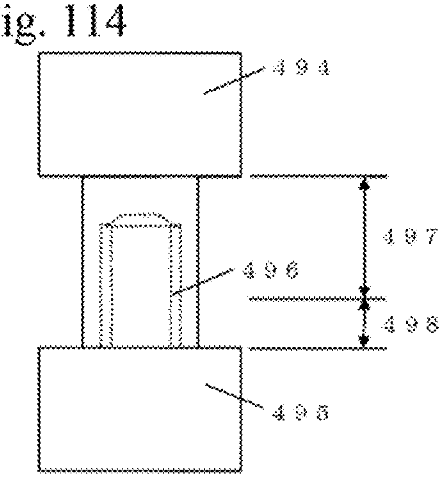
FIG. 114 is a schematic diagram representing the structure of puller bolt.

A puller bolt is available as a means to control the size (distance) of opening of mold. In FIG. 114, reference numeral 494 indicates a flange, 496 the flange of a screw, and 496 a screw. Reference numeral 497 indicates thickness and 498 indicates the backlash (ineffective distance) which may be able to define the size of opening of mold, for instance, the size of opening of clearance 475. A puller bolt can be utilized also for controlling the size of opening of mold when carrying out the backward movement or recession of mold clamping.

[Means to Carry Out Quickly the Fluid Pressurization (=The Predetermined Pressure is Reached in a Short Period of Time)]

In the process of pressure forming-injection molding or injection blow molding, if the time for carrying out the fluid pressurization is shortened (signifying that the predetermined pressure is reached in a short period of time), as the cooling and solidification of molten resin does not progress and hence the pressurized fluid acts on the resin still retaining a highly molten state, a higher level of action and effect can be achieved.

In the device illustrated in FIG. 1 or FIG. 46, if a sub-tank 502 with a capacity of, for instance, about 1,000 ml to 2,000 ml is provided after the regulator of reference numeral 12, a process of fluid pressurization can be carried out at a stable pressure in a short period of time.

FIG. 114 depicts a part of device of FIG. 1 or FIG. 46. In the case where the distance between tank 10 and regulator 12 is long (represented by reference numeral 499), because the inner diameter of high pressure gas pipework is not so large, it takes much time for the pressure to reach a desired level when the pressurized fluid is made to act on the resin in the cavity, for instance, by opening solenoid valve 14 shown in FIG. 1. Consequently, the level of action and effect of fluid pressurization becomes low. In the process of pressure forming-injection molding or injection blow molding, it is needed to make the pressurized fluid act on the molten resin injected into the mold cavity in a time as short as possible. As a means to solve this problem, it is possible to make the pressurized fluid reach a desired pressure level (set pressure) in a short period of time, by installing before regulator 12, as illustrated in FIG. 114, a sub-tank indicated by reference numeral 501 with a capacity of, for instance, about 1,000 ml to 2,000 ml, and furthermore by installing also after the regulator a sub-tank indicated by reference numeral 502 with a capacity of, for instance, about 1,000 ml to 2,000 ml.

The purpose of provision of a small space of reference numeral 483 in FIG. 111(I) is to secure the action and effect of stabilizing the pressurized fluid. In certain cases, the small space may be provided below the bottom flange of pressurization pin.

[Oblique Slide {Inclined Pin, Inclined Core (Slide-Core) }]

With a slide mechanism such as slide-core, inclined pin, etc., sealing effect is enabled by rounding the inclined portion and providing a K-seal, etc. in an oblique manner. Where necessary, a slide ring to prevent swaying may be used in certain cases. (FIG. 114)

In FIG. 114, reference numeral 503 indicates a K-seal or the like provided for the purpose of sealing a shaft body (ejector pin, etc.), reference numerals 504 and 505 indicate a slide ring, reference numeral 506 a joint, 507 a shaft body for pushing out straight forward and 508 a shaft body for pushing out in an oblique direction.

(Means to Produce a Clean Appearance by Enhancing the Fluidity of Resin)

The gas counter pressure process is implemented by using the sealed mold shown in FIG. 2 and FIG. 3. The gas counter pressure process uses a gas presenting a high solubility in resin and being in gas state at 20° C. under the atmospheric pressure including, for instance: a hydrocarbon like an alkane such as methane, ethane, propane, etc., or an alkene such as ethylene, propylene, or an alkadiene; a gas including vapor of dimethyl ether, chlorofluorocarbon, halon, etc. A gas is used alone or as an ingredient in a mixture with other gasses (mixed gas), or as an ingredient in a mixture with air, nitrogen gas, carbon dioxide or another inert gas.

By using these gasses soluble in resin in the gas counter pressure process, they dissolve into the flow-front (leading end of flux of molten resin injected into the mold cavity) of molten resin flowing inside the mold cavity due to the pressure of gas counter pressure process, and enhance the fluidity of molten resin.

Because carbon dioxide, similarly as in the case of alkanes, also has a property to dissolve into (fuse with, melt into) molten resin and enhance its fluidity, the gas is used alone or as an ingredient in a mixture at a constant rate with air and nitrogen gas in the process of gas counter pressure.

(Fluid Pressurization from the Outside of a Molded Article)

Figure 118A:
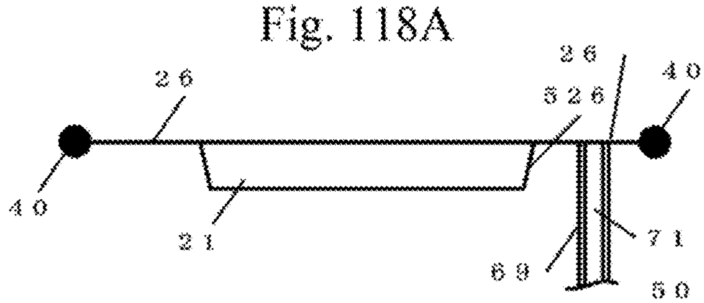
FIGS. 118A to 118C are schematic diagrams representing means of injecting a pressurized fluid between a molten resin and the mold through the parting surface by positioning a part like pressurization pin 50 outside the molded article (at a location in the parting surface outside the cavity).
Figure 118B:
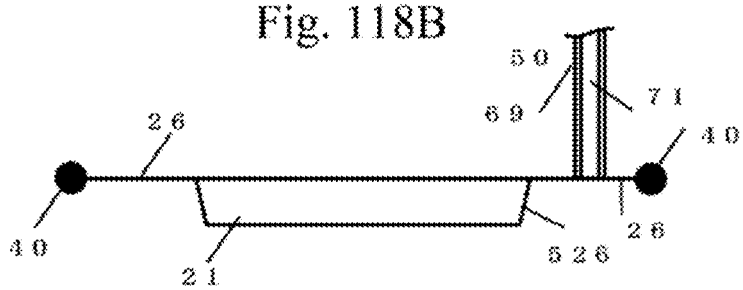
Figure 118C:
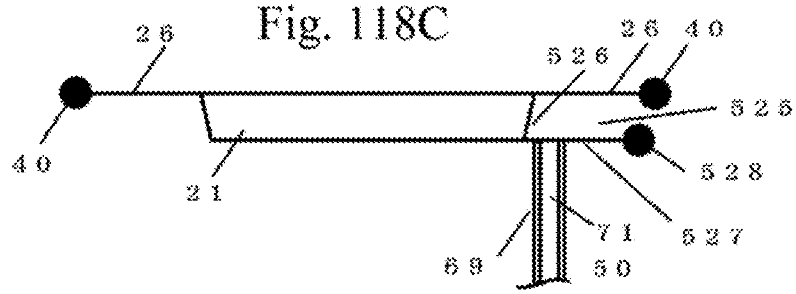

FIG. 118A to FIG. 118C illustrate structures wherein the tip portion for ejecting into cavity 21 the pressurized fluid of the pressurization pin 50 comprising outer cylinder 69, inner core 71, etc. is arrayed on the parting surface 26 extending outside the molded article. The drawings show that the portion below the parting 26 in the page represents the movable side. Pressurization pin 50 may be moved back when effecting the fluid pressurization, but it is not always needed to do so.

In the structure of FIG. 118A, pressurization pin 50 is arrayed so that the fluid pressurization is effected on parting 26 from the movable side.

In the structure of FIG. 118B, pressurization pin 50 is arrayed from the upper side of the page (drawing shows that the lower side of the page represents the stationary side). In this case, because of the presence of draft angle 526, it is easier for the pressurized fluid to enter the clearance over the surface on the movable side.

In the structure of FIG. 118C, another plate 525 (indicating only the location without illustration) is fitted in the parting so that the tip of pressurization pin 50 reaches that surface 527, and consequently that the entry of pressurized fluid into the movable side is facilitated.

The structures of FIG. 118A to FIG. 118C, etc. facilitate the introduction of pressurized fluid mainly into the clearance between a resin and the mold on the side opposite to the side where a pressurization pin is arrayed.

Figure 119A:
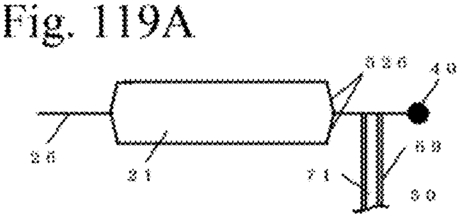
FIGS. 119A to 119E are schematic diagrams representing the means of injecting the pressurized fluid between the molten resin and the mold through the parting surface by providing a part like pressurization pin on the parting surface outside the molded article.

FIG. 119A depicts an array where parting 26 is at the center and draft angles 526 are found on both sides. In this case, it is easier for the pressurized fluid to enter the clearance on the stationary side (upper side of page) opposite to the side where pressurization pin 50 is made to fit into (drawing shows that the lower side of the page represents the movable side).

Figure 119D:
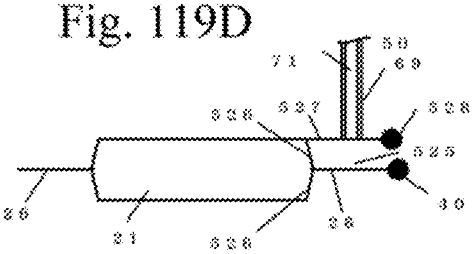
Figure 119B:
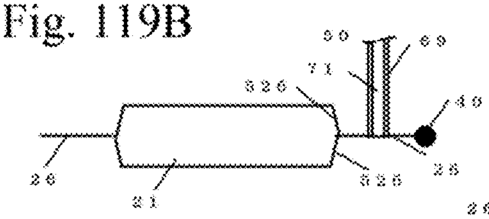

With the structure depicted in FIG. 119B, as pressurization pin 50 is arrayed on the stationary side, the entry of pressurized fluid into the movable side is facilitated.

Figure 119E:
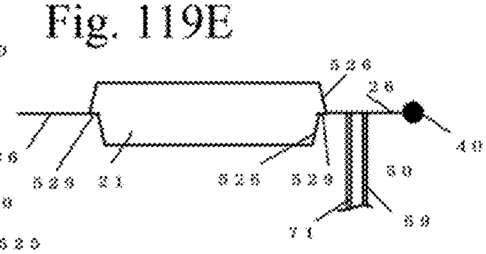
Figure 119C:
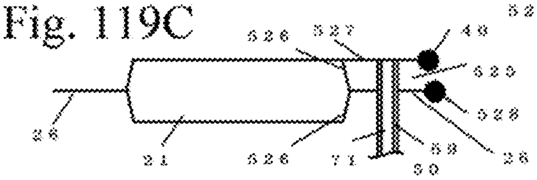

With the structure depicted in FIG. 119C, the entry of pressurized fluid into the clearance on the stationary side is facilitated, because in the structure, similarly as in the case of FIG. 118C, plate 525 is fitted and the tip of pressurization pin 50 touches the surface of reference numeral 527.

With the structure depicted in FIG. 119D, the entry of pressurized fluid into the clearance on the stationary side is facilitated, because the plate is fitted in and the tip of pressurization pin 50 arrayed on the stationary side touches the surface of reference numeral 527.

In the shape of molded article, as shown in FIG. 119E, a step 529 with width of about 0.1 mm to 5 mm was provided between the shaped element of stationary side and that of movable side.

In this manner, by providing a step in the shape of parting, in the case of structures depicted in FIG. 119A and FIG. 119B, the portion to be pressurized by fluid can be controlled. In the structure depicted in FIG. 119E, the pressurized fluid is conducted to the movable side.

In the configuration of molded article depicted in FIG. 120A [for instance, a disk-shaped element with thickness of 3 mm and diameter (φ) of 100 mm on which a rib 10 mm high and 1.6 mm thick stands around a concentric circle located at a distance of 5 mm from the edge of disk], a rib 530 stands at a location 531 removed a little bit (for instance by about 2 mm) from the edge face. If the fluid pressure is applied only from the left side of the rib 530 in the page, the fluid pressurization is effected only over the portion lying on the left of rib 530 without effecting fluid pressurization on the right of it, and consequently sink marks due to the presence of rib 530 occur. As the portion lying on the right of rib 530 (edge face) is too narrow, it is difficult to put in a pressurization pin there.

As a means to solve this problem, FIG. 120B illustrates a configuration of pressurization pin 50 the tip of which is concaved and fitted onto rib 530 so that the pressurized fluid can be ejected to both right and left sides of rib 530. Needless to say, the pressurization pin 50 can also be moved back before fluid pressurization.

FIG. 120C illustrates a configuration wherein another plate 527 is provided and pressurization pin 50 is arrayed on the surface of plate 527 so that the pressurized fluid can be ejected from the right side of rib 530.

(Mold Using a Sintered Metal Element)

As a product shown in FIG. 121A to FIG. 121C through which a gas or liquid can pass but a high-viscosity material, e.g. a molten resin, cannot pass, there is available a sintered metal material. FIG. 121A shows a sintered metal element, and FIG. 121B and FIG. 121C show a structure in which sintered metal element 532 is locked in by enclosing it in external cylinder 533.

FIG. 122A and FIG. 122B illustrate means to carry out the fluid pressurization wherein a sintered metal element is used in a nested element 534. FIG. 121B illustrates a configuration wherein the nested element made of sintered metal is moved back when effecting the fluid pressurization to create a space 535 so that the pressurized fluid is ejected from the sintered metal element into the space 535.

In FIG. 122A and FIG. 122B, element of reference numeral 536 is an exhaust circuit to conduct the pressurized fluid to the nested element made of sintered metal. The seal indicated by reference numeral 55 in FIG. 122A and FIG. 122B serves for the purpose of preventing leakages of pressurized fluid from the bottom of nested element and is placed normally at the outermost side.

If this sintered metal material is used in a portion or the whole of nested element, the fluid pressurization is feasible without using a gas pin or an ejector pin having the structure capable of effecting the fluid pressurization. Needless to add, such elements as gas pin 50 or ejector pin 227 can also be used in combination with a nested element comprising a sintered metal material.

(Means to Connect a Sleeve)

In the case of a large mold, with those elements as depicted in FIG. 111A, 111B, etc., it is difficult to make a structure of long sleeve by boring a hole through a workpiece. As a means to solve this problem, it is only needed to link together short sleeves. As a means for linking, screwed joints and paired flanges can be used equally well. FIG. 123A shows the case where a joint is made by screw-shaped elements 537, and FIG. 122B shows the case where a joint is made by flanges 539. In the case of screw-shaped elements, an O-ring 538 is inserted to prevent leakages of pressurized fluid. In certain cases, a seal tape may be used. In the case of joint with flanges, sealing effect is realized by inserting an O-ring 540 between flanges 539 to prevent leakages of pressurized fluid. The screws for locking flanges 539 are not illustrated in FIG. 122B.

FIG. 69, FIG. 72, FIG. 112 and FIG. 113 illustrate the means to avoid causing hollows by moving back a part or the totality of pressurization pin to create a space before fluid pressurization and ejecting the pressurized fluid into it. This retraction distance can be only about 1 mm from the pressurized surface of resin and it is sufficient if the pin is distanced preferably by about 5 mm from it.

In certain cases where the viscosity of resin is low in a molten state, the retraction distance may be chosen to exceed 5 mm. The retraction movement can be made in a single stroke. Moreover, in the case where the pin is retracted by 10 mm, it is also possible to retract it by 1 mm at first, and then after carrying out the fluid pressurization at a low pressure, to retract it further by 9 mm to carry out the fluid pressurization at a high pressure.

As hollows are caused if the diameter of pressurization pin 50 for carrying out the fluid pressurization or that of an ejector pin 227 provided with the function of fluid pressurization is small, a pin with a large diameter is preferable. Generally, the diameter of inner core is preferably greater than φ3 mm.

It is possible to avoid the burst of molded article in the process of injection blow molding, if the process is carried out by moving back first the inner core only to create a space. The distance of retraction is sufficient if it exceeds only 1 mm. FIG. 124A and FIG. 124B present schematic views of the retraction of inner core in cases of injection blow molding. FIG. 124A depicts a state where the inner core is at an advanced position while the cavity is being filled with resin.

Immediately or after the elapse of a certain period of time upon completing the filling of the cavity with resin, inner core 542 is retracted for a fixed distance to create a space indicated by reference numeral 545 between resin and inner core 542, and the pressurized fluid is introduced into the space to form hollows within the resin injected into the cavity 21. The pressurized fluid still present after the injection blow molding process is evacuated. For this phase, because of the space created by retracting the inner core, fluid evacuation can be effected quickly and finished in a short time, and the problem of burst is solved. The boss of reference numeral 541 in FIG. 124 is provided with a view to preventing leakages of pressurized fluid to outside. The structure of a hollow pin employed in injection blow molding is approximately similar to that of pressurization pin 50 except for the configuration of tip portion presenting a conical form which facilitates the entry of pressurized fluid into resin, because the cone is heated due to the heat of molten resin and retards the cooling and solidification of resin so as to make thinner the cooled and solidified layer.

(Material of a Fluid Pressurization Pin and its Cooling)

In the case of pressure forming-injection molding, the prevention of hollows caused by the entry of pressurized fluid into the resin can be facilitated if the cooling and solidification of resin around the tip of pressurization pin is accelerated and the cooled and solidified layer is formed rapidly. As a material for pressurization pin etc., in certain cases, a high thermal conductivity material like aluminum, copper, silver or alloy using those metals may be used. The flanged part 70 of pressurization pin 50, etc. is cooled by using water, air, etc. The totality of a pressurization pin and the like can also be cooled.

In the case where the fluid pressurization from an ejector pin is carried out by means of one of those structures depicted in FIG. 52 to FIG. 61, FIG. 63 to FIG. 73, FIG. 111A to FIG. 111I, FIG. 112A, FIG. 112B, and FIG. 113A to FIG. 113C, the mark of ejector pin appears on the molded article; the mark of ejector pin in such a case is different from a simple circle left by an ordinary ejector pin in the case without carrying out fluid pressurization, but it becomes a mark of double-structured or multiple-structured ejector pin.

FIG. 125A is a mark of an ordinary type ejector pin for the use without fluid pressurization, FIG. 125B is a mark of an ejector pin when a pin for fluid pressurization having a double structure, e.g., one depicted in FIG. 111A to FIG. 111D, is used, and FIG. 125C is a mark of an ejector pin when a sintered metal element is used in the tip of elements depicted in FIG. 61A1 to FIG. 61D2. FIG. 125D exemplifies a configuration in which a halved shaped element has been embedded in a pin tip or an inner core has been split into two halves; the pressurized fluid is ejected also from these clearances between split elements. FIG. 125E exemplifies a configuration in which a shaped element split into four quarters has been embedded in a pin tip or an inner core has been split into four quarters; the pressurized fluid is ejected also from these clearances between split elements.

FIG. 126A and FIG. 126B illustrate the state where a half portion of a pressurization pin 50 is applied to one end (end face) of molded article or to one end of cavity. In FIG. 126 A, the half portion is applied to as far as a part of the edge of molded article and in FIG. 126B it is applied to as far as parting 26. FIG. 126A and FIG. 126B illustrate the case with pressurization pin 50, but, needless to say, the method can be exploited also in the case with ejector pin 227 capable of effecting fluid pressurization.

In the injection blow molding process, when the temperature of mold surface is high, a molded article with a good appearance can be obtained. In the case of styrene-based resin like HIPS and ABS, it is desirable to make the temperature of mold surface higher than 45° C., and the appearance becomes better furthermore if it exceeds 65° C. A molded article with a good appearance can be obtained through a series of steps as follows: a resin to be used is filled into the cavity at a temperature above glass transition point; then hollows are made to be formed; after deriving a molded article with a good appearance, it is cooled by a cooling circuit provided separately; the molded article is taken out.

Similarly also in the case of PP, a molded article with a relatively good appearance is obtained if the resin is molded at a temperature above the crystallization point, then hollows are made to be formed, and then the article is cooled. As a matter of course, the same situation applies to the case of pressure forming-injection molding as well.

In the configuration depicted in FIG. 127, an inclined shape of reference numeral 547 is provided to facilitate the conduction of pressurized fluid.

A better result is obtained if the temperature of molten resin is kept higher approximately by 10 to 40° C. than that during an ordinary solid injection molding process. In the process of either of injection blow molding and pressure forming-injection molding, the occurrences of sink marks due to the presence of surface features like a rib are less frequent if the viscosity of molten resin is higher.

In addition to the molding of thermoplastic resins, the pressure forming-injection molding and the injection blow molding can be exploited also in the injection molding process with metals of low melting point including magnesium, magnesium alloy, aluminum, aluminum alloy, zinc, zinc alloy; for instance, in the injection molding method for die casting.

In the present invention: "°" represents a unit of angle; "° C." represents a unit of measurement of temperature, degree Celsius; "%" is a unit to express a quantity as measured in comparison with a whole taken as 100, equivalent to a hundredth, and the measured value is percentage; and φ represents the diameter of a circle.

"D-cut" signifies a shape created by cutting a part of, for instance, a flange; the cross-section of the cut part resembling the form of alphabetical letter "D". D-cut also signifies a machining operation; "D-cut face" signifies the shape made by D-cut and is also called "D-face".

In structures illustrated in FIG. 118A to FIG. 118C, and FIG. 119A to FIG. 119E, in the case where, as a face to process by fluid pressurization, for instance, the face on the movable side or that on the stationary side is selected, or the faces on both the movable side and the stationary side are selected, if embossments are made on the whole surface or a part of surface of the parting excluding the surface of product, the entry of pressurized fluid is facilitated.

FIG. 129A depicts a means to conduct the pressurized fluid to the cavity by extending the embossment of reference numeral 552 (e.g., leather grain, sand grain) connected with pressurization pin 50 as far as cavity 21, and by partially treating the surface with the said embossment 554.

FIG. 129B illustrates embossment 554 provided on one side of the area around the cavity. FIG. 129C illustrates embossment 554 machined in the area around the cavity. The width of embossed area illustrated in FIG. 129B is different from that illustrated in FIG. 129C. Needless to add, all the strips of embossment can have the same width or the width of every strip of embossment can vary from that of others. In FIG. 129A to FIG. 129C, only one pressurization pin is illustrated, but in certain cases a plurality of them may be used.

As illustrated in FIG. 110, after filling the cavity 21 with a resin and before effecting the fluid pressurization, when outer cylinder 224, outer cylinder 227 or outer cylinder 470 is moved back, the molten resin enters inevitably space 481, space 491 or space 493 illustrated in FIG. 111A to FIG. 111(I), FIG. 112A and FIG. 112B. The molten resin having thus entered the space is pushed back into the molten resin in the cavity under the pressure of pressurized fluid, but when the pressure of pressurized fluid is high, it intrudes into the molten resin and results in forming hollows.

As a means to solve this problem, as shown in FIG. 130A to FIG. 130E, outer cylinder 224 is moved forth once to push back the resin having entered space 481 etc. into the molten resin in the cavity. After pushing back the resin, outer cylinder 224 is moved back to create again the space to eject the pressurized fluid into.

FIG. 130A depicts a configuration wherein a molten resin is injected into the cavity. FIG. 130B depicts a configuration wherein outer cylinder 224 has been moved back with a view to create space 511 to eject the pressurized fluid into [element of reference numeral 511 is a space having the same objective as that of elements of reference numerals 481, 491 and 493 (means to avoid forming hollows when ejecting the pressurized fluid)]. FIG. 130C depicts a situation where the molten resin has inevitably entered space 511. Element of reference numeral 555 represents the resin that has entered space 551. FIG. 130D depicts an operational phase where outer cylinder 224 has been moved forth and pushed the resin indicated by reference numeral 555 into the molten resin in the cavity. Element of reference numeral 556 is resin of reference numeral 555 having been pushed into the cavity. FIG. 13E depicts an operational phase where outer cylinder 224 has been moved back again to create space 557 to eject the pressurized fluid into. The pressurized fluid is ejected into this space 557 through the clearance between element of reference numeral 226 and that of 225.

During the operational phase depicted in FIG. 130A to FIG. 130E, outer cylinder 224 is moved forth only once, but this process can be carried out several times. Moreover, the timing of movement back and forth is determined according to the speed of cooling and solidification of molten resin. Outer cylinder 224 can be moved forth again and moved back immediately, or it can be moved forth and held at the advanced position for a while and then moved back.

For preventing the undesired intrusion of molten resin into the space, it is needed only to reduce the pressure of resin injected into the cavity 21; as a means to do this, for instance, a suck-back is effected immediately upon filling the cavity with a molten resin or after the elapse of a certain period of time after that to reduce the pressure of resin injected into the cavity. Means other than the suck-back include: exploitation of a breathing tool (expanded core) method by which a portion of mold is expanded immediately upon filling the cavity with a molten resin or after the elapse of a certain period of time after that to reduce the pressure of molten resin; reduction of pressure in the molten resin in the cavity by using a dummy shape provided with a shutter; injecting a resin by short molding into the mold provided with a disposable cavity having no shutter.

Figures from 130A to 13E describe the case with mold specifications presented in FIG. 110, but the method described there can be exploited similarly also in the cases with FIG. 63A to FIG. 63C, FIG. 65, FIG. 66, FIG. 67, FIG. 68, FIG. 69 and FIG. 72.

(Shaft Mechanism)

In the present invention, ejector pin, shape extrusion, inclined pin, inclined core, inclined slide, kicker pin, knockout pin, etc. are called shaft body for extrusion; and also the ejector plate to move a shaft body for extrusion, the function of ejector plate for pushing out, a mechanism to drive a shaft body for extrusion like hydraulic cylinder, pneumatic cylinder or electrical motor, or a shaft body including aforementioned ejector pin, shape extrusion, inclined pin, inclined core, inclined slide, kicker pin, knockout pin, etc. may be called "shaft mechanism" in certain cases.

(FIG. 131)

In the structure depicted in FIG. 110, ejector pin 227 and outer cylinder 470 both of which have a structure capable of effecting fluid pressurization as well as an ordinary ejector pin (not illustrated in FIG. 110) with the sole function of ejecting the molded article are arrayed on the same ejector plates comprising element of reference numeral 28 and element of reference numeral 29. In other words, ejector pin 227 and outer cylinder 470 provided with pressurization function as well as an ordinary ejector pin are incorporated into one set of ejector plates, and ejector pins of respective types move together in accordance with the movements back and forth of ejector plates comprising element of reference numeral 28 and element of reference numeral 29.

When cavity 21 is filled with the molten resin, as the ejector plates comprising element of reference numeral 28 and element of reference numeral 29 are at an advanced position together, clearance 475 is formed between the set of ejector plates and mounting plate 23 on the movable side.

Ejector pin 27, ejector pin 227 and outer cylinder 470 are subjected to the injection pressure of molten resin that pushes down the ejector plates comprising element of reference numeral 28 and element of reference numeral 29. The means to sustain this pressure have previously been described: holding the pin by the extrusion force of the ejector mechanism in the injection molding unit (This represents the ejector force that is not so great and only about 18 tons by an electric motor on an injection molding unit of 850 ton rating. Even if the capacity of servomotor or the size of pulley of extrusion mechanism is increased, there is a limitation.), and pressing the pin against the end of forward movement; sustaining the injection pressure while injecting the molten resin by inserting into the clearance 475 a mechanism of wedge (for instance, wedge unit 278 illustrated in FIG. 66).

If the mold presents a complex shape having a large number of ejector pins, the injection pressure of molten resin exerted on ejector plates comprising elements of reference numerals 28 and 29 (expressed as "pressure to be sustained") becomes great. If the pressure exerted directly on an ejector pin of φ10 is 35 MPa, the pressure to be sustained by the ejector pin is calculated as φ10/2×φ10/2×π (circular constant)×350 MPa (injection pressure) and becomes about 0.275 tons; if the total number of ejector pins is 100, a force of about 27.5 tons is exerted on the ejector plates comprising elements of reference numerals 28 and 29. As a means to solve this problem of pressure to be sustained by an ejector pin (in actuality, ejector plates comprising elements of reference numerals 28 and 29), in a structure like that in FIG. 110, the area to sustain the pressure is reduced by arraying the pin having the function of fluid pressurization on the mounting plate 23 and by incorporating the outer cylinder 470 into ejector plates comprising elements of reference numerals 28 and 29. For example, with the previously cited ejector pin of φ10, if the diameter of pin having a structure capable of effecting fluid pressurization is made to be φ8 and the latter is arrayed on the mounting plate, the pressure to be sustained can be reduced by about 0.099 tons as calculated by the formula: φ10/2×φ10/2×π×350 MPa−φ8/2×φ8/2×π×350 MPa.

The area with which to sustain the pressure can be reduced if a double structure is employed in an ejector pin 27 too only in the mechanism to extrude the molded article, and only the outer cylinder is incorporated into the ejector plates comprising elements of reference numerals 28 and 29. This solution is feasible, but as the ejector pin 27 adopts a sleeve structure, it is not economical.

In the structure depicted in FIG. 131, in addition to ejector plates comprising elements of reference numerals 28 and 29, a set of ejector plates 566 comprising upper ejector plate of reference numeral 564 and lower ejector plate of reference numeral 565 are provided. Into these ejector plates 566, an ordinary ejector pin 27 is incorporated. In FIG. 131, the ejector plates above them in the drawing comprising elements of reference numerals 28 and 29 are configured so as to be able to move back and forth in accordance with the movements of ejector mechanism of the injection molding unit, and only the outer cylinder 470 of an ejector pin having the function for effecting the fluid pressurization is incorporated into them. Ejector plate 27 is incorporated into ejector plates 566, and since they are in contact with mounting plate 23 while the molten resin is injected into cavity 21, there is no problem about sustaining the pressure during the injection of molten resin.

Ejector rod 272 is made to be an element of reference numeral 570 presenting a stepped configuration. The clearance 475 is created because the tip 568 of element 570 touches the bottom face of ejector plate 29 and remains at an advanced position (the position of front end is determined by element of reference numeral 478) due to the action of extrusion mechanism of injection molding unit. When carrying out the fluid pressurization and moving back outer cylinder 470 (by backward movement of ejector rod 570), as a space 493 is created between outer cylinder 470 and the surface of molten resin, the pressurized fluid is ejected into this space 493 to effect fluid pressurization on the molten resin. If the molten resin intrudes into this space due to the residual pressure of molten resin in the cavity, in the case where the viscosity of molten resin is low like the case where PP is processed, it is needed only to thrust back (compress) the molten resin having flowed in by thrusting again outer cylinder 470.

Upon completing the fluid pressurization, when the mold is opened and ejector rod 570 is pushed, the molded article can be ejected (extruded), because element of reference numeral 568 pushes the bottom of ejector plate of reference numeral 29 of the ejector plates comprising elements of reference numerals 28 and 29, and element of reference numeral 596 pushes ejector plates 566 (bottom of element of reference numeral 565). The length of portion (stepped portion in the illustration) 571 between elements of reference numerals 568 and 569 in ejector rod 570 is made to be equal to the sum of width of clearance 475 and thickness of 566. Element of reference numeral 567 is a support pillar provided on element 565 and has the function of return pin. Elements 572 in the illustration are arrowheads indicating movements back and forth of ejector rod 570.

In FIG. 131, a stepped structure is provided in element 570 so as to push respective ejector plates. In this case, since element of reference numeral 566 is pushed first and then the ejector plate comprising elements of reference numerals 28 and 29 on which outer cylinder 470 is arrayed is pushed, a small difference in time arises. If the whitening by an ejector pin as a result of the difference in time is feared, as a remedy, it is recommended, for example, to construct a structure wherein the stepped structure 571 is configured in a semi-circular shape so that the ejector rod can be turned by 90 degrees while pushing it out so as to be able to push out respective ejector plates simultaneously.

(Sequential Control)

"The sequential control" as it is meant in the injection molding process is a means to inject a molten resin into the cavity with differently timed injection steps by using a number of hot-runners equipped with a valve gate manufactured by Mold-Masters; the technique has an advantage to enable an injection molding machine with a small mold clamping capacity to make a large-sized molded article.

FIG. 132 illustrates a means to carry out the fluid pressurization through a process of sequential control. Element of reference numeral 573 is a rib provided around the molded article to serve to prevent the pressurized fluid from escaping beyond it. Elements of reference numerals 574 and 575 are ribs provided within the surface of molded article to prevent the pressurized fluid from flowing out beyond these rims. The injection of resin into the cavity is carried out first by opening valves of hot-runners in the order of reference numerals from 580 to 581, 582 and 583 to pressurize respective sectors sequentially by starting from reference numeral 576 and going to reference numeral 577, reference numeral 578 and reference numeral 579. In the course of resin injection, when the resin injection is completed and respective sectors (sectors surrounded by rib 573, rib 5874 and rib 575) are ready for fluid pressurization, the pressurized fluid is ejected by choosing an appropriate timing through ejection ports of reference numeral 584, reference numeral 585, reference numeral 586 and reference numeral 587, with staggered timings. In the case of sequential control, as the conditions of pressure and timing of fluid pressurization differ from one place to another, a number of units of the device shown in FIG. 115 (device relating to the ejection of pressurized fluid following the element of reference numeral 12 in FIG. 1) are used in parallel. As two circuits capable of carrying out the fluid pressurization are shown in FIG. 46, the system therein is able to perform the sequential control with two patterns (by providing two circuits of hot-runners, a sequentially controlled operation is carried out by effecting the first fluid pressurization in one circuit and then the second one in the other circuit). Needless to add, if the number of circuits capable of effecting the fluid pressurization is increased, the number of sequentially controlled operations can be increased furthermore.

Working Example 1

Next, the present invention is described based on working examples.

The resins used in working examples from 1 to 29 are as follows: STYLAC 121 (trade name) of Asahi Kasei Corp. as an ABS resin for injection molding; STYLON 492 (trade name) of Asahi Kasei Corp. as an HIPS resin; XYLON 100Z (trade name) of Asahi Kasei Corp. as an m-PPE resin; MULTILON T3714 (trade name) of Teijin Chemicals Ltd. as a PC/ABS resin; IUPILON S2000 (trade name) of Mitsubishi Engineering-Plastics Corp. as a PC resin; SUMITOMO NOBLEN H501 (trade name) of Sumitomo Chemical Co., Ltd. as a PP resin. Regarding POM, DURACON M90 (trade name) of Polyplastics Co., Ltd. was used. Regarding PA66 (nylon 66), Leona 1200S of Asahi Kasei Corp. was used.

As test pieces used for verifying the action and effect of pressurized fluid, molded article 1 and molded article 3 were obtained by totally pressurizing by fluid the resin in the movable side mold 206, and the sink marks generated on the decorative surface of product surface of the stationary side were examined.

The molded article 1 (test piece in FIG. 30) is a flat plate 70 mm in length, 150 mm in width and 2 mm in thickness in which the presence of sink marks at the flow end of resin was compared with the case without fluid pressurization.

The molded article 2 (test piece in FIG. 31) is a flat plate 70 mm in length, 150 mm in width and 2 mm in thickness in which the presence of sink marks around the circle in the center was compared with the case without fluid pressurization.

The molded article 3 (test piece in FIG. 32) is a flat plate 70 mm in length, 150 mm in width and 2 mm in thickness in which the presence of sink marks caused by the ribs (thickness of rib being 2 mm at the base) on the stationary side resulting from the partial pressurization was examined by comparison with the case without fluid pressurization.

Incidentally, in this working example, in order to clarify the effect of fluid pressurization, the molding process was carried out with the same metering value for molded article 1, molded article 2 and molded article 3 (by equalizing the test piece (molded article) weight), to examine the occurrences of sink marks in comparison with the case without fluid pressurization.

In this working example, the resin pressure keeping is not used.

The action and effect of pressurized fluid was examined by adopting as a factor of evaluation: the presence of occurrences of sink marks at the flow end corner 1100 in molded article 1; that of sink marks around the circular opening 1101 in molded article 2; and that of sink marks caused by the rib at the opposite side 1102 of the rib.

For the pressurized fluid, nitrogen gas and air as a gas, water as a liquid were used.

Pressure, pressurization time, retention time, liquid temperature in the case of liquid, etc. of the pressurized fluid were indicated in Table 1, Table 2 and Table 3 for working examples. As clearly shown in these working examples, the action and effect of the use of pressurized fluid was confirmed for improving the transcription performance and for reducing the occurrences of sink marks.

The mold devices used in working examples are sealed mold 141 shown in FIG. 2 and the sealed mold 142 shown in FIG. 3.

In the sealed mold 141 shown in FIG. 2, valve 62 and valve 67 are kept open while filling the cavity with a resin.

In the sealed mold 142 with the structure shown in FIG. 3 also, valve 62, valve 67 and valve 68 were similarly kept open to let out the air in the mold expelled while filling it with a resin.

In respective molds 141 and 142, these valves were closed before pressurizing by fluid to prevent the pressurized fluid from escaping to the outside.

In the sealed mold 141 having an ejector box 51, as it is difficult to use as a pressurized fluid a liquid like water, only nitrogen gas or air was used. The fluid pressurization was carried out by introducing the pressurized fluid from ejection means 56 and ejection means 58. In the sealed mold 142 in FIG. 3, the fluid pressurization was carried out by using ejection means 58 and ejection means 115 and using nitrogen gas, air or water as a pressurized fluid.

When nitrogen gas or air was used as a gas, the operation was carried out without any problem. However, when water was used as a liquid, while it was possible to carry out the fluid pressurization, the water as a pressurized fluid entered clearances in the nested element, clearances in the ejector pin, and clearances between plate 53 and plate 54.

As an injection molding machine, a unit of injection machine having a clamping capacity of 70 ton manufactured by Meiki Co., LTD. was employed. Respective conditions in the molding processes for molded article 1, molded article 2 and molded article 3 were as follows: in the circuit from sprue runner to gate, filling pressure was set at 35% of the maximum injection pressure, and filling speed was set at 35% of the maximum injection speed; and for the circuit after the resin passed the gate, filling pressure was set at 65% of the maximum injection pressure, and filling speed was set at 65% of the maximum injection speed.

In the working example 1, the fluid pressurization was carried out by using the pressurization pins 50 shown in FIGS. 4-10 in the manner described in FIGS. 11-13, and by using the pressurization pins shown in FIG. 14 and FIG. 15 in the manner described in FIG. 16, and it was demonstrated that with each of the fluids used, the fluid pressurization was possible.

As a non-crystalline resin has a small (low) rate of shrinkage, the effect of pressure forming was recognized in its product even when the pressure of pressurized fluid was low. As a crystalline resin has a great (high) rate of shrinkage, sink marks were observed in its products of fluid pressurization. When the pressurization pressure was increased, the pressurized fluid intruded into the resin and hollows were formed. In such a case, if the delay time was prolonged and the fluid pressurization was carried out after a superficial skin layer had developed sufficiently, the pressure forming was effected. However, even when the delay time was prolonged, a higher pressure of pressurized fluid resulted in forming hollows, particularly in the case of gas.

Meanwhile, even if the diameter of pressurization pin 50 had been enlarged to disperse the pressure of pressurized fluid exerted on the resin surface, hollows were formed none the less when the pressure of pressurized fluid was increased progressively.

Working Example 2

In the preceding working example 1, in a process of fluid pressurization with the sealed mold 142 in FIG. 3 by using ethanol, instead of water, from the ejection means 58, ethanol was ejected into the mold and vaporized due to the resin temperature, and as a result of this, it was confirmed that it was possible to shorten the cooling time of molded article. The results of fluid pressurization operations were approximately similar to those of Table 3.

In the working example 2, the pressurization pins 50 shown in FIGS. 4-10 were used and installed in the mold as shown in FIG. 13.

Working Example 3

In the working example 1, in a process of fluid pressurization with the sealed mold 142 in FIG. 3 by using glycerin heated to a temperature of 180° C., instead of water, from the ejection means 58, the cooling and solidification was retarded but it was confirmed that the transcription performance improved.

In working example 2 and working example 3, the measures were taken in which the tank 10 in FIG. 1 was filled beforehand with a liquid like water to about a half of its capacity and pressurized by nitrogen gas to extract the liquid from the bottom and to carry out the pressurization. The results of fluid pressurization operations were approximately similar to those of Table 3.

Working Example 4

While in the working example 3 the liquid temperature was raised to improve the transcription performance, in the working example 4 the improvement of transcription performance was achieved by raising the temperature of molten resin to delay the cooling and solidification.

When nitrogen gas was used as a pressurized fluid and the pressurization was carried out by setting the melting temperature of ABS resin in the working example 1 at 285° C. and with the conditions of the working example 1, an improvement in transcription conforming to the mold was confirmed in comparison with the case of working example 1. In this case, if the pressure of pressurized fluid was raised, hollows were formed more frequently.

Working Example 5

Figure 38:
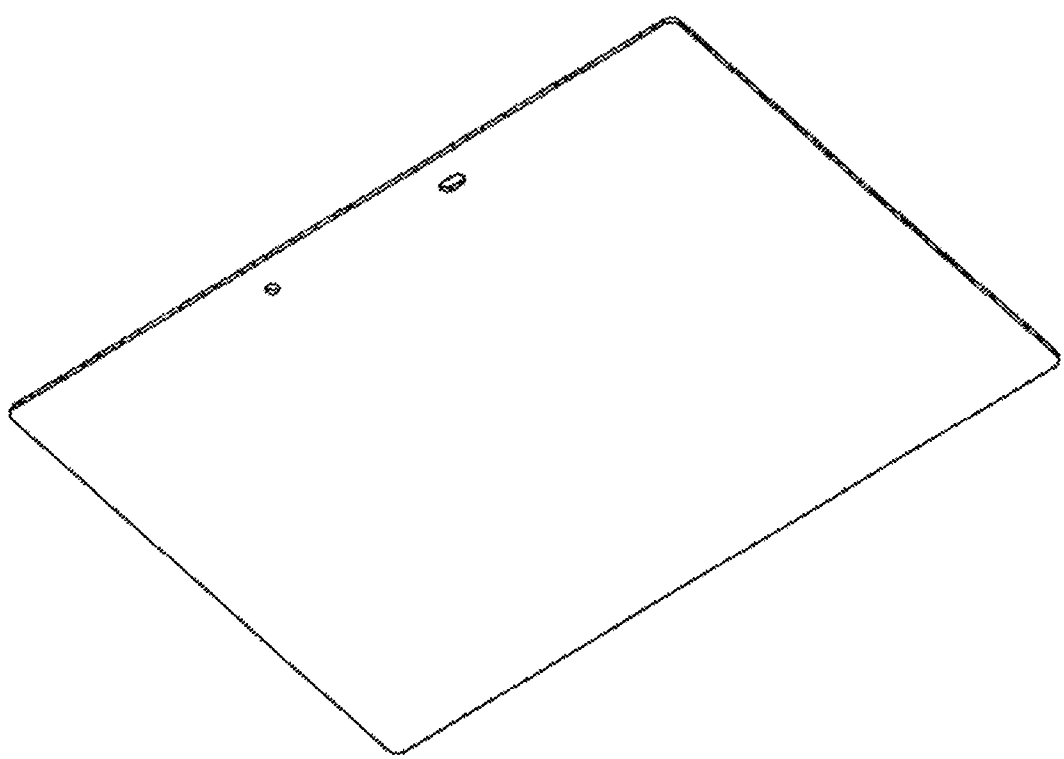
FIG. 38 is an oblique perspective view of the stationary side of FIG. 36.

In the working example 1, the mold was changed to the one for the molded article 4 [(test piece shown in FIGS. 36-38), thickness of 2.5 mm, size of A4]. The fluid pressurization by pressurized nitrogen gas was carried out while injecting the resin, with the conditions as follows: delay time, 2 seconds; pressure of fluid pressurization, 10 MPa, 20 MPa, 30 MPa; pressurization duration, 20 seconds; retention time, 5 seconds. Incidentally, in the case where pressurization pin 50 touches the resin as shown in FIG. 11, if the pressure of pressurized fluid was about 20 MPa, the fluid pressurization on ABS, HIPS, PC/ABS, PC, modified PPE and POM resulted in blow molding instead of pressure forming. The fluid pressurization on PP and PA66, in certain cases, resulted in blow molding even when the pressure of pressurized fluid was 10 MPa. When the pin was arranged as shown in FIG. 12 and FIG. 13 with a view to avoid resulting in blow molding, the fluid pressurization on ABS, HIPS, PC/ABS, modified PPE and POM resulted in pressure forming with the pressure of pressurized fluid at 20 MPa, but, on PP and PA66, it resulted in pressure forming with the pressure at 10 MPa and in blow molding at 20 MPa. With the pressure at 30 MPa, the fluid pressurization resulted in forming hollows with all types of resin. Even though hollows were formed, because the pressurized fluid had also entered the clearance between the resin and the mold, hollow portions, in contrast to the case of ordinary injection blow molding, remained only at the base or in the vicinity of a rib without spreading widely.

The injection molding machine used was a unit manufactured by Toshiba Machine Co., Ltd. with 350 ton rating.

The pressurization pins were provided at two points as shown in FIG. 36 etc. The respective cases where a single pin was or two pins were provided were carried out, and it was confirmed that when two pins were used, the transcription performance was improved in comparison with the case of a single pin. In the working example 5, the direct pressurization was adopted.

Working Example 6

In the working example 5, the mold was changed to the one for the molded article 5 [(test piece shown in FIGS. 39-41), thickness of 2.5 mm, size of A4], and the fluid pressurization was carried out by introducing the pressurized fluid through the connecting port 48 on the right of illustration shown in in FIG. 18, and the clearances of nested element (the rib tip is made to have a nested structure with a view to facilitate the fabrication of mold and to release the air in the cavity during molding process) and the clearances of ejector pin 27. In the like case where there are many ribs and an article is surrounded by ribs, as it is needed to provide a pressurization pin to each of shapes surrounded by ribs, the system is not economical. Although not illustrated, on molded article 5, one or more ejector pins 27 are arranged in each of rectangular surface areas surrounded by four ribs, and also in each of rectangular areas with rims arrayed in a U-shape, and areas with rims arrayed in an L-shape. In working example 6, the indirect pressurization was applied wherein the fluid pressurization was carried out through clearances of ejector pins and clearances of nested elements.

Consequently, as the fluid pressurization was effected also from ribs, the shapes of rib tips were disturbed by the pressurized fluid, resulting in something like a short mold, but with all types of resins used in working example 5, in molded articles with a product thickness of 2.5 mm, no sink mark due to rims was observed, and products presenting a clean appearance on the stationary side were obtained. However, in a certain number of ribs, the pressurized fluid intruded through clearances of ejector pins 27 and nested elements and formed hollows at the bases of rims.

It was confirmed that, with this means (indirect pressurization through clearances of nested elements), the pressurized fluid was ejected from clearances of nested elements as well and disturbed the shape of molten resin injected into the cavity. The results of fluid pressurization are shown in Table 4. Table 4 presents: types and trade names of resins; resin temperatures; conditions of fluid pressurization; results of fluid pressurization.

Working Example 7

In the working example 5, the mold was changed to the one for the molded article 6 [(test piece shown in FIGS. 42-45), thickness of 2.5 mm, size of A4], and the gas rib 218 was provided around ejector pin 27 to prevent the gas leakage from ejector pin 27. The fluid pressurization was carried out through pressurization pin 50 by using nitrogen gas at a pressure of 30 MPa for 20 seconds simultaneously with filling the cavity with a resin.

The resins used were all the resins used in the working example 5, and with a product thickness of 2.5 mm, no sink mark due to ribs was observed, and the molded article with a clean appearance on the stationary side was obtained. In the working example 7, the direct pressurization was adopted.

Although hollows were formed in the case where pressurization pin 50 was not moved back, when a fluid pressurization process was carried out at a pressure of 30 MPa after having moved back the pressurization pin by 10 mm, the process resulted in pressure forming without resulting in blow molding. In working example 7, gas ribs were provided with a view to prevent the pressurized fluid from entering clearances of ejector pins and nested elements, but in order to prevent the pressurized fluid having entered clearances of nested elements from leaking through clearances of ejector pins 27, seal rings 89 are provided on plate 53 and plate 54.

Results of fluid pressurization in working example 7 are shown in Table 4. Table 4 presents: types and trade names of resins; resin temperatures; conditions of fluid pressurization; results of fluid pressurization.

Working Example 8

(Method by Conducting the Pressurized Fluid Through the Inside of Ejector Pin)

With the mold of working example 6 and by the methods shown in FIGS. 52-55 (means of fluid pressurization from the pressurization ejector pin 227), the fluid pressurization was carried out.

Resins having been used, conditions and results of fluid pressurization in working example 8 are shown in Table 5. In working example 6, since the fluid pressurization was carried out through the clearance of ejector pin 27 and clearance 35 of nested element, the disturbances in shapes at rib tips were recognized. As a means to solve the problem (disturbances in shapes at rib tips) in working example 6, in working example 9 the device was configured so that the pressurized fluid was conducted only through ejector pin 227 and ejected only from the tip of ejector pin. As a result, the problem of disturbances in shape at rib tips was solved but this means was not able to solve the problem that hollows were formed when the pressure of pressurized fluid was increased.

Working Example 9

(Method by Conducting the Pressurized Fluid Through the Inside of Ejector Pin)

In working example 9, the fluid pressurization was carried out with a means having separate circuits for fluid pressurization by using a number of plates illustrated in FIG. 59, by using the mold of working example 6 in conformity with the aforementioned working example 9, and at the pressure of 30 MPa, 20 MPa and 10 MPa. Trial processes resulted in the same state of sink marks on flat portions on the stationary side as that of Table 5 of working example 6. The problem of disturbances in shape at rib tips was solved but this means was not able to solve the problem that hollows were formed when the pressure of pressurized fluid was increased.

Working Example 10

(Method by Conducting the Pressurized Fluid Through the Inside of Ejector Pin)

While in working examples 8 and 9 the ejector pin 227 was made to have a double structure as illustrated in FIG. 52 to FIG. 59, in working example 10, the fluid pressurization was carried out by using ejector pins illustrated in FIG. 61A to FIG. 61G and it was verified that the ejector pins with these shapes presented respectively in FIG. 61A to FIG. 61G were also capable of effecting fluid pressurization.

As types of resins and pressurized fluids used in working example 10 were the same as those indicated in Table 5, and the conditions of fluid pressurization were the same likewise, the results similar to those of working examples 8 and 9 were obtained. In the case of working example 10, as the fluid pressurization was carried out only from the ejector pin tips, the problem of disturbances in shape at rib tips was solved but this means was not able to solve the problem that hollows were formed when the pressure of pressurized fluid was increased.

It was demonstrated that, in addition, it was possible to close off the pressurized fluid by the method depicted in FIG. 61K, and that no leakage of pressurized fluid from ejector pins occurred.

Working Example 11

(Fluid Pressurization is Carried out after Pressurization Pin 50 is Moved Back)

In working example 11, the fluid pressurization was carried out by increasing the size of pressurization pin 50 of working example 5 to φ16 mm and by moving back ejector pin 50 by 10 mm before fluid pressurization as depicted in FIG. 62 to separate the tip of pressurization pin 50 from the resin to create a space. The fluid pressurization was carried out to make molded articles with the thickness increased from 2.5 mm to 3.0 mm (article 7), to 3.5 mm (article 8) and to 4 mm (article 9) respectively. Irrespective of the length of delay time, by the fluid pressurization at a high pressure of 30 MPa, even with PP, the process resulted in pressure forming without resulting in blow molding. Results of working example 11 are presented in Table 6.

Seal 126 is used on the upper face of flanged part of pressurization pin 50 to seal the face to prevent leakages of pressurized fluid. However, when pressurization pin 50 is made to recede, seal 126 moves away from the face and loses the sealing effect. Therefore, in the structure where pressurization pin 50 was made to be movable, the sealing effect was secured by using seal ring 89.

Working Example 12

(Pressurization 50 Capable of Moving Back and Forth)

The results of fluid pressurization processes in working example 5 and working example 11 by using pressurization pins with structures depicted in FIG. 61A to FIG. 61J were the same as those of working example 5 and working example 11. Incidentally, as described for working example 11, in the case where the pressurization pin has a structure enabling it to move back and forth, because the mechanism and function of seal 126 of the sealed pressurization pin 50 is lost when the pin moves back, the sealing effect was secured by using a seal ring 89.

Working Example 13

(Provision of Space by Making Use of the Mechanism to Push Ejector Rod on the Injection Molding Unit)

A commercially available injection molding unit is not equipped with the mechanism and function: to advance the ejector rod in order to move forth and hold the ejector plate before injecting a resin into the cavity; to inject the resin into the cavity to fill it completely with the resin; and then to move back the ejector rod simultaneously with the completion of resin injection or after the elapse of a certain period of time subsequent to the completion of resin injection. Therefore, at first such a mechanism as moves forth the ejector plate at the time of resin injection and other mechanisms were added anew to an injection molding unit.

With the addition of this mechanisms and functions, the fluid pressurization is carried out, for example, by exploiting the features depicted in FIG. 63 to FIG. 72, wherein at first pressurization pin 227 or pressurization pin 500 is moved back to create a space between the resin injected into the cavity and pressurization pin 227 or pressurization pin 500 and then the pressurized fluid is ejected into the space. In this manner, pressurized fluid enters the clearance between a resin and the mold to carry out fluid pressurization without intruding into resin.

First, molds having structures illustrated in FIG. 66 and FIG. 67 were prepared for molded article 10, molded article 11 and molded article 12 by modifying the mold for molded article 5 [(test piece shown in FIGS. 39-41) with product thickness (plate thickness) of 2.5 mm and grid of ribs (rib having a height of 10 mm and a thickness of 2 mm at the base] in order to modify only the product thickness of respective molded articles as follows: to 3.0 mm in molded article 10; to 3.5 mm in molded article 11; to 4.0 mm in molded article 12. Then, return pins 271 having a structure depicted in FIG. 64 were incorporated into respective modified molds, and in addition, 30 units of pressurization ejector pins 227 of φ10 (with inner core having a diameter of 6 mm) illustrated in FIG. 52 to FIG. 54 and ordinary ejector pins 27 were incorporated therein to pressurize rectangular surface areas surrounded by four ribs, rectangular areas with rims arrayed in a U-shape, or areas with rims arrayed in an L-shape, on respective types of molded articles.

Before filling the cavity with resin, pressurization ejector pins 227 and ordinary ejector pins 27 were moved forth by 10 mm (the state where ejector pins are advanced in this manner is normal; the plane of end points of ejector pins coincides with the movable side of molded article) by pushing the ejector rod by means of added mechanisms in the injection molding unit.

Under this condition, respective resins listed in Table 7 were injected into the cavity at a rate of 95% of full capacity. Main injection conditions are indicated in the Table. Incidentally, resin pressure keeping was not employed.

When, by allowing a delay time of 0 second, 2 seconds or 5 seconds for retraction by keeping time starting from the end of resin injection, the injection molding unit stopped the action to push the ejector rod, and the rod was moved back, ejector plate was moved back by 10 mm due to the force of spring 268 embedded in return pin and touched mounting plate 23 on the movable side. As the result, a space 279 of 10 mm was created between the tip of pressurization ejector pin 227 and the resin injected into the cavity (state of pin tip separated from resin surface by a distance of 10 mm).

Fluid pressurization was carried out with the conditions of pressure and time indicated in Table 7, and the occurrence of sink marks due to the presence of ribs was examined and recorded in Table 7. Moreover, it was also confirmed that there occurred no hollow resulting from the intrusion of pressurized fluid into the rib bases, and the results were indicated in Table 7.

Incidentally, in working example 13, the wedge unit 278 depicted in FIG. 65 and FIG. 66 was not utilized, and the operation was carried out by means of only the mechanism and function to push the ejector rod on the injection molding unit.

Working Example 14

In working example 14, the fluid pressurization was carried out on molded article 4 by using device 1140 in combination with pressurization pin 50 as well as pressurization ejector pin 227.

Moreover, pressurization pin 50 and pressurization ejector pin 227 were moved back by 10 mm before fluid pressurization to create a space between the tips of both pressurization pin 50 and pressurization ejector pin 227 and the resin injected into the cavity so as to prevent the formation of hollows as a result of intrusion of pressurized fluid into the resin.

By working example 14, it was demonstrated that a pressurization pin 50 could be used in combination with a pressurization ejector pin 227.

The possibility of combined use of pressurization pin 50 and pressurization ejector pin 227 as well as pressurization ejector pin 500 was examined, and the possibility of combined use of three types of fluid pressurization on a single mold was demonstrated.

Furthermore, in regard to the sealing of an inclined pin illustrated in FIG. 82A, FIG. 82B and FIG. 82C, it was demonstrated that any type of method indicated was feasible for sealing an inclined pin.

Working Example 15

(Provision of a Space by Using a Wedge Unit 278)

In working example 16, a wedge unit 278 that was not utilized in working example 15 was used to sustain the pressure to inject the resin into the cavity, and the mechanism and function to push ejector rod on the injection molding unit utilized in the previously described working example 15 was utilized for the operation of insertion and extraction of wedge unit 278.

Conditions of resin injection and fluid pressurization were the same as those in working example 15 and the results also were the same as those in Table 7 of working example 14.

Because space 279 was created in front of pressurization ejector pin 227, even in a molded article with a large thickness and at a high pressure of pressurized fluid, no hollow due to the intrusion of pressurized fluid into the resin was formed.

Working Example 16

(Other Structures of Pressurization Ejector Pin)

In working example 16, pressurization pin 227 employed in working example 14 and working example 15 was replaced by 9 different types of pressurization ejector pins illustrated in FIG. 61A1 to FIG. 61J4 and respective modified structures were used to examine if they were able to carry out fluid pressurization. Because obtained results were similar to those of working example 14 and working example 15, it was confirmed that any of the said 9 different types of pressurization ejector pins was feasible.

Besides, it was examined if the said 9 types of pressurization ejector pins illustrated in FIG. 61A1 to FIG. 61J4 could be used also in working example 25 to be described later, and it was confirmed that they could be used not only in working example 15 and working example 16 but also in working example 25.

Moreover, the length of 9 types of pressurization ejector pins illustrated in FIG. 61A1 to FIG. 61J4 was shortened down to the same length as that of pressurization pin 50 and the shortened pins were used in working example 5, and it was confirmed with conditions of working example 12 that the fluid pressurization with shortened pins could be carried out similarly as in the case of pressurization pin 50.

Working Example 17

In working example 15, working example 16 and working example 25 to be described later, pressurization ejector pins were replaced with ejector pins illustrated in FIG. 61K, and it was also confirmed that the structure depicted in FIG. 61K was sufficiently capable of blocking the pressurized fluid.

Working Example 18

(Means to Move Back Separately the Outer Cylinder and the Inner Core by Employing Two Types of Wedge Units)

In working example 18, the effect of fluid was confirmed: by using a mold with a mold structure using wedge unit 278 and wedge unit 180 illustrated in FIG. 67 and FIG. 68; and by moving back both outer cylinder 224 and inner core 226 of pressurization ejector pin 227 as illustrated in FIG. 69A to FIG. 69F. Results are presented in Table 8 of working example.

Results of working example 18 demonstrated) when both inner core and outer cylinder are attached closely to resin (FIG. 69A) and the pressure of pressurized fluid is high, pressurized fluid intrudes into resin and forms hollows (blow molding) without effecting pressure forming) when inner core is moved back and outer cylinder is attached to resin (FIG. 69B) and the pressure of pressurized fluid is high, with a resin of low viscosity in a molten state, like PP, pressurized fluid intrudes into resin and forms hollows without effecting pressure forming) when inner core is moved back and outer cylinder is attached to resin (FIG. 69C), because of the presence of space for ejecting pressurized fluid, the pressurized fluid does not intrude into resin to form hollows, but effects the pressure forming, even when the pressure of pressurized fluid is high and with a resin of low viscosity in a molten state, like PP) when both inner core and outer cylinder are moved back (FIG. 69D to FIG. 69F), because of the presence of space 286 for ejecting pressurized fluid, the pressure forming is effected without forming hollows in the resin, even when the pressure of pressurized fluid is high and with a resin of low viscosity in a molten state, like PP.

Working Example 19

Working example 19 was implemented by combining working example 8 (method by conducting the pressurized fluid through the inside of ejector pin) or working example 10 (method by conducting the pressurized fluid through the inside of ejector pin) with working example 21 (method by conducting the pressurized fluid through the outside of ejector pin). The same resins and pressurized fluids as those in working example 8 and working example 10 were used, and the same conditions of fluid pressurization as those in working example 8 and working example 10 were applied. Incidentally, in working example 19, as the mechanism and function to move back pressurization ejector pin 227 described for working example 19, the mechanism and function to move back outer cylinder 301 described for working example 21 was used to create a space between the resin and the pin tip, and therefore the formation of hollows at locations like rib bases did not occur.

Working example 19 can be implemented also if pressurization pin 227 is replaced with a pressurization ejector pin confirmed in working example 16 (FIG. 61A to FIG. 61J).

Working Example 20

Working example 12, working example 13 and working example 15 were implemented, after heating up to 300° C. the surface of mold having a nitrided surface by effecting electromagnetic induction from the surface by means of an electromagnetic induction device (BSM device). Even if the mold temperature is high, because the tips of pressurization pin 50 and pressurization ejector pin 227 are separated from the resin surface to form a space, hollows are not formed. As the resin injected into the cavity was pressurized by fluid at a temperature above the glass-transition point while effecting fluid pressurization as well, a molded article with a surface of good transcription performance and a clean appearance was obtained.

Working Example 21

(Method by Conducting the Pressurized Fluid Through the Outside of Ejector Pin/Neither the Outer Cylinder Nor the Ejector Pin 27 is Moved Back)

Working example 21 was implemented to examine if the fluid pressurization by using the pressurization ejector pins 500 in a mold structure depicted in FIG. 70 (with neither the outer cylinder 301 nor the ejector pin 27 of a pressurization ejector pin being moved back) was feasible. Results of working example 21 are presented in Table 9. Although not presented in Table 9, the temperature of mold surface was set at 60° C. on both the stationary side and the movable side.

Working Example 22

(Moving Back Ejector Pin 27)

In working example 22, only the ejector pins 27 illustrated in FIG. 70 were moved back by 10 mm by utilizing the respective means (utilization of mechanism to push the ejector rod of injection molding unit and wedge units) of working example 13 and working example 15, and the fluid pressurization was carried out. The results thus obtained are presented in Table 10 of working example 15. Even when the pressure of fluid pressurization is raised to 30 MPa, because of the presence of clearances, although a space exists at the tip of ejector pin 27 in comparison with working example 21, as outer cylinder 301 touches the resin in the cavity, the results are not so greatly different from those in Table 9 of working example 21.

Working Example 23

(Fluid Pressurization by Moving Back Outer Cylinder 301)

In working example 23, the molds illustrated in FIG. 71 and FIG. 72 were fabricated by using a commercially available short ejector sleeve and a long ejector pin. Fluid pressurization was carried out by using the molds illustrated in FIG. 71 and FIG. 72. Outer cylinder 301 was moved back by 10 mm before effecting fluid pressurization.

As means to move back outer cylinder 301, although not illustrated in FIG. 71 and FIG. 72, the mechanism to push the ejector rod of injection molding unit in working example 13 was utilized. Incidentally, although not illustrated, the ejector rod is extended further to reach plate 300 and, when filling the cavity with resin, pushes spring 294, presses plate 298 against plate 297 and moves forth outer cylinder 301. With this state, respective resins presented in Table 11 were injected into mold to fill 95% of the capacity of cavity. Main injection conditions are presented in Table 11. Incidentally, the resin pressure keeping was not used.

After allowing a delay time of 0 second, 2 seconds or 5 seconds by keeping time starting from the end of resin injection, the ejector rod was moved back, and consequently, due to the force of spring 268 embedded between plate 298 and plate 297, plates were separated by 10 mm from each other (FIG. 72) and clearance 302 appeared. As a result, outer cylinder 301 of pressurization ejector pin 500 receded by 10 mm and had a space of 10 mm apart from resin injected into the cavity.

Fluid pressurization was carried out with conditions of time and pressure presented in Table 11 to examine if sink marks occurred due to the presence of ribs.

Results of operations of fluid pressurization without moving back outer cylinder 301 demonstrated that, similarly as in the case of previously described working example 10, as was expected, hollows were formed when the pressure of pressurized fluid was high and product thickness was great.

Working Example 24

In working example 24, with the mold structure of working example 23, and by using mechanisms and wedge units on the injection molding unit in working example 13 and working example 15, ejector pin 27 was moved back simultaneously with the backward movement of outer cylinder 301 to create a space between the tip of pressurization ejector pin 500 and the resin in the cavity.

The amount (distance) of backward movement of outer cylinder 301 and the amount (distance) of backward movement of ejector pin 27 were varied in different ways as illustrated in FIG. 69A to FIG. 69F to examine the effect of fluid. Results were the same as those of Table 8 of working example 18. Incidentally, the conditions of resin injection into the cavity and fluid pressurization were the same as those presented in Table 8. The distance of backward movement of outer cylinder 301 was made to be 10 mm.

Working Example 25

In working example 25, although not illustrated in FIG. 71 and FIG. 72, wedge units to be inserted between wedge units 278 of the ejector plate and space 302 were added, and thus the pressure of resin injected into the cavity exerted on the ejector pin was sustained by the wedge units. The space to be created by the backward movement of both outer cylinder 301 and ejector pin 27 was varied as illustrated in FIG. 69A to FIG. 69F, according to the thickness of respective wedge units.

The fluid pressurization operations by varying space 286 in this manner produced the same results as those of working example 16. The means to close off pressurized fluid of FIG. 69K is also feasible and this is a seal for an ordinary ejector pin 27.

Working Example 26

In working example 26, the injection blow molding was carried out by using the molds of core-backing type illustrated in FIG. 84A and FIG. 84B. The molds were prepared by modifying the specifications of mold for molded article 5 illustrated in FIG. 39 to FIG. 41 so as to make it possible to effect core-backing.

To start with, as illustrated in FIG. 84A, with floating core of reference numeral 354 being moved forth (product thickness of 2 mm) by the mold clamping force (mold clamping mechanism) of injection molding unit (not illustrated), ABS was injected into the cavity to fill 100% of its capacity. After 5 seconds, floating core 354 was moved back by 1 mm as shown in FIG. 84B, and after 2 seconds of delay time, fluid pressurization was carried out for 20 seconds by nitrogen gas at a pressure of 25 MPa from pressurization pin 50. Pressurized fluid was discharged to the atmosphere after taking a delay time of 10 seconds.

Ejector pin 358 in FIG. 84A and FIG. 84B holds down the top of rib 353 when core-backing is effected so that the molded article does not move away from the stationary side.

Working example 26 made it possible to implement the pressure forming-injection molding even with a mold having core-backing function, and no sink mark due to the presence of rib 353 was observed.

Incidentally, in the case of core-backing configuration, a rib of reference numeral 371 corresponding to the dimension of core-backing is provided around the edge of molded product, and as it serves as a gas rib, there is no likelihood of leaking out of the pressurized fluid. With HIPS and PP as well, the action and effect similar to that with ABS was recognized.

Because above mentioned pin 50 moves back together with (in conjunction with, simultaneously with) floating core 354 and moves away from the surface of resin in the cavity, space 360 is created (although not illustrated in FIG. 84B, actually a space 360 corresponding to the dimension of core-backing of 1 mm is created also on the tip and lateral face of rib) where pressurized fluid flows (passes) despite the presence of rib, and therefore the fluid pressurization can be carried out with pressurization pin 50.

Needless to add, the implementation with pressurization ejector 227 or pressurization ejector pin 500 is also feasible. In this case, because of the necessity of creating a space between pressurization ejector pin 227 or pressurization ejector pin 500 and the resin in the cavity, these pins need to move independently with respect to aforementioned ejector pin 358 holding down the top of rib (to move in conjunction with core backing action). This means can be implemented by using a plurality of ejector plates and by moving them respectively.

Working Example 27

In working example 27, the pressure forming-injection molding as well as the injection blow molding was carried out wherein the base of rib was made to present a hollow and other surfaces were pressure-formed.

In order to prepare a mold capable of carrying out injection blow molding (not illustrated), a single hollow pin (injection blow molding can be effected easily by inserting pressurization pin 50 into the molded article) was provided from the stationary side in the vicinity of gate of runner on molded article 5 shown in FIG. 39 to FIG. 41. Needless to add, pressurization ejector pin 227 having the mechanism enabling back and forth movements similarly as in the cases of working example 13 and working example 15 was provided.

To start with, injection blow molding was carried out with the pressure of pressurized fluid at 25 MPa. A hollow was formed at the base of rib as a whole but the hollow extended beyond the rib base and the extension amounted to about 5 mm to 15 mm.

Then, simultaneously with the introduction of pressurized fluid at 25 MPa into the hollow pin serving for carrying out injection blow molding, the fluid pressurization was carried out also through the pressurization ejector pin.

Conditions of injection of pressurized fluid in injection blow molding and pressurization conditions in pressure forming-injection molding were as follows: pressurization time of 20 seconds, retention time of 10 seconds and time of 10 seconds for discharge into the atmosphere were used as fixed parameters; pressure for blow molding, pressure of fluid pressurization, delay time, etc. were set respectively as variable parameters.

As a result of comparison of obtained molded articles with those obtained from the aforementioned process in which only pressure forming-injection molding was carried out, it has been demonstrated that, when both injection blow molding and pressure forming-injection blow molding were carried out in combination, a hollow was formed, the extent of hollow portion varied or no hollow was formed, depending on the differences between the conditions of injection of high pressure gas in injection blow molding and the conditions of fluid pressurization in pressure forming-injection molding. These results are presented in Table 12. Incidentally, in working example 27, the internal portion was examined and evaluated by using transparent ABS, HIPS or PP so that the formation of hollow portions could be identified. When the internal portion was difficult to examine, the product was cut for examination.

From the results of evaluation, it was judged that the combination of processes of injection blow molding and pressure forming-injection molding made it possible to form a hollow only at the base of rib.

Working Example 28

ABS pellets were mixed with a small amount of baby oil, 0.4% by weight of sodium hydrogen carbonate and 0.25% by weight of monosodium citrate; the pellets were further coated with bloating agents in a tumbler mixer, fed into the hopper of injection molding unit and plasticized; sodium hydrogen carbonate and monosodium citrate in the mixture were pyrolized in the heating cylinder of injection molding unit to make it a foamable resin. The aforementioned formable resin provided with foaming properties was used in the implementation of working example 13, working example 15 and working example 27, and it was verified that the action and effect for raising (boosting) expansion factor in the conventional foam molding process similar to those of core-backing technique was found in the pressure forming-injection molding using a foamable resin.

Working Example 29

In working example 29, the augmentation of expansion factor as compared with that in working example 28 was intended by using the foamable resin in working example 28 instead of the resin in working example 26, and by effecting the core-backing movement. Results of measurement of specific gravity were able to confirm that the factor augmented further by 5 wt. % as compared with working example 28.

Working Example 30

In working example 30, the seal ring 89 that had been employed as a seal on ejector pin, pressurization ejector pin or other types of shaft bodies for extracting the molded article in working examples 1 to 29 was replaced with L-shaped seal or U-shaped seal presented in FIG. 79 instead of commercially available Omniseal or Variseal. It was confirmed that as a material for element of reference numeral 316, both PTFE and silicone resin could be used, and for element of reference numeral 315, any type of rubber among nitrile rubber, polyurethane rubber, silicone rubber and fluorine-contained rubber could be used.

Working Example 31

As a compression part of gas booster 8 on fluid pressurization device 140 or 1140 used in working examples 1 to 29, the one with the structure illustrated in FIG. 83 was employed. It had a structure provided with slide rings 329 and seal 333 in a cylinder 331, and it was confirmed that the system was able to raise the pressure of (compress) a gas or a fluid up to 30 MPa, and also could be operated continuously.

Incidentally, regarding the injection molded solid article with which a comparison was made with respect to the occurrence of sink marks in the working examples 1 to 29, each of the examined resins was processed with the same molding conditions, without using any resin pressure keeping at all and by lowering the metering volume to a level as low as the limit where a short-mold starts to occur, and consequently big sink marks occurred on the flat face on the stationary side. The weight of a molded article by fluid pressurization and that of an injection molded solid article were equalized.

Working Example 32

Although resin pressure keeping was not used in working examples 1 to 29, they can also be implemented by using resin pressure keeping. However, if resin pressure keeping is used, it may become impossible, in certain cases, to benefit from the down grading of injection molding unit thanks to the capability of low pressure molding, one of the features in the action and effect of pressure forming-injection molding otherwise available. In that case, internal stress increases, strain of molded article increases, and its warpage and deformation are marked more than when pressure keeping is not used.

Working Example 33

(Examination of Effect of Ring-Shaped Member)

Figure 86:
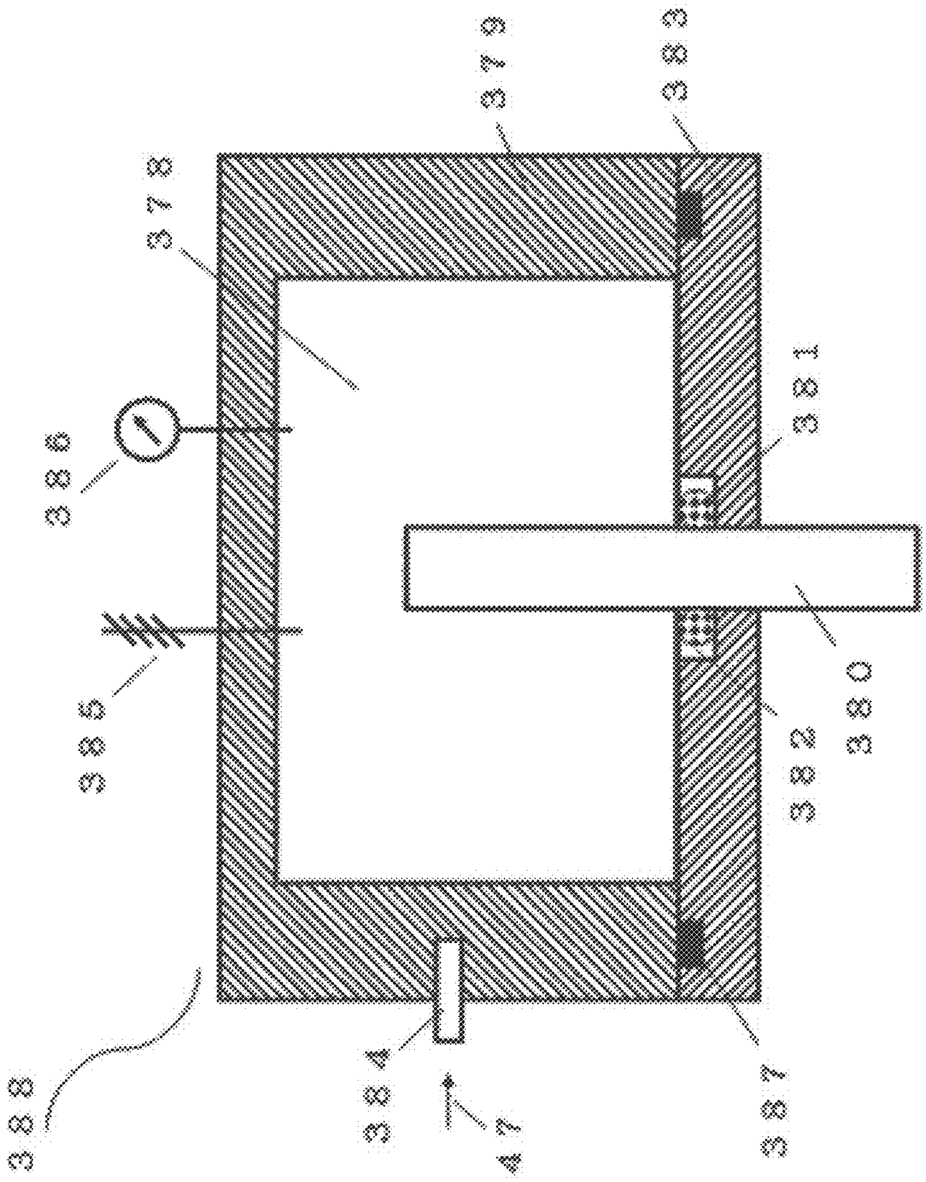
FIG. 86 is a schematic diagram representing a device for evaluation of sealing properties of a ring-shaped elastic member.

By using device 388 depicted in FIG. 86, it was examined if the sealing effect of U-shaped seal and L-shaped seal in FIG. 27, FIG. 28 and FIG. 79 was ensured, and therefore ring-shaped member 104 and ring-shaped member 315 were really needed. Nitrogen gas was supplied from device 140 and a pressurized liquid or nitrogen gas was introduced through element of reference numeral 384 into space 378, retained for a certain period of time, and the indication of pressure gauge of reference numeral 386 (with inner volume of 25 ml) was observed; when the pressure drop was observed to be less than 25% in 5 minutes, it was judged that the tested element had an acceptable sealing effect as a conclusion of working example 33.

Ring-shaped member 315 is incorporated for the purpose of providing a loading function (function to constrict an outer element around an inner element). With this working example 33, a comparison was made between the case where ring-shaped member 315 was not utilized and the case where it was utilized. The results demonstrated that the utilization of ring-shaped member 315 improved the sealing effect of concerned element.

At the outset, Variseal depicted in FIG. 27 and FIG. 28, and U-shaped seal and L-shaped seal depicted in FIG. 79 were used to examine their sealing effect to close off the pressurized fluid at respective pressures (10 MPa, 20 MPa, and 30 MPa).

Moreover, the sealing effect was examined by comparing the case where ring-shaped member 104 or ring-shaped member 315 was utilized with the case where ring-shaped member 103 or ring-shaped member 316 alone was used without incorporating ring-shaped member 103 or ring-shaped member 315 into ring-shaped member 103 or ring-shaped member 316.

The sealing effect was examined by observing pressure gauge 386 with the pressure of space 378 set at 10 MPa, 20 MPa and 30 MPa. As element of reference numeral 380 corresponds to, for example, an ejector pin, its size was made to be φ6, φ8, φ10, φ12, φ15, φ20 or φ25. The results of examination of sealing effect are presented in Table 13. Table 13A presents results of examination by using a commercially available Variseal depicted in FIG. 27 and FIG. 28. Table 13B presents results of examination in the case where ring-shaped member 103 (metal spring) in FIG. 27 and FIG. 28 was not used; no sealing effect at all was observable. Table 13C presents results of examination in the case where a U-shaped seal in FIG. 79 was used; a sufficient level of sealing effect was ensured by using ring-shaped member 315 made of NBR, silicone rubber or fluorine-contained rubber. Unless ring-shaped member 315 was used, no sealing effect was observable. Similar results were obtained in the case where an L-shaped seal was used; Table 13E presents results in the case where ring-shaped member 315 made of NBR, silicone rubber or fluorine-contained rubber was used; Table 13F presents results in the case where ring-shaped member 315 was not used.

In Table 13, "○" stands for presence of sealing effect; "x" stands for absence of sealing effect, the symbol namely signifying that the pressurized fluid leaks out through clearance between the seal and element of reference numeral 380 because the seal is not pressed against the latter by a ring-shaped member. Incidentally, as a material to constitute main body 316 in FIG. 79, any one of those materials including PTFE and FPA of fluorine contained resin, silicone resin, silicone rubber and high molecular weight polyethylene could be used. It was made by machining with an NC lathe. It could be made also through a forming process by using a mold; flashes occurring on parting surface were smoothed out by mechanical polishing or the like.

Incidentally, element of reference numeral 379 in FIG. 86 is a steel product (corresponding to a nested element) constituting a space, and element of reference numeral 380 therein corresponds to a shaft body for extrusion and to an ejector pin. Element of reference numeral 381 corresponds to the ring-shaped elastic member in FIG. 27, FIG. 289 and FIG. 79; element of reference numeral 382 corresponds to a groove in which the ring-shaped elastic member fits; element of reference numeral 383 is a seal plate and in FIG. 3 corresponds, for example, to element of reference numeral 53. Element of reference numeral 387 is a seal and in FIG. 3 corresponds, for example, to element of reference numeral 55. Element of reference numeral 385 is a safety valve for preventing the explosion of device 388.

The evaluation methods presented in Tables 1-5 are described. Visual verification was made about the presence of sink marks on the flat plate on the stationary side. Evaluation criteria are as follows: in comparison with the injection molded solid article, "◎" stands for a level where no sink mark at all is recognizable; "○" stands for a level where a few sink marks are recognized but permissible for a practical purpose; "Δ" stands for a level where sink marks are recognizable but in comparison with a molded article without fluid pressurization, an improvement has been made with respect to the presence of sink marks; "x" stands for a level where there is little difference in comparison with the injection molded solid article with respect to the presence of sink marks. Moreover, "●" stands for the case where, even in a pressure forming-injection molding process, the pressurized fluid enters the resin and results in forming hollows in thick portions like the base of rib or in portions where the speed of cooling and solidification is slow.

Working Example 34

Feasibility was examined for the fluid pressurization through the outside of ejector pin as well as the inside of pressurization ejector pin (combined use of different passageways) by replacing pressurization ejector pin 227 of working example 25 with the pressurization ejector pins depicted in FIG. 69A to FIG. 69J.

Working Example 35

The mold structure depicted in FIG. 110 was adopted as the structure of respective molds for molded article 5 (with a thickness of 2.5 mm), molded article 10 (with a thickness of 3.0 mm), molded article 11 (with a thickness of 3.5 mm) and molded article 12 (with a thickness of 3.5 mm) in working example 13.

Figure 115:
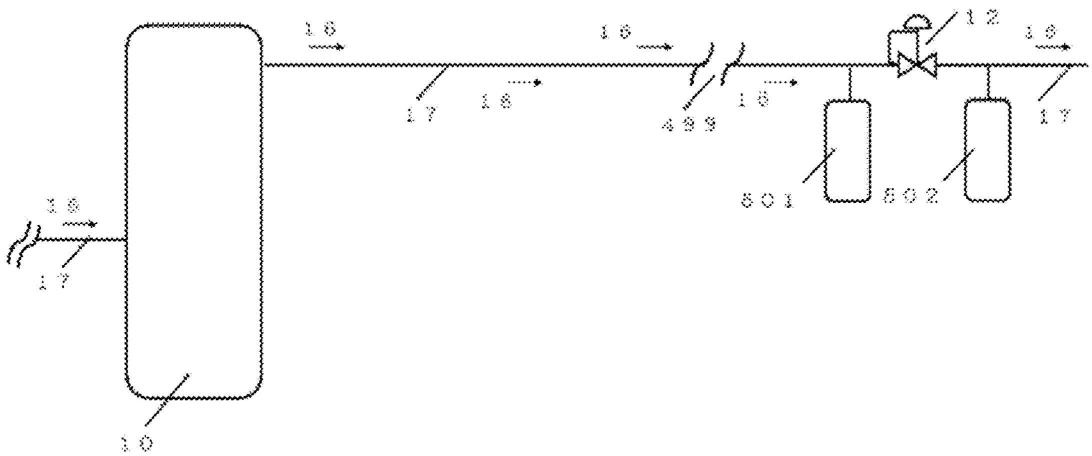
FIG. 115 is a circuit diagram of a device in which receiver tanks are provided before and after the regulator so that the fluid pressurization can be effected in a short period of time.

In addition to the device depicted in FIG. 1, the system was provided with sub-tank 501 and sub-tank 502 depicted in FIG. 115. The employed pressurized liquid was nitrogen gas. Element of reference numeral 467 was prepared by piercing by means of a drill a hole of φ4 mm of reference numeral 479 in an ejector pin of φ8 mm, the hole being pierced starting from the bottom of flanged part. The hole was not pierced through the pin but terminated at a point 2 mm short of the pin end.

The hole of reference numeral 480 had a diameter of 4 mm and was pierced at two points located every 180 degrees along the circumferential direction around the pin, with its center located at 6 mm from the top end of element of reference numeral 467, so as to lead to hole 479 and make up a configuration depicted in FIG. 111B.

The pin thus prepared was enclosed in an outer cylinder of reference numeral 470 to constitute a structure capable of fluid pressurization by element of reference numeral 467 and capable of ejecting operation as well by element of reference numeral 470. The function to open clearance 475 was effected by using a coil spring (not illustrated in FIG. 110) provided on the mold and the control of amount (distance) of clearance was effected by incorporating a puller bolt depicted in FIG. 114 in the mold (location for mounting in FIG. 110 is not illustrated). The distance of clearance 475 was set at 12 mm.

Upon completing the step of mold clamping, the molten resin is injected into the mold cavity, with element of reference numeral 470 held at a position where it was moved forward by 12 mm (state where clearance 475 was opened by 12 mm) by means of a mechanism to push out the ejector rod on the injection molding unit, and after finishing the resin injection, the ejector rod on injection molding unit was moved back to move back element of reference numeral 470 by a distance of 12 mm set by the puller bolt. After moving back element 470, the fluid pressurization (pressure forming-injection molding) by nitrogen gas was carried out by means of the system of FIG. 1 modified by adding two tanks 501 and 502 depicted in FIG. 115.

Working Example 36

In working example 35, hole 480 was made to emerge by the backward movement of outer cylinder of reference numeral 470. Because it was feared that, as a result of this configuration, the resin might flow (intrude) into hole 480 when it presented a low viscosity in a molten state as in the cases of PE, PP, etc., the position of hole 280 that had been set at 6 mm from the pin end in working example 35 was changed to that set at 20 mm in working example 36.

As the hole 480 was located at 20 mm, the ejection of pressurized fluid became rather difficult when the pin was enclosed in outer cylinder 470, and consequently D-shaped cut sections 510 were provided as depicted in FIG. 113 so as to lead (be connected) to hole 480. As the fluid pressurization is effected after moving back outer cylinder 470, pressurized fluid is not ejected (does not have to be ejected) from the pin tip, unlike the case of element of reference numeral 227, and hence D-shaped cut sections have been machined just up to a point short of the top end as depicted in FIG. 113B and FIG. 113C. Similarly as in the case of working example 35, after moving back outer cylinder 470 by 12 mm, the fluid pressurization (pressure forming-injection molding) was carried out by nitrogen gas by means of the same system.

Working Example 37

In working example 37, as an element of reference numeral 467 in working example 35, an element having a structure employing a cap 484 depicted in FIG. 111E to FIG. 111G was adopted. It was enclosed in outer cylinder 470 and made to have the function of fluid pressurization as well as that of ejector as depicted in FIG. 111H. Elements of reference numerals 480 and 490 depicted in FIG. 111(I), create spaces 491 for ejecting pressurized fluid by moving back outer cylinder 470. At this moment, hole 480 and hole 490 emerge as a result of backward movement of outer cylinder 490. Similarly as in the case of working example 35, after moving back outer cylinder 470 by 12 mm, the fluid pressurization (pressure forming-injection molding) was carried out by using nitrogen gas by means of the same system.

Working Example 38

In working example 37, because hole 480 and hole 4 emerge similarly as in the case of working example 35, there is the possibility of intrusion of molten resin into the holes. In order to avoid the possibility of intrusion of molten resin, the means described for working example 36 (the position of holes 480 and 490 is set back) is adopted so that holes 480 and 490 may not emerge even when outer cylinder 470 is moved back. Needless to add, the D-shaped cut sections (of the same configuration as that of FIG. 113B and FIG. 113C) are likewise provided as it is needed to enable the pressurized fluid to flow through.

Similarly as in the case of working example 35, after moving back outer cylinder 470 by 12 mm, the fluid pressurization (pressure forming-injection molding) was carried out by nitrogen gas by means of the same system.

Working Example 39

In working example 39, an element shown in FIG. 112A and FIG. 112B was constructed as follows: as illustrated in FIG. 112A, hole 492 was pierced in outer cylinder 224 of pressurization pin 227 depicted in FIG. 52, FIG. 53 and FIG. 54 to make it possible to eject the pressurized fluid through this hole 492; the unit thus constructed was enclosed in another outer cylinder 470.

Similarly as in the case of working example 35, the fluid pressurization was carried out after moving back outer cylinder 470 by 12 mm.

Working Example 40

Since the intrusion of molten resin into hole 492 was feared in working example 39, similarly as in the case of working example 36, the position of hole 492 was set back so that hole 492 might not emerge even when outer cylinder 470 was moved back. Similarly as in the case of working example 35, after moving back outer cylinder 470 by 12 mm, the fluid pressurization (pressure forming-injection molding) was carried out by nitrogen gas by means of the same system.

The results of working example 35 to working example 40 were presented in Table 15. Table 15 presented employed resins, conditions of injection and conditions of fluid pressurization. The results were presented by symbols, ○ and x. ○ signifies that no intrusion of molten resin into the hole was observed and the fluid pressurization was carried out with ease. x indicates that intrusion of molten resin into the hole was observed and the fluid pressurization was difficult to carry out with certain types of resins (resins presenting a low viscosity in a molten state) (Table 15).

Working Example 41

In working examples 35 to 39, pressure forming-injection molding processes were carried out by mounting, as a nozzle for injection molding unit, such a one as incorporated a ball 446 depicted in FIG. 105A, and by using respective resins presented in Table 15, in order to mold respective types of molded articles described in working example 35. The system for fluid pressurization was the one that was utilized in workings examples 35 to 39. A pressurized fluid (nitrogen gas was used) was compressed to 35 MPa and accumulated in receiver tank 10. Needless to add, the fluid would be accumulated in sub-tank 501 under a pressure of 35 MPa.

The pressure of pressurized fluid was set at 10 MPa by regulator 12, sub-tank 502 accumulated the fluid at 10 MPa, and although the operation was carried out for 100 consecutive shots, in the case of this pressure (10 MPa), there occurred no intrusion of gas from the nozzle into the heating cylinder of injection molding unit, because ball 446 incorporated in the nozzle served as an adequate valve. When the fluid pressure was raised up to 30 MPa by regulator 12, no intrusion of gas into the heating cylinder of injection molding unit took place for the first fifteen shots, but at the $16^{th}$ shot and afterward the nitrogen gas, pressurized fluid, intruded at every shot into the heating cylinder of injection molding unit through the sprue-runner.

With the structure depicted in FIG. 105A, as the sealing part of reference numeral 450 presented a spherical surface to match the spherical profile of ball 446, a small amount of resin, resin debris or contaminants (resin fragments carbonized in the heating cylinder) entered interstices, created a slight gap between ball 446 and sealing part 450 and caused the loss of sealing effect. Even when the size (diameter) of ball was varied to make it 10 mm, 15 mm or 20 mm, in all cases, at a pressure of 30 MPa, ball 446 was not able to serve as a valve and block the intrusion of fluid into the heating cylinder.

With a seal configuration presenting a line-to-line contact between ball 446 and seal part 506 that was configured in a conical form as depicted by element of reference numeral 509 in FIG. 105D, even the continuous production by consecutive 100 shots at a pressure of 30 MPa did not result in causing the intrusion of pressurized fluid into the heating cylinder of injection molding unit. The sealing effect of ball at a pressure of 30 MPa was confirmed for all the different diameters of ball, 10 mm, 15 mm and 25 mm. Even when the pressure was raised to 50 MPa, the intrusion of pressurized fluid into the heating cylinder was blocked and a sufficient level of sealing effect was ensured.

Working Example 42

Alternative types of check valves to replace element of reference numeral 446 were implemented by utilizing respective valve configurations depicted in FIG. 107B to FIG. 107L. In the case where all the seal surfaces of elements of FIG. 107B, FIG. 107C, FIG. 107I, FIG. 107J and FIG. 107L were spherical (reference numeral 449), and in the case of form of part 450 (spherical form) in FIG. 105, when the pressure of pressurized fluid was raised to 30 MPa, similarly as in the case of FIG. 107A, the intrusion of gas into the injection molding unit started to occur after finishing about 15 shots. When the seal was made by line-to-line contact with a conical form of element of reference numeral 509, even at a pressure of 50 MPa, the intrusion of pressurized fluid into the heating cylinder could be blocked.

Then, with a conical valve shape (reference numeral 459) of FIG. 107F, FIG. 107G or 107K, if it was combined with a seating part (part to constitute a seal by contacting a valve) presenting a conical form 509 to make a surface seal (make a surface-to-surface contact), the intrusion of pressurized fluid occurred at a pressure of 30 MPa. In the case where the element of reference numeral 509 was replaced with that of 450 to constitute a line seal (make a line-to-line contact), there occurred no intrusion of pressurized fluid into the heating cylinder of injection molding unit, and the sealing effect was ensured.

With a flat valve shape (reference numeral 460) of FIG. 107F, FIG. 107E or 107H, as the counterpart element (part to constitute a seal by contacting the element of reference numeral 460) also presented a flat surface to constitute a surface seal, the valve configuration allowed easy intrusion of resin, resin debris or contaminants, and therefore, at a high pressure of 30 MPa, the sealing effect deteriorated and the intrusion of pressurized fluid could not be blocked.

Working Example 43

With a nozzle using two balls 446 as depicted in FIG. 108, balls 446 moved back to make seals; even if the sealing surfaces were spherical (reference numeral 450) as illustrated, and even at a pressure of 30 MPa, the sealing effect could be ensured sufficiently. Needless to add, the elements of reference numeral 450 can be replaced with those presenting a conical shape of reference numeral 509. Moreover, FIG. 108 illustrates a case employing two balls 446, but a combination of any of two among elements illustrated in FIG. 107A to FIG. 107L can be used alternatively as well.

Working Example 44

A hot runner provided with a valve structure depicted in FIG. 111A was incorporated into molds of working examples 35 to 39. When the pressure forming-injection molding was carried out by using ABS at a pressure of 30 MPa, there occurred no intrusion of pressurized fluid into the hot runner manifold. With regard to seal 515 in working example 43, element of reference numerals 103 as well as that of 104 was made of spring steel in FIG. 27 and FIG. 28. Sealing effect was recognized also on a seal in which element of reference numeral 103 was made of Teflon and that of 104 was made of spring steel.

It was confirmed that a structure (FIG. 117B) comprising only a valve without using a valve pin 514 also was able to serve perfectly as a hot runner. The tip portion was tapered as depicted by element of reference numeral 524 so as to facilitate the separation.

Working Example 45

The operation of pressure forming-injection molding was implemented to make a molded article illustrated in FIG. 39 to FIG. 41 (product thickness of 2.5 mm, rib base thickness of 2 mm) with PP and ABS, after filling the cavity with a molten resin, by means of a device depicted in FIG. 115 provided with sub-tank 501 before and with sub-tank 502 after regulator 12 having the function to set the pressure of pressurized fluid in the pressure forming-injection molding process.

As examples for comparison, the process was carried out for the case provided with only sub-tank 502, for the case provided with only sub-tank 501 and for the case provided with neither sub-tank 501 nor sub-tank 502.

Results of comparison of sink marks and unevenness of transcription occurring due to the presence of ribs on the surface shown in FIG. 41 demonstrated that the molded articles with the best appearance and the fewest occurrences of defects were obtained when sub-tank 201 and sub-tank 502 were provided respectively before and after regulator 12. Articles with the second best appearance were obtained in the case with only sub-tank 502, the third best appearance in the case with only sub-tank 501, and articles with the poorest appearance were obtained in the case where neither sub-tank 501 nor sub-tank 502 was used, and only the receiver tank of reference numeral 10 depicted in FIG. 1 was used.

Relevant parameters in working example 45 were set at respective levels as follows: temperature of molten resin of ABS, 240° C.; pressure of fluid pressurization, 15 MPa or 30 MPa; delay time. 0.5 seconds; fluid pressurization time, 15 seconds; retention time, 10 seconds; atmospheric discharge time, 10 seconds. In the case of PP, temperature of molten resin was set at 190° C.

Needless to add, it was confirmed that the device of FIG. 115 was useful for injection blow molding as well.

Working Example 46

Figure 116:
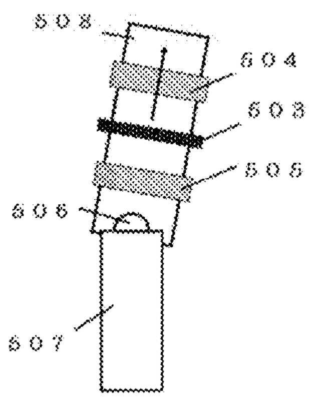
FIG. 116 is a schematic diagram representing the configuration wherein a seal is arranged obliquely on a mechanism including slide-core, inclined pin etc.

It was confirmed that in the implementation of pressure forming-injection molding, as a seal on the inclined pin, the means illustrated in FIG. 116 was able to function perfectly without any leakage of fluid even with the nitrogen gas at a pressure of 30 MPa.

Working Example 47

In working examples from 1 to 56 of the present invention, with a nozzle incorporating the ball check illustrated in FIG. 106, even when the continuous operation of pressure forming-injection molding or injection blow molding was carried out with the pressure of pressurized fluid raised up to 30 MPa, the intrusion of pressurized fluid into the heating cylinder of injection molding unit occurred in neither of the two types of injection molding processes.

As the shape of seat for ball check 446, it was confirmed that the shape of reference numeral 509 (line seal) offered a higher sealing effect than that of reference numeral 450 (whole surface seal). If magnet 457 of FIG. 106 was used, ball check 446 returned rapidly, and hence the sealing effect was enhanced further.

It was confirmed that ball check 446 or any shaped element of those illustrated in FIG. 107A to FIG. 107L was able to perform adequately the function of blocking the pressurized fluid hermetically (function of stop valve).

It was confirmed that also in the case where two units of ball check depicted in FIG. 108 were used, a sufficient level of sealing effect to close off the pressurized fluid was ensured.

Working Example 48

It was confirmed that in either of the two types of hot runners using valve 519 illustrated in FIG. 117A and FIG. 117B, valve 519 had the action and effect sufficiently to obstruct the intrusion of pressurized fluid into the manifold of hot runner (not illustrated). By cooling a hot runner with air, the discoloration and burns around the tip of hot runner nozzle (occurring on the surface of a molded article) caused by the hot runner were reduced.

Working Example 49

Figure 30:
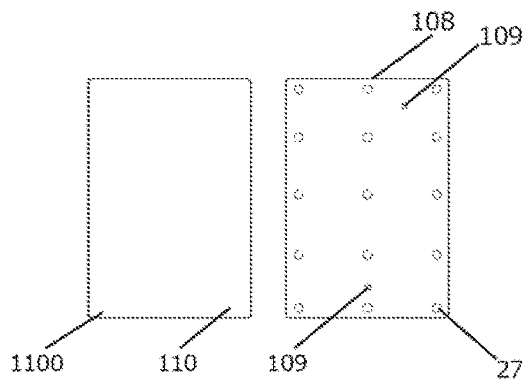
FIG. 30 is a test piece used in an embodiment wherein the entire part on the movable side is pressurized by fluidic pressure.
Figure 31:
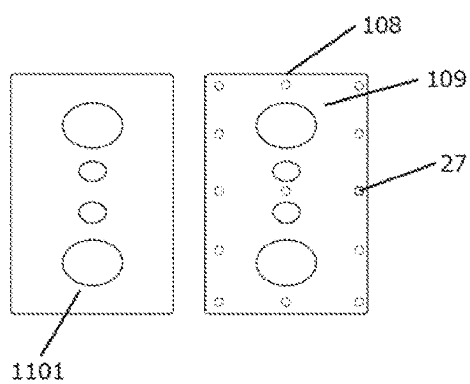
FIG. 31 is a test piece used in an embodiment wherein the entire part on the movable side is pressurized by fluidic pressure.

In working example 49, pressurization pin 50 was positioned on the parting as illustrated in FIG. 118A to FIG. 118C, and it was confirmed that the fluid pressurization was possible with both PP and ABS on respective molded articles illustrated in FIG. 30 and FIG. 31.

Relevant parameters in pressure forming-injection molding operation were set at respective levels as follows: temperature of molten resin of ABS, 240° C.; pressure of fluid pressurization, 15 MPa or 30 MPa; delay time. 0.5 seconds; fluid pressurization time, 15 seconds; retention time, 10 seconds; atmospheric discharge time, 10 seconds. In the case of PP, temperature of molten resin was set at 190° C.

In the case of FIG. 118A, a large quantity of pressurized fluid intruded into upper side of page (stationary side) and fluid pressurization was possible. In the case of FIG. 118B, a large quantity of pressurized fluid intruded into lower side of page (movable side) and fluid pressurization was possible. In the case of FIG. 118C, the pressurized fluid intruded only into the movable side (lower side of page) and fluid pressurization was carried.

Working Example 50

A large quantity of pressurized fluid intruded into the movable side in the case of FIG. 119A, and into the stationary side in the case of FIG. 119B, and the fluid pressurization from respective sides was possible. In both cases of FIG. 119C and FIG. 119D, the pressurized fluid intruded into the stationary side (the upper side of page was considered as stationary side), and fluid pressurization was possible. In the case of FIG. 119E, the pressurized fluid intruded into the stationary side (the upper side of page was considered as stationary side), and fluid pressurization was possible. Relevant parameters in pressure forming-injection molding operation were set at respective levels as follows: temperature of molten resin of ABS, 240° C.; pressure of fluid pressurization, 15 MPa or 30 MPa; delay time. 0.5 seconds; fluid pressurization time, 15 seconds; retention time, 10 seconds; atmospheric discharge time, 10 seconds. In the case of PP, temperature of molten resin was set at 190° C.

Working Example 51

In the case of FIG. 120B, as pressurization pin 50 was provided on a rib, the fluid pressurization was possible on the outer side of rib (right side of page) as well as on the inner side of rib (left side of page); the fluid pressurization was carried out from the movable side (lower side of page) and it was confirmed that sink marks due to the presence of rib occurred less frequently.

In the case of FIG. 120C, the fluid pressurization was carried out from the movable side (lower side of page) on both the outer side and the inner side of rib, and it was confirmed that sink marks due to the presence of rib occurred less frequently.

Working Example 52

In the mold for a product of FIG. 39, a nested element surrounded by ribs was replaced with a sintered metal element 534 to make up a structure illustrated in FIG. 122. A pressurized fluid was ejected from sintered metal element 534, and in both cases of FIG. 122A and FIG. 122B, the effect to reduce the occurrence of sink marks due to the presence of rib was observed. Relevant parameters in pressure forming-injection molding operation were set at respective levels as follows: temperature of molten resin of ABS, 240° C.; pressure of fluid pressurization, 15 MPa or 30 MPa; delay time. 0.5 seconds; fluid pressurization time, 15 seconds; retention time, 10 seconds; atmospheric discharge time, 10 seconds. In the case of PP, temperature of molten resin was set at 190° C.

In working example 49 to working example 52, molded articles of PP presented warpages and deformations in pressure forming-injection molding when they were processed with only fluid pressurization. When the process of resin pressure keeping was used concomitantly, warpages and deformations could be reduced.

Working Example 53

In a test by jointing in mid-course a passageway for pressurized fluid as depicted in FIG. 123A and FIG. 123B, it was confirmed that leakages of pressurized fluid did not occur at the joint of passageway for pressurized fluid even with the nitrogen gas pressure kept at 50 MPa. Needless to add, as a high pressure fluid flows in such devices as those shown in FIG. 1, FIG. 46, FIG. 115 etc., those parts including tanks, valves, pipe fittings, etc. are designed and assembled after calculating such requirements as strength with wall thickness, based on High Pressure Gas Safety Act (a Japanese law), so as to prevent explosion, destruction, etc.

Working Example 54

In the injection blow molding process, the pressurized fluid injected into the resin can be discharged or exhausted (released into the atmosphere) even if a pin for effecting fluid pressurization comprising element of reference numeral 542 and element of reference numeral 543 is held at an advanced position as shown in FIG. 124A. However, when inner core 542 was moved back as shown in FIG. 124B, the fluid discharge proceeded smoothly and the problem of burst in injection blow molding was solved.

With the molded article depicted in FIG. 39 to FIG. 41, a pin used for injection blow molding comprising element of reference numeral 542 and element of reference numeral 543 was provided in the sprue runner from the movable side.

The molding operation was carried out by setting parameters as follows: the temperature of molten resin in the case of PP at 190° C., that in the case of ABS at 240° C.; pressure of fluid pressurization, 15 MPa or 30 MPa; delay time, 0.5 seconds; fluid pressurization time, 10 seconds; retention time, 10 seconds; atmospheric discharge time, 10 seconds. The mold was opened after the elapse of 10 seconds for the atmospheric discharge. Since a long duration of 10 seconds was allowed for atmospheric discharge, the residual pressure did not persist in hollow portions inside the molded article, and consequently problems resulting from the residual pressure, including whitening, bloating, burst (explosion), occurred with neither of PP and ABS.

The mold was opened after the elapse of 3 seconds for the atmospheric discharge. Since a short duration of only 3 seconds was allowed for atmospheric discharge, problems of whitening and bloating resulting from the residual pressure occurred with both PP and ABS. When the pressure was 30 MPa, burst (explosion) occurred with both PP and ABS.

After the end of retention time of 10 seconds, inner core 542 was moved back by 5 mm as shown in FIG. 124B. The mold was opened after the elapse of 3 seconds of atmospheric discharge. Since the inner core was moved back, the residual pressure did not persist in hollow portions inside the molded article, and consequently problems resulting from the residual pressure, including whitening, bloating, burst, occurred with neither of PP and ABS.

In the case of injection blow molding, a hollow portion inside the molded article expands as shown by element of reference numeral 550 in FIG. 128A, but when pressure forming-injection molding is used concomitantly, the hollow portion formed around the base of rib is confined only to the base of rib as shown by element of reference numeral 551 in FIG. 128B.

In the present working example 54, the temperature of molten resin in the case of PP was set at 190° C., that in the case of ABS was set at 240° C., and the same levels of following parameters were applied to both processes of pressure forming-injection molding and injection blow molding: pressure (fluid pressure of pressurized injection in injection blow molding, and fluid pressure of pressurized fluid in pressure forming-injection molding); operational durations (signifying: delay time, injection time in injection blow molding, ejection time in pressure forming-injection molding, retention time and atmospheric discharge time). Actual levels were set as follows: pressure of fluid pressurization, 15 MPa or 30 MPa; delay time, 0.5 seconds; fluid pressurization time, 15 seconds; retention time, 10 seconds; atmospheric discharge time, 10 seconds. As a result, in the case where only one mode of molding process was used, the extent of a rib was large, and when both modes were used concomitantly, hollows were formed only at the base of rib. No large sink mark is observed.

In the present working example 54, differences in the size of hollow portion 551 formed at the base of rib were observed depending on different operating conditions enumerated as follows: whether the pressure in injection blow molding was higher or lower than that in pressure forming-injection molding; when delay time, as an operational duration, was varied; when, as an operational duration, injection time was varied; when, as an operational duration, retention time was varied.

In working example 54, 0.4 wt. % of ADCA (azodicarbonamide) was mixed as a foaming agent to provide foaming properties to PP and ABS. Respective resins provided with foaming properties and pressure were processed in a similar manner by pressure forming-injection molding and injection blow molding, and molded articles presenting a foamed layer or a hollow layer therein were obtained.

Fluid pressure, and operational durations such as pressurization time and injection time were set at the same levels as those for cases of resins without foaming properties.

Working Example 55

Fluid pressurization was carried out with the position of pressurization pin set as in the configuration illustrated in FIG. 126A and FIG. 126B, wherein levels of operational parameters were set as follows: temperature of molten resin in the case of PP, 190° C., that in the case of ABS, 240° C.; pressure of fluid pressurization, 15 MPA or 30 MPA; delay time, 0.5 seconds; fluid pressurization time, 15 seconds; retention time, 10 seconds; atmospheric discharge time, 10 seconds. Results demonstrated that with both types of resin, the pressurized fluid entered the movable side (lower side of page was considered as the movable side) and made it possible to effect the fluid pressurization.

Working Example 56

In working example 56, the fluid pressurization was carried out with the same conditions as those of working example 55, with the pressurization pin set in the position as depicted in FIG. 127. It was confirmed that, since the end section of molded article was shaped so as to present an inclined surface 547, most of the pressurized fluid entered the movable side (lower side of page was considered as the movable side) to make it possible to effect the fluid pressurization.

In the configuration depicted in FIG. 118A, the stationary side of parting was embossed with coarse sand grains as shown in FIG. 129A, and it was confirmed that the pressurized fluid entered the clearance between the mold on stationary side and the molten resin.

In the configuration depicted in FIG. 118A, the stationary side of parting was embossed with coarse sand grains as shown in FIG. 129B, and it was confirmed that the pressurized fluid entered the clearance between the mold on stationary side and the molten resin.

In the configuration depicted in FIG. 118A, the stationary side of parting was embossed with coarse sand grains as shown in FIG. 129C, and it was confirmed that the pressurized fluid entered the clearance between the mold on stationary side and the molten resin.

It was confirmed that, in addition to the case of configuration of FIG. 118A, the conduction of pressurized fluid was possible also by configuration of FIG. 118B or FIG. 118C.

In working example 56, a flat square shaped element with a side length of 150 mm and a thickness of 2.5 mm (having a side gate with width of 8 mm) was used, and the pressurized fluid applied was nitrogen gas compressed at 15 MPa and 30 MPa. The resin employed was ABS that was pressurized after having been injected into the cavity with delay time set at 0.5 seconds, pressurization time set at 20 seconds, retention time set at 5 seconds and atmospheric discharge time set at 5 seconds. The device employed was that illustrated in FIG. 1.

In addition to the above described device, the operation was carried out also with a system provided with tank 501 and tank 502, and it was confirmed that a sufficient level of action and effect of pressure forming-injection molding was provided by such a system.

Working Example 57

In working example 57, the means illustrated in FIG. 130 were implemented with PP. The molten resin was injected into the cavity, with the system presenting the configuration as depicted in FIG. 130A. When the outer cylinder was moved back by 5 mm one second after injection, and the product was extracted as it was, the formation of an annular shape (shape formed by the entry of resin into a space created by the retraction of outer cylinder) was recognized.

Because it was confirmed that by moving back the outer cylinder the molten resin had entered the space for ejecting a pressurized fluid due to the residual pressure of resin or other causes, the annular-shaped portion was pushed into the molten resin by pushing the outer cylinder before solidification of molten resin (2 seconds after completing the injection of molten resin into the cavity). By extracting the molded article under this condition for once, it was confirmed that the annular-shaped portion had been pushed into the resin.

The annular-shaped portion was pushed into the resin by pushing the said outer cylinder; after maintaining the pushing condition for 0.5 seconds, the outer cylinder was moved back again; the mold was opened after 10 seconds and it was confirmed that the angular-shaped portion was not formed again. From the above respective results, it was possible to confirm that, by the pushing in of outer cylinder, the annular-shaped portion was pushed into the molten resin in the cavity and a space capable of effecting the fluid pressurization was created.

Based on the above results, a series of processes starting from the beginning were implemented by using PP and ABS. With PP, the following sequence of operations were carried out: 2 seconds after completing the injection of molten resin into the cavity, outer cylinder was retracted by 5 mm; 2 seconds after the retraction, outer cylinder was moved forward again to push in the annular-shaped portion; outer cylinder was held in the advanced position for 0.5 seconds; after the end of period for holding outer cylinder in the advanced position, it was retracted by 5 mm; simultaneously with the retraction, the fluid pressurization was carried out at a pressure of 15 MPa for 10 seconds by using nitrogen gas; after holding the pressure for 10 seconds, atmospheric discharge was carried out for 5 seconds; after the atmospheric discharge, the mold was opened to confirm that the molded article was pressurized by fluid.

With ABS as well, the same sequence of operations were carried out and the same results (action and effect of the retraction of outer cylinder) as those with PP were obtained.

In working example 57, 0.5 seconds after injecting a molten resin into the cavity, an operation of suck-back corresponding to 15% of the metering volume was carried out, in order to lower the pressure of molten resin in the cavity. After completing the suck-back operation, the movement of outer cylinder as described in working example 57 was effected.

Also in the case where a breathing tool was employed, a movement of outer cylinder similar to the said suck-back was effected. Incidentally, working example 57 was evaluated by using the molded article depicted in FIG. 31.

The ring-shaped elastic body used in working examples 1 to 28 and in those 30 to 57 were U-shaped seals depicted in FIG. 79A and L-shaped seals depicted in FIG. 79B, and they were incorporated, for example, as illustrated in FIG. 91A, FIG. 91B and FIG. 101. Also, these working examples were implemented with Omniseal and Variseal illustrated in FIG. 27 and FIG. 28. Even when the spring element in Omniseal and Variseal was replaced with an O-ring made of nitrile rubber, the function of O-ring to tighten was performed and the function to close off the pressurized fluid was performed satisfactorily.

TABLE 1

| Resin | ABS | HIPS | PC/ABS | PC |
|---|---|---|---|---|
| Product name | STYLAC 121 | STYLON 492 | MULTILON T3714 | IUPILON S2000 |
| Temperature of molten resin | 240° C. | 240° C. | 265° C. | 290° C. |
| Type of pressurized fluid | Nitrogen gas | | | |
| Delay time | 1 sec. | 1 sec. | 1 sec. | 1 sec. |
| Pressurization pressure | 15 MPa | 15 MPa | 15 MPa | 15 MPa |
| Pressurization time | 15 sec. | 15 sec. | 15 sec. | 15 sec. |
| Retention time | 5 sec. | 5 sec. | 5 sec. | 5 sec. |
| Molded article 1 | | | | |
| Evaluation | ◎ | ◎ | ◎ | ◎ |
| Molded article 2 | | | | |
| Evaluation | ◎ | ◎ | ◎ | ◎ |
| Molded article 3 | | | | |
| Evaluation | ◎ | ◎ | ◎ | ◎ |
| Resin | Modified PPE | PP | POM | PA66 |
| Product name | XYLON 100Z | SUMITOMO NOBLEN H501 | DURACON M90S | Leona 1200S |
| Temperature of molten resin | 240° C. | 200° C. | 200° C. | 240° C. |
| Type of pressurized fluid | Nitrogen gas | | | |
| Delay time | 1 sec. | 1 sec. | 1 sec. | 1 sec. |
| Pressurization pressure | 15 MPa | 15 MPa | 15 MPa | 15 MPa |
| Pressurization time | 15 sec. | 15 sec. | 15 sec. | 15 sec. |
| Retention time | 5 sec. | 5 sec. | 5 sec. | 5 sec. |
| Molded article 1 | | | | |
| Evaluation | ◎ | ○ | ○ | ○ |
| Molded article 2 | | | | |
| Evaluation | ◎ | ○ | ○ | ○ |
| Molded article 3 | | | | |
| Evaluation | ◎ | ◎ | ◎ | ◎ |

TABLE 2

| Resin | ABS | HIPS | PC/ABS | PC |
|---|---|---|---|---|
| Product name | STYLAC 121 | STYLON 492 | MULTILON T3714 | IUPILON S2000 |
| Temperature of molten resin | 240° C. | 240° C. | 265° C. | 290° C. |
| Type of pressurized fluid | Air | | | |
| Delay time | 1 sec. | 1 sec. | 1 sec. | 1 sec. |
| Pressurization pressure | 15 MPa | 15 MPa | 15 MPa | 15 MPa |
| Pressurization time | 15 sec. | 15 sec. | 15 sec. | 15 sec. |
| Retention time | 5 sec. | 5 sec. | 5 sec. | 5 sec. |
| Molded article 001 | | | | |
| Evaluation | ◎ | ◎ | ◎ | ◎ |
| Molded article 002 | | | | |
| Evaluation | ◎ | ◎ | ◎ | ◎ |
| Molded article 003 | | | | |
| Evaluation | ◎ | ◎ | ◎ | ◎ |
| Resin | Modified PPE | PP | POM | PA66 |
| Product name | XYLON 100Z | SUMITOMO NOBLEN H501 | DURACON M90S | Leona 1200S |
| Temperature of molten resin | 240° C. | 200° C. | 200° C. | 240° C. |
| Type of pressurized fluid | Air | | | |
| Delay time | 1 sec. | 1 sec. | 1 sec. | 1 sec. |
| Pressurization pressure | 15 MPa | 15 MPa | 15 MPa | 15 MPa |
| Pressurization time | 15 sec. | 15 sec. | 15 sec. | 15 sec. |
| Retention time | 5 sec. | 5 sec. | 5 sec. | 5 sec. |
| Molded article 001 | | | | |
| Evaluation | ◎ | ○ | ○ | ○ |

TABLE 2-continued

| | | | | |
|---|---|---|---|---|
| Molded article 002 | | | | |
| Evaluation | ◎ | ○ | ○ | ○ |
| Molded article 003 | | | | |
| Evaluation | ◎ | ○ | ○ | ○ |

TABLE 3

| | | | | |
|---|---|---|---|---|
| Resin | ABS | HIPS | PC/ABS | PC |
| Product name | STYLAC 121 | STYLON 492 | MULTILON T3714 | IUPILON S2000 |
| Type of pressurized fluid | Water, with liquid temperature at 65° C. | | | |
| Delay time | 1 sec. | 1 sec. | 1 sec. | 1 sec. |
| Pressurization pressure | 15 MPa | 15 MPa | 15 MPa | 15 MPa |
| Pressurization time | 15 sec. | 15 sec. | 15 sec. | 15 sec. |
| Retention time | 5 sec. | 5 sec. | 5 sec. | 5 sec. |
| Molded article 001 | | | | |
| Evaluation | ○ | ○ | ○ | ○ |
| Molded article 002 | | | | |
| Evaluation | ○ | ○ | ○ | ○ |
| Molded article 003 | | | | |
| Evaluation | ○ | ○ | ○ | ○ |
| Resin | Modified PPE | PP | POM | PA66 |
| Product name | XYLON 100Z | SUMITOMO NOBLEN H501 | DURACON M90S | Leona 1200S |
| Type of pressurized fluid | Water, with liquid temperature at 65° C. | | | |
| Delay time | 1 sec. | 1 sec. | 1 sec. | 1 sec. |
| Pressurization pressure | 15 MPa | 15 MPa | 15 MPa | 15 MPa |
| Pressurization time | 15 sec. | 15 sec. | 15 sec. | 15 sec. |
| Retention time | 5 sec. | 5 sec. | 5 sec. | 5 sec. |
| Molded article 001 | | | | |
| Evaluation | ○ | Δ | Δ | Δ |
| Molded article 002 | | | | |
| Evaluation | ○ | Δ | Δ | Δ |
| Molded article 003 | | | | |
| Evaluation | ○ | Δ | Δ | Δ |

TABLE 4

| | | | | |
|---|---|---|---|---|
| Resin | ABS | HIPS | PC/ABS | PC |
| Product name | STYLAC 121 | STYLON 492 | MULTILON T3714 | IUPILON S2000 |
| Temperature of molten resin | 240° C. | 240° C. | 265° C. | 290° C. |
| Type of pressurized fluid | Nitrogen gas | | | |
| Delay time | 2 sec. | 2 sec. | 2 sec. | 2 sec. |
| Pressurization pressure | 10 MPa | 10 MPa | 10 MPa | 10 MPa |
| Pressurization time | 20 sec. | 20 sec. | 20 sec. | 20 sec. |
| Retention time | 5 sec. | 5 sec. | 5 sec. | 5 sec. |
| Molded article 4 (Working example 5) | | | | |
| Evaluation | Δ | Δ | Δ | Δ |
| Molded article 5 (Working example 6) | | | | |
| Evaluation | Δ | Δ | Δ | Δ |
| Molded article 6 (Working example 7) | | | | |
| Evaluation | Δ | Δ | Δ | Δ |
| Delay time | 2 sec. | 2 sec. | 2 sec. | 2 sec. |
| Pressurization pressure | 20 MPa | 20 MPa | 20 MPa | 20 MPa |
| Pressurization time | 20 sec. | 20 sec. | 20 sec. | 20 sec. |
| Retention time | 5 sec. | 5 sec. | 5 sec. | 5 sec. |
| Molded article 4 (Working example 5) | | | | |
| Evaluation | ○ | ○ | ○ | ○ |

TABLE 4-continued

| | | | | |
|---|---|---|---|---|
| Molded article 5 (Working example 6) | | | | |
| Evaluation | ○ | ○ | ○ | ○ |
| Molded article 6 (Working example 7) | | | | |
| Evaluation | ○ | ○ | ○ | ○ |
| Delay time | 2 sec. | 2 sec. | 2 sec. | 2 sec. |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Molded article 4 (Working example 5) | | | | |
| Evaluation | ● | ● | ● | ● |
| Molded article 5 (Working example 6) | | | | |
| Evaluation | ● | ● | ● | ● |
| Molded article 6 (Working example 7) | | | | |
| Evaluation | ● | ● | ● | ● |
| Resin | Modified PPE | PP | POM | PA66 |
| Product name | XYLON 100Z | SUMITOMO NOBLEN H501 | DURACON M90S | Leona 1200S |
| Temperature of molten resin | 240° C. | 200° C. | 200° C. | 240° C. |
| Type of pressurized fluid | Nitrogen gas | | | |
| Delay time | 2 sec. | 2 sec. | 2 sec. | 2 sec. |
| Pressurization pressure | 10 MPa | 10 MPa | 10 MPa | 10 MPa |
| Pressurization time | 20 sec. | 20 sec. | 20 sec. | 20 sec. |
| Retention time | 5 sec. | 5 sec. | 5 sec. | 5 sec. |
| Molded article 4 (Working example 5) | | | | |
| Evaluation | Δ | Δ | Δ | Δ |
| Molded article 5 (Working example 6) | | | | |
| Evaluation | Δ | Δ | Δ | Δ |
| Molded article 6 (Working example 7) | | | | |
| Evaluation | Δ | Δ | Δ | Δ |
| Delay time | 2 sec. | 2 sec. | 2 sec. | 2 sec. |
| Pressurization pressure | 20 MPa | 20 MPa | 20 MPa | 20 MPa |
| Pressurization time | 20 sec. | 20 sec. | 20 sec. | 20 sec. |
| Retention time | 5 sec. | 5 sec. | 5 sec. | 5 sec. |
| Molded article 4 (Working example 5) | | | | |
| Evaluation | ○ | ● | ○ | ● |
| Molded article 5 (Working example 6) | | | | |
| Evaluation | ○ | ● | ○ | ● |
| Molded article 6 (Working example 7) | | | | |
| Evaluation | ○ | ● | ○ | ● |
| Delay time | 2 sec. | 2 sec. | 2 sec. | 2 sec. |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Molded article 4 (Working example 5) | | | | |
| Evaluation | ● | ● | ● | ● |
| Molded article 5 (Working example 6) | | | | |
| Evaluation | ● | ● | ● | ● |
| Molded article 6 (Working example 7) | | | | |
| Evaluation | ● | ● | ● | ● |

TABLE 5

| | | | | |
|---|---|---|---|---|
| Resin | ABS | HIPS | PC/ABS | PC |
| Product name | STYLAC 121 | STYLON 492 | MULTILON T3714 | IUPILON S2000 |
| Temperature of molten resin | 240° C. | 240° C. | 265° C. | 290° C. |
| Temperature of Mold surface | 60° C. | 60° C. | 60° C. | 60° C. |
| Type of pressurized fluid | Nitrogen gas | | | |
| Delay time | 2 sec. | 2 sec. | 2 sec. | 2 sec. |
| Pressurization pressure | 10 MPa | 10 MPa | 10 MPa | 10 MPa |

TABLE 5-continued

| | | | | |
|---|---|---|---|---|
| Pressurization time | 20 sec. | 20 sec. | 20 sec. | 20 sec. |
| Retention time | 5 sec. | 5 sec. | 5 sec. | 5 sec. |
| Molded article 5 (Working example 8) | | | | |
| Evaluation | Δ | Δ | Δ | Δ |
| Delay time | 2 sec. | 2 sec. | 2 sec. | 2 sec. |
| Pressurization pressure | 20 MPa | 20 MPa | 20 MPa | 20 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 8) | | | | |
| Evaluation | ○ | ○ | ○ | ○ |
| Delay time | 2 sec. | 2 sec. | 2 sec. | 2 sec. |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 8) | | | | |
| Evaluation | ● | ● | ● | ● |
| Resin | Modified PPE | PP | POM | PA66 |
| Product name | XYLON 100Z | SUMITOMO NOBLEN H501 | DURACON M90S | Leona 1200S |
| Temperature of molten resin | 240° C. | 200° C. | 200° C. | 240° C. |
| Temperature of Mold surface | 60° C. | 60° C. | 60° C. | 60° C. |
| Type of pressurized fluid | Nitrogen gas | | | |
| Delay time | 2 sec. | 2 sec. | 2 sec. | 2 sec. |
| Pressurization pressure | 10 MPa | 10 MPa | 10 MPa | 10 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 8) | | | | |
| Evaluation | Δ | Δ | Δ | Δ |
| Delay time | 2 sec. | 2 sec. | 2 sec. | 2 sec. |
| Pressurization pressure | 20 MPa | 20 MPa | 20 MPa | 20 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 8) | | | | |
| Evaluation | ○ | ● | ○ | ● |
| Delay time | 2 sec. | 2 sec. | 2 sec. | 2 sec. |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 8) | | | | |
| Evaluation | ● | ● | ● | ● |

TABLE 6

| 1. Common parameters | | | | |
|---|---|---|---|---|
| | Resin | | | |
| | ABS | HIPS | PC/ABS | PC |
| | Product name | | | |
| | STYLAC 121 | STYLON 492 | MULTILON T3714 | IUPILON S2000 |
| Temperature of molten resin | 240° C. | 240° C. | 265° C. | 290° C. |
| Injection pressure (%) | 65 | | | |
| Injection speed (%) | 60 | | | |
| Pressure keeping | Not implemented | | | |
| Injection volume (%) | 95 | | | |
| Type of pressurized fluid | Nitrogen gas | | | |
| Pressurization pressure | 30 MPa | | | |
| Pressurization time | 20 sec. | | | |
| Retention time | 5 sec. | | | |

TABLE 6-continued

| | Resin | | | |
|---|---|---|---|---|
| | Modified PPE | PP | POM | PA66 |
| | Product name | | | |
| | XYLON 100Z | SUMITOMO NOBLEN H501 | DURACON M90S | Leona 1200S |
| Temperature of molten resin | 240° C. | 200° C. | 200° C. | 240° C. |
| Injection pressure (%) | 65 | | | |
| Injection speed (%) | 60 | | | |
| Pressure keeping | Not implemented | | | |
| Injection volume (%) | 95 | | | |
| Type of pressurized fluid | Nitrogen gas | | | |
| Pressurization pressure | 30 MPa | | | |
| Pressurization time | 20 sec. | | | |
| Retention time | 5 sec. | | | |

TABLE 6-continued

2. Respective results

| | Resin | | | |
|---|---|---|---|---|
| | ABS | HIPS | PC/ABS | PC |
| | Product name | | | |
| | STYLAC 121 | STYLON 492 | MULTILON T3714 | IUPILON S2000 |
| Temperature of molten resin | 240° C. | 240° C. | 265° C. | 290° C. |
| Molded article 4, product thickness 2.5 mm | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Molded article 7, product thickness 3.0 mm | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Molded article 8, product thickness 3.5 mm | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Molded article 9, product thickness 4.0 mm | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |

| | Resin | | | |
|---|---|---|---|---|
| | Modified PPE | PP | POM | PA66 |
| | Product name | | | |
| | XYLON 100Z | SUMITOMO NOBLEN H501 | DURACON M90S | Leona 1200S |
| Temperature of molten resin | 240° C. | 200° C. | 200° C. | 240° C. |
| Molded article 4, product thickness 2.5 mm | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Molded article 7, product thickness 3.0 mm | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Molded article 8, product thickness 3.5 mm | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Molded article 9, product thickness 4.0 mm | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |

TABLE 7

1. Common parameters

| | Resin | | | |
|---|---|---|---|---|
| | ABS | HIPS | PC/ABS | PC |
| | Product name | | | |
| | STYLAC 121 | STYLON 492 | MULTILON T3714 | IUPILON S2000 |
| Temperature of molten resin | 240° C. | 240° C. | 265° C. | 290° C. |
| Injection pressure (%) | 65 | | | |
| Injection speed (%) | 60 | | | |
| Pressure keeping | Not implemented | | | |
| Injection volume (%) | 95 | | | |
| Type of pressurized fluid | Nitrogen gas | | | |
| Pressurization pressure | 30 MPa | | | |
| Pressurization time | 20 sec. | | | |
| Retention time | 5 sec. | | | |

| | Resin | | | |
|---|---|---|---|---|
| | Modified PPE | PP | POM | PA66 |
| | Product name | | | |
| | XYLON 100Z | SUMITOMO NOBLEN H501 | DURACON M90S | Leona 1200S |
| Temperature of molten resin | 240° C. | 200° C. | 200° C. | 240° C. |
| Injection pressure (%) | 65 | | | |
| Injection speed (%) | 60 | | | |
| Pressure keeping | Not implemented | | | |
| Injection volume (%) | 95 | | | |
| Type of pressurized fluid | Nitrogen gas | | | |
| Pressurization pressure | 30 MPa | | | |
| Pressurization time | 20 sec. | | | |
| Retention time | 5 sec. | | | |

2. Respective results

| | Resin | | | |
|---|---|---|---|---|
| | ABS | HIPS | PC/ABS | PC |
| | Product name | | | |
| | STYLAC 121 | STYLON 492 | MULTILON T3714 | IUPILON S2000 |
| Temperature of molten resin | 240° C. | 240° C. | 265° C. | 290° C. |
| Molded article 5, product thickness 2.5 mm | | | | |
| Retraction delay time | 0 sec. | | | |
| Evaluation | ◎ | ◎ | ◎ | ◎ |
| Retraction delay time | 2 sec. | | | |
| Evaluation | ◎ | ◎ | ◎ | ◎ |

TABLE 7-continued

| | | | | |
|---|---|---|---|---|
| Retraction delay time | | 5 sec. | | |
| Evaluation | ◎ | ◎ | ◎ | ◎ |
| Molded article 10, product thickness 3.0 mm | | | | |
| Retraction delay time | | 0 sec. | | |
| Evaluation | ◎ | ◎ | ◎ | ◎ |
| Retraction delay time | | 2 sec. | | |
| Evaluation | ◎ | ◎ | ◎ | ◎ |
| Retraction delay time | | 5 sec. | | |
| Evaluation | ◎ | ◎ | ◎ | ◎ |
| Molded article 11, product thickness 3.5 mm | | | | |
| Retraction delay time | | 0 sec. | | |
| Evaluation | ◎ | ◎ | ◎ | ◎ |
| Retraction delay time | | 2 sec. | | |
| Evaluation | ◎ | ◎ | ◎ | ◎ |
| Retraction delay time | | 5 sec. | | |
| Evaluation | ◎ | ◎ | ◎ | ◎ |
| Molded article 12, product thickness 4.0 mm | | | | |
| Retraction delay time | | 0 sec. | | |
| Evaluation | ◎ | ◎ | ◎ | ◎ |
| Retraction delay time | | 2 sec. | | |
| Evaluation | ◎ | ◎ | ◎ | ◎ |
| Retraction delay time | | 5 sec. | | |
| Evaluation | ◎ | ◎ | ◎ | ◎ |
| Evaluation | ◎ | ◎ | ◎ | ◎ |

| | Resin | | | |
|---|---|---|---|---|
| | Modified PPE | PP | POM | PA66 |
| | Product name | | | |
| | XYLON 100Z | SUMITOMO NOBLEN H501 | DURACON M90S | Leona 1200S |
| Temperature of molten resin | 240° C. | 200° C. | 200° C. | 240° C. |
| Molded article 5, product thickness 2.5 mm | | | | |
| Retraction delay time | | 0 sec. | | |
| Evaluation | ◎ | ◎ | ◎ | ◎ |
| Retraction delay time | | 2 sec. | | |
| Evaluation | ◎ | ◎ | ◎ | ◎ |
| Retraction delay time | | 5 sec. | | |
| Evaluation | ◎ | ◎ | ◎ | ◎ |
| Molded article 10, product thickness 3.0 mm | | | | |
| Retraction delay time | | 0 sec. | | |
| Evaluation | ◎ | ◎ | ◎ | ◎ |
| Retraction delay time | | 2 sec. | | |
| Evaluation | ◎ | ◎ | ◎ | ◎ |
| Retraction delay time | | 5 sec. | | |
| Evaluation | ◎ | ◎ | ◎ | ◎ |
| Molded article 11, product thickness 3.5 mm | | | | |
| Retraction delay time | | 0 sec. | | |
| Evaluation | ◎ | ◎ | ◎ | ◎ |
| Retraction delay time | | 2 sec. | | |
| Evaluation | ◎ | ◎ | ◎ | ◎ |
| Retraction delay time | | 5 sec. | | |
| Evaluation | ◎ | ◎ | ◎ | ◎ |
| Molded article 12, product thickness 4.0 mm | | | | |
| Retraction delay time | | 0 sec. | | |
| Evaluation | ◎ | ◎ | ◎ | ◎ |

TABLE 7-continued

| | | | | |
|---|---|---|---|---|
| Retraction delay time | | 2 sec. | | |
| Evaluation | ◎ | ◎ | ◎ | ◎ |
| Retraction delay time | | 5 sec. | | |
| Evaluation | ◎ | ◎ | ◎ | ◎ |

TABLE 8

1. Common parameters

| | Resin | | | |
|---|---|---|---|---|
| | ABS | HIPS | PC/ABS | PC |
| | Product name | | | |
| | STYLAC 121 | STYLON 492 | MULTILON T3714 | IUPILON S2000 |
| Temperature of molten resin | 240° C. | 240° C. | 265° C. | 290° C. |
| Injection pressure (%) | | 65 | | |
| Injection speed (%) | | 60 | | |
| Pressure keeping | | Not implemented | | |
| Injection volume (%) | | 95 | | |
| Type of pressurized fluid | | Nitrogen gas | | |
| Pressurization pressure | | 30 MPa | | |
| Pressurization time | | 20 sec. | | |
| Retention time | | 5 sec. | | |
| Molded article 7, product thickness 3.5 mm | | | | |

| | Resin | | | |
|---|---|---|---|---|
| | Modified PPE | PP | POM | PA66 |
| | Product name | | | |
| | XYLON 100Z | SUMITOMO NOBLEN H501 | DURACON M90S | Leona 1200S |
| Temperature of molten resin | 240° C. | 200° C. | 200° C. | 240° C. |
| Injection pressure (%) | | 65 | | |
| Injection speed (%) | | 60 | | |
| Pressure keeping | | Not implemented | | |
| Injection volume (%) | | 95 | | |
| Type of pressurized fluid | | Nitrogen gas | | |
| Pressurization pressure | | 30 MPa | | |
| Pressurization time | | 20 sec. | | |
| Retention time | | 5 sec. | | |
| Molded article 7, product thickness 3.5 mm | | | | |

2. Respective results

| | Resin | | | |
|---|---|---|---|---|
| | ABS | HIPS | PC/ABS | PC |
| | Product name | | | |
| | STYLAC 121 | STYLON 492 | MULTILON T3714 | IUPILON S2000 |
| Case of FIG. 69A | | | | |
| Delay time | | 0 sec. | | |
| Evaluation | ● | ● | ● | ● |
| Delay time | | 2 sec. | | |
| Evaluation | ● | ● | ● | ● |
| Delay time | | 5 sec. | | |
| Evaluation | ● | ● | ● | ● |

TABLE 8-continued

| | | | | |
|---|---|---|---|---|
| Case of FIG. 69B | | | | |
| Delay time | 0 sec. | | | |
| Evaluation | ● | ● | ◎ | ◎ |
| Delay time | 2 sec. | | | |
| Evaluation | ◎ | ● | ◎ | ◎ |
| Delay time | 5 sec. | | | |
| Evaluation | ◎ | ◎ | ◎ | ◎ |
| Case of FIG. 69C | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Case of FIG. 69D | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Case of FIG. 69E | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Case of FIG. 69F | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |

| | Resin | | | |
|---|---|---|---|---|
| | Modified PPE | PP | POM | PA66 |
| | Product name | | | |
| | XYLON 100Z | SUMITOMO NOBLEN H501 | DURACON M90S | Leona 1200S |
| Case of FIG. 69A | | | | |
| Delay time | 0 sec. | | | |
| Evaluation | ● | ● | ● | ● |
| Delay time | 2 sec. | | | |
| Evaluation | ● | ● | ● | ● |
| Delay time | 5 sec. | | | |
| Evaluation | ● | ● | ● | ● |
| Case of FIG. 69B | | | | |
| Delay time | 0 sec. | | | |
| Evaluation | ● | ● | ◎ | ◎ |
| Delay time | 2 sec. | | | |
| Evaluation | ◎ | ● | ◎ | ◎ |
| Delay time | 5 sec. | | | |
| Evaluation | ◎ | ● | ◎ | ◎ |
| Case of FIG. 69C | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Case of FIG. 69D | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Case of FIG. 69E | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |
| Case of FIG. 69F | | | | |
| Delay time | 0 sec. | | | |
| Evaluation | ◎ | ◎ | ◎ | ◎ |
| Delay time | 2 sec. | | | |
| Evaluation | ◎ | ◎ | ◎ | ◎ |
| Delay time | 5 sec. | | | |
| Evaluation | ◎ | ◎ | ◎ | ◎ |

TABLE 9

| | Resin | | | |
|---|---|---|---|---|
| | ABS | HIPS | PC/ABS | PC |
| | Product name | | | |
| | STYLAC 121 | STYLON 492 | MULTILON T3714 | IUPILON S2000 |
| Temperature of molten resin | 240° C. | 240° C. | 265° C. | 290° C. |
| Type of pressurized fluid | Nitrogen gas | | | |
| Delay time | 2 sec. | 2 sec. | 2 sec. | 2 sec. |
| Pressurization pressure | 10 MPa | 10 MPa | 10 MPa | 10 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 21) | | | | |
| Evaluation | Δ | Δ | Δ | Δ |
| Delay time | 2 sec. | 2 sec. | 2 sec. | 2 sec. |
| Pressurization pressure | 20 MPa | 20 MPa | 20 MPa | 20 MPa |
| Pressurization time | 20 sec. | 20 sec. | 20 sec. | 20 sec. |
| Retention time | 5 sec. | 5 sec. | 5 sec. | 5 sec. |
| Evaluation | ○ | ● | ○ | ○ |
| Delay time | 2 sec. | 2 sec. | 2 sec. | 2 sec. |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Evaluation | ● | ● | ● | ● |

| | Resin | | | |
|---|---|---|---|---|
| | Modified PPE | PP | POM | PA66 |
| | Product name | | | |
| | XYLON 100Z | SUMITOMO NOBLEN H501 | DURACON M90S | Leona 1200S |
| Temperature of molten resin | 240° C. | 200° C. | 200° C. | 240° C. |
| Temperature of Mold surface | 60° C. | 60° C. | 60° C. | 60° C. |

TABLE 9-continued

| | | | | |
|---|---|---|---|---|
| Type of pressurized fluid | Nitrogen gas | | | |
| Delay time | 2 sec. | 2 sec. | 2 sec. | 2 sec. |
| Pressurization pressure | 10 MPa | 10 MPa | 10 MPa | 10 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 21) | | | | |
| Evaluation | Δ | Δ | Δ | Δ |
| Delay time | 2 sec. | 2 sec. | 2 sec. | 2 sec. |
| Pressurization pressure | 20 MPa | 20 MPa | 20 MPa | 20 MPa |
| Pressurization time | 20 sec. | 20 sec. | 20 sec. | 20 sec. |
| Retention time | 5 sec. | 5 sec. | 5 sec. | 5 sec. |
| Evaluation | ○ | ● | ○ | ● |
| Delay time | 2 sec. | 2 sec. | 2 sec. | 2 sec. |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Evaluation | ● | ● | ● | ● |

TABLE 10

| | Resin | | | |
|---|---|---|---|---|
| | ABS | HIPS | PC/ABS | PC |
| | Product name | | | |
| | STYLAC 121 | STYLON 492 | MULTILON T3714 | IUPILON S2000 |
| Temperature of molten resin | 240° C. | 240° C. | 265° C. | 290° C. |
| Type of pressurized fluid | Nitrogen gas | | | |
| Delay time | 2 sec. | 2 sec. | 2 sec. | 2 sec. |
| Pressurization pressure | 10 MPa | 10 MPa | 10 MPa | 10 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 21) | | | | |
| Evaluation | Δ | Δ | Δ | Δ |
| Delay time | 2 sec. | 2 sec. | 2 sec. | 2 sec. |
| Pressurization pressure | 20 MPa | 20 MPa | 20 MPa | 20 MPa |
| Pressurization time | 20 sec. | 20 sec. | 20 sec. | 20 sec. |
| Retention time | 5 sec. | 5 sec. | 5 sec. | 5 sec. |
| Evaluation | ○ | ○ | ○ | ○ |
| Delay time | 2 sec. | 2 sec. | 2 sec. | 2 sec. |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Evaluation | ● | ● | ● | ● |

TABLE 10-continued

| | Resin | | | |
|---|---|---|---|---|
| | Modified PPE | PP | POM | PA66 |
| | Product name | | | |
| | XYLON 100Z | SUMITOMO NOBLEN H501 | DURACON M90S | Leona 1200S |
| Temperature of molten resin | 240° C. | 200° C. | 200° C. | 240° C. |
| Temperature of Mold surface | 60° C. | 60° C. | 60° C. | 60° C. |
| Type of pressurized fluid | Nitrogen gas | | | |
| Delay time | 2 sec. | 2 sec. | 2 sec. | 2 sec. |
| Pressurization pressure | 10 MPa | 10 MPa | 10 MPa | 10 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 21) | | | | |
| Evaluation | Δ | Δ | Δ | Δ |
| Delay time | 2 sec. | 2 sec. | 2 sec. | 2 sec. |
| Pressurization pressure | 20 MPa | 20 MPa | 20 MPa | 20 MPa |
| Pressurization time | 20 sec. | 20 sec. | 20 sec. | 20 sec. |
| Retention time | 5 sec. | 5 sec. | 5 sec. | 5 sec. |
| Evaluation | ○ | ● | ○ | ● |
| Delay time | 2 sec. | 2 sec. | 2 sec. | 2 sec. |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Evaluation | ● | ● | ● | ● |

TABLE 11

| 1. Common parameters | | | | |
|---|---|---|---|---|
| | Resin | | | |
| | ABS | HIPS | PC/ABS | PC |
| | Product name | | | |
| | STYLAC 121 | STYLON 492 | MULTILON T3714 | IUPILON S2000 |
| Temperature of molten resin | 240° C. | 240° C. | 265° C. | 290° C. |
| Injection pressure (%) | 65 | | | |
| Injection speed (%) | 60 | | | |
| Pressure keeping | Not implemented | | | |
| Injection volume (%) | 95 | | | |

TABLE 11-continued

| | | | | |
|---|---|---|---|---|
| Type of pressurized fluid | Nitrogen gas | | | |
| Pressurization pressure | 30 MPa | | | |
| Pressurization time | 20 sec. | | | |
| Retention time | 5 sec. | | | |

| | Resin | | | |
|---|---|---|---|---|
| | Modified PPE | PP | POM | PA66 |
| | Product name | | | |
| | XYLON 100Z | SUMITOMO NOBLEN H501 | DURACON M90S | Leona 1200S |
| Temperature of molten resin | 240° C. | 200° C. | 200° C. | 240° C. |
| Injection pressure (%) | 65 | | | |
| Injection speed (%) | 60 | | | |
| Pressure keeping | Not implemented | | | |
| Injection volume (%) | 95 | | | |
| Type of pressurized fluid | Nitrogen gas | | | |
| Pressurization pressure | 30 MPa | | | |
| Pressurization time | 20 sec. | | | |
| Retention time | 5 sec. | | | |

2. Respective results

| | Resin | | | |
|---|---|---|---|---|
| | ABS | HIPS | PC/ABS | PC |
| | Product name | | | |
| | STYLAC 121 | STYLON 492 | MULTILON T3714 | IUPILON S2000 |
| Temperature of molten resin | 240° C. | 240° C. | 265° C. | 290° C. |
| Molded article 5, product thickness 2.5 mm | | | | |
| Retraction delay time | 0 sec. | | | |
| Evaluation | ◎ | ◎ | ◎ | ◎ |
| Retraction delay time | 2 sec. | | | |
| Evaluation | ◎ | ◎ | ◎ | ◎ |
| Retraction delay time | 5 sec. | | | |
| Evaluation | ◎ | ◎ | ◎ | ◎ |
| Molded article 10, product thickness 3.0 mm | | | | |
| Retraction delay time | 0 sec. | | | |
| Evaluation | ◎ | ◎ | ◎ | ◎ |
| Retraction delay time | 2 sec. | | | |
| Evaluation | ◎ | ◎ | ◎ | ◎ |
| Retraction delay time | 5 sec. | | | |
| Evaluation | ◎ | ◎ | ◎ | ◎ |
| Molded article 11, product thickness 3.5 mm | | | | |
| Retraction delay time | 0 sec. | | | |
| Evaluation | ◎ | ◎ | ◎ | ◎ |
| Retraction delay time | 2 sec. | | | |
| Evaluation | ◎ | ◎ | ◎ | ◎ |
| Retraction delay time | 5 sec. | | | |
| Evaluation | ◎ | ◎ | ◎ | ◎ |
| Molded article 12, product thickness 4.0 mm | | | | |
| Retraction delay time | 0 sec. | | | |
| Evaluation | ◎ | ◎ | ◎ | ◎ |
| Retraction delay time | 2 sec. | | | |
| Evaluation | ◎ | ◎ | ◎ | ◎ |
| Retraction delay time | 5 sec. | | | |
| Evaluation | ◎ | ◎ | ◎ | ◎ |

TABLE 11-continued

| | Resin | | | |
|---|---|---|---|---|
| | Modified PPE | PP | POM | PA66 |
| | Product name | | | |
| | XYLON 100Z | SUMITOMO NOBLEN H501 | DURACON M90S | Leona 1200S |
| Temperature of molten resin | 240° C. | 200° C. | 200° C. | 240° C. |
| Molded article 5, product thickness 2.5 mm | | | | |
| Retraction delay time | 0 sec. | | | |
| Evaluation | ◎ | ◎ | ◎ | ◎ |
| Retraction delay time | 2 sec. | | | |
| Evaluation | ◎ | ◎ | ◎ | ◎ |
| Retraction delay time | 5 sec. | | | |
| Evaluation | ◎ | ◎ | ◎ | ◎ |
| Molded article 10, product thickness 3.0 mm | | | | |
| Retraction delay time | 0 sec. | | | |
| Evaluation | ◎ | ◎ | ◎ | ◎ |
| Retraction delay time | 2 sec. | | | |
| Evaluation | ◎ | ◎ | ◎ | ◎ |
| Retraction delay time | 5 sec. | | | |
| Evaluation | ◎ | ◎ | ◎ | ◎ |
| Molded article 11, product thickness 3.5 mm | | | | |
| Retraction delay time | 0 sec. | | | |
| Evaluation | ◎ | ◎ | ◎ | ◎ |
| Retraction delay time | 2 sec. | | | |
| Evaluation | ◎ | ◎ | ◎ | ◎ |
| Retraction delay time | 5 sec. | | | |
| Evaluation | ◎ | ◎ | ◎ | ◎ |
| Molded article 12, product thickness 4.0 mm | | | | |
| Retraction delay time | 0 sec. | | | |
| Evaluation | ◎ | ◎ | ◎ | ◎ |
| Retraction delay time | 2 sec. | | | |
| Evaluation | ◎ | ◎ | ◎ | ◎ |
| Retraction delay time | 5 sec. | | | |
| Evaluation | ◎ | ◎ | ◎ | ◎ |

TABLE 12

| | Resin | | | |
|---|---|---|---|---|
| | ABS | HIPS | PC/ABS | PC |
| | Product name | | | |
| | STYLAC 121 | STYLON 492 | MULTILON T3714 | IUPILON S2000 |
| 1. Common parameters | | | | |
| Temperature of molten resin | 240° C. | 240° C. | 265° C. | 290° C. |
| Type of pressurized fluid | Nitrogen gas | | | |
| 2. Pressure forming conditions | | | | |
| Pressurization pressure | 30 MPa | 30 MPa | 30 MPa | 30 MPa |
| Delay time | 1 sec. | 1 sec. | 1 sec. | 1 sec. |
| Pressurization time | 20 sec. | 20 sec. | 20 sec. | 20 sec. |
| Retention time | 10 sec. | 10 sec. | 10 sec. | 10 sec. |
| 3. Blow molding conditions | | | | |
| Pressurization pressure | 30 MPa | 30 MPa | 30 MPa | 30 MPa |
| Delay time | 1 sec. | 1 sec. | 1 sec. | 1 sec. |
| Pressurization time | 20 sec. | 20 sec. | 20 sec. | 20 sec. |
| Retention time | 5 sec. | 5 sec. | 5 sec. | 5 sec. |
| Evaluation | ◎ | ◎ | ◎ | ◎ |
| 2. Pressure forming conditions | | | | |
| Pressurization pressure | 30 MPa | 30 MPa | 30 MPa | 30 MPa |
| Delay time | 5 sec. | 5 sec. | 5 sec. | 5 sec. |
| Pressurization time | 20 sec. | 20 sec. | 20 sec. | 20 sec. |
| Retention time | 10 sec. | 10 sec. | 10 sec. | 10 sec. |
| 3. Blow molding conditions | | | | |
| Pressurization pressure | 30 MPa | 30 MPa | 30 MPa | 30 MPa |
| Delay time | 2 sec. | 2 sec. | 2 sec. | 2 sec. |
| Pressurization time | 20 sec. | 20 sec. | 20 sec. | 20 sec. |
| Retention time | 10 sec. | 10 sec. | 10 sec. | 10 sec. |
| Evaluation | ◎ | ◎ | ◎ | ◎ |
| 2. Pressure forming conditions | | | | |
| Pressurization pressure | 30 MPa | 30 MPa | 30 MPa | 30 MPa |
| Delay time | 2 sec. | 2 sec. | 2 sec. | 2 sec. |
| Pressurization time | 20 sec. | 20 sec. | 20 sec. | 20 sec. |
| Retention time | 10 sec. | 10 sec. | 10 sec. | 10 sec. |
| 3. Blow molding conditions | | | | |
| Pressurization pressure | 30 MPa | 30 MPa | 30 MPa | 30 MPa |
| Delay time | 5 sec. | 5 sec. | 5 sec. | 5 sec. |
| Pressurization time | 20 sec. | 20 sec. | 20 sec. | 20 sec. |
| Retention time | 10 sec. | 10 sec. | 10 sec. | 10 sec. |
| Evaluation | No hollow formed | | | |
| 2. Pressure forming conditions | | | | |
| Pressurization pressure | 30 MPa | 30 MPa | 30 MPa | 30 MPa |
| Delay time | 2 sec. | 2 sec. | 2 sec. | 2 sec. |
| Pressurization time | 20 sec. | 20 sec. | 20 sec. | 20 sec. |
| Retention time | 10 sec. | 10 sec. | 10 sec. | 10 sec. |
| 3. Blow molding conditions | | | | |
| Pressurization pressure | 30 MPa | 30 MPa | 30 MPa | 30 MPa |
| Delay time | 2 sec. | 2 sec. | 2 sec. | 2 sec. |
| Pressurization time | 20 sec. | 20 sec. | 20 sec. | 20 sec. |
| Retention time | 10 sec. | 10 sec. | 10 sec. | 10 sec. |
| Evaluation | Hollows were formed, but hollows extended greatly depending on pressure differences | | | |
| 2. Pressure forming conditions | | | | |
| Pressurization pressure | 30 MPa | 30 MPa | 30 MPa | 30 MPa |
| Delay time | 2 sec. | 2 sec. | 2 sec. | 2 sec. |
| Pressurization time | 20 sec. | 20 sec. | 20 sec. | 20 sec. |
| Retention time | 10 sec. | 10 sec. | 10 sec. | 10 sec. |
| 3. Blow molding conditions | | | | |
| Pressurization pressure | 25 MPa | 25 MPa | 25 MPa | 25 MPa |
| Delay time | 2 sec. | 2 sec. | 2 sec. | 2 sec. |
| Pressurization time | 20 sec. | 20 sec. | 20 sec. | 20 sec. |
| Retention time | 10 sec. | 10 sec. | 10 sec. | 10 sec. |
| Evaluation | No hollow formed | | | |

TABLE 13

| | Pressure | | |
|---|---|---|---|
| Diameter | 10 MPa | 20 MPa | 30 MPa |
| (A) | | | |
| φ6 | ○ | ○ | ○ |
| φ8 | ○ | ○ | ○ |
| φ10 | ○ | ○ | ○ |
| φ12 | ○ | ○ | ○ |
| φ15 | ○ | ○ | ○ |
| φ20 | ○ | ○ | ○ |
| φ25 | ○ | ○ | ○ |
| (B) | | | |
| φ6 | X | X | X |
| φ8 | X | X | X |
| φ0 | X | X | X |
| φ12 | X | X | X |
| φ15 | X | X | X |
| φ20 | X | X | X |
| φ25 | X | X | X |
| (C) | | | |
| φ6 | ○ | ○ | ○ |
| φ8 | ○ | ○ | ○ |
| φ10 | ○ | ○ | ○ |
| φ12 | ○ | ○ | ○ |
| φ15 | ○ | ○ | ○ |
| φ20 | ○ | ○ | ○ |
| φ25 | ○ | ○ | ○ |
| (D) | | | |
| φ6 | X | X | X |
| φ8 | X | X | X |
| φ10 | X | X | X |
| φ12 | X | X | X |
| φ15 | X | X | X |
| φ20 | X | X | X |
| φ25 | X | X | X |
| (E) | | | |
| φ6 | ○ | ○ | ○ |
| φ8 | ○ | ○ | ○ |
| φ10 | ○ | ○ | ○ |
| φ12 | ○ | ○ | ○ |
| φ15 | ○ | ○ | ○ |
| φ20 | ○ | ○ | ○ |
| φ25 | ○ | ○ | ○ |
| (F) | | | |
| φ6 | X | X | X |
| φ8 | X | X | X |
| φ10 | X | X | X |
| φ12 | X | X | X |
| φ15 | X | X | X |
| φ20 | X | X | X |
| φ25 | X | X | X |

TABLE 14

| 433 | 432 | 434 | 437 | 435 | 436 |
|---|---|---|---|---|---|
| φ2 | φ5.5 | 4 | H7/f8 | 0.3 | 0.4 |
| φ3 | φ6.5 | | | | |
| φ4 | φ7.5 | | | | |
| φ5 | φ8.5 | | | | |
| φ6 | φ9.5 | | | | |
| φ7 | φ10.5 | | | | |
| φ8 | φ11.5 | | | | |
| φ10 | φ13.7 | | | | |
| φ12 | φ16.5 | | | | |
| φ13 | φ17.5 | | | | |
| φ16 | φ20.5 | | | | |
| φ18 | φ22.5 | | | | |
| φ20 | φ24.5 | | | | |

TABLE 15

| Parameters | ABS | HIPS | PP | PC |
|---|---|---|---|---|
| Resin temperature (° C.) | 240 | 220 | 200 | 280 |
| Injection pressure (MPa) | 130 | 130 | 130 | 130 |
| Injection speed (mm/sec) | 150 | 150 | 150 | 150 |
| Pressurization pressure (MPa) | 20 | 20 | 20 | 20 |
| Delay time (sec) | 5 | 5 | 5 | 5 |
| Pressurization time (sec) | 20 | 20 | 20 | 20 |
| Retention time (sec) | 5 | 5 | 5 | 5 |
| Atmospheric discharge time (sec) | 10 | 10 | 10 | 10 |
| Working example 35 | ○ | X | X | ○ |
| Working example 36 | ○ | ○ | ○ | ○ |
| Working example 37 | ○ | X | X | ○ |
| Working example 38 | ○ | ○ | ○ | ○ |
| Working example 39 | ○ | X | X | ○ |
| Working example 40 | ○ | ○ | ○ | ○ |

○: No intrusion of resin into the hole/Effect of fluid pressurization realized sufficiently
X: Occurrence of intrusion of resin into the hole was observed but the fluid pressurization was passably feasible.

The above described working examples and embodiments have been exemplified only for the purpose of presentation, and hence the present invention is not restricted to them and they are susceptible to modifications or additions, as long as these changes in no way contradict the technical spirits of the present invention that can be construed by the parties concerned from the scope of patent claims, detailed description of the invention and illustrated drawings.

INDUSTRIAL APPLICABILITY

The present invention can be applied to manufacturing of injection molded articles by using resins.

DESCRIPTION OF REFERENCE NUMERALS

1: Nitrogen gas cylinder (Nitrogen gas bottle filled at a pressure of 15 MPa), 2: Manometer (Pressure gauge indicating the pressure in the nitrogen gas cylinder 1), 3: Valve (Manual valve to be closed when the nitrogen gas cylinder is replaced), 4: Regulator (Regulator to control the pressure in the nitrogen gas cylinder), 5: Manometer (Pressure gauge to verify the pressure set by the regulator 4), 6: Check valve, 7: Manometer (Pressure gauge to verify the pressure of the intermediate stage of gas booster during compression), 8: Gas booster (Gas booster to compress nitrogen gas), 9: Manometer (Pressure gauge to verify the pressure in the receiver tank 10), 10: Receiver tank (Receiver tank to accumulate the compressed high-pressure nitrogen gas), 11: Valve (Manual valve (drain valve) to evacuate the high-pressure nitrogen gas in the receiver tank 10), 12: Regulator (Regulator to set the pressure of pressurized fluid when the resin in the cavity is pressurized. The manometer to verify the set pressure is not illustrated.), 13: Manometer (Pressure gauge to verify the pressure of pressurized fluid), 14: Automatic on-off valve (Automatic on-off valve to introduce the pressurized fluid into the cavity), 15: Automatic on-off valve (Automatic on-off valve to eject or inject the pressurized fluid into the atmosphere), 16: Flow direction of the pressurized fluid, 17: Piping, 18: Flow direction of exhaust (blowout) of the pressurized fluid, 19: Flow direction of exhaust gas when the pressurized fluid in tank 10 is drained, 20: Indicates the state of presence in the atmosphere, 21: Cavity, 22: Mounting plate on the stationary side, 23: Mounting plate on the movable side, 24: Sprue bush, 25: Sprue of molded article, 26: Parting of the mold, 27: Ejector pin, 28: Upper ejector plate, 29: Lower ejector plate, 30: Mold cavity on the stationary side, 31: Mold cavity on the movable side, 32: Nested element on the stationary side, 33: Clearance at the matching part of the stationary side nested element, 34: Nested element on the movable side, 35: Clearance at the matching part of the movable side nested element, 36: Slide-core provided on the stationary side, 37: Slide-core provided on the movable side, 38: Seal (Seal installed for preventing the pressurized fluid from leaking out from the sprue bush), 39: Seal (Seal between the mounting plate and the mold plate on both the stationary and the movable sides), 40: Seal (Seal installed on the parting), 41: Seal (Seal on the parting surface of the slide-core provided on the stationary side), 42: Seal (Seal on the parting surface of the slide-core provided on the movable side), 43: Seal (Seal provided in the ejector plate), 44: Plate (Lower seal plate under the stationary side nested element), 45: Plate (Upper seal plate under the stationary side nested element), 46: Seal (Seal provided between the seal plates under the stationary side nested element), 47: Flow direction of pressurized fluid (However, regarding the stationary side part, as it is similar to that for the movable side, etc., it is not illustrated.), 48: Connecting port (Connecting port between the mold and the device for pressurized fluid in FIG. 1 or FIG. 46), 49: Passageway for pressurized fluid, 50: Pressurization pin, 51: Broken lines (Broken lines 51 indicating that the ejector mechanism is enclosed in a closed space and hermetically sealed (Ejector box structure), 52: Space (Space created by the ejector box 52), 53: Plate (Lower seal plate under the movable side nested element), 54: Plate (Upper seal plate under the movable side nested element), 55: Seal (Seal provided between the seal plates 53 and 54 under the movable side nested element), 56: Injection means (Injection means 56 for injecting pressurized fluid into the ejector box 51 comprises the connecting port 48 and the passageway 49 for pressurized fluid.), 57: Ejection means (Ejection means 57 for making the pressurized fluid act directly on the resin in the cavity to pressurize directly the resin in the cavity from the stationary side comprises connecting port 48, passageway 49 for pressurized fluid, and pressurization pin 50.), 58: Ejection means (Ejection means 58 for making the pressurized fluid act directly on the resin in the cavity to pressurize directly the resin in the cavity from the movable side comprises connecting port 48, passageway 49 for pressurized fluid, and pressurization pin 50.), 59: Ejection means (Ejection means 59 for making the pressurized fluid act directly on the resin in the cavity from the stationary side slide-core to pressurize the resin comprises connecting port 48, passageway 49 for pressurized fluid, and pressurization pin 50.), 60: Ejection means (Ejection means 60 for making the pressurized fluid act directly on the resin in the cavity from the movable side slide-core to pressurize the resin comprises connecting port 48, passageway 49 for pressurized fluid, and pressurization pin 50.), 61: Ejection means (Ejection means 61 for introducing the pressurized fluid into the cavity through the clearances 33 in the stationary side nested element to pressurize the resin from the stationary side comprises connecting port 48, passageway 49 for pressurized fluid, and pressurization pin 50.), 62: Valve (Automatic on-off valve to solve the problem of occurrences of short-mold, discoloration and burn by letting out the air in the cavity from the parting when the cavity has been filled with resin), 63: Passageway (Passageway in the mold for drawing off the air in the cavity from the gas vents, etc. provided in parting, nested element, etc.,), 64: Hose (Pressure-resistant hose connected to valve 62, valve 67, valve 68, etc. provided for drawing off the air in the cavity), 65: Flow direction of the air drawn off out of the cavity, 66: Air in the cavity that has been discharged into the atmosphere, 67: Valve (Automatic on-off valve having the same function as that of automatic on-off valve 62 connected to plate 44 and plate 45 on the stationary side), 68: Valve (automatic on-off valve having the same function as that of automatic on-off valve 62 connected to plate 44 and plate 45 on the stationary side), 69: Outer cylinder, 70: Flanged part, 71: Inner core, 72: D-shaped surface (Machined to make a D-shaped cross section (D-cut) serving as a passageway for pressurized fluid), 73: Apical end of inner core 71, 74: D-shaped surface, 75: Hexagonal shape, 76: Fitting, 77: Part into which the inner core 71 is inserted, 78: Stationary side mold plate, 79: Part into which the flanged part of inner core 71 is accommodated (Because an O-ring makes line-to-surface contact, its sealing effect is low. The inventor used a rubber sheet cut in a circle to improve the sealing effect by creating surface-to-surface contact, 80: Hole, 81: Groove (Passageway for the air drawn off from the cavity and for the pressurized fluid), 82: Groove (Groove for accommodating a seal ring 89), 83: Hole (Hole into which the ejector pin is inserted), 84: Hole (Hole into which the pressurization pin 50 is inserted), 85: Hole (Hole accommodating the flanged part of pressurization pin 50, 86: Hole (It shows the details of the hole of passageway 63 for letting out the air in FIG. 3), 87: Movable side mold plate, 89: Seal ring (Seal ring provided for sealing the ejector pin), 90: Seal ring (Seal ring provided for preventing the air from intruding through interstices around ejector pins when the aspiration by vacuum is carried out.), 91: Seal (To prevent the entry of air through the clearances between plate 53 and plate 92 when aspiration by vacuum is carried out.), 92: Plate (Plate for pressing the seal ring 90), 93: Seal (Seal provided between mold plate 87 and plate 54 on the movable side, for preventing the escape of pressurized fluid through this clearance. A seal with a similar function is provided also between mold plate 78 and plate 54 on the stationary side, although not illustrated.), 94: Gas vent, 95: Groove, 96: Groove, 97: Hole (Hole of exhaust gas circuit 63), 98: Connection port (Connection port of valve 62 in FIG. 2), 99: Gas vent of the nested element, 100: Passageway (Passageway for drawing off the air in the cavity, passageway for pressurized fluid), 101: Groove (Connected to air exhaust passageway 63 through a groove leading to gas vent 99. The passageway for pressurized fluid when the pressurized fluid is introduced between plate 53 and plate 54, to pressurize the resin in the cavity, 102: Space (Small space created for the purpose of providing a cushioning effect, but it is not always needed to create it., 103: Resin part, 104: Spring, 105: Embossment, 106: Ceramic coating, 107: Glossy surface, 108: Gate (Made as a side gate), 109: Apex of pressurized fluid pin, 110: Pressurization part of the movable side, 111: Pressurization part of the stationary side, 112: Pressurization part of the movable side slide-core, 113: Pressurization part of the stationary side slide-core, 115: Ejection means, 116: Ejection means (The resin in the cavity is pressurized by fluidic pressure by injecting the pressurized fluid through passageways of grooves 81 formed between plate 53 and plate 54, and through the clearances in the nested element and the clearances around ejector pins.), 117: Flanged part of inner core 71, 118: D-shaped surface of flanged part 117 (It has been machined so as to have D-shaped cross section for the passageway of pressurized fluid), 119: Apical end section, 120: U-shaped groove (U-shaped groove is engraved and serves as a passageway for pressurized fluid), 121: Hole, 122: Socket for Allen wrench, 123: Threaded part, 124: Molded article, 126: O-ring (seal), 127: setscrew, 128: Pressurized fluid, 129: Part of a thin thickness, 130: Boss, 131: U-shaped groove (U-shaped groove is engraved and serves as a passageway for pressurized fluid), 132: Outer cylinder, 133: Inner core, 134: D-shaped surface, 135: Flanged part, 136: Boss on the molded article, 140: Device for preparing the pressurized fluid, 141: Sealed mold, 142: Sealed mold, 200: Cavity, molding space, 201: Stationary side mold, 202: Movable side mold, 203: Core body, 204: Pressurization pin (Direct pressurization), 205: First mold, 206: Second mold, 207: Flanged part, 208: Depressed part, 209: Opening, 210: Molded article, 211: Rib (It is a rib provided for stopping the pressurized fluid), 212: Pressurization pin (Indirect pressurization), 213: Depressed part, 214: Nested element, 215: Nested element, 216: Molded article, 217: Surface, 218: Gas rib around the ejector pin, 219: Clearance between ejector pin and rib, 220: Embossing with coarse grains of φ20, 221: Schematic diagram describing that the nested element 34 was machined so as to have a shape enabling to accommodate the core body 203, 222: Seal, 223: Part for ejecting pressurized fluid, 224: Outer cylinder, 225: Inner core, 226: Core body part, 227: Ejector pin having a passageway for pressurized fluid formed by machining an ejector sleeve, 228: Seal, 229: Seal, 230: Seal, 231: Stepped hole to accommodate the ejector pin, 232: Stepped hole to accommodate the ejector pin, 233: Stepped hole to accommodate the ejector pin, 234: Stepped hole to accommodate the ejector pin, 235: Stepped hole to accommodate the ejector pin, 236: Groove, 237: Groove, 238: Groove, 239: Groove, 240: Groove, 241: Convex shape, 242: Concave shape, 243: Seal,

244 Sintered part
245 Part of superimposed plates
246 Part of superimposed quadrangular columns
247 Part of superimposed circular cylinders
248 Cubic block
249 Ejection portion
250 Cylindrically shaped flanged element
251 Spring
252 Ball
253 Arrowhead indicating the ball movement
254 Part of superimposed quadrangular pyramids
255 Quadrangular pyramid or cone
256 Setscrew
257 Space created by moving back the pressurization pin
258 Rod
259 Arrowhead indicating the movement of pressurization pin
260 Driving device
261 Molten resin in the cavity
262 Clearance (space)
263 Arrowhead indicating the movement of pressurized fluid in an ejector plate
264 Arrowhead indicating the flow of pressurized fluid in a pressurization ejector pin
265 Arrowhead indicating the flow of pressurized fluid through the clearance between a resin and the mold
266 Arrowhead indicating that a molten resin is undergoing fluid pressurization.
267 Tip of return pin
268 Spring
269 Return pin
270 Space
271 Return pin
272 Ejector rod
273 Clearance
274 Driving device
275 Wedge block
276 Arrowhead indicating the movement of wedge block
277 Rod
278 Wedge unit
279 Space (clearance)
280 Wedge unit
281 Plate
282 Seal
283 Plate
284 Plate
285 Clearance
286 Space (Clearance)
287 Plate
288 Plate
289 Seal
290 Seal
291 Seal
292 Seal
293 Seal
294 Spring
295 Seal
296 Seal
297 Plate
298 Plate
299 Seal
300 Plate
301 Ejector pin guide
302 Clearance
303 Plate
304 Space (clearance)
305 Clearance
306 Passageway for pressurized fluid provided on a flanged part
307 Clearance between ejector pin guide and ejector pin
308 Arrowhead indicating the backward movement of ejector pin
309 Tip portion made of a porous material (e.g. sintered metal)
310 Clearance
311 Clearance
312 Boss
313 Boss
314 Boss
315 O-ring (example of ring-shaped member)
316 Main body (sealing part), main body of a ring-shaped elastic member
317 Cut end
318 Stepped portion
319 Body
320 Flanged part
321 Body
322 Clearance
323 Slide portion
324 Sliding direction
325 Inclined pin
236 Sliding direction
327 Slide unit
328 Extrusion direction
329 Slide ring or wear ring
330 Piston
331 Cylinder
332 Outer cylinder
333 Seal
334 Clearance
335 Arrowhead indicating the movement of piston
336 Coolant (before cooling)
337 Coolant (after cooling)
338 Inlet port
339 Outlet port
340 Baffle plate

341 Cylinder head
342 Rear cover of cylinder
345 Passageway of pressurized fluid (before compression)
346 Compression space
347 Passageway of pressurized fluid (after compression)
348 Rod
349 Arrowhead indicating the movement of rod
350 Hydraulic or pneumatic cylinder or electric motor
351 Clearance between cylinder 33 land piston 330
352 Connecting part between cylinder 331 and rod 348
353 Rib
354 Floating core (core-backing part)
355 Rod
356 Injection molding unit
357 Ejector pin
358 Ejector pin for pushing the upper part of rib
359 Pressurized fluid
360 Space created by core-backing
361 Lower seal plate
362 Upper seal plate
363 Seal
364 Arrowheads indicating the core-backing movement
365 Seal
366 Clearance
367 Resin
368 Hot runner
369 Tapered portion
370 Tapered portion
371 Circumferential rib created by core-backing
372 Upper slide plate
373 Lower slide plate
374 Slotted hole for slide unit movement
375 Seal
376 Seal
377 Leg of the lower part of slide unit
378 Space (corresponding to cavity)
379 Steel product making up a space (corresponding to a nested element)
380 Shaft body for extruding
381 Ring-shaped elastic member
382 Groove for fitting in a ring-shaped elastic member
383 Sea plate
384 Inlet and outlet port for pressurized fluid
385 Safety valve
386 Pressure gauge
387 Seal
388 Device having verified the capacity of sealing properties of ring-shaped elastic members
389 Slide-core
390 Nested element
391 Matching surface of nested element
392 Structure presenting the fixture of slide-core
393 Structure presenting the fixture of slide-core
394 Structure presenting the fixture of slide-core, and the ejection part
395 Structure presenting the fixture of slide-core, and the ejection part
396 Angular pin
397 Slide-core which angular pin 396 enters
398 Clearance
399 Rounded profile
400 Protruded portion
401 Clearance
402 Ejector plate
403 Arrowheads indicating the pressurized fluid having entered the clearance between a resin and the mold.
404 Arrowheads indicating the pressurized fluid having returned through ejector pin 27
405 Arrowheads indicating the pressurized fluid having returned through clearance 35 of nested element
406 Arrowheads indicating the pressurized fluid flowing erratically by passing through clearances between the bottom of nested element and plate 54
407 Arrowheads indicating the pressurized fluid of renewed ejection
408 Clearance between molded article and ejector plate
409 Clearance between molded article and ejector plate
410 Clearance between molded article and ejector plate
411 Gas rib provided on the movable side
412 Gas rib provided on the stationary side
413 Gas rib placed away from the parting
414 Gas rib placed away from the parting
415 Upper plate
416 Lower plate
417 Seal
418 Bottom of nested element
419 Seal provided on the matching surface of nested element
420 Block of sealed nested elements
421 Shape to control the flow of pressurized fluid by cutting the portion obliquely
422 Shape to control the flow of pressurized fluid by cutting the portion obliquely
423 Thrust pin
424 Gate
425 Portion where the gate is pushed in
426 The portion indicates the space that has been created by pushing in the gate, and shows that the gate-cut operation has been completed.
427 The portion indicates the gate that has been pushed in.
428 Sprue runner
429 Arrowhead indicating the forward movement of thrust pin 423
430 Arrowhead indicating the backward movement of thrust pin 423
431 Portion made of a porous material through which a pressurized fluid can pass but a molten resin cannot pass.
432 Dimension accommodating an L-shaped seal
433 Diameter of ejector pin
435 Shape indicating the guide of L-shaped seal
434 Depth of the housing accommodating an L-shaped seal
436 Shape of the bottom of housing accommodating an L-shaped seal
437 Fitting tolerance between ejector pin and L-shaped seal
438 Pressurized fluid having leaked out that seal ring 440 was not able to contain
439 Seal ring
440 Seal ring
441 Seal ring
442 Pressurized fluid having leaked out that seal ring 89 was not able to contain
443 Hole on nozzle tip through which a molten resin flows out
444 Nozzle cap
445 Groove
446 Ball
447 Space where ball 446 moves back and forth, space through which a molten resin passes
448 Face (front face of the ball), frontal part of a spherical shape
449 Face (rear face of the ball), rear face part of a spherical shape
450 Portion with which ball 446 comes in contact and makes up a seal [sealing part (spherical in shape)]

451 Threaded part
452 Nozzle body
453 Flow of molten resin
454 Flow channel of molten resin
455 Clearance
456 Shape of rear portion (end portion) of element of reference numeral 445
457 Magnet
458 Conical shape
459 Conical shape
460 Flat surface
461 Flat surface
462 Guide
463 D-shaped cut
464 Rail shape
465 Seal
466 Passageway for pressurized fluid
467 Pressurization pin
468 Rear part (back face) of flanged part of pressurization pin 467
469 Inlet/outlet port for pressurized fluid
470 Outer cylinder, with the same function as that of outer cylinder of reference numeral 224
471 Passageway
472 Plate
473 Plate
474 Seal
475 Clearance
476 Seal
477 Die plate
478 Support pillar
479 Hole
480 Hole
481 Space
482 Pressurized fluid
483 Hole
484 Tip portion
485 Hole
486 Inserted portion
487 Cap
488 Outer cylinder
489 Hole
490 Hole
491 Space
492 Hole
493 Space
494 Flange
495 Flange of screw
496 Screw
497 Thickness
498 Backlash
499 Abbreviation sigh indicating a long distance
500 Pressurization ejector pin (ejector pin 27 constituting ejector pin 500 has a mechanism to extrude the molded article)
501 Sub-tank
502 Sub-tank
503 K-seal and the like
504 Slide ring
505 Slide ring
506 Joint
507 Shaft body for extruding straight
508 Shaft body for extruding obliquely
509 Part to form a seal by contacting ball 446 [sealing part (in a form of cone/sphere to make a line-to line contact seal)]
510 D-shaped cut
511 Space
512 Ejector pin the inside of which is pierced to make holes 479 and 480
513 Mechanism to drive the element of reference numeral 514
514 Valve pin
515 Seal
516 Tip portion
517 Portion into which tip portion 516 fits.
518 Tip portion
519 Bale-shaped valve
520 Clearance
521 Air
522 Air pipe fitting
523 Air
524 Tip portion
525 Plate (reference numeral only without illustration)
526 Draft angle of molded article
527 Surface formed by the plate
528 Seal (O-ring)
529 Tip portion of pressurization pin was made to present a depressed shape due to the presence of rib.
530 Rib
531 Narrow portion outside the rib
532 Sintered metal
533 Outer cylinder enclosing a sintered metal
534 Nested element using a sintered metal
535 Space filled with a pressurized fluid
536 Conduit tube of pressurized fluid
537 Threaded part
538 Seal (O-ring)
539 Flange
540 Seal (O-ring)
541 Boss
542 Inner core
543 Outer cylinder
544 Arrowhead indicating that the inner core is able to move back and forth
545 Cone part at the tip of inner core
546 Space
547 Inclined shape provided on the molded article
548 Rib of molded article illustrated in FIG. 39 to FIG. 41
549 Thickness of molded article illustrated in FIG. 39 to FIG. 41
550 Hollow formed by injection blow molding
551 Compressed hollow resulting from the implementation of pressure forming-injection molding on a hollow formed by injection blow molding
552 Emboss
553 Emboss
554 Emboss
555 Molten resin having entered space 511
556 Resin of element of reference numeral 555 having been pushed into a molten resin in the cavity
557 Space
558 Arrowhead indicating that outer cylinder 224 is moved back
559 Arrowhead indicating that outer cylinder 224 is moved forward again
560 Arrowhead indicating that outer cylinder 224 is moved back again
561 Lip (inside)
562 Lip (outside)
563 Face
564 Upper ejector plate
565 Lower ejector plate
566 Ejector plate

567 Support pillar (return pin connected with ejector plate 566)
568 Upper part of ejector rod 570
569 Upper part of the stepped shape of ejector rod 570
570 Ejector rod
571 Distance
572 Arrowhead indicating the movement of ejector rod
573 Rib provided on the edge of molded article (for controlling the leakage of pressurized fluid)
574 Rib provided on the inner part of molded article (for controlling the leakage of pressurized fluid)
575 Rib provided on the inner part of molded article (for controlling the leakage of pressurized fluid)
576 Zone filled by sequential control
577 Zone filled by sequential control
578 Zone filled by sequential control
579 Zone filled by sequential control
580 Gate portion of hot runner
581 Gate portion of hot runner
582 Gate portion of hot runner
583 Gate portion of hot runner
584 Part for ejecting pressurized fluid that is exemplified by 227, element of reference numeral 470, etc.
585 Part for ejecting pressurized fluid that is exemplified by 227, element of reference numeral 470, etc.
586 Part for ejecting pressurized fluid that is exemplified by 227, element of reference numeral 470, etc.
587 Part for ejecting pressurized fluid that is exemplified by 227, element of reference numeral 470, etc.
1100: Location of occurrence of sink marks, 1101: Location of occurrence of sink marks, 1102: Location of occurrence of sink marks, 1140: Device for preparing the pressurized fluid

The invention claimed is:

1. A mold device, comprising:

a shaft mechanism that is provided on at least one of a first mold and a second mold, the first mold and the second mold forming a molding space having a nested structure; and an ejection portion that is provided on at least one of the first mold and the second mold, the ejection portion ejecting a pressurized fluid from an ejection device to the molding space for letting the pressurized fluid enter a clearance between a resin and a cavity of the mold device to pressurize the resin during an injection of the resin or after the injection of the resin, wherein the shaft mechanism includes:

a shaft body for extruding a molded article that is molded from the resin injected into the molding space;

a ring-shaped elastic member for supporting the shaft body, an opening of a groove formed in a circumferential direction of the ring-shaped elastic member being oriented toward the molding space; and a ring-shaped member fitted into the opening of the groove of the ring-shaped elastic member, wherein the ejection device has a pressurization pin or a pressurization ejector pin, the pressurization pin or the pressurization ejector pin has a multiple structure including an outer cylinder, the outer cylinder having a passage of the pressurized fluid inside the outer cylinder, at least the outer cylinder of the pressurization pin or the outer cylinder of the pressurization ejector pin is configured to move backward before fluid pressurization to make a space between the ejection portion and the resin so that the fluid pressurization is carried out toward the space, the ejection portion being formed at a tip of the pressurization pin or the pressurization ejector pin.

2. A mold device, comprising:

an ejection device for ejecting a pressurized fluid and letting the pressurized fluid enter a clearance between a resin and a cavity of the mold device during an injection of the resin or after the injection of the resin to pressurize the resin, wherein the ejection device has a pressurization pin or a pressurization ejector pin, the pressurization pin or the pressurization ejector pin has a multiple structure including an outer cylinder, the outer cylinder having a passage of the pressurized fluid inside the outer cylinder, at least the outer cylinder of the pressurization pin or the outer cylinder of the pressurization ejector pin is configured to move backward before fluid pressurization to make a space between an ejection portion and the resin so that the fluid pressurization is carried out toward the space, the ejection portion being formed at a tip of the pressurization pin or the pressurization ejector pin.

3. The mold device according to claim 2, further comprising:

a discharge portion for discharging air in a molding space while the resin is being injected.

4. An injection molding system, comprising:

the mold device according to claim 2; and an injection device for injecting the resin into the mold device.

5. A method for manufacturing molded article, comprising:

a first step of injecting a resin into a molding space of the mold device according to claim 2;

a second step of ejecting the pressurized fluid between the resin injected into the molding space and a first mold forming the molding space or between the resin injected into the molding space and a second mold forming the molding space; and a third step of opening the first mold and the second mold and extruding the molded article by a shaft body, the molded article being formed from the resin injected into the molding space.

6. A method for manufacturing molded article, comprising:

a first step of injecting a resin into a molding space of the mold device according to claim 2;

a second step of moving the ejection device of pressurized fluid backward;

a third step of ejecting the pressurized fluid from the ejection portion into between the resin injected into the molding space and a first mold forming the molding space or between the resin injected into the molding space and a second mold forming the molding space; and a fourth step of opening the first mold and the second mold and extruding the molded article by a shaft body, the molded article being formed from the resin injected into the molding space.

7. A method for manufacturing molded article, comprising:

a first step of injecting a resin into the molding space of a mold device according to claim 2 while discharging air in the molding space from a discharge portion;

a second step of ejecting the pressurized fluid from the ejection portion into between the resin injected into the molding space and a first mold forming the molding space or between the resin injected into the molding space and a second mold forming the molding space; and a third step of opening the first mold and the second mold and extruding the molded article by a shaft body, the molded article being formed from the resin injected into the molding space.

8. A method for manufacturing molded article, comprising:

a first step of injecting a resin into a molding space of the mold device according to claim 2 while discharging air in the molding space from a discharge portion;

a second step of moving the ejection device of pressurized fluid backward;

a third step of ejecting the pressurized fluid from the ejection portion between the resin injected into the molding space and a first mold forming the molding space or between the resin injected into the molding space and a second mold forming the molding space; and a fourth step of opening the first mold and the second mold and extruding the molded article by a shaft body, the molded article being formed from the resin injected into the molding space.

* * * * *